(12) United States Patent
Wolfe

(10) Patent No.: US 12,283,028 B2
(45) Date of Patent: Apr. 22, 2025

(54) SPATIO-TEMPORAL NOISE MASKS FOR IMAGE PROCESSING

(71) Applicant: NVIDIA Corporation, Santa Clara, CA (US)

(72) Inventor: Alan Wolfe, San Clemente, CA (US)

(73) Assignee: NVIDIA Corporation, Santa Clara, CA (US)

( * ) Notice: Subject to any disclaimer, the term of this patent is extended or adjusted under 35 U.S.C. 154(b) by 567 days.

(21) Appl. No.: 17/533,062

(22) Filed: Nov. 22, 2021

(65) Prior Publication Data

US 2022/0392023 A1 Dec. 8, 2022

Related U.S. Application Data

(60) Provisional application No. 63/196,116, filed on Jun. 2, 2021.

(51) Int. Cl.
*G06T 5/75* (2024.01)
*G06T 3/4046* (2024.01)
*G06T 15/06* (2011.01)
*G06T 15/08* (2011.01)

(52) U.S. Cl.
CPC .............. *G06T 5/75* (2024.01); *G06T 3/4046* (2013.01); *G06T 15/06* (2013.01); *G06T 15/08* (2013.01)

(58) Field of Classification Search
None
See application file for complete search history.

(56) References Cited

U.S. PATENT DOCUMENTS

| | | | |
|---|---|---|---|
| 2015/0002545 A1* | 1/2015 | Webster | G09G 5/377 345/634 |
| 2016/0063705 A1 | 3/2016 | Xu et al. | |
| 2017/0045950 A1 | 2/2017 | El Dokor et al. | |
| 2021/0012465 A1 | 1/2021 | Kim et al. | |
| 2021/0233213 A1* | 7/2021 | Mejjati | G06N 3/045 |

OTHER PUBLICATIONS

Georgiev et al., "Blue-noise Dithered Sampling," SIGGRAPH, Jul. 24-28, 2016, 1 page.
IEEE, "IEEE Standard 754-2008 (Revision of IEEE Standard 754-1985): IEEE Standard for Floating-Point Arithmetic," Aug. 29, 2008, 70 pages.
Ulichney, "The Void-and-Cluster Method for Dither Array Generation," Digital Equipment Corporation, 1993, 12 pages.
Wikipedia, "IEEE 802.11," Wikipedia the Free Encyclopedia, https://en.wikipedia.org/wiki/IEEE_802.11, most recent edit Sep. 20, 2020 [retrieved Sep. 22, 2020], 15 pages.

* cited by examiner

*Primary Examiner* — Leon Viet Q Nguyen
(74) *Attorney, Agent, or Firm* — Davis Wright Tremaine LLP

(57) ABSTRACT

Apparatuses, systems, and techniques to generate blue noise masks for real-time image rendering and enhancement. In at least one embodiment, a noise mask is generated and applied to one or more images to generate one or more enhanced images for image processing (e.g., real-time image rendering). In at least one embodiment, the noise mask is able to handle the temporal domain (e.g., add time to the spatial domain) to improve image quality when rendering images over multiple frames.

31 Claims, 120 Drawing Sheets

SPATIO-TEMPORAL NOISE MASKS FOR IMAGE PROCESSING

CROSS-RELATED APPLICATION

This application claims priority to U.S. Provisional Patent Application No. 63/196,116 titled "NOISE MASKS FOR IMAGE PROCESSING," filed on Jun. 2, 2021, the content of which is hereby incorporated by reference in its entirety.

TECHNICAL FIELD

At least one embodiment pertains to processing resources used to perform and facilitate real-time image rendering and enhancement. For example, processors or computing systems to generate blue noise masks used in image enhancement according to various novel techniques described herein.

BACKGROUND

Image processing, such as imaging rendering and enhancement can use significant memory, time, or computing resources, especially when the processing is to be performed in real time. The amount of memory, time, or computing resources used to enhance images can be improved.

DETAILED DESCRIPTION

Figure 1A:
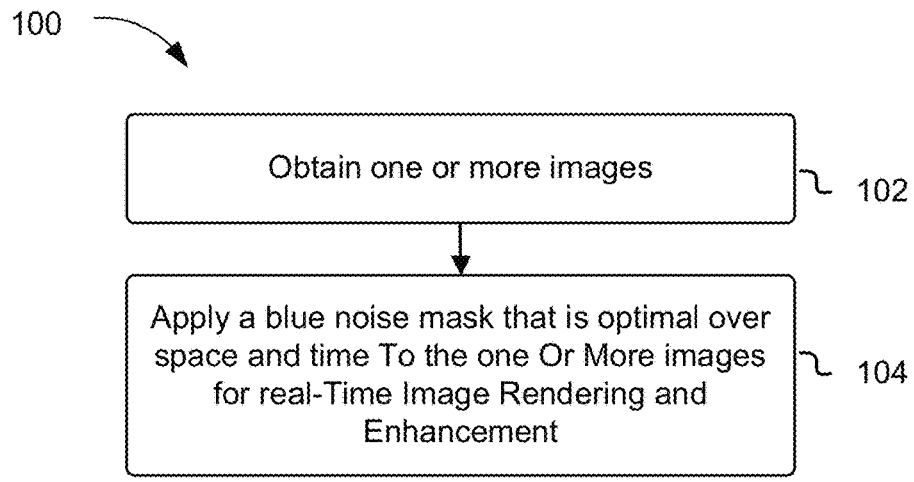
FIG. 1A illustrates an example of a process for a framework to generate blue noise masks optimal for use over both space and time, according to at least one embodiment.

In the following description, numerous specific details are set forth to provide a more thorough understanding of at least one embodiment. However, it will be apparent to one skilled in the art that the inventive concepts may be practiced without one or more of these specific details.

Blue noise masks are used in systems to provide image rendering algorithms random numbers at a per-pixel level, which result in patterns of random noise that are perceptually better than white noise. Blue noise masks are generally limited to high frequencies such that they can be removed more thoroughly with a low pass filter (such that de-noising with a blur is much more effective).

However, in real-time image rendering, there is also an axis of time that needs to be considered. In some embodiments, improving sampling of an image based on a texture over time improves an image quality when viewed in motion, and is also applicable in temporal filtering methods such as temporal anti-aliasing (TAA) and deep learning super sampling (DLSS). There are various methods to animate blue noise masks over time, but there exists a tradeoff between the quality on the space axes, and the quality on the time axis.

In at least one embodiment, one or more circuits (which may be part of one or more processors in a computer system) generate blue noise masks that are both optimal over space and time (sometimes referred to herein as "spatio-temporal blue noise masks"). One or more circuits (implementing software operations) can generate these spatio-temporal blue noise masks as a set of N blue noise textures such that each texture is individually suitable blue noise, but each pixel is also blue noise over time. Suitable blue noise can contain sufficient amounts of higher frequencies and low amounts of lower frequencies.

In an embodiment, the spatio-temporal blue noise masks are created by modifying a void and cluster algorithm. A void and cluster algorithm is an algorithm used to generate N-dimensional blue noise masks. The void and cluster algorithm can be modified to make noise patterns that solve the desired constraints over both space and time simultaneously for real-time image rendering. In an embodiment, the modified void and cluster algorithm receives an image or images with pixel data, where pixel data includes data for N-dimensions (e.g., three or more dimensions, where one dimension is time).

Specifically, techniques described herein are directed to the generation of spatio-temporal blue noise masks for real-time image rendering and enhancement. For example, a spatio-temporal blue noise mask can be a three-dimensional mask, where two dimensions corresponds to space (e.g., x and y coordinates) and one dimension corresponds to time. In an embodiment, spatio-temporal blue noise masks are used to benefit a variety of applications or techniques for image rendering, including dithering, stochastic transparency, area light sampling, and volumetric rendering. Also, the spatio-temporal blue noise masks may be applied to a variety of sampling techniques, including, e.g., soft shadows and path tracing, stochastic alpha and dithering.

Specifically, the techniques described herein are directed to generating spatio-temporal blue noise masks that can handle the temporal domain, e.g., adding time to the spatial (image) domain to improve image quality when rendering images over multiple frames (e.g., time). For example, the techniques described herein can be used with temporal anti-aliasing, which is often used in games and other interactive applications to amortize the cost of rendering across multiple frames. Also, for still image rendering, enhancement to the images can be made by integrating over multiple samples per pixel covering the time or other dimensions, while still maintaining blue noise error properties spatially. Human perception (and some computing displays) performs some amount of implicit integration over time, especially at high frame rates, and these situations typically provide value to good sampling patterns over time, without any explicit filtering. Therefore, two-dimensional (2D) blue noise patterns are used for each frame, which are well distributed over time at each pixel and converge rapidly for Monte Carlo integration (e.g., numerical integration using random numbers). As such, the techniques described herein are directed to systems and methods that generate spatio-temporal blue noise masks, which maintain spatial 2D blue noise properties while providing blue noise over time at every pixel. In an embodiment, the spatio-temporal blue noise mask is generalized to arbitrary dimensionality for higher dimensional uses.

In at least one embodiment, a time slice is a specific time. More generally, a slice can also be a specific dimension or multi-dimensional layer (e.g., based on coordinates of the pixels that fall within a plane having the specific dimension or multi-dimensions). The techniques described herein describe a framework that enables each two-dimensional (2D) slice (in the spatial domain) of a three-dimensional image to be associated with blue noise properties so that each pixel comprises one-dimensional sampling properties over the time dimension. In an embodiment, taking a slice from a higher space results an image in a space of lower dimension. So, a 2D slice may be an image taken from a 3D image or object. In an embodiment, 3D images over time may be represented by a 2D slice (e.g., X-Y plane over a spatial domain) and a Z axis representing the time domain.

In an embodiment, the framework described herein provides blue noise properties in each spatial 2D slice that also provides a better than white noise sequence along the time axis. In addition, de-noising algorithms may benefit from spatio-temporal sampling techniques (and the use of blue noise). As a result, techniques described herein cause one or more circuits (which may be part of one or more processors which may be in a computer system) to execute an algorithm for spatio-temporal and higher-dimensional noise mask generation (e.g., blue noise masks). Specifically, spatio-temporal and higher-dimensional blue noise masks are generated by modifying a void and cluster algorithm.

In an embodiment, the void and cluster algorithm has an energy function which is what is used to find the emptiest space in the image to place the next pixel into. In an embodiment, one or more modifications can be made to the energy function of a void and cluster algorithm. In one modification, for spatio-temporal blue noise, the algorithm may be run in 3D to make a unique energy function. This energy function makes it so that pixels only affect each other in the energy field if they are from the same slice, or if they are the same pixel at a different point in time. This way, each 2D slice of the 3D blue noise will be a good 2D blue noise, and makes each pixel be 1D blue noise over time. As a result, error may be well hidden as blue noise, but is also just smaller by being able to converge to the correct result better. In an embodiment, another modification that can be made is to extend this to higher dimensions by specifying which axes should be grouped together into N-dimensional blue noise. This allows the techniques described herein to be extended beyond spatio-temporal blue noise into spatio-temporal-depth blue noise, which is four dimensional (4D). This is useful, for example, when rendering fog, but this may also be generalized for any dimensionality and any grouping of those dimensions that may be desired for a specific rendering algorithm. Being able to custom craft random numbers like this provides blue noise error in screen space while getting faster convergence for a rendering algorithm.

Blue noise distributions are well suited to human perception and minimize unwanted low-frequency noise. Blue-noise point-sets are also commonly referred to as blue noise masks or blue noise textures. In image rendering, it often involves integration of samples over multiple frames to amortize rendering costs, or equivalently, multiple samples taken per frame. Hence, in an embodiment, the techniques described herein achieve various technical advantages, including but not limited to using 2D blue noise patterns, that when animated produce samples at a pixel that are well distributed over time, converge rapidly for Monte Carlo integration, while still retaining spatial blue noise properties. Some spatial blue noise methods that are applied at each frame independently produce results that show white noise frequency spectra temporally and are therefore slow to converge for integration across time and are also unstable when filtered temporally.

Accordingly, the techniques described herein are an extension to the void and cluster algorithm involving reformulating the energy function, which produces spatio-temporal blue noise masks that exhibit blue noise frequency spectra in both the spatial and temporal domains. This may result in visually pleasing error patterns, rapid convergence speeds, and increased stability when filtered temporally. In some embodiments, the techniques described herein can also be extended to higher dimensions as it provides unique sampling characteristics for use in temporal integration. By applying the techniques deceived herein, improvements in a variety of applications such as dithering, stochastic transparency, low sample count ambient occlusion and volumetric rendering can be achieved.

In at least one embodiment, techniques described herein achieve various technical advantages, including but not limited to improving real-time image rendering and enhancement in applications using rendering algorithms that need per pixel random numbers, as well as any place quantization because it makes for very good dithering (good perceptually, from a filtering standpoint, and also the average of small regions of pixels over space and time are more accurate to the actual average of the source data un-quantized), which hides the fact that low bit counts were used. This is useful for reducing memory usage of geometry buffers (G-buffers), render targets, textures, etc.

While masks can be generated for two and three dimensions, the techniques described herein can apply to multiple dimensions (e.g., greater than 3, 6, 7, etc.). Also, the techniques are not limited to having one dimension as the time dimension; rather, the techniques described herein can generate a multi-dimensional mask (e.g., 7 dimensions), where one dimension is time, or no dimension is time. For example, a generate mask can relate to a 7 dimensional mask, where the first three axes (e.g., dimensions) refer to 3D blue noise, the next two axes (e.g., dimensions) refer to 2D blue noise, and the last two axes (e.g., dimensions) refer to 1D blue noise. In at least one embodiment, a computer implemented can select the grouping of dimensions when generating the mask.

In at least one embodiment, after a blue noise mask is generated, other types of filtering operations can be applied to a rendering process such as red noise filtering, band pass filtering, or other types of noise filtering (e.g., frequency attenuating filters or other denoising methods).

FIG. 1A illustrates an example of a process 100 for a framework to generate blue noise masks optimal for use over both space and time, according to at least one embodiment. In at least one embodiment, some or all of process 100 (or any other processes described herein, or variations and/or combinations thereof) is performed under control of one or more computer systems configured with computer-executable instructions and is implemented as code ((e.g., computer-executable instructions, one or more computer programs, or one or more applications, Compute Unified Device Architecture (CUDA) code)) executing collectively on one or more processors, by hardware, software, or combinations thereof. In at least one embodiment, code is stored on a computer-readable storage medium in form of a computer program comprising a plurality of computer-readable instructions executable by one or more processors. In at least one embodiment, a computer-readable storage medium is a non-transitory computer-readable medium. In at least one embodiment, at least some computer-readable instructions usable to perform process 100 are not stored solely using transitory signals (e.g., a propagating transient electric or electromagnetic transmission).

In at least one embodiment, a non-transitory computer-readable medium does not necessarily include non-transitory data storage circuitry (e.g., buffers, caches, and queues) within transceivers of transitory signals. In at least one embodiment, process 100 is performed at least in part on a computer system such as those described elsewhere in this disclosure. In at least one embodiment, process 100 is performed by one or more circuits to calculate motion of one or more pixels in a first region of an image based, at least in part, on motion of one or more pixels in a second region of the image that overlaps the first region.

In at least one embodiment, a system performing at least a part of process 100 includes executable code to generate blue noise masks that are both optimal over space and time (e.g., spatio-temporal blue noise masks). A spatio-temporal blue noise mask may be generated as set of N blue noise textures where each texture individually has good blue noise (e.g., containing high amounts of higher frequencies and low amounts of lower frequencies) and each pixel individually is also blue noise over time. This may provide the desired qualities of compromising on neither the space axes nor the time axis. In an embodiment, one or more images are obtained 102 from a computing device, a camera, or the like. In an embodiment, the one or more images may be a part of a gaming application where real-time image rendering algorithms are used to display images while the gaming application is being executed by a computing device. The computing device may comprise one or more graphic cards that uses deep learning to upscale lower-resolution images to a higher resolution for display on computing screens. In an embodiment, one or more processors of the computing device executes instructions to apply the spatio-temporal blue noise masks to the one or more obtained images for real-time image rendering 104.

In an embodiment, systems and methods described herein are directed to generating blue noise masks that are optimal over both space and time. This may be performed by using the void and cluster algorithm and extending the algorithm to handle a spatio-temporal domain. In an embodiment, the void and cluster algorithm comprises the following steps:
 1. Initial Binary Pattern
 2. Phase I—Make Pattern Progressive
 3. Phase II—First Half of Pixels
 4. Phase III—Second Half of Pixels
 5. Finalize Texture In an embodiment, one or more computing devices execute an algorithm that generates a blue noise mask M of dimension $[d_0, d_1, \ldots, d_n]$, the algorithm may require storage per pixel to store a Boolean logic specifying whether the pixel is activated (emits energy to the energy field), and an integer index specifying the order that this pixel was activated in. The ordering that a pixel was activated may define the final output color for that pixel, where the first pixel to be activated is black, and the last pixel to be activated is white. Every pixel $p=(d_x, d_y)$, which is activated may give energy to every point q in the energy field using:

$$E(p, q) = \exp\left(-\frac{\|p-q\|^2}{2\sigma^2}\right) \quad (1)$$

where p and q are the integer coordinates and distances are computed on wrapped boundaries, i.e., toroidal wrapping. The $\sigma$ is a configurable parameter, which controls energy falloff over distance, and thus frequency content. In an embodiment, $\sigma=1.5$.

In an embodiment, this is similar to a Gaussian blur, which is used to distribute the energy from activated pixels into the energy field over distance. The energy field E may be discretized onto a grid the same size as the mask M and is defined as:

$$F(p) \sum_{q \in M} E(p, q) \quad (2)$$

1. Initial Binary Pattern

In an embodiment, the first step in the void and cluster algorithm is to generate an initial binary pattern where less than or equal to half of the pixels are activated. This may be accomplished by using white noise or any other pattern. These pixels may need to be transformed into a blue noise distribution before continuing. In an embodiment, the transformation of pixels may be performed by repeatedly deactivating the tightest cluster pixel and activating the largest void pixel. This process may be repeated until the same pixel is found for both operations. At that point, the algorithm has converged, and the initial binary pattern may be blue noise distributed. While these pixels have been activated in the energy field, these pixels may not have yet received an ordering. The largest void may be the point in the energy field with the lowest energy and is defined as: $\inf_{p \in M} F(p)$. Conversely, the tightest cluster may be the point in the energy field with the highest energy and is defined as: $\sup_{p \in M} F(p)$.

2. Phase I—Make Pattern Ordered

In an embodiment, the initial binary pattern is now blue noise distributed. In an embodiment, an ordered sequence of points is performed. This may be done by repeatedly removing the tightest cluster and giving that pixel an ordering of how many pixels are on after it is deactivated. This may be repeated until all pixels are deactivated. After this, the initial binary pattern may be reactivated and together with the order, generated as described above, there is now an ordered binary blue noise sequence.

3. Phase II—First Half of Pixels

In an embodiment, the remaining pixels that are deactivated are activated, one at a time, until half of the pixels are activated. In an embodiment, this is performed by finding the largest void and activating that pixel. The ordering given to that pixel may be the number of pixels that were on before this pixel was activated.

4. Phase III—Second Half of Pixels

In an embodiment, the state of all the pixels are reversed. In an embodiment, pixels that are on are deactivated, and vice versa. This phase repeatedly finds the largest valued cluster and deactivates it, giving it the ordering of the number of pixels that were inactive before this pixel was deactivated. In an embodiment, when there are no more pixels deactivated, this phase is finished, and all pixels have an ordering. This process is reversed compared to phase II because the process from Phase II works best with sparser points. Reversing the problem may allow for the work to be performed sparsely as the rest of the pixels are being added.

5. Finalize Texture

In an embodiment, after all pixels are ordered, that ordering is turned into pixel values in the output image. If the output image has a resolution of n×n pixels, then their ordering may go from 0 to $n^2-1$. If the output is a k-bit image, the values may need to be remapped from 0 to $n^2-1$ to 0 to $2^k-1$. In some instances, this may create non-unique values in the output texture, but the histogram will be flat, as desired.

In an embodiment, when integrating rendered frames temporally, each pixel is undergoing one-dimensional integration on the time axis. If the same 2D blue noise texture is used for every frame, each pixel may get the same result and not provide any new samples for integration. If independently generated 2D blue noise textures were used for every frame, each pixel may become a white noise sequence over time.

In some instances, multiple two-dimensional blue noise masks may be used for high quality in the spatial domains; however, each pixel individually may also need to have a high-quality sampling sequence over time. As a result, in an embodiment, one or more computing devices may execute one or more algorithms to generate a three-dimensional blue noise mask. In an embodiment, the void and cluster algorithm may be reformulated such that it is driven by a novel energy function, as shown in Equation 1 above. In an embodiment, instead of executing that formulation in two dimensions, it is performed in three dimensions and the energy function is constrained in two ways. The energy may be non-zero if the two pixels in the energy function are in the same two-dimensional layer or if the two pixels have the same (x, y)-coordinates. The first condition ensures that each two-dimensional layer may have blue noise properties, and the second condition guarantees that each pixel may have blue noise properties over time (as described in more detail with respect to FIG. 3). Without the first condition, each pixel would be blue noise on the time axis, but would be independent of each other and be white noise over space. Without the second condition, each z plane slice would be independent, and the result would be white noise along the time axis. Without the constraint that one of these conditions must be met, the result would be three-dimensional blue noise which is not well distributed on either the space or time axis (spatio-temporally) but is instead well distributed in a 3D volume.

In an embodiment, a pixel in the three-dimensional spatio-temporal blue noise texture is denoted as $p=(p_{xy}, p_z)=(p_x, p_y, p_z)$. In an embodiment, the modified energy formulation is then:

$$E(p, q) = \begin{cases} \exp\left(-\frac{\|p_{xy} - q_{xy}\|^2}{2\sigma_{xy}^2}\right), & \text{if } p_z = q_z \\ \exp\left(-\frac{\|q_z - q_z\|^2}{2\sigma_z^2}\right), & \text{if } q_{xy} = q_{xy} \\ 0, & \text{otherwise} \end{cases} \quad (3)$$

In an embodiment, these two constraints work together to provide all the usual benefits of void and cluster blue noise in two dimensions, while also making each pixel have good sampling properties over the time axis. In an embodiment, the distance fed into the energy function is computed toroidally on all axes, which means that the individual texture slices tile well over space, but the temporal qualities also tile well over time, with no seam when the time starts over at zero. In an embodiment, when generating spatio-temporal blue noise, an initial binary pattern density of 10% of the pixels and σ=1.9 for all axes are used.

Figure 1B:
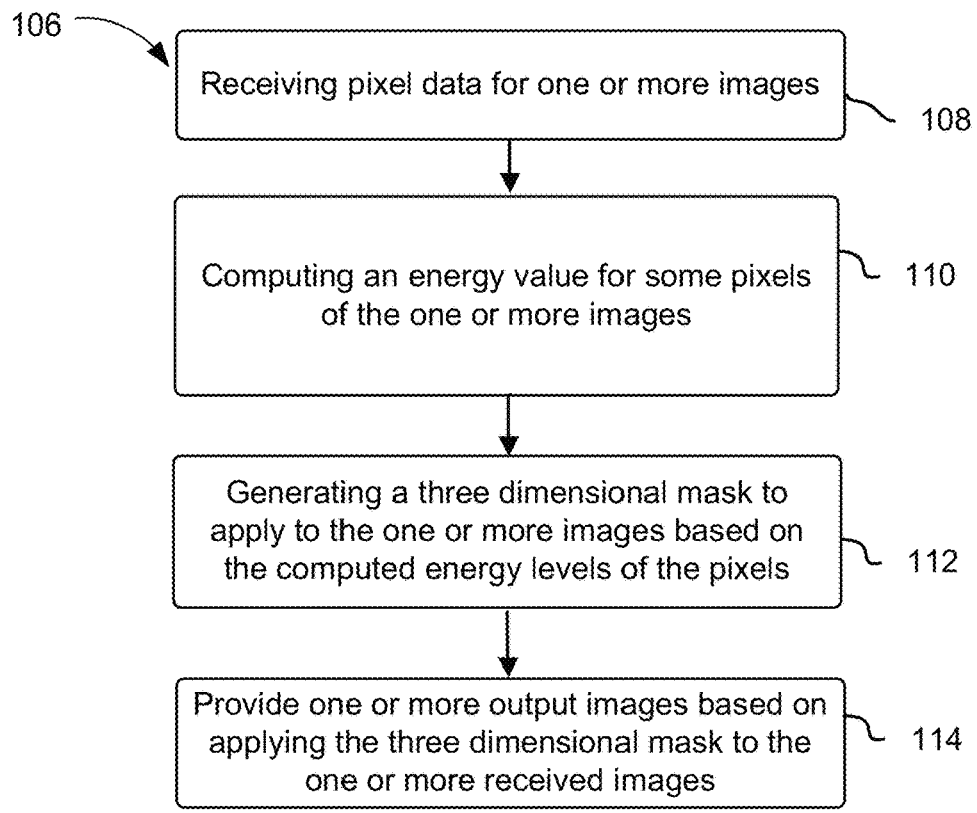
FIG. 1B illustrates an example of a process for a framework to generate a three-dimensional mask for use over both space and time, according to at least one embodiment.

FIG. 1B illustrates an example of a process 106 for a framework to generate a three-dimensional mask for use over both space and time, wherein two dimensions correspond to space (e.g., x and y coordinates) and one dimension corresponds to time. While a three-dimensional mask can be generated, an N-dimensional mask can also be generated as explained in receiving operation 108. In at least one embodiment, process 106 is integrated into process 100. In at least one embodiment, some or all of process 106 (or any other processes described herein, or variations and/or combinations thereof) is performed under control of one or more computer systems configured with computer-executable instructions and is implemented as code (e.g., computer-executable instructions, one or more computer programs, or one or more applications, CUDA code) executing collectively on one or more processors, by hardware, software, or combinations thereof. In at least one embodiment, a system comprising a memory storing instructions, which when executed by one or more processors, cause the system to perform instructions to perform process 106. In at least one embodiment, code is stored on a computer-readable storage medium in form of a computer program comprising a plurality of computer-readable instructions executable by one or more processors. In at least one embodiment, a computer-readable storage medium is a non-transitory computer-readable medium. In at least one embodiment, at least some computer-readable instructions usable to perform process 106 are not stored solely using transitory signals (e.g., a propagating transient electric or electromagnetic transmission). In at least one embodiment, a non-transitory computer-readable medium does not necessarily include non-transitory data storage circuitry (e.g., buffers, caches, and queues) within transceivers of transitory signals. In at least one embodiment, process 106 is performed at least in part on a computer system such as those described elsewhere in this disclosure. In at least one embodiment, process 106 starts with receive operation 108 and continues to compute operation 110.

At receive operation 108, a system or computing device receives pixel data with three dimensions corresponding to one or more images. In one embodiment, the system or computing device receives the pixel data based on sampling one or more images from obtaining the one or more images in step 102 from process 100. In an embodiment, the system or computer device receives the pixel data from another device or another process (e.g., from an application running on another device). Receiving pixel data can include receiving N dimensions of data for the pixels. For example, receiving pixel data can include receiving spatial pixel data (e.g., x and y coordinates) and time data, where the spatial data corresponds to two dimensions and the time data corresponds to a time dimension for each pixel.

At compute operation 110, a system or computing device performing process 106 computes an energy value for some pixels of the one or more images received in the receive operation 108. In at least one embodiment, energy value for a pixel can be computed according to Equation 1. In at least one embodiment, an energy value corresponds to an intensity value, where an intensity value indicates the intensity of a pixel, e.g., how much a pixel stands out relative to other pixels (e.g., when it is activated). Sigma (σ) is a configurable parameter, which controls energy or intensity fall off (e.g., decrease) over distance, and it can be referred to as an "energy fall off parameter" or an "intensity fall of parameter." In some embodiments, the energy falloff parameter corresponds to a Gaussian blur function, e.g., as shown in Equation 2. As shown in Equation 1, energy value is based on coordinates of the at least some pixels (e.g., pixel p and q), a distance between the at least some pixels (e.g., pixel p and q), and an energy falloff parameter. When determining a distance between the at least some pixels, a distance between a pair of pixels can be used. In an embodiment, when determining a distance between the at least some pixels, multiple pairs of pixels can be determined (e.g., pixel p and q, where q can be any neighboring pixel for p). When determining an energy value for a pixel, a distance between pixels can be computed toroidally. In one embodiment, an energy value is computed for every pixel. In one embodiment, a system or computing device computes an energy value for some of the pixels based on determining the relevant processing portions for an image.

As shown in Equation 1, there are generally two constraints to determine an energy value, e.g., the energy value may be non-zero if the two pixels in the energy function are in the same two dimensional layer or if the two pixels have the same (x,y) coordinates. The first condition ensures that each two dimensional layer may have blue noise properties, and the second condition guarantees that each pixel may have blue noise properties over time (as described in more detail with respect to FIG. 3). If a computed pixel energy does not meet these two constraints, the system or computing device can set the energy value to zero. For example, the system or computing device can set the energy value of a pixel in at least some pixels to a zero value if the pixel and another pixel are not in a same two-dimensional layer or do not have identical coordinates (e.g., at different temporal slices).

To generate a three-dimensional mask, in mask operation 112, a system or computing device generates the mask based on the computed energy values from compute operation 110. Generating the three-dimensional mask can be part of another digital image processing algorithm such as a void and cluster algorithm, dithering, or error-diffusion, where image processing algorithms use the energy function (e.g., Equation 1) and corresponding energy values of the pixel data as determined in the compute operation 110. In an embodiment, because the mask operation 112 considers energy according to Equation 1, the generated mask results in a blue noise mask that provides optimal visual results for human perception, e.g., as part of a video game, video, or other digital video process. The three-dimensional mask can be considered a blue noise spatio temporal mask.

Figure 6:
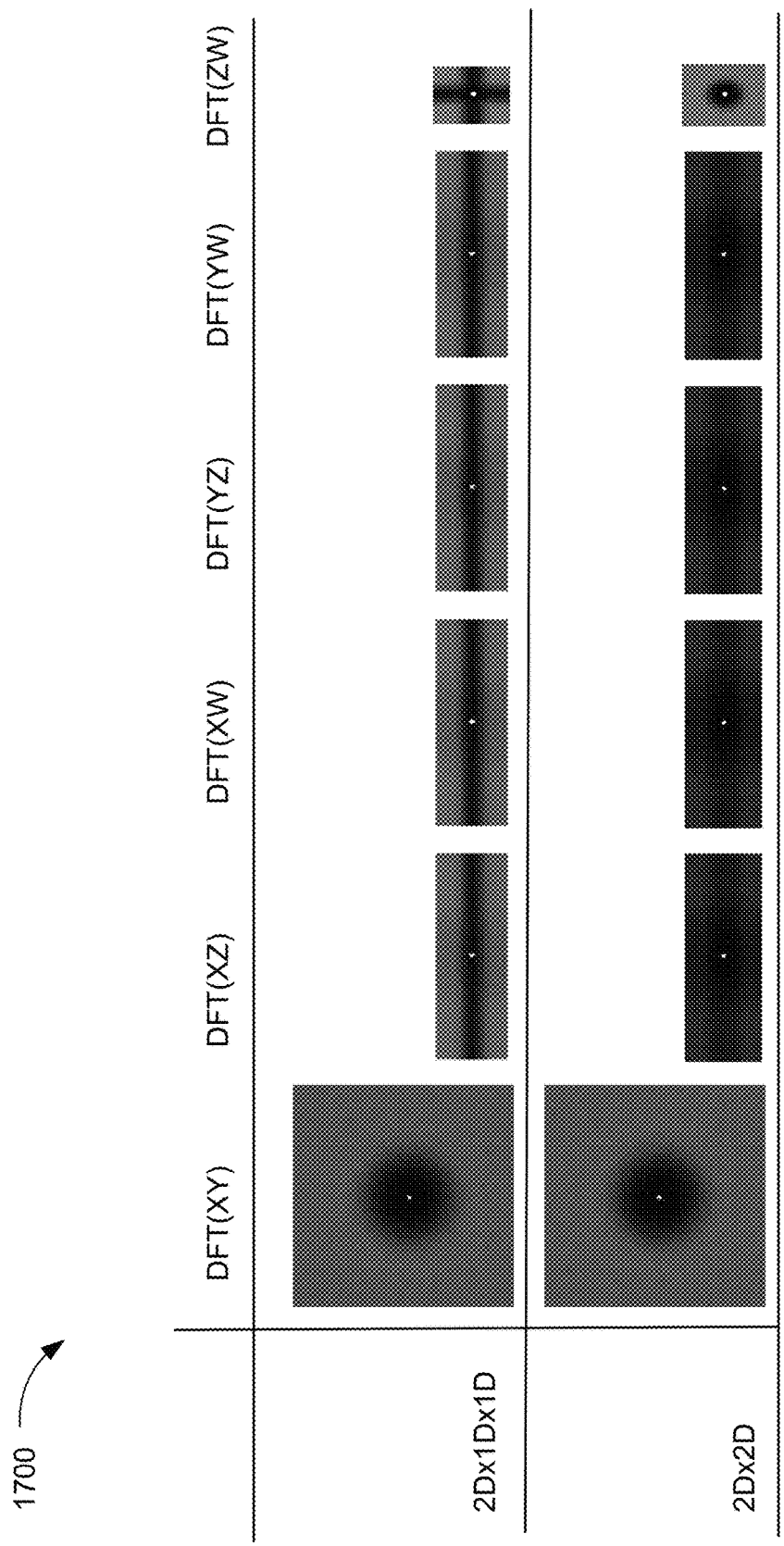
FIG. 6 illustrates DFTs of the 2D projections of 4D blue noise masks that are 64×64×16×16, according to at least one embodiment.

In an embodiment, generating a spatio temporal blue noise mask can be configured to specify different dimensions per axis (see FIG. 6). For example, one or more computing devices execute an extension of the void and cluster algorithm corresponding to using the energy function (Equation 1) that runs in D dimensions, where D is the number of parameters needed to index into the noise function to get a scalar value. These parameters may be the axes of the blue noise mask. The D dimensions may be broken up into one or more sets G, where each set of G contains one or more dimensions. When computing a mask for more than 3 dimensions, the system or computing device can use Equation 4.

At provide operation 114, a system or computing device provides one or more output images based on applying the three-dimensional mask from mask operation 112 to the one or more images, a sample version of the one or more images, or a processed version of the one or more images. In an embodiment, the one or more output images may be a part of a gaming application where real-time image rendering algorithms are used to display images while the gaming application is being executed by a computing device. For example, rendering the output image can be part of an image generation pipeline that includes ray tracing or path tracing. In an embodiment, one or more processors of the computing device executes instructions to apply the three-dimensional mask to the one or more images for real time image rendering.

Process 106 can be integrated with other image processing techniques. In an embodiment, process 106 can be integrated into sampling as part of a processing images in motion and temporal filtering methods such as temporal anti-aliasing (TAA) and deep learning super sampling (DLSS). As part of DLSS, process 106 can include applying a temporal image upscaling to the one or more images, wherein the upscaling is based on a neural network inferring upscaling from a lower resolution image. In at least one embodiment, a spatial-temporal mask is applied before, after, or both before and after image processing related to TAA and DLSS.

Also, process 106 can be integrated into dithering, stochastic transparency, area light sampling, volumetric rendering, path tracing, and/or stochastic alpha image processing techniques. Also, the operations of process 106 can be repeated (e.g., for multiple images) or performed in a different order as part of another digital image processing algorithm. For example, process 106 can be performed as part of a sampling algorithm.

In at least one embodiment, process 100 and processor 106 can be applied to video or video game content. A video or video game comprises a sequence of images (e.g., frames) that can be displayed at a frequency (e.g., frame rate), where a single video frame is an image. Also, a video frame refers to video information, whereas an audio frame refers to audio information, and a video frame can be synchronized with or processed separately from an audio frame.

Figure 2:
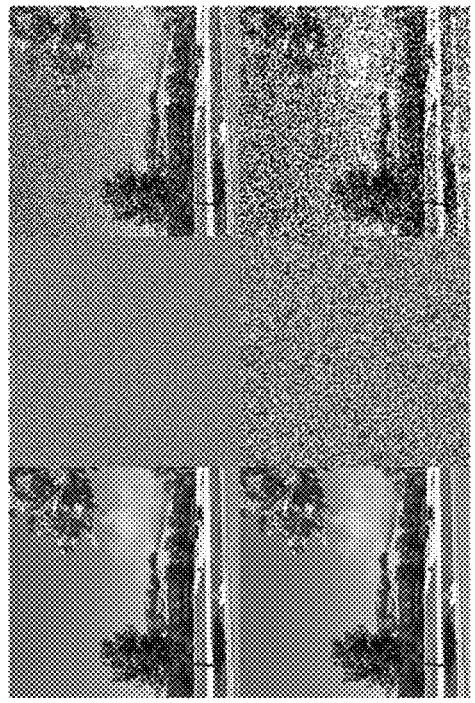
FIG. 2 illustrates exemplary images using blue noise masks optimal for use over both space and time, according to at least one embodiment.
Figure 2:
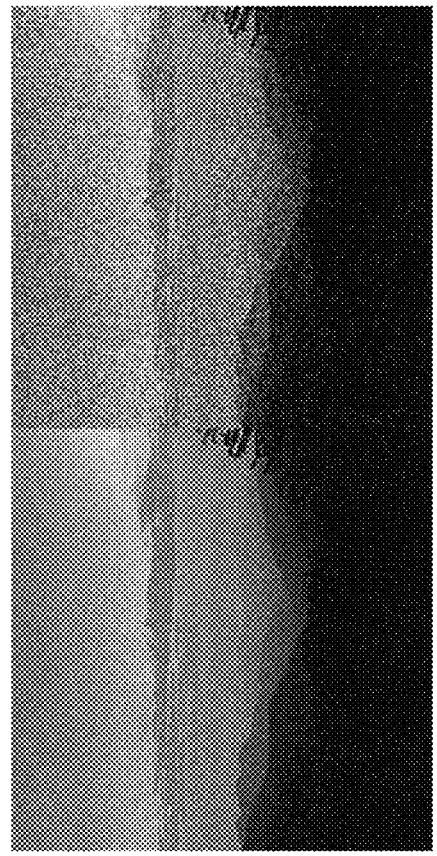

FIG. 2 illustrates exemplary images using blue noise masks optimal for use over both space and time, according to at least one embodiment. In an embodiment, blue noise masks provide systems a way to hide noise and error. This is useful in real time rendering where computing resources are limited to cause the noise to go away completely, which is the motivation for denoising. Although blue noise masks do not create less noise and error than that of white noise, it does arrange it in a way that is more visually pleasing, more difficult to notice, and is also easier to de-noise. There are multiple uses of blue noise in both rasterization and raytracing. As shown in FIG. 2, on the top, blue noise and white noise are used to stipple a greyscale image to black and white. The top blue noise is much less noisy and looks a lot more like the source image, despite having the same amount of error as the white noise image below it. On the bottom, the two noises are used to dither a color image before it's quantized to being one bit per color channel. Both images may contain 8 colors: red, green, blue, yellow, cyan, purple, black, and white, and have the same amount of error from the source image, but the blue noise version on the top has better image quality.

The stippling case may be evident in raytracing and shooting less than one ray per pixel. The black dots could be seen as pixels when selected to shoot rays for and choosing white or blue noise would give the same sorts of results in that 3D render. The dithering case happens when encoding data in buffers. Being able to use a single bit per color channel instead of the usual 8 bits per color channel means 3 bits are used for a color instead of 24, which means the data could be represented using only 12% of the previous number of bits.

In an example embodiment, a spatio-temporal blue noise mask of $64^3$ (64×64×64) resolution is created. In addition, a $64^3$ 3D blue noise mask and 64 independent 2D blue noise masks of size $64^2$ may also be created. In an embodiment, the 2D and 3D blue noise masks are generated using the void and cluster algorithm described herein. In an embodiment, a spatio-temporal mask is also created by using a single 2D blue noise mask and adding the golden ratio to it each frame for 63 frames to make 64 different masks.

Figure 3:
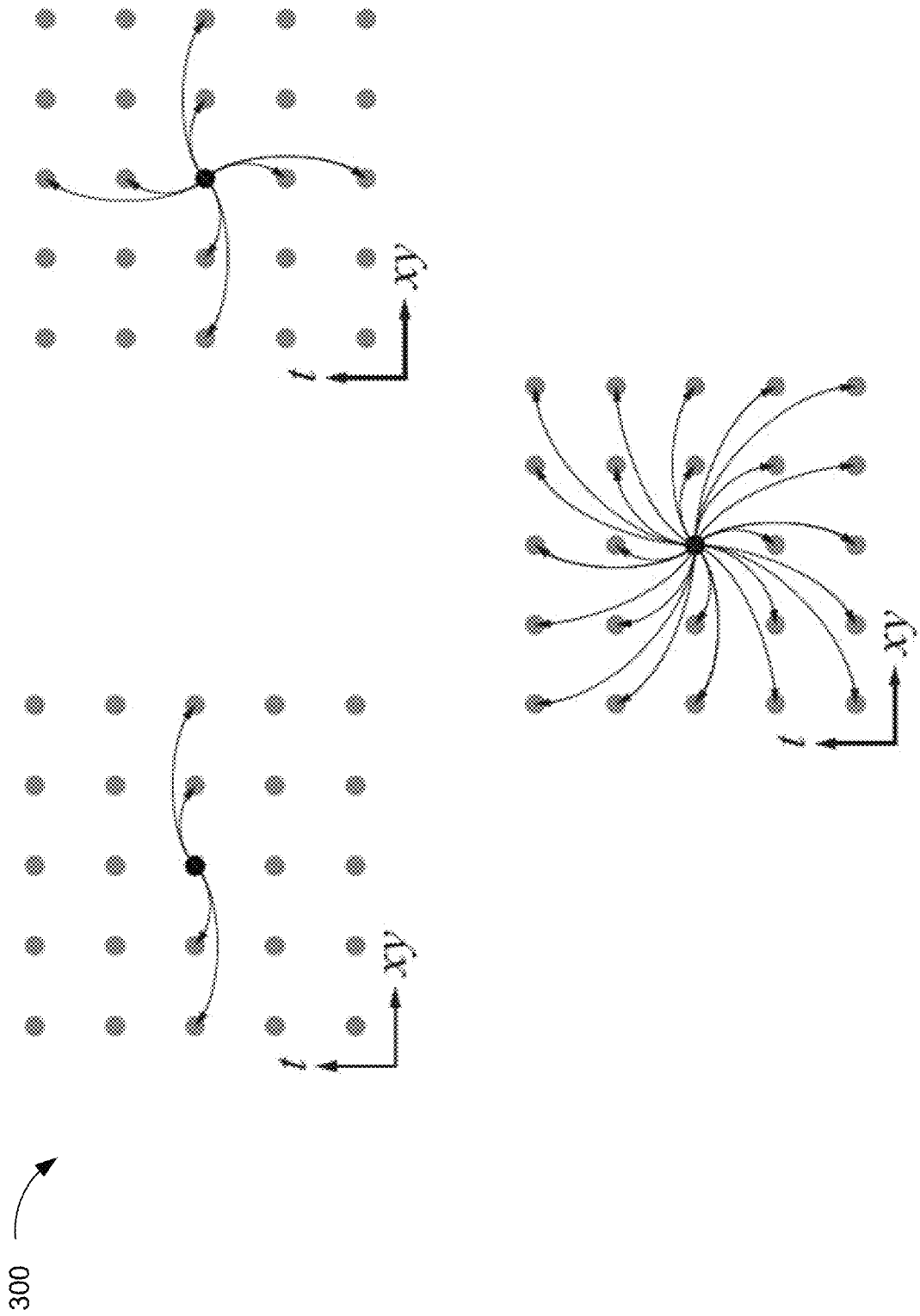
FIG. 3 illustrates energy evaluation where there are compressed spatial x-y dimensions to a single dimension (horizontal axis) and time is on the vertical axis, according to at least one embodiment.

FIG. 3 illustrates energy evaluation where there are compressed spatial x-y dimensions to a single dimension (horizontal axis) and time is on the vertical axis, according to at least one embodiment. In an embodiment, an energy function evaluation for a pixel is provided for a pixel in the middle of the illustrations. In an embodiment, energy function evaluation for a middle pixel is determined for 2D blue noise, 3D blue noise, and the spatio-temporal blue noise mask using the void and cluster algorithm described herein (as shown from left to right in FIG. 3). In an embodiment, the 2D blue noise (most left image in FIG. 3) measures energy to all pixels in the same 2D layer, while 3D blue noise (middle image in FIG. 3) measures energy to all pixels in the entire 3D texture. In an embodiment, the spatio-temporal blue noise mask using the void and cluster algorithm described herein (most right image in FIG. 3) measures distance in the 2D layer and along the time dimension for the current pixel.

Figure 4:
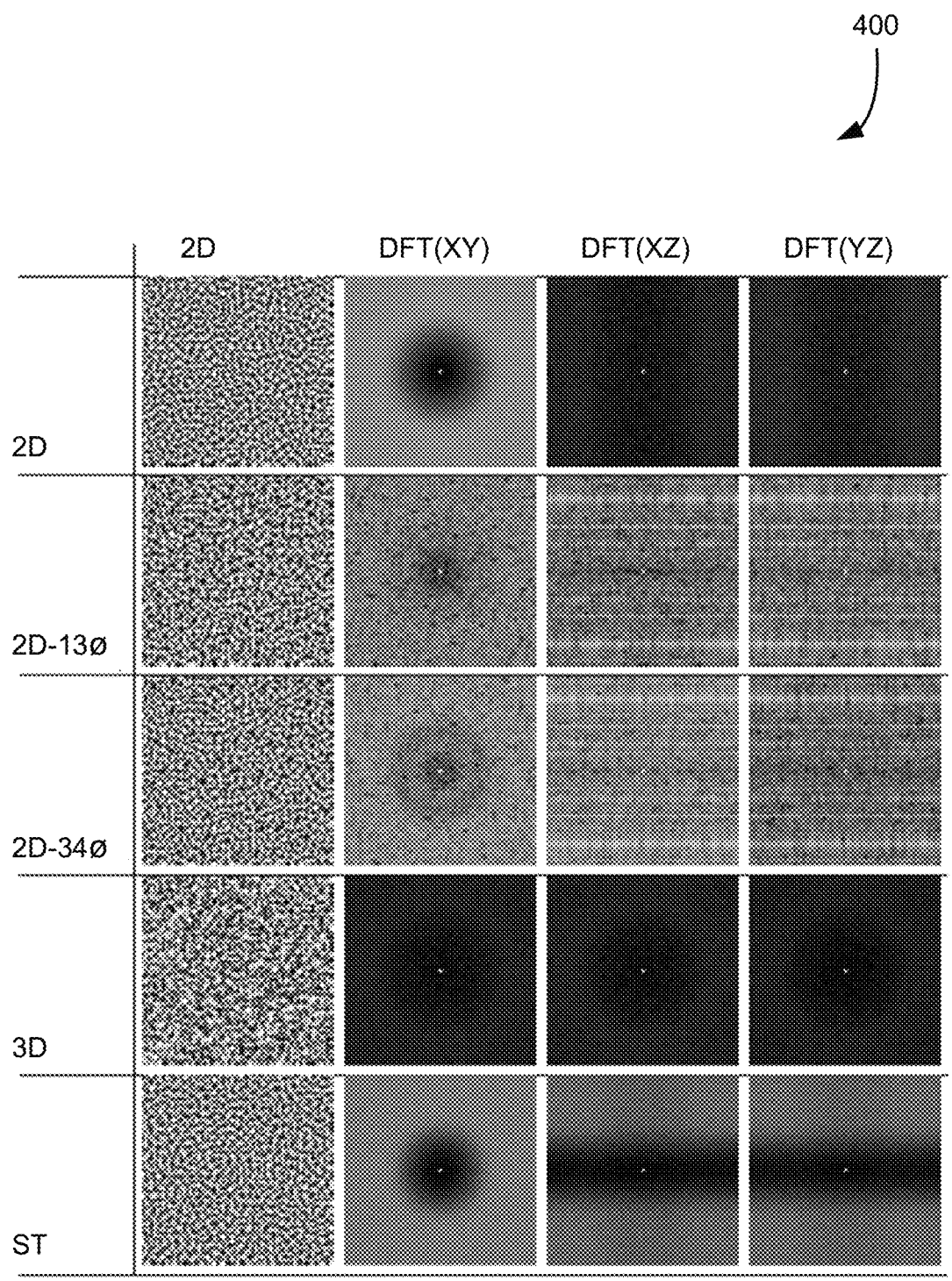
FIG. 4 illustrates comparative frequency results generated using Fourier analysis on the three types of blue noise masks mentioned above in FIG. 3, according to at least one embodiment.
Figure 5A:
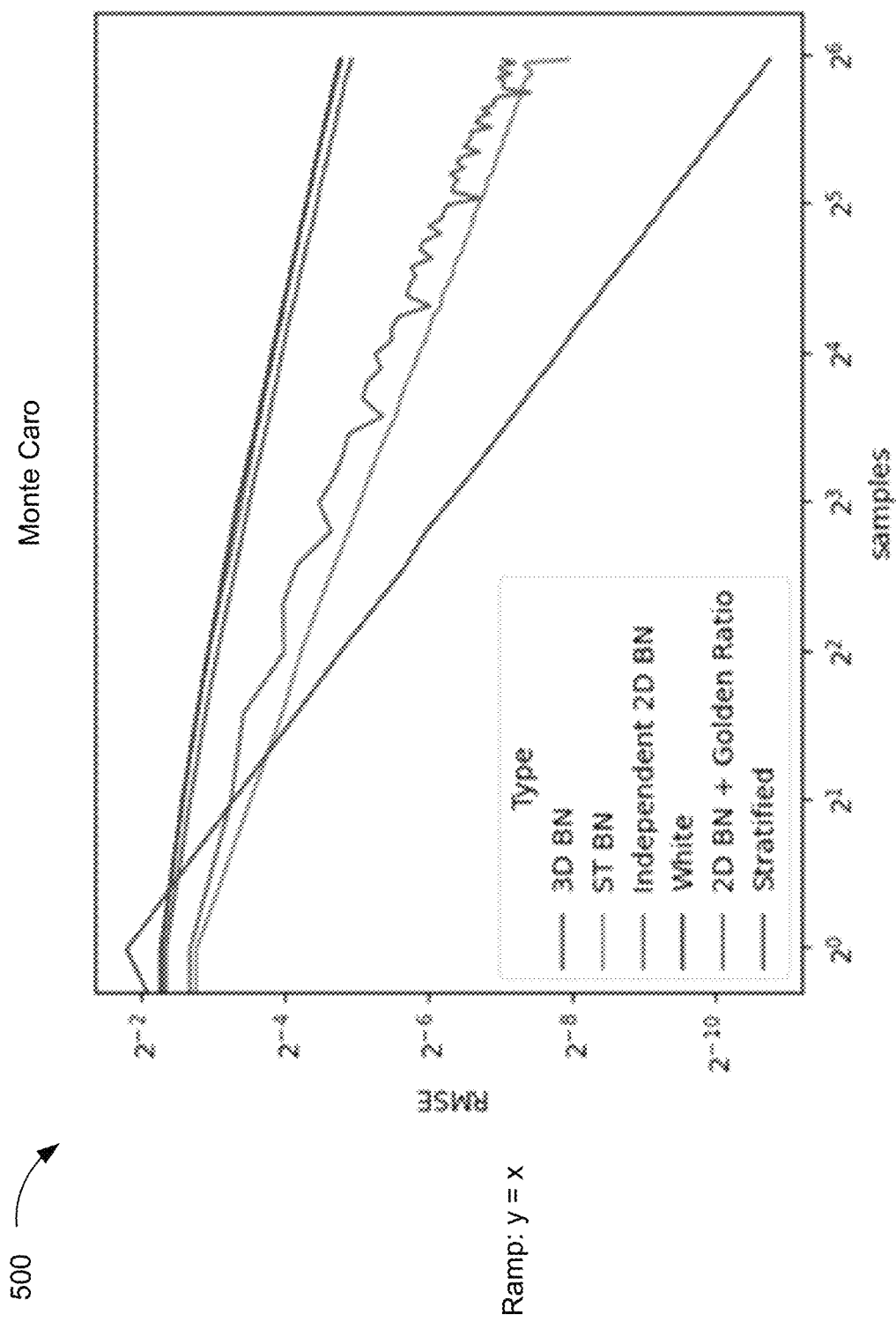
FIGS. 5A, 5B, 5C, 5D, 5E, 5F, 5G, 5H, 5I, 5J, 5K, and 5L illustrate convergence rates for 1D functions, according to at least one embodiment.
Figure 5B:
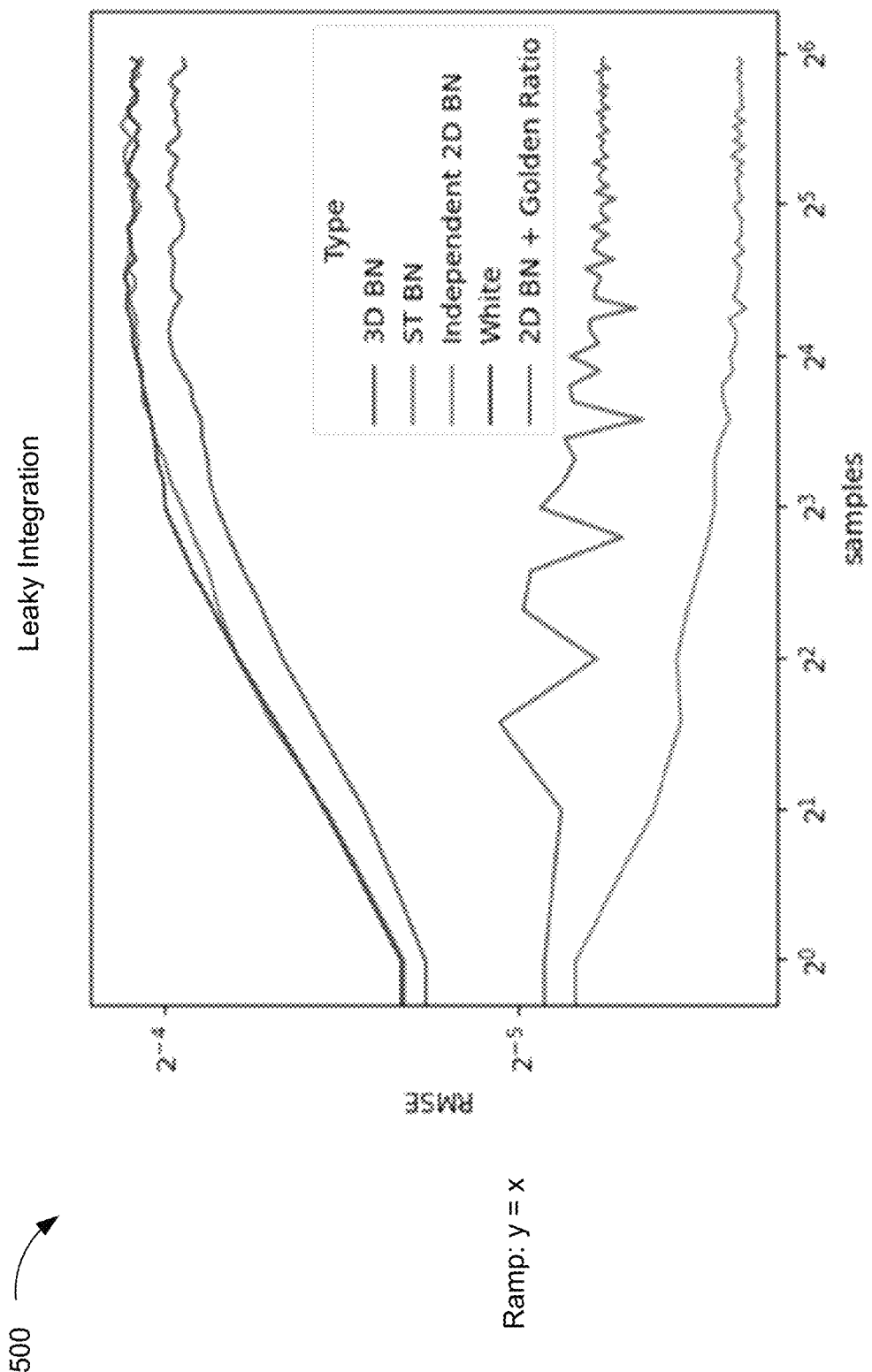
Figure 5C:
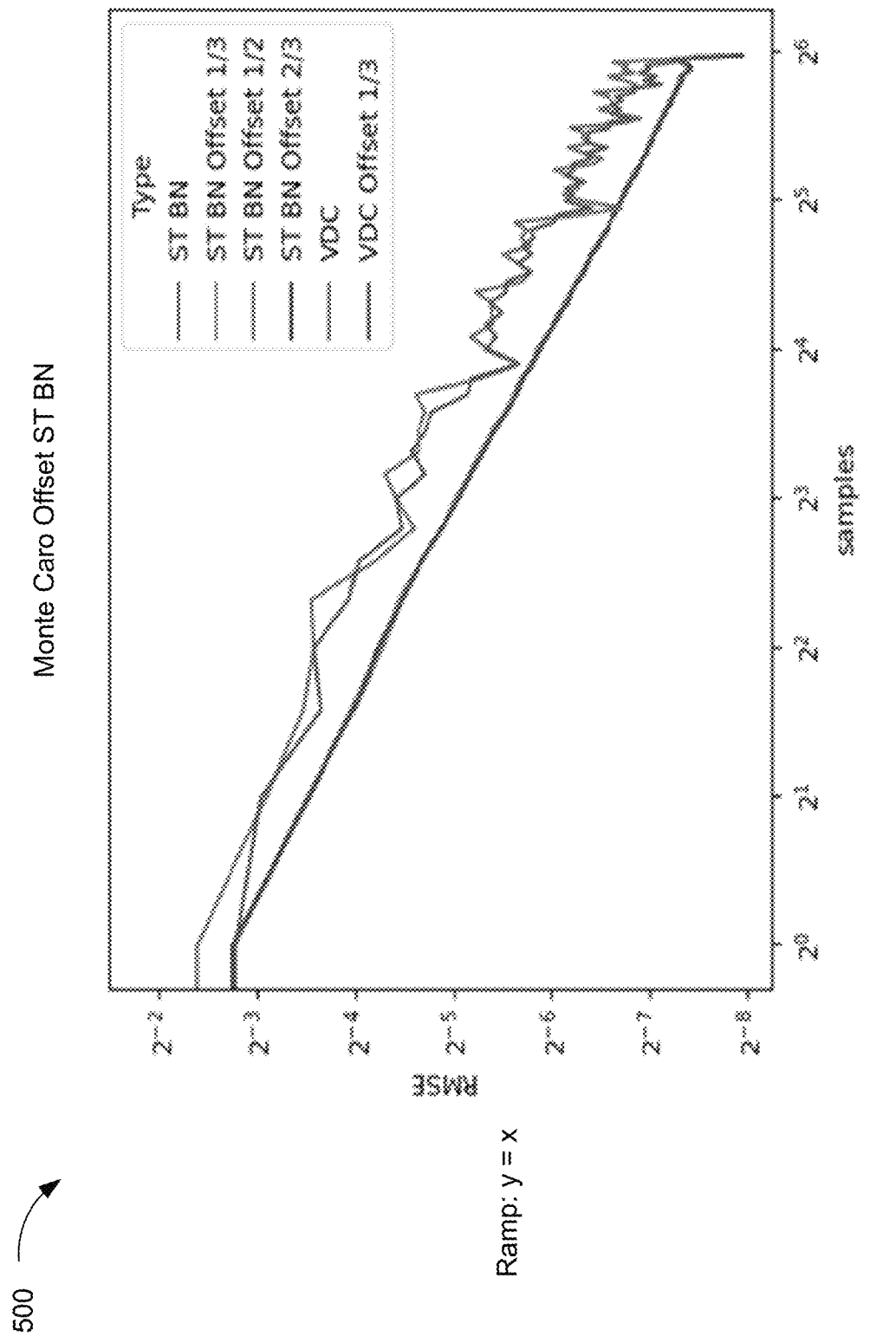
Figure 5D:
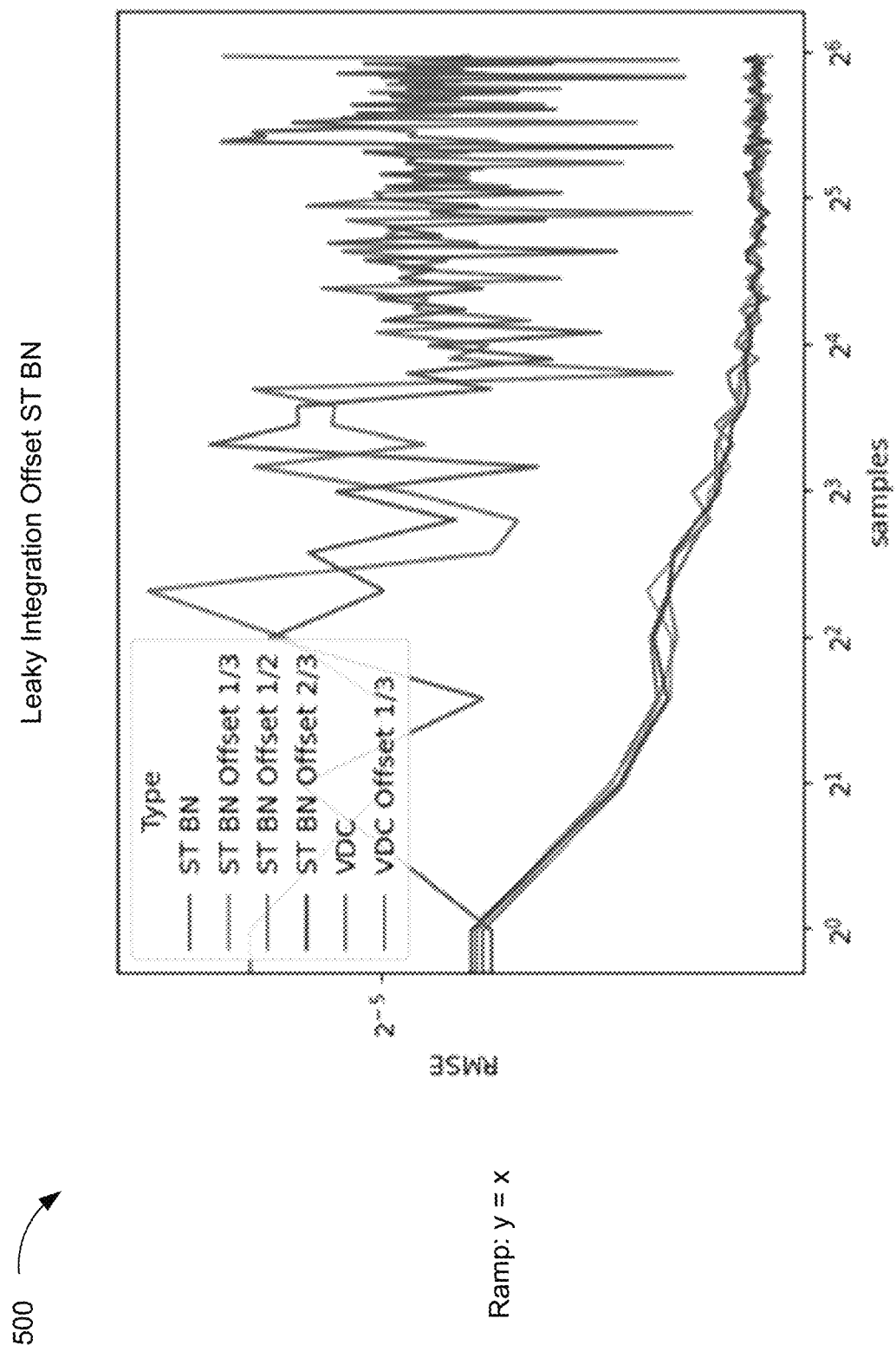
Figure 5E:
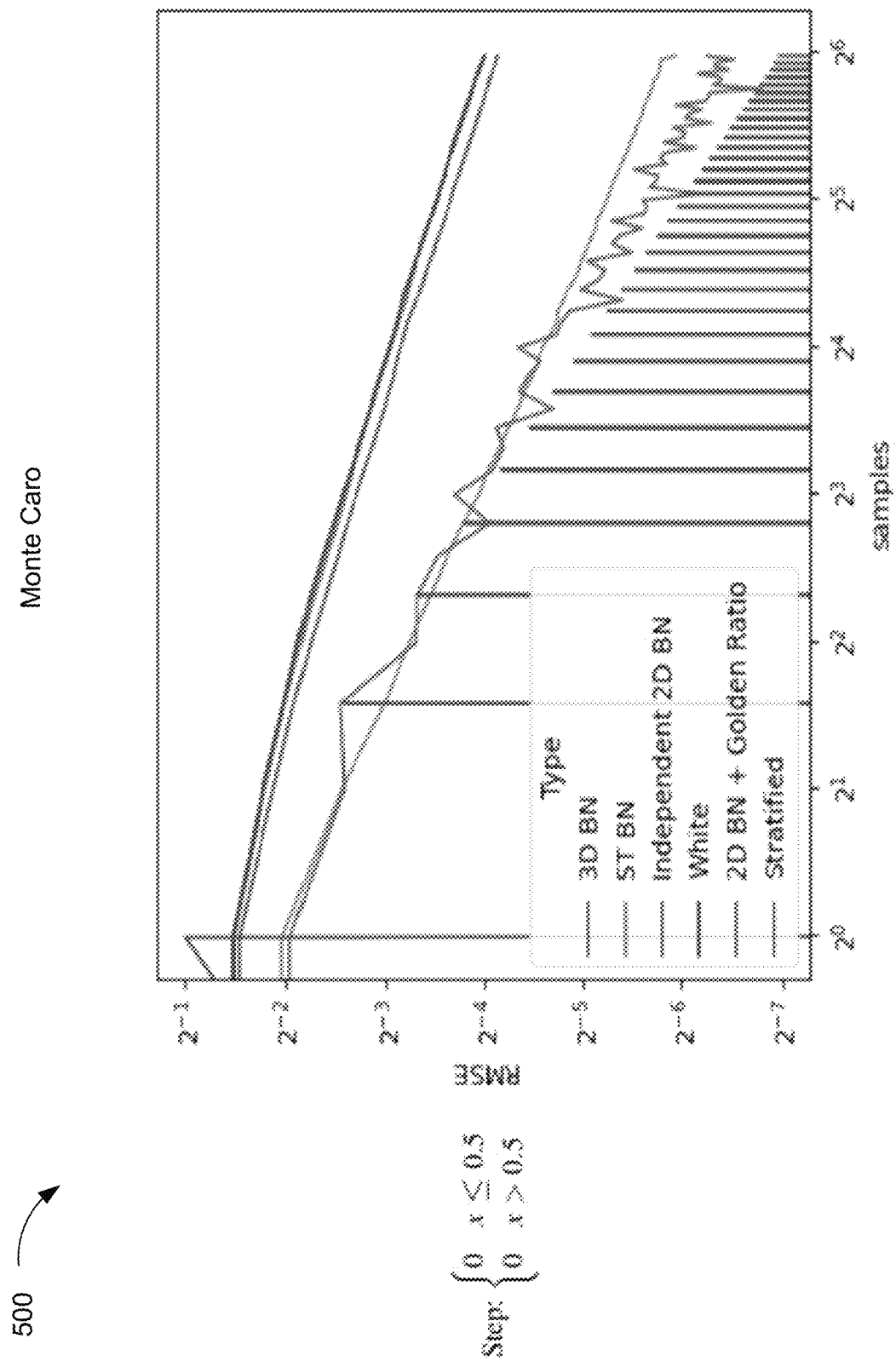
Figure 5F:
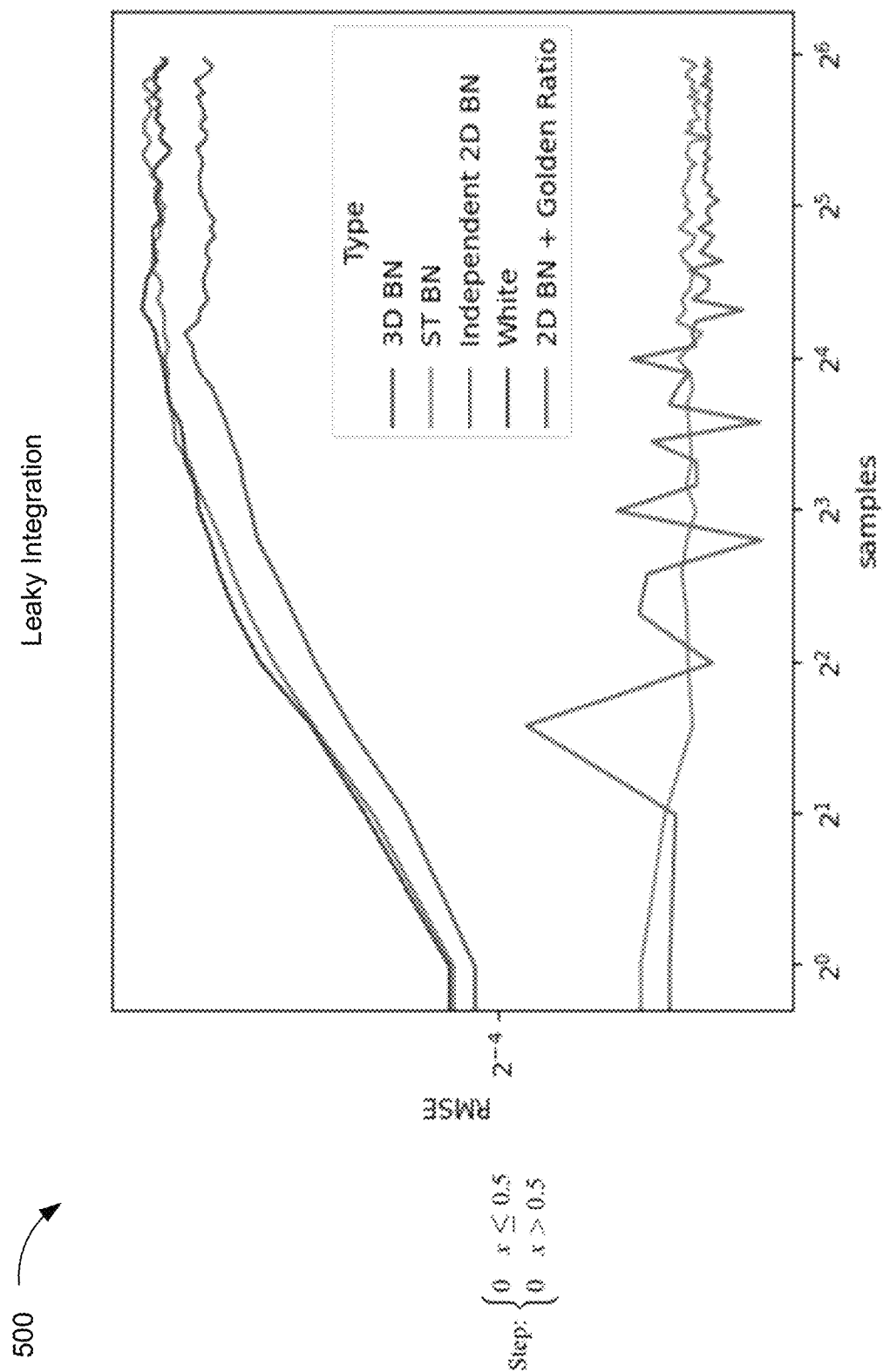
Figure 5G:
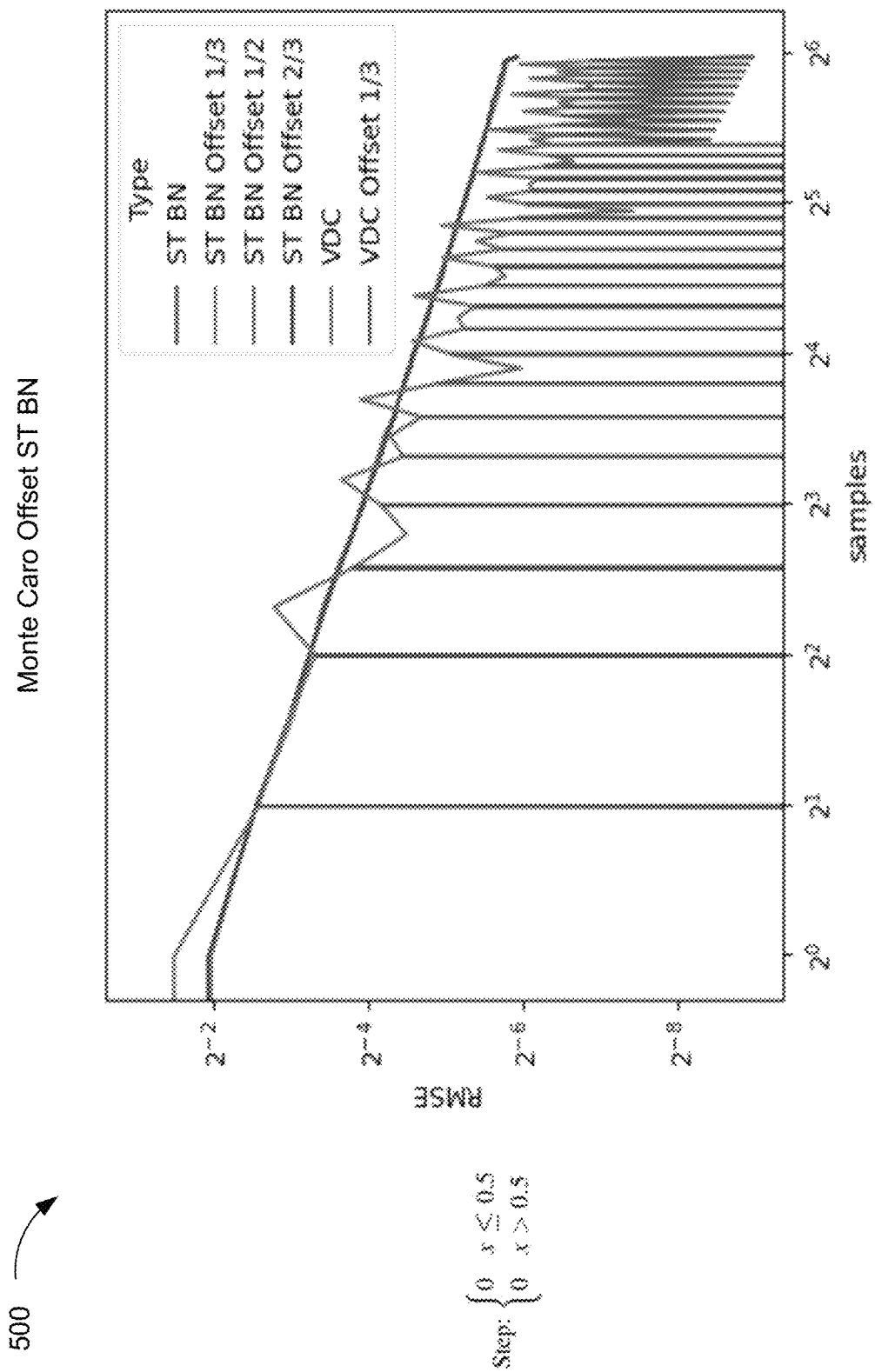
Figure 5H:
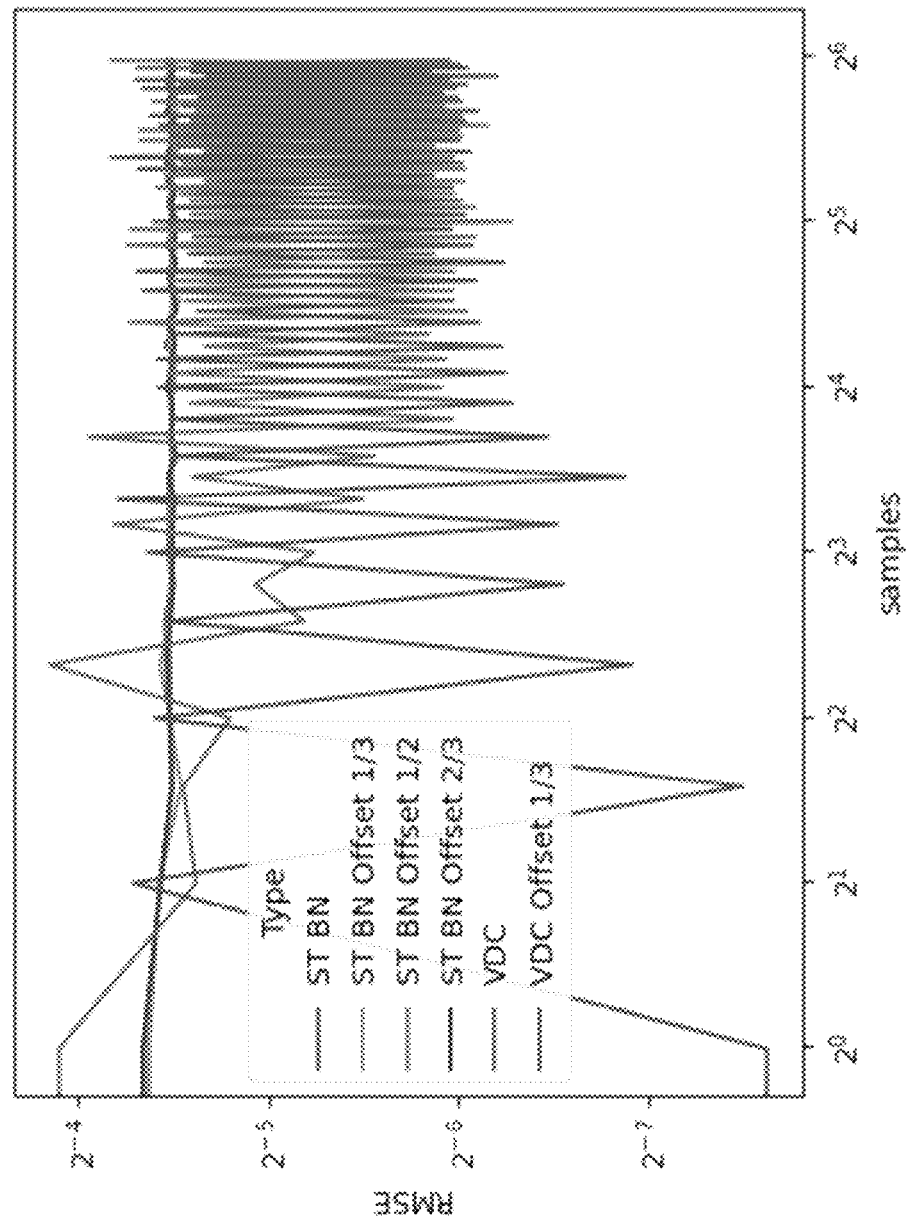
Figure 5I:
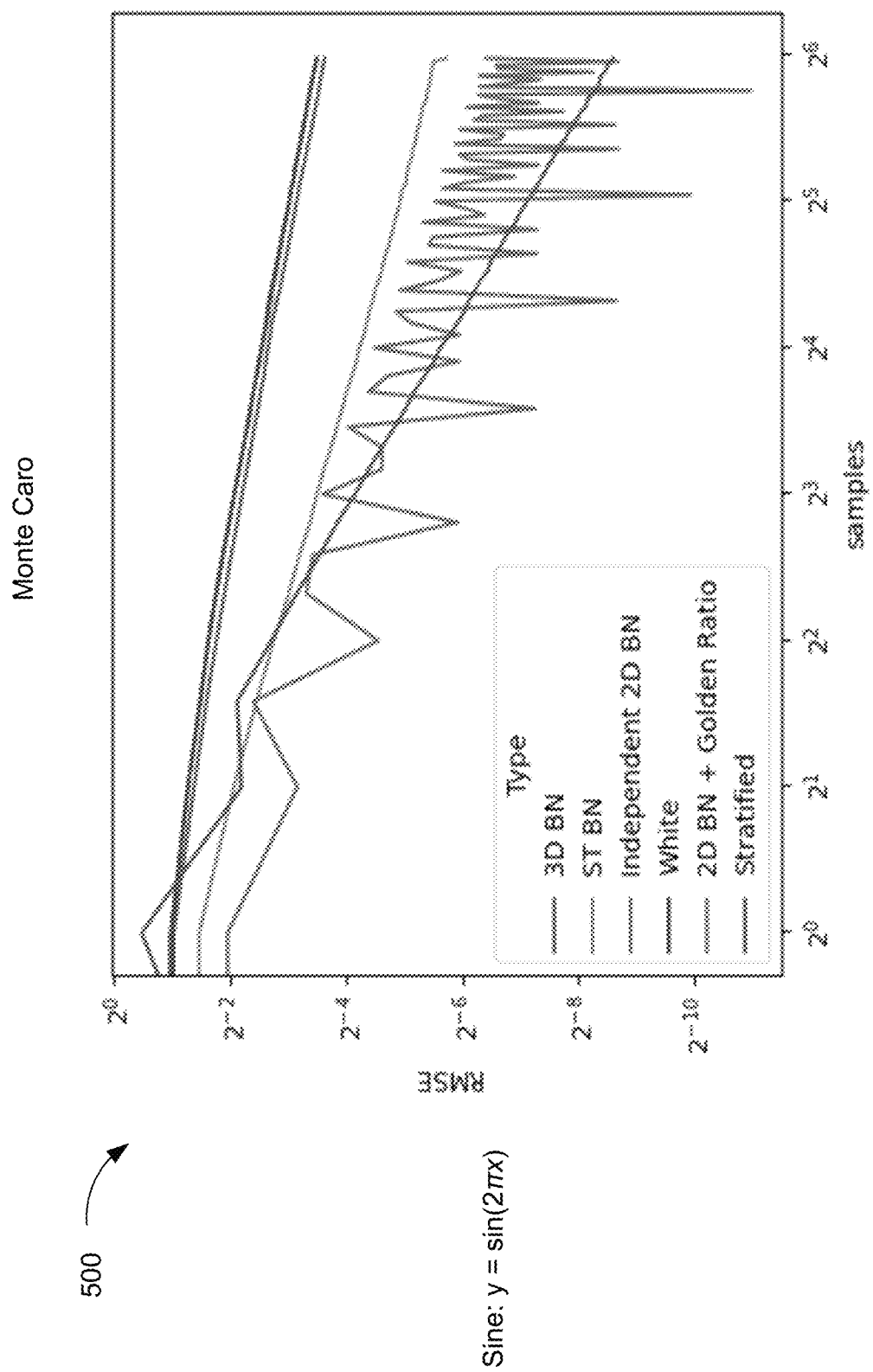
Figure 5J:
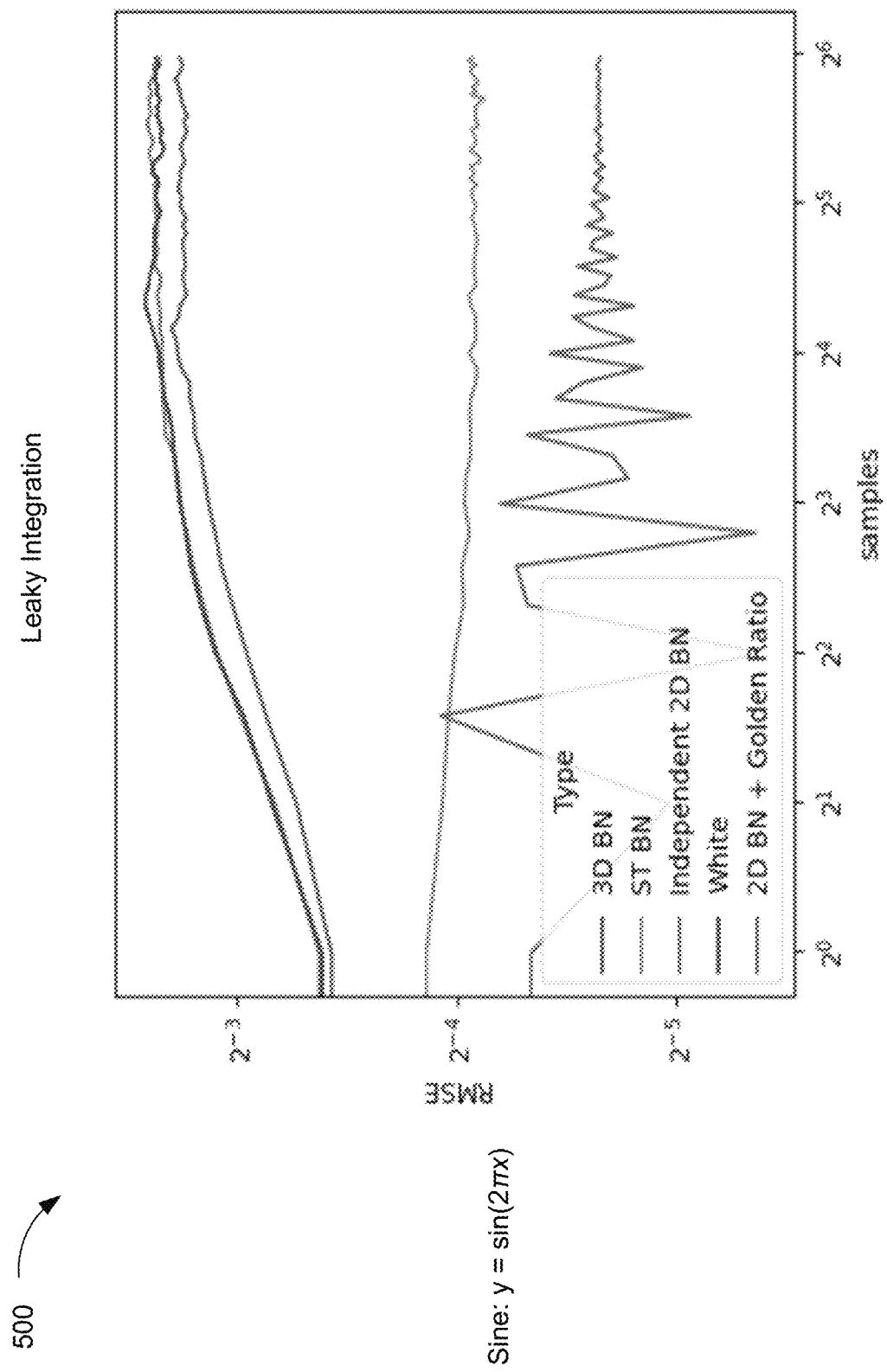
Figure 5K:
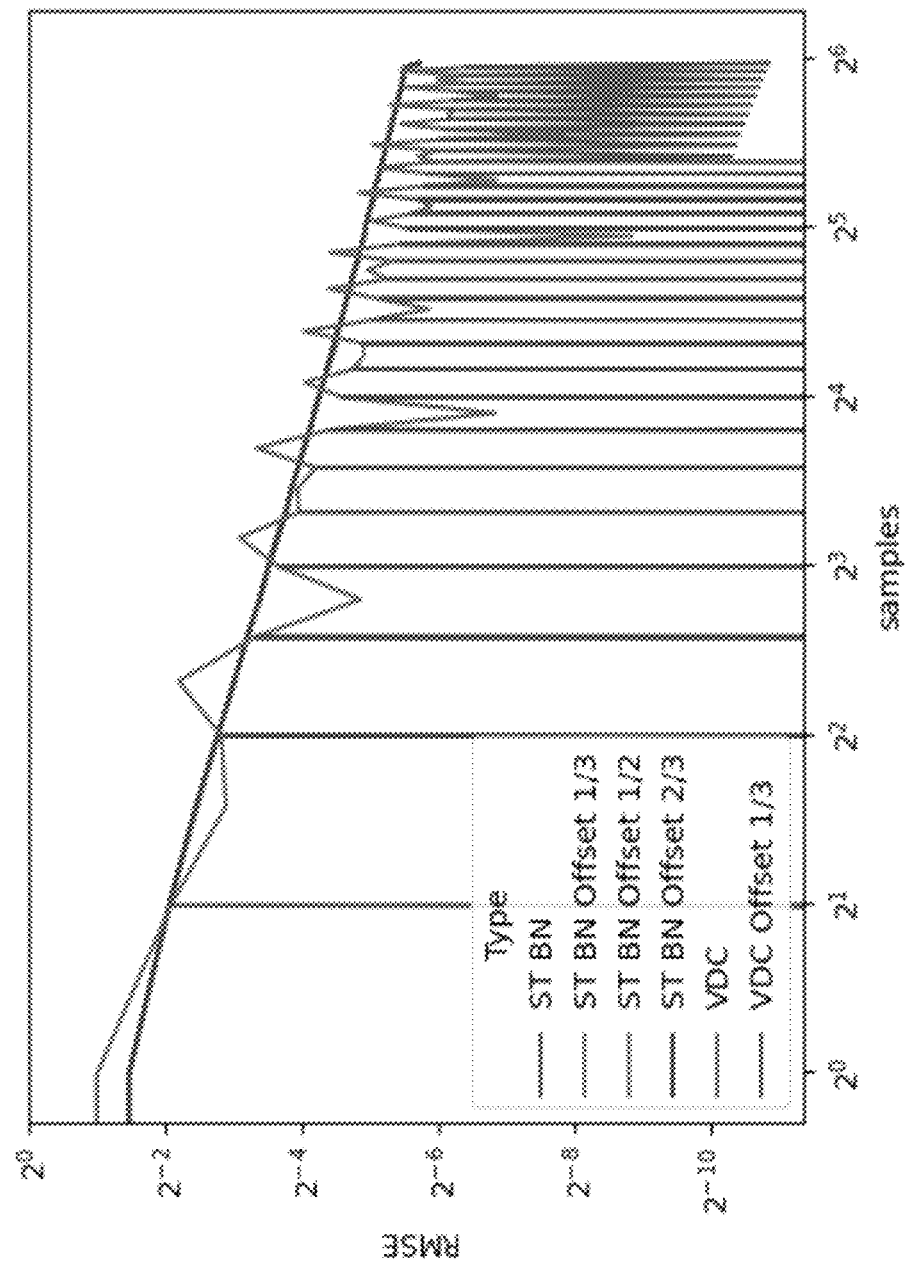
Figure 5L:
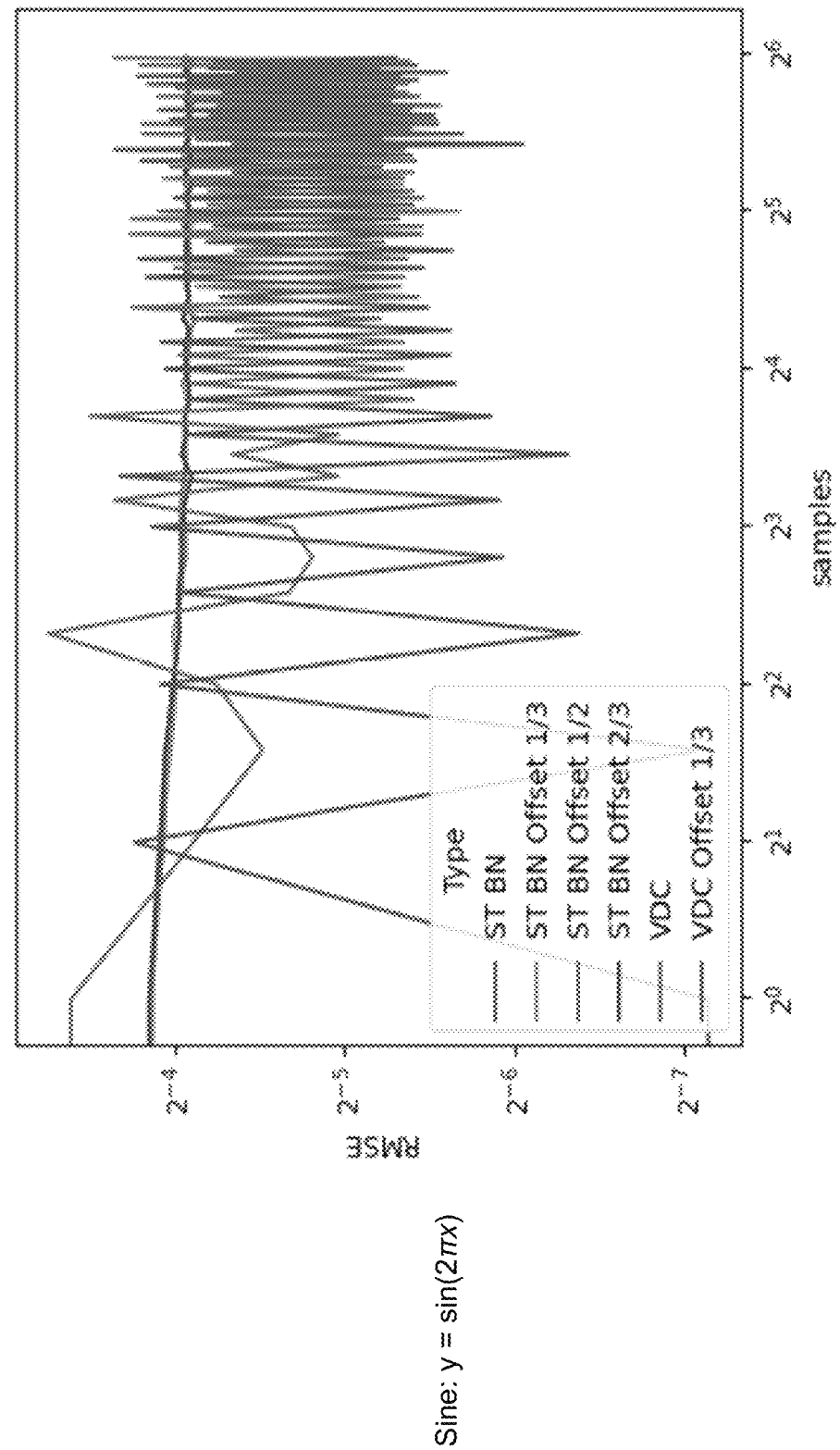

FIG. 4 illustrates comparative frequency results generated using Fourier analysis on the three types of blue noise masks mentioned above in FIG. 3, according to at least one embodiment. That is, Discrete Fourier Transforms (DFTs) of the 2D projections of various blue noise masks are shown in FIG. 4. The comparative frequency results can be generated using process 100 (see FIG. 1A) and/or process 106 (see FIG. 1B). In an embodiment, a spatio-temporal blue noise mask has blue noise over space such that it may provide better image results than white noise over the z axis (time). In an embodiment, the DFTs are averaged to show expected frequency spectra except for golden ratio animated blue noise which highlights two ways it damages spatial frequencies at specific frame numbers. In an embodiment, it is desired to get blue noise properties in each spatial 2D slice, so as to provide an improved noise sequence than white noise sequence along the time axis. As illustrated in FIG. 4, using a spatio-temporal blue noise mask as described herein provides those two features simultaneously by having 2D blue noise characteristics on the X-Y plane and adding blue noise characteristics to the Z axis.

In an embodiment, while DFTs indicate that using a spatio-temporal blue noise mask as described herein is blue over both space and time, convergence speeds of blue noise over time is increased compared to other alternative methods of animating blue noise (this is shown in more detail in FIGS. 5A, 5B, 5C, 5D, 5E, 5F, 5G, 5H, 5I, 5J, 5K, and 5L). The problem of integration over time is equivalent to integrating multiple samples within the same frame, so solving it in one domain is equivalent to solving it in the other. Temporal integration often uses a leaky integrator instead of Monte Carlo integration.

4.3. Special Properties

As illustrated in FIG. 4, the right two columns also show that, if spatio-temporal blue noise is offset on the time axis, it may have the same convergence characteristics and is in fact progressive starting at any index, while also being toroidally continuous as well. This toroidally continuous/progressiveness of the time axis may be a powerful property for use in TAA style temporal integration and filtering algorithms. In those algorithms, every pixel is integrating an integrand progressively each frame, but when an individual pixel deems that its history is no longer valid due to occlusion changes or similar, pixels will effectively throw out their history and start the integration over.

Using animated blue noise masks to drive 1D integration for those pixels means that a global sequence is driving all pixels. Most progressive sequences will only give a progressive sequence starting at index 0 (an exception to this is Sobol which is progressive for all power of 2 sized sections). This is problematic because with a global sequence driving the sampling for individual pixels throwing their history away at arbitrary points in time, those pixels will be sampling beginning at arbitrary places in the sampling sequence.

With the toroidally continuous/progressiveness of spatio-temporal blue noise on the time axis, each pixel may receive the benefit of starting at the beginning of a progressive sequence after rejecting history at any frame number, without the overhead of having to track an index per pixel to make this happen. Furthermore, history rejection is commonly not a discrete event, but instead, is a continuous operation, such as clamping the history data to a min and max of colors seen in the local neighborhood of the newly rendered pixel value. In some instances, a sampling index is reset and in other cases, it is not. Despite that, a sequence which is progressive from any index means that whether a pixel has rejected its history, taking the next sample is a good thing to do, which means it also handles this continuous history rejection case.

4.4. Generalization to Arbitrary Dimensionality

In an embodiment, spatio-temporal blue noise masks are valuable in any animated situation where 2D blue noise textures are currently used, as they are a solution to a problem of animating blue noise masks. In other methods, the blue noise spatially may be spoiled, or become white noise over time. In an embodiment, spatio-temporal blue noise has, both, a high-quality blue noise spectrum over space, while also having a blue noise spectrum over time.

In an embodiment, one or more computing devices execute an extension of the void and cluster algorithm that runs in D dimensions, where D is the number of parameters needed to index into the noise function to get a scalar value. These parameters may be the axes of the blue noise mask. The D dimensions may be broken up into one or more sets G, where each set of G contains one or more dimensions. A specific set g of G with a membership count of d implies that all d dimensional projections of the D dimensional blue noise mask should be d dimensional blue noise, when only the axes within that group vary, and all other axes are held constant. A group of axes h as being all axes which are not in g may also be defined.

Once the dimensions are grouped, each group g may naturally map to an energy function $E_g$ by only using the dimensions present in the group (denoted as $p_g$ and $q_g$) within the usual Gaussian energy function, so long as the axes from the corresponding group h are equal between the two pixels. The energy function between two pixels is the summation of all $E_g$ functions between those pixels, and the energy field F is the sum of energy at each pixel, from every other pixel.

$$E_g(p, q) = \begin{cases} \exp\left(-\frac{\|p_g - q_g\|^2}{2\sigma_g^2}\right), & \text{if } p_h == q_h \\ 0, & \text{otherwise} \end{cases} \quad (4)$$

$$E(p, q) = \sum_{g \in G} E_g(p, q)$$

$$F(p) = \sum_{q \in M} E(p, q)$$

Of note, each dimension can be of different size, and can use a different sigma value to control the frequency content of the result. The original void and cluster algorithm can be seen such that D is any arbitrary value, and that there is only a single group in G which contains all axes. As a result, the void and cluster algorithm may make D dimensional blue noise masks. When considering spatio-temporal blue noise, D may be 3, and G may have two groups in it: $g_{xy}$ and $g_z$. In that sense, spatio-temporal blue noise can also be seen as a 2D×1D blue noise mask.

4.5. 4D Blue Noise Mask Analysis

In an embodiment, two 4D blue noise masks are configured as follows: 2D×1D×1D and 2D×2D, where both are 64×64×16×16 in size. In an embodiment, frequency analysis can be seen in FIG. 6 which shows the desired frequency behaviors for each pair of axes in 2D DFTs. In an embodiment, both masks show 2D blue noise on the X-Y plane, but are different under all other projections. The 2D×1D×1D blue noise mask may show 1D blue noise on the Z and W axes under all projections, including the Z-W plane where they are both present and show in a cross pattern. The 2D×2D blue noise on the other hand shows white noise for all other projections except the Z-W plane, where it shows 2D blue noise.

Figure 9:
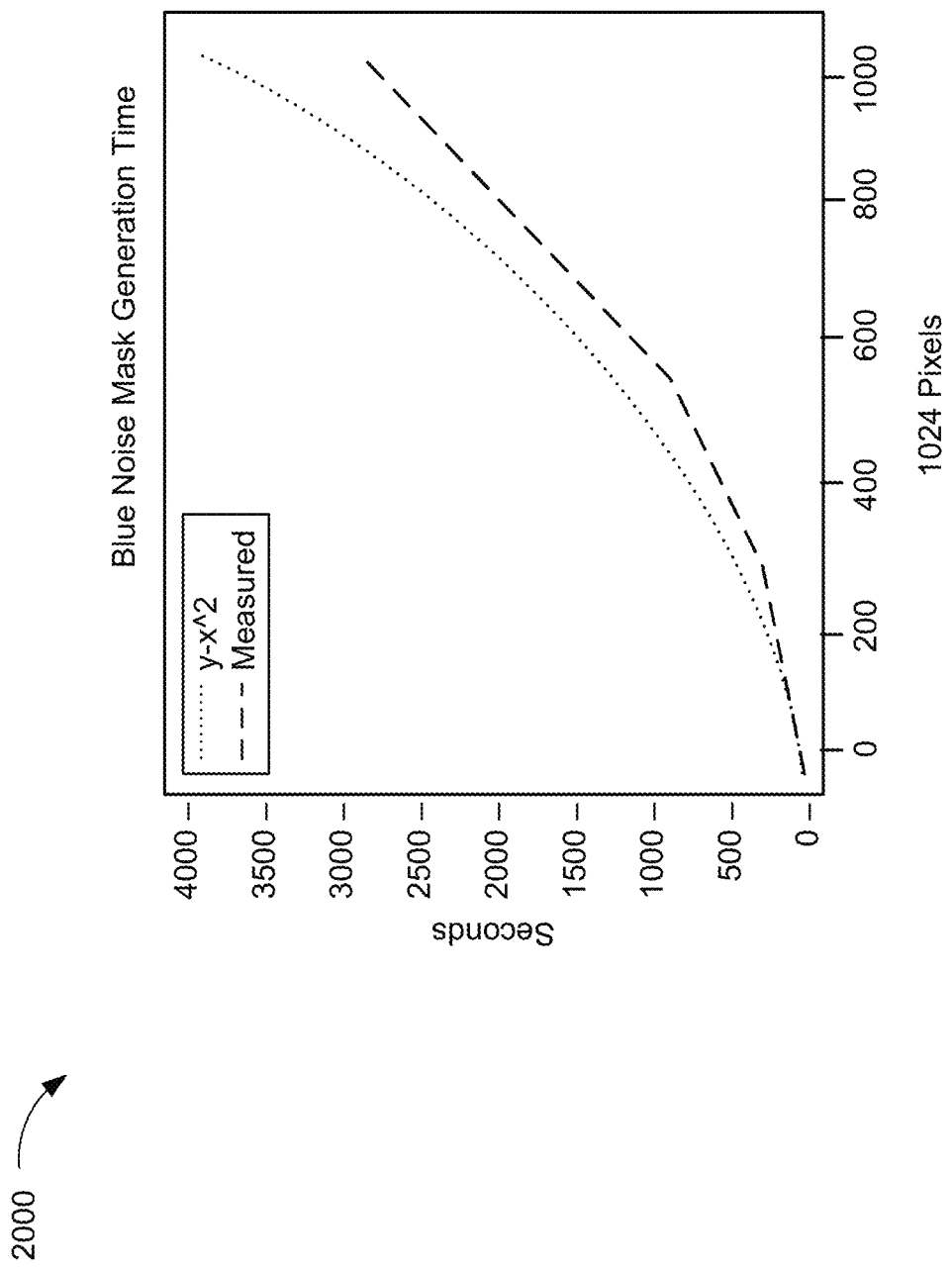
FIG. 9 illustrates a graph that generation time is a function of the number of pixels in the blue noise mask and roughly follows a $y=x^2$ curve, according to at least one embodiment.

From observation, generation time of blue noise masks is a function of the total pixel count, without regard for how those pixels are divided up by between the dimensions and is nearly $O(n^2)$ as shown in FIG. 9, where n is the number of pixels. Doubling the number of pixels in a blue noise mask will roughly quadruple the time taken to generate that mask. Blue noise masks may be stored as single channel 8-bit textures. The chart below are examples of some texture sizes and their size in bytes. Due to tiling well on each axis, smaller textures such as 64×64×16 (64 KB) for spatio temporal blue noise, and 64×64×16×16 (1 MB) may be sufficient for image rendering. The actual sizes used for spatio-temporal blue noise, and the 4D versions are bolded.

| Dimensions | Size |
| --- | --- |
| 64 × 64 | 4 KB |
| 32 × 32 × 16 | 16 KB |
| 32 × 32 × 32 | 32 KB |

-continued

| Dimensions | Size |
|---|---|
| 64 × 64 × 16 | 64 KB |
| 256 × 256 | 64 KB |
| 64 × 64 × 64 | 256 KB |
| 64 × 64 × 16 × 16 | 1 MB |
| 64 × 64 × 64 × 64 | 16 MB |
| 256 × 256 × 256 × 256 | 4 GB |

Figure 8:
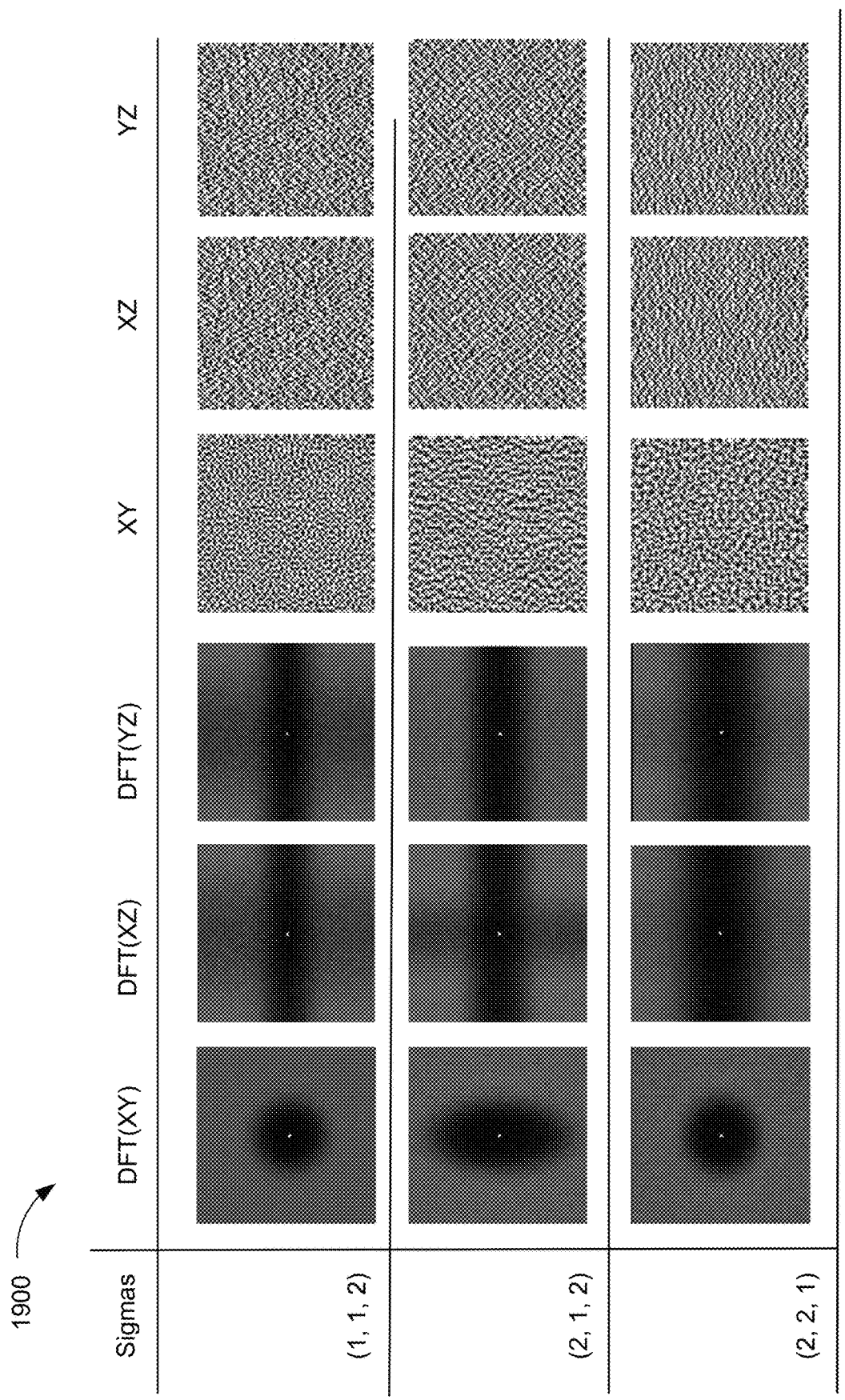
FIG. 8 illustrates 2D×1D spatio-temporal blue noise masks with various sigma's per axis, according to at least one embodiment.

In an embodiment, the algorithm to generate a spatio temporal blue noise mask may be configured to specify different dimensions per axis (see FIG. 6), as well as different energy sigma's (see FIG. 8). Also, while all axes are toroidally continuous, if that was not desired, that is a feature that can be chosen per axis, by calculating distances on that axis non-toroidally instead.

4.6. Extensions

When using blue noise masks, multiple independent masks may be needed. For instance, when used for dithering a diffuse and specular buffer which were later combined via addition, the same blue noise mask may not be used repeatedly for both buffers as it would increase the difference between pixels when they were added together, having used the same dither pattern on each buffer. In some instances, a system may generate and load two independent masks, but that may take more memory than necessary, especially if an independent blue noise mask is needed for every different color buffer in a rendering pipeline. That number may even be dynamic or unbounded, which would be even more problematic.

Figure 7:
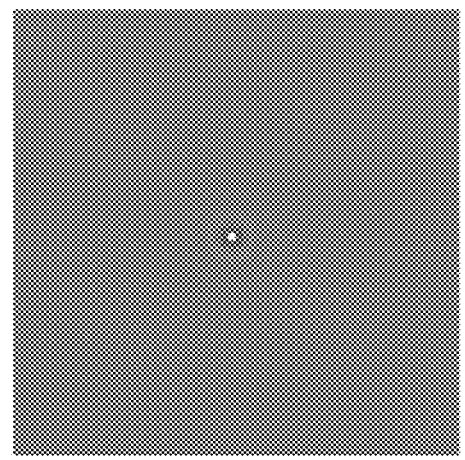
FIG. 7 illustrates images to show the autocorrelation of blue noise textures, according to at least one embodiment.
Figure 7:
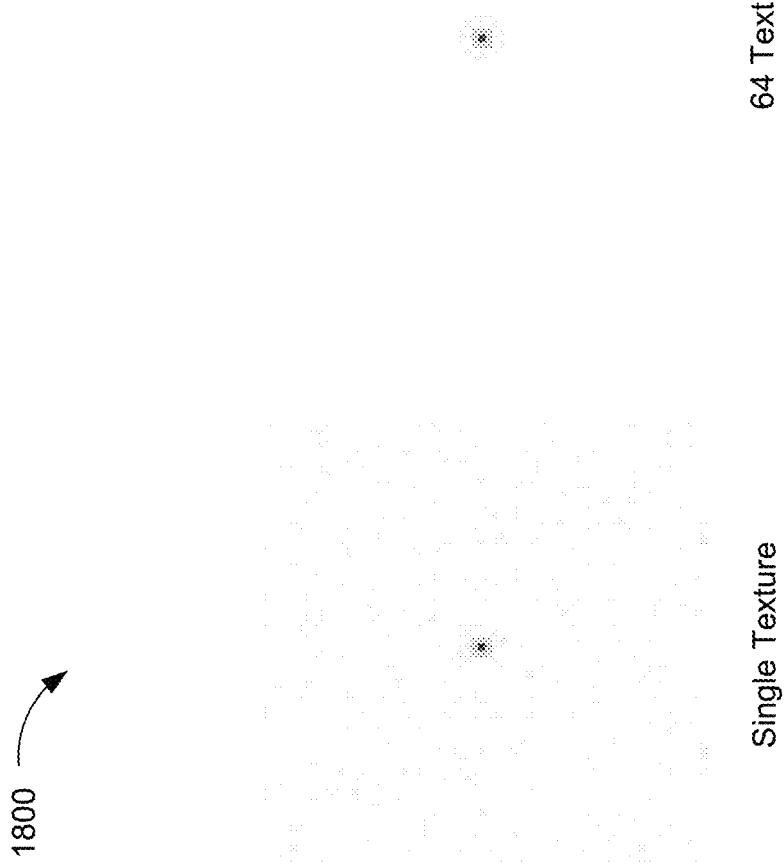

An alternate way of approximately getting independent blue noise sources is to offset where a blue noise mask is read for each independent blue noise source desired. FIG. 7 shows blue noise mask autocorrelation, and shows that small offset reads in a blue noise texture may result in correlation or anti-correlation, but that larger offsets will result in decorrelated values. The reason for this is that blue noise has correlation over small distances but is decorrelated over large distances as show in the autocorrelation.

To generalize this to wanting N different independent data sources, N points on the texture may be needed, which are nearly maximally distant from each other. In other words, these points should be low discrepancy. Where star discrepancy is not measured toroidally, this discrepancy may be measured toroidally. If it is not known in advance how many independent data sources are needed, a progressive, toroidally low discrepancy sequence may provide an arbitrary number of points with this property.

As higher dimensional blue noise masks take longer to compute, and require more memory to store them, to get an N-dimensional mask, a system may first approximately get it by starting with an N−1 dimensional mask, reading the value for the first N−1 axes, and then multiplying the last dimensional index by the golden ratio, adding it to a mask value, and using modulus to keep it between 0 and 1.

$$N(a_0, a_1, \ldots, a_n) = (N(a_0, a_1, \ldots, a_{n-1}) + \phi a_{n-1}) \bmod 1 \quad (5)$$

This was shown where spatio-temporal blue noise was compared against 2D blue noise animated by the golden ratio, and was also shown where 2D×1D×1D blue noise was compared against spatio-temporal blue noise which used the golden ratio to add on a fourth dimension. While this can hurt frequencies over space, it does show decent convergence and can help creation time as well as memory usage. While there are other irrational numbers to form other rank 1 lattices that can be used here as well, they are of lesser quality for sampling and this method can only add on groups of 1D axes.

In an embodiment, lower quality higher dimensional groups are be added. For instance, Interleaved Gradient Noise or the z sampler could be used to add on a 2D group since they are a way of converting a 2D integer coordinate into a scalar which has desirable properties on a 2D plane. This scalar could be added to the value read from the blue noise mask, and modulus could once again be used to bring it between 0 and 1.

FIGS. 5A, 5B, 5C, 5D, 5E, 5F, 5G, 5H, 5I, 5J, 5K, and 5L illustrate convergence rates for 1D functions, according to at least one embodiment. That is, FIGS. 5A, 5B, 5C, 5D, 5E, 5F, 5G, 5H, 5I, 5J, 5K, and 5L illustrate convergence rates for 1D functions with $x \in [0, 1]$ using the time axis of various mask types, showing both Monte Carlo and leaky integration. In at least one embodiment, stratified sampling shows that there are better convergence speeds possible if only considering the 1D axis of time, and not also the 2D plane of screen space. The offset graphs in the right two columns show that beginning the integration from an index other than 0 does not affect the results, showing that spatio-temporal blue noise is progressive from any index and also continuous when reaching the end of the sequence and starting over at index 0. Van Der Corput base 2 (VDC) does not have that property as is shown by erratic accuracy with low numbers of samples.

FIG. 6 illustrates DFTs of the 2D projections of 4D blue noise masks that are 64×64×16×16, according to at least one embodiment. For the sake of clarity, projections depicted in FIG. 6 are averaged to show expected frequency spectra. In at least one embodiment, the DFTs can be generated using part of process 100 (see FIG. 1A) or process 106 (see FIG. 1B).

FIG. 7 illustrates images to show the autocorrelation of blue noise textures, according to at least one embodiment. In an embodiment, neighbors may have very different values, which causes a rippling of correlation (red/white) and anti-correlation (blue/black) in the center for small offsets, but rapidly decay to decorrelated values (white/grey).

FIG. 8 illustrates 2D×1D spatio-temporal blue noise masks with various sigmas per axis, according to at least one embodiment.

FIG. 9 illustrates a graph that generation time is a function of the number of pixels in the blue noise mask and roughly follows a $y=x^2$ curve, according to at least one embodiment. Doubling the pixel count may roughly quadruple the processing time.

5.1. Stochastic Transparency

In an embodiment, stochastic transparency is the process of stochastically choosing whether to take or ignore a sample based on a material's transparency level. Sophisticated algorithms have been developed by alternative methods, but the core idea of stochastically accepting or rejecting a pixel may remain the same. In an embodiment, the spatio-temporal blue noise mask described herein uses very low sample counts and low computational costs (a single texture read and comparison), giving blue noise distributed error in screen space as 2D blue noise does, but converging faster than other methods of 2D blue noise usage. Stochastic transparency is useful in situations such as deferred lighting where information is stored on how to shade a pixel, instead of the shaded result itself, and it is impractical to store multiple or arbitrary numbers of layers to later calculate proper transparency. Stochastic transparency is also useful in the context of path tracing where a single sample per ray vertex is needed, and are only concerned that the average pixel value is correct for things like semi transparency, instead of spending the costs of computation and memory to calculate semi transparency for a single sample. Stochastic transparency works by generating a random number $\xi \in [0, 1]$ and comparing that against the opacity of the material a $\alpha \in [0, 1]$. If $\xi$ is greater than $\alpha$ than the sample is discarded. When using white noise random numbers for $\xi$, the percentage of pixels surviving the test will match $\alpha$ if done an infinite number of times, but will have a lot of variance over both space and time for lower numbers of samples.

Using 2D blue noise masks instead will make the surviving pixel percentage be more accurate for lower numbers of samples spatially, which also will make the surviving pixels be randomized, but roughly evenly spaced. As mentioned before, however, the methods for animating blue noise over time either alters the blue noise over space or becomes white noise over time, causing poor convergence when either taking multiple samples per frame, or integrating multiple frames. Using spatio-temporal blue noise masks as described herein where each individual frame is a good blue noise, but each pixel is also a good sampling sequence over time means that individual frames will have surviving pixels being blue noise distributed in space, but also that each frame will have very different surviving pixels, allowing better convergence over time, or over multiple samples within a single frame. Rendering comparisons are shown in FIG. 10 and convergence rates are shown in FIGS. 11A, 11B, and 11C.

Figure 10:
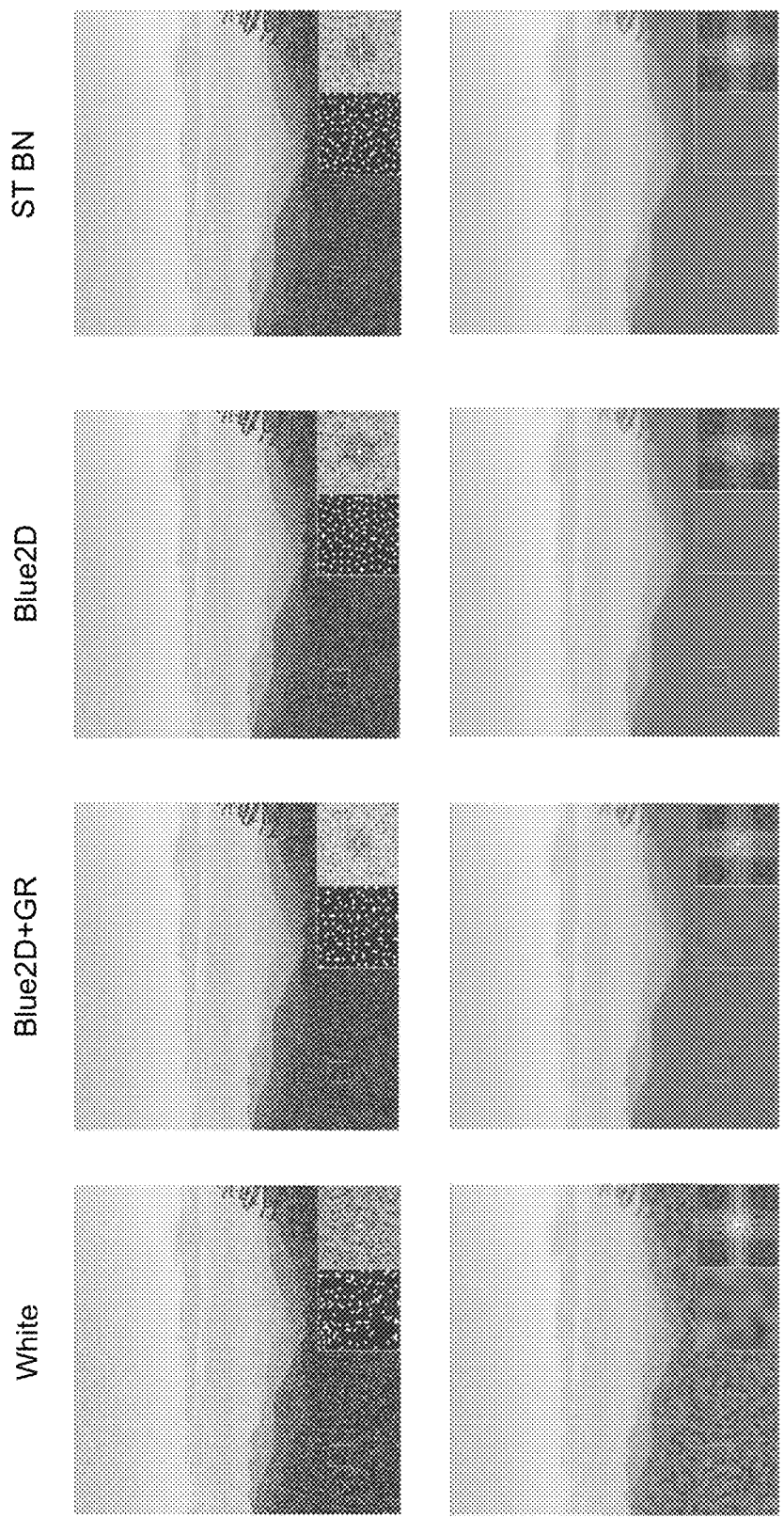
FIG. 10 illustrates stochastic transparency using various types of noise, according to at least one embodiment.
Figure 11A:
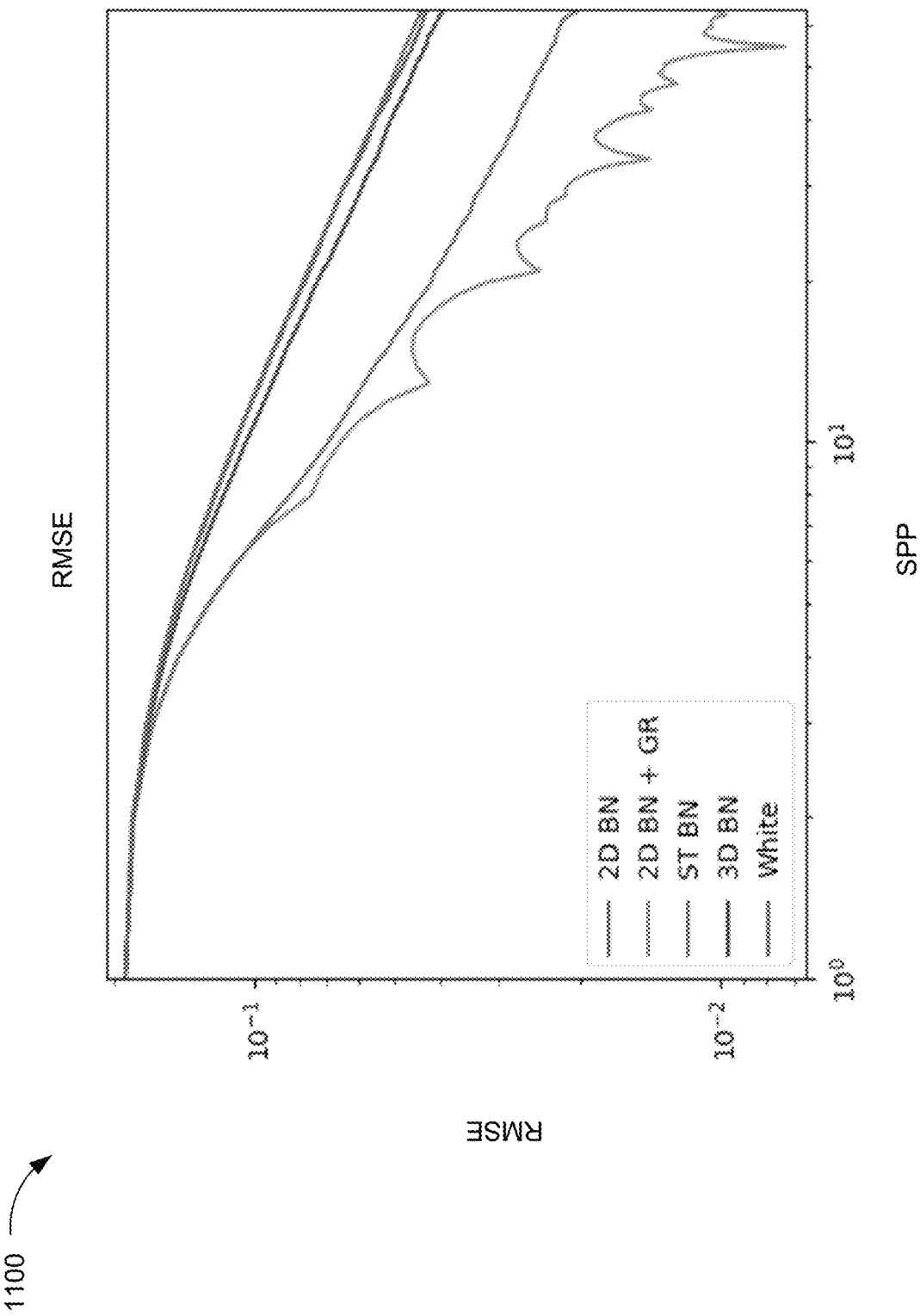
FIGS. 11A, 11B, and 11C illustrate convergence rates in stochastic alpha of various types of noise, according to at least one embodiment.
Figure 11B:
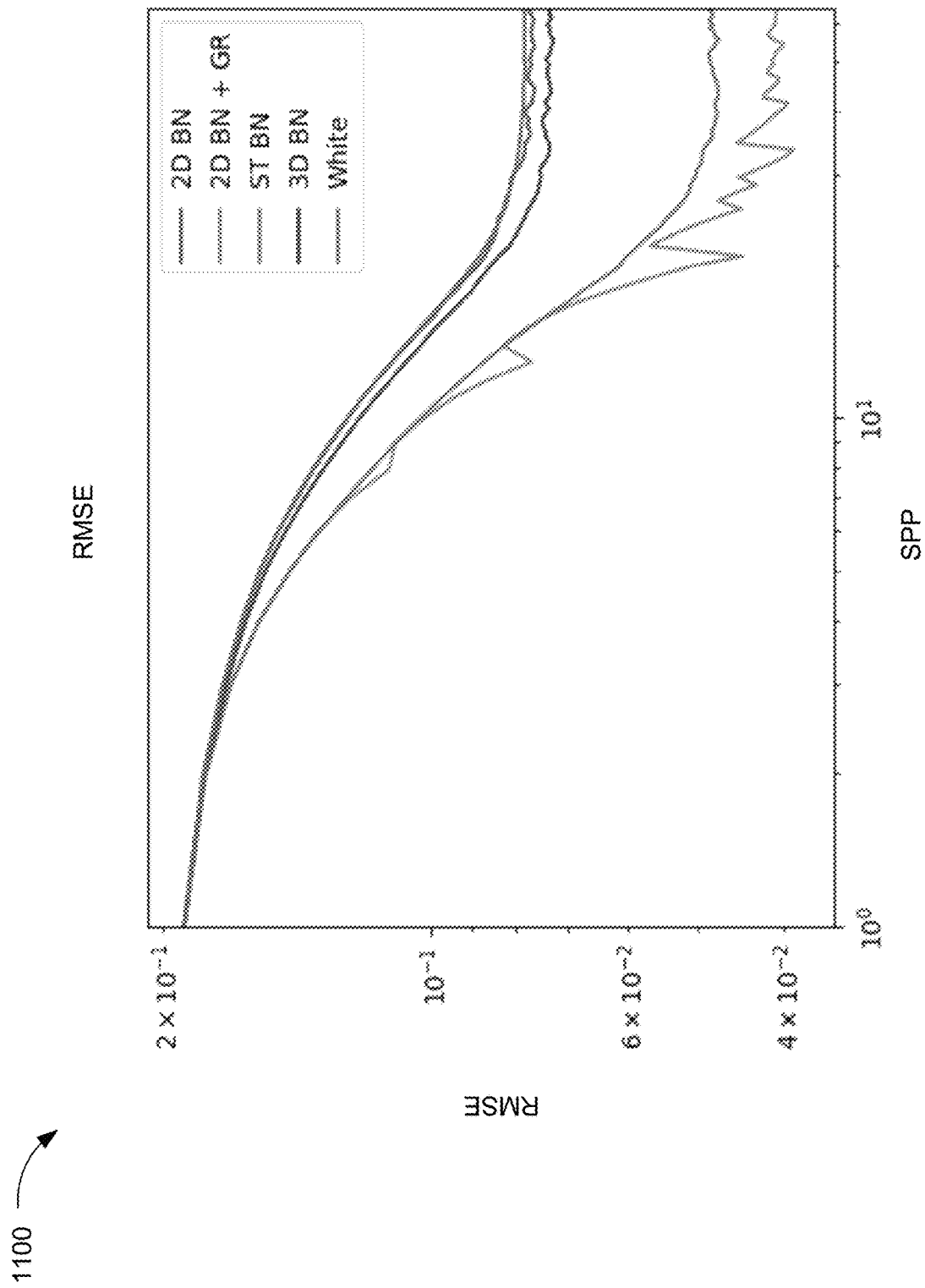
Figure 11C:
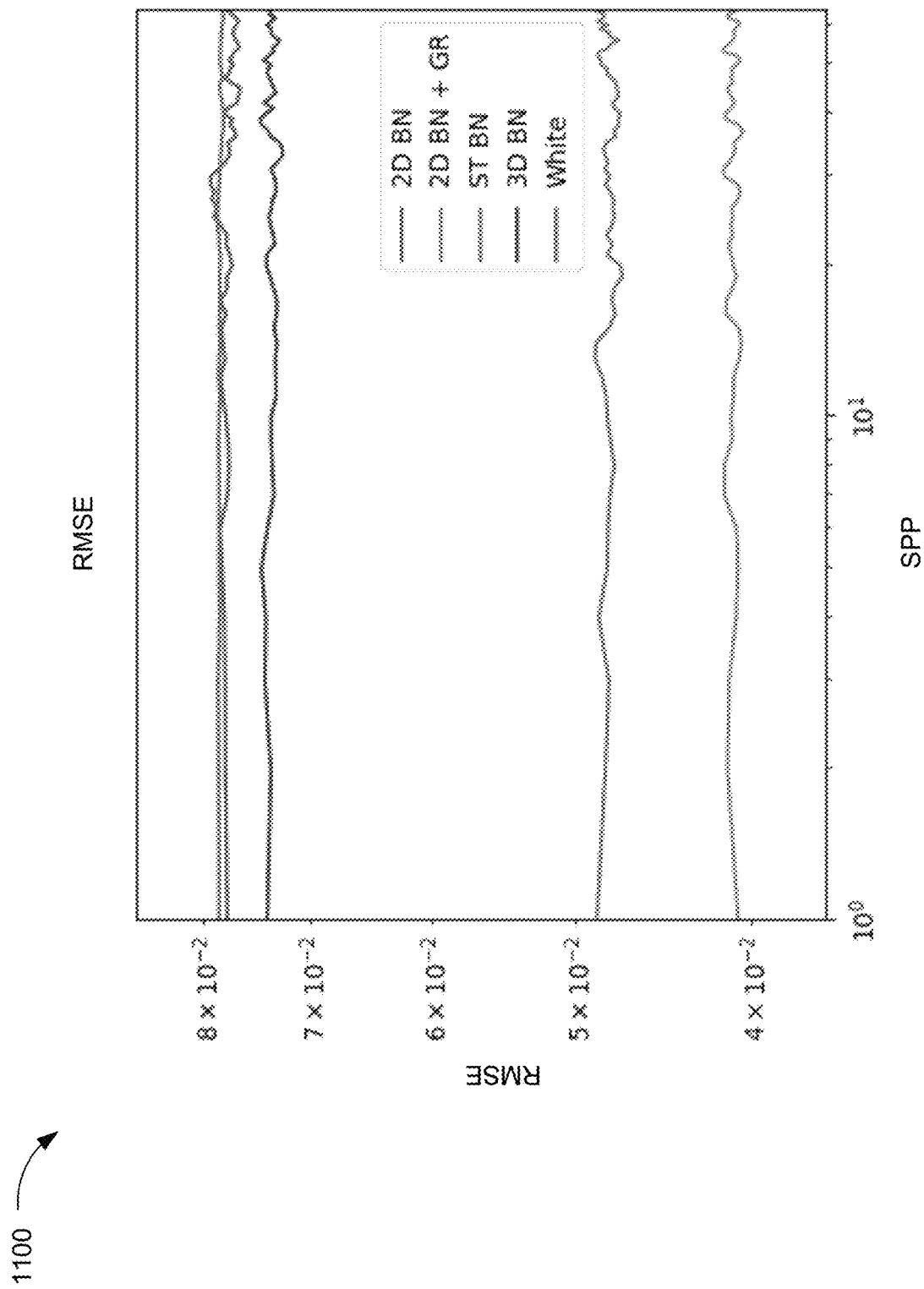

FIG. 10 illustrates stochastic transparency using various types of noise, according to at least one embodiment. In an embodiment, FIG. 10 illustrates one sample per pixel. The top images are a raw frame, where bottom images are Gaussian blurred with a sigma of 2. In an embodiment, spatio-temporal blue noise does as well spatially as 2D blue noise, and better than golden ratio animated blue noise.

5.2. Dithering

Dithering is the process of adding a small amount of noise to data before quantizing it to get a noisy result instead of quantization artifacts. This can be used to hide banding artifacts that would otherwise come from decreasing bit depth, allowing less memory to be used while attempting to preserve image quality. Dithering causes pixels to stochastically round up or round down when being quantized, where the probability of rounding towards a quantization level is based on how far the value is from that level. If quantizing a continuous value $x \in [0, 1]$ into n distinct values, to get the quantized value $y \in \mathbb{Z}$, a random number $\xi \in [0, 1)$ may be used in the equation below:

$$y = \lfloor x(n-1) + \xi \rfloor$$

When white noise is used for dithering, the result gives a white noise pattern. If blue noise is used instead, the result is more visually pleasant to a human or on a display while also having more correct averages over small regions of pixels spatially. When spatio-temporal blue noise is used for dithering, the result may be blue noise over space, but also over time, where each pixel may have a more correct average over smaller samples over time when animated. Rendering comparisons are shown in FIG. 12 and convergence rates are shown in are shown in FIGS. 13A, 13B, and 13C.

FIGS. 11A, 11B, and 11C illustrate convergence rates in stochastic alpha of various types of noise, according to at least one embodiment. In an embodiment, golden ratio animated blue noise converges faster than spatio temporal blue noise, but may alter frequencies spatially.

Figure 12:
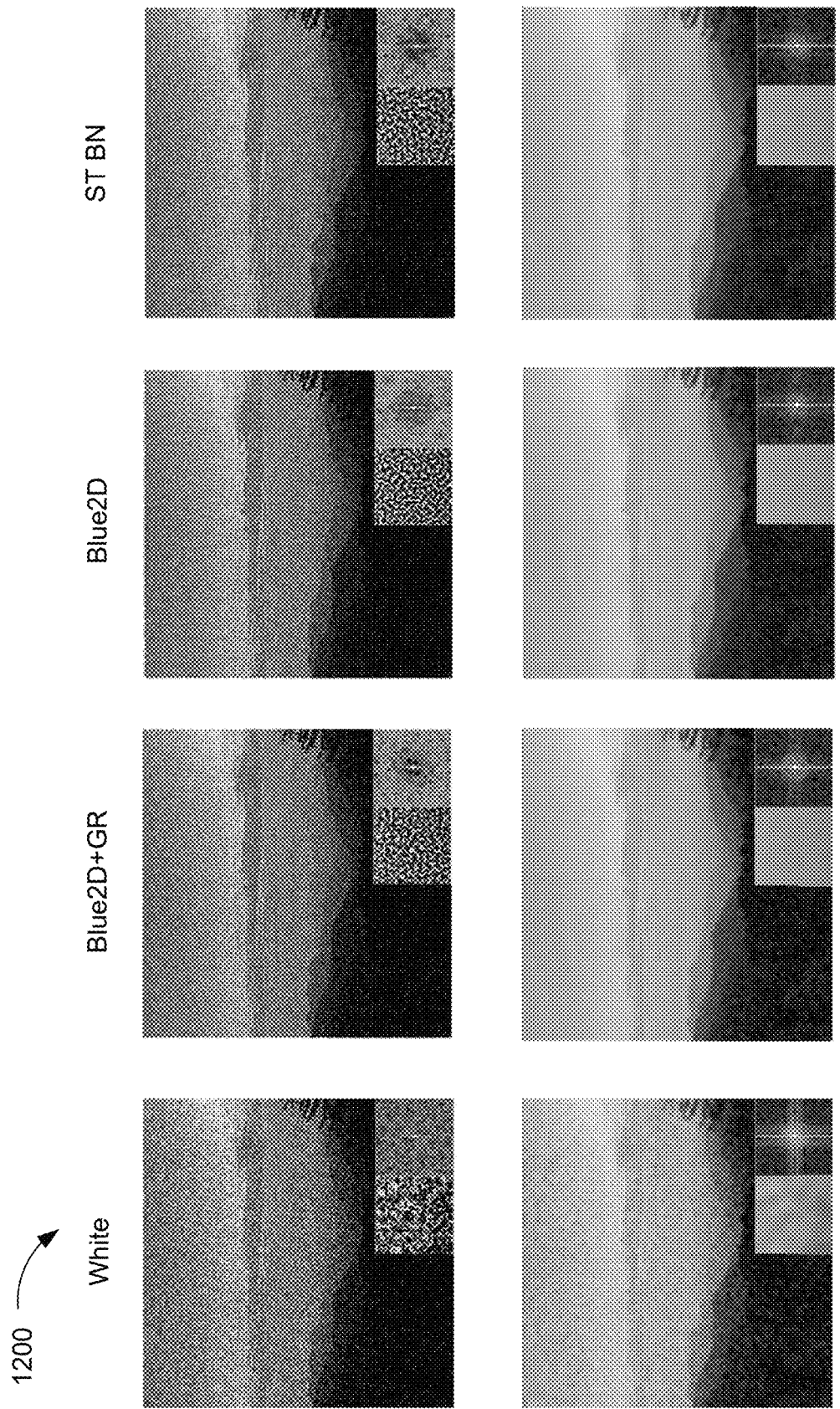
FIG. 12 illustrates dithering before quantizing to 1 bit per color channel using various types of noise, according to at least one embodiment.

FIG. 12 illustrates dithering before quantizing to 1 bit per color channel using various types of noise, according to at least one embodiment. The top images are a raw frame, bottom images are Gaussian blurred with a sigma of 2. As shown in FIG. 12, the spatio-temporal blue noise does as well spatially as 2D blue noise, and is improved compared to golden ratio animated blue noise.

Figure 13A:
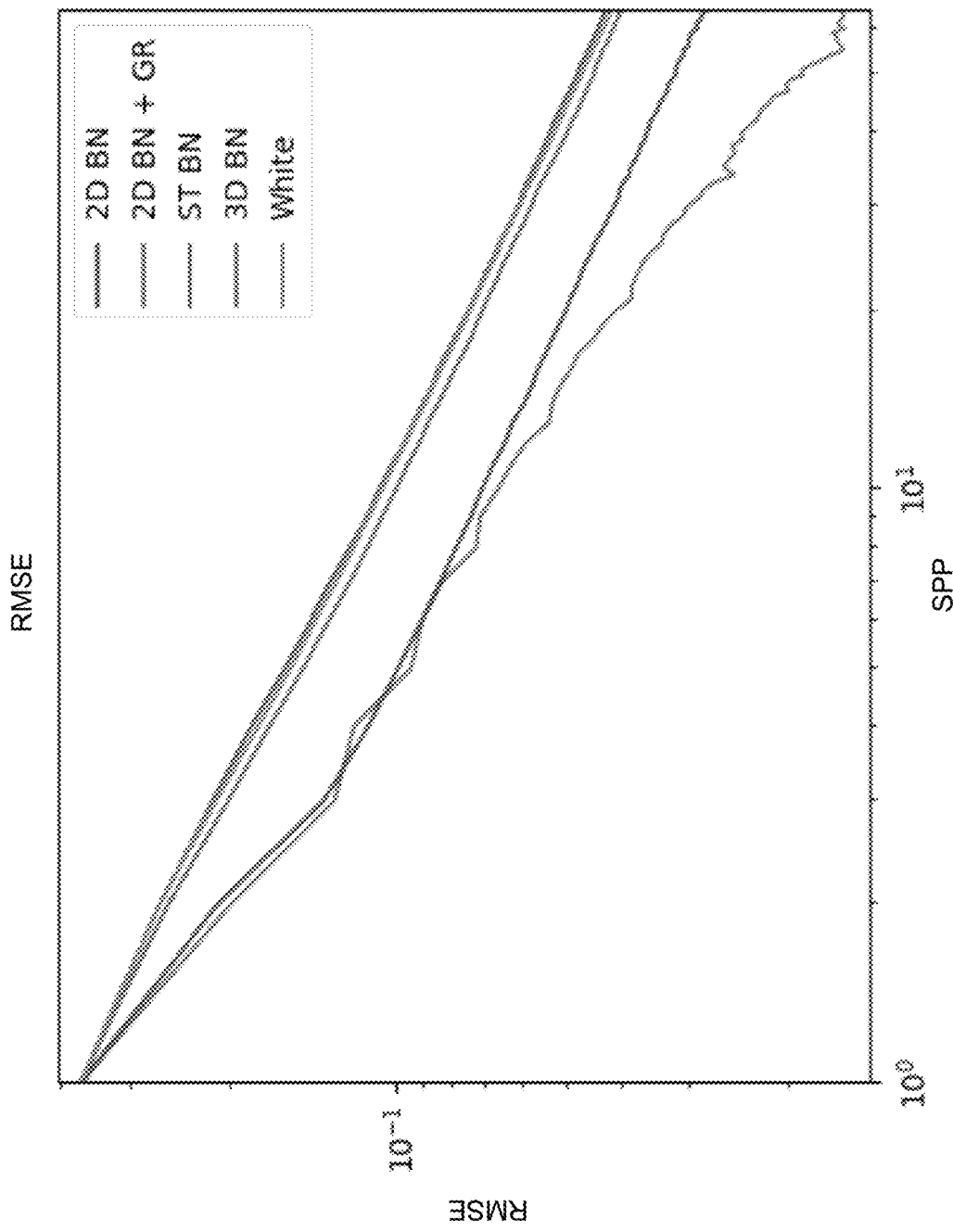
FIGS. 13A, 13B, and 13C illustrate graphs of convergence rates in dithering of various types of noise, according to at least one embodiment.
Figure 13B:
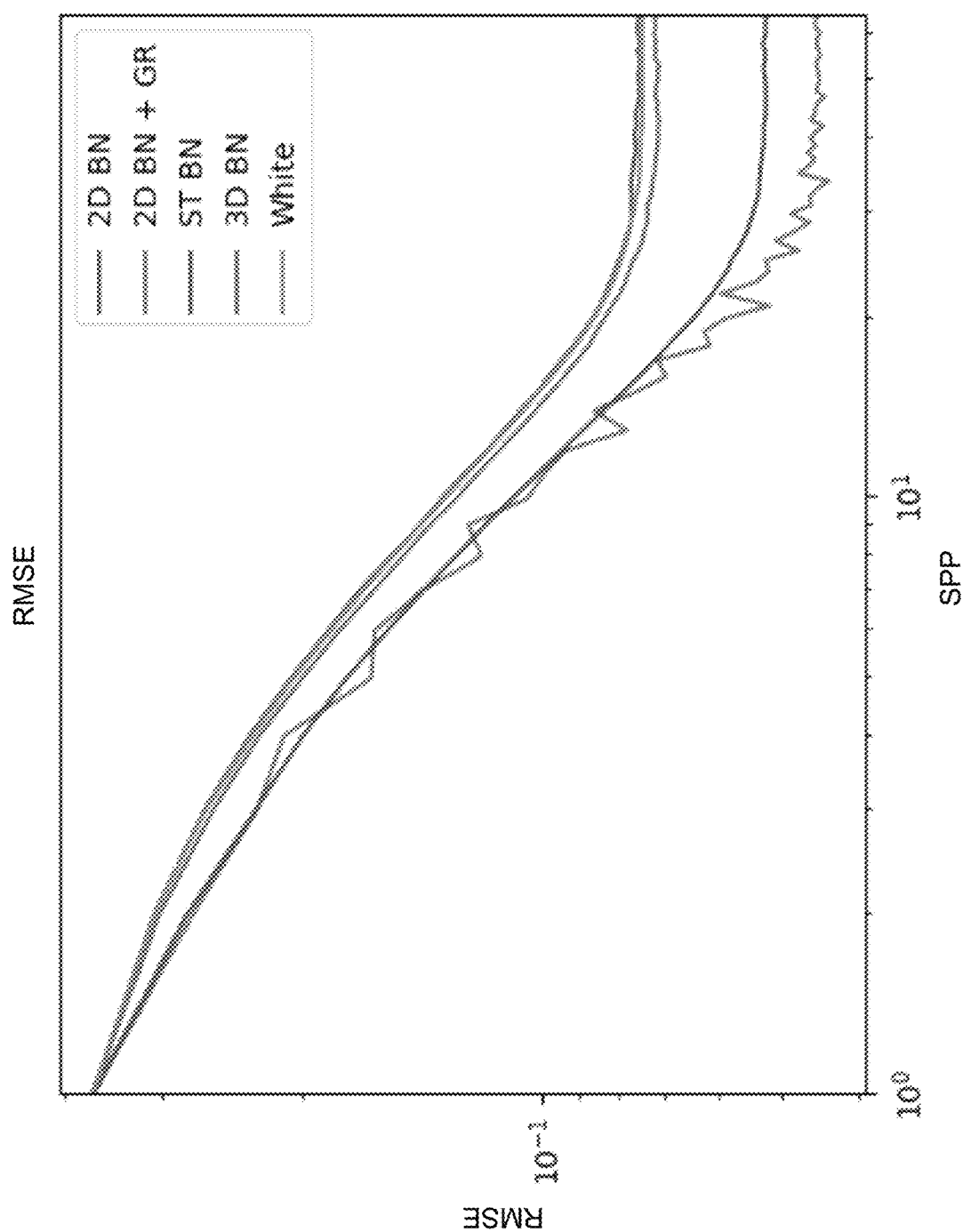
Figure 13C:
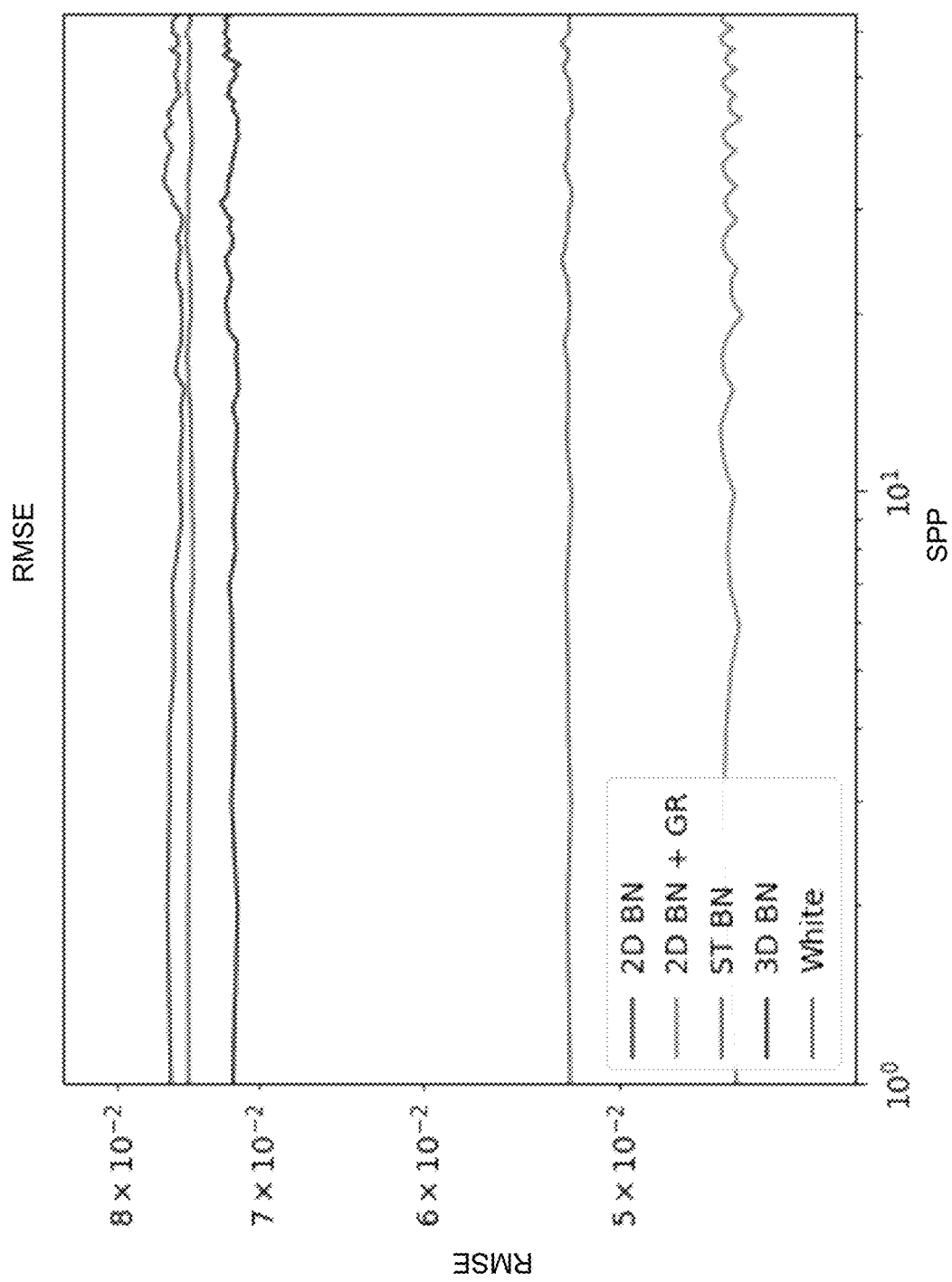

FIGS. 13A, 13B, and 13C illustrate graphs of convergence rates in dithering of various types of noise, according to at least one embodiment. In an embodiment, golden ratio animated blue noise converges faster than spatio-temporal blue noise, but alters frequencies spatially.

5.3. Ray Marched Participating Media with Spatio-Temporal Blue Noise

In an embodiment, one or more computing devices execute an algorithm to render single scattering heterogeneous participating media with very low sample counts. This is a different type of algorithm than stochastic transparency or dithering because it shows how blue noise masks can be applied to arbitrary rendering problems. While there are much more sophisticated algorithms for rendering participating media, the techniques described herein is simple, performant, gives good results at very low sample counts and works with either rasterization or raytracing. In an embodiment, the algorithm is run after the primary hit has been shaded and the surface depth is known. The surface depth d may be the length of the line segment down the camera ray r that must be integrated. In an embodiment, that line segment is sampled at n evenly spaced locations, where the space between each sample is $$\frac{d}{n}$$

units. The location $p_s$ of a sample $s \in \mathbb{Z}[0, n-1]$ is then calculated as:

$$p_s = rs\frac{d}{n}$$

At each sample point $p_s$, a fog density field F is sampled to get a density $f_s$. This is assumed to be the density for an entire step length of distance.

$$f_s = F(p_s)$$

A light visibility function V is also evaluated at $p_s$ to get a visibility value $v_{s,i} \in [0,1]$ for all lights $i \in I$. The visibility value $v_{s,i}$ may either be a binary value which is similar when shooting a single ray towards a light, or it may be a more continuous value which is similar to reading a shadow map using percentage closer filtering, or from taking multiple shadow ray samples.

$$v_{s,i} = v(p_s, i)$$

To calculate the color of an individual sample $c_s$ of fog, shaded fog colors $c_{unit}$ for fog in shadow and $c_{lit,i}$ for fog lit by light i are determined. The fog colors may either be calculated or provided. The visibility value $v_{s,i}$ may be multiplied by $c_{lit,i}$ to get the contribution of that light. All lighting contributions are summed and $c_{unlit}$ is added to the results to get the final color for the fog at that sample $c_s$.

$$c_s = c_{unlit} + \sum_{i \in I} v_s, i^c lit, i$$

To calculate the opacity $o_s$ for a sample, the usual Beer's law absorption formula may be used, using the density f and step distance d.

$$o_s = e^{-df}$$

When performing the integration, the cumulative result r may be initialized to the shaded surface color p, and then march backwards from the surface towards the camera, calculating the color and opacity of the fog sample, and applying the usual over alpha blending operation to the cumulative result.

$$r_0 = p$$

$$r_s = r_{s-1}(1-o_s) + c_s o_s$$

Running the algorithm as is with low values of n samples down the line segment causes noticeable banding. Much like the dithering case, random numbers may be used to replace the banding with noise. In an embodiment, a random value is used $\xi \in [0; 1)$ per primary hit sample (e.g., per pixel), to offset the location of each sample point $p_s$. Note that the sample locations are still evenly spaced, they are just shifted forwards or backwards in depth.

$$p_s = r(s + \xi)\frac{d}{n}$$

Using white noise, screen space white noise results are obtained. Using 2D blue noise, the error pattern is improved. Using spatio-temporal blue noise, screen space blue noise error patterns are obtained, but also, the magnitude of the error is smaller. Rendered results can be seen in FIG. 14, and convergence graphs can be seen in FIGS. 15A, 15B, and 15C.

Figure 14:
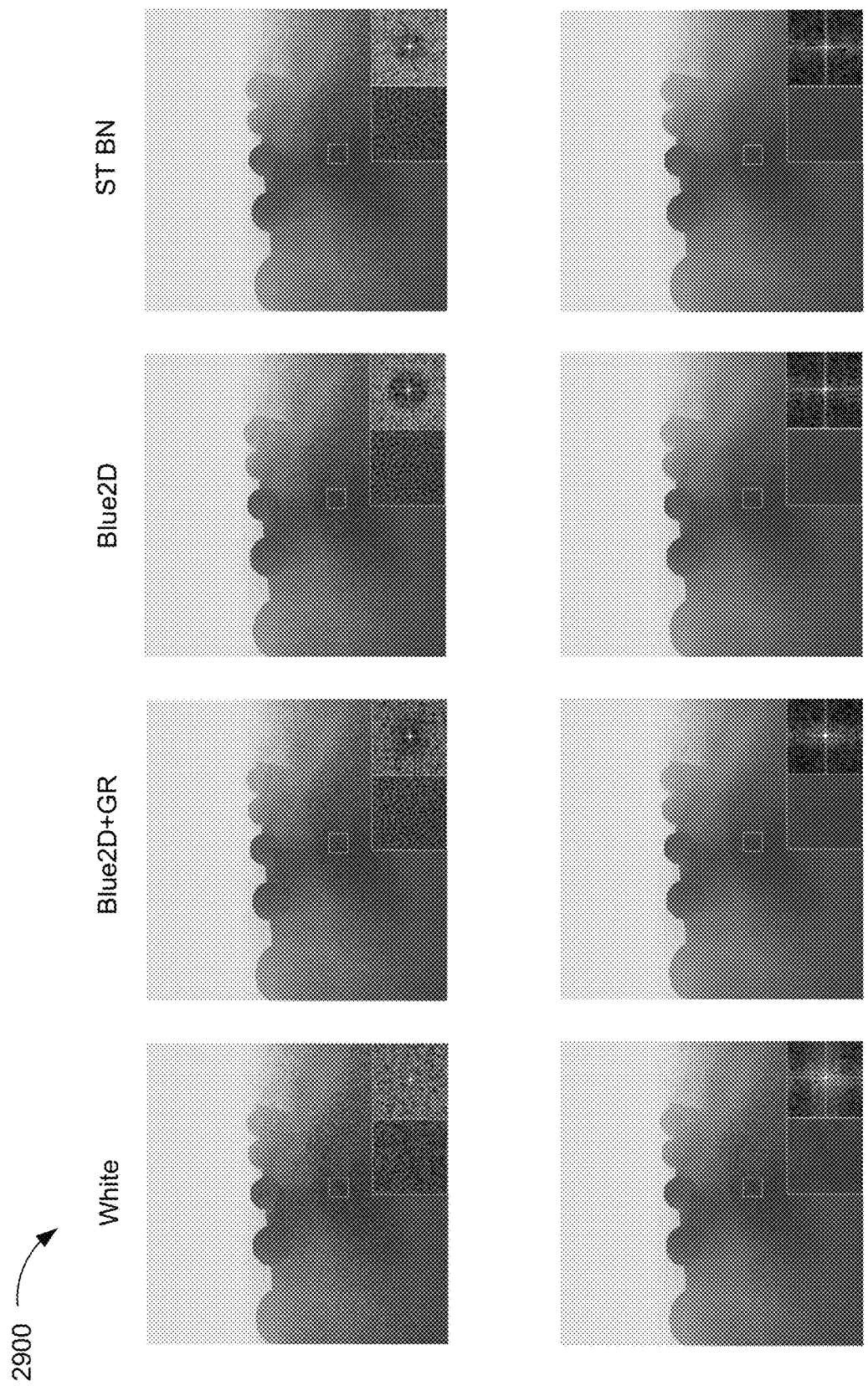
FIG. 14 illustrates using noise to randomly offset ray marching starting portions for 4 steps of raymarching per pixel, accordingly to at least one embodiment.

FIG. 14 illustrates using noise to randomly offset ray marching starting portions for 4 steps of raymarching per pixel, according to at least one embodiment. Top images are a raw frame, bottom images are depth aware Gaussian blurred with a sigma of 2.

Figure 15A:
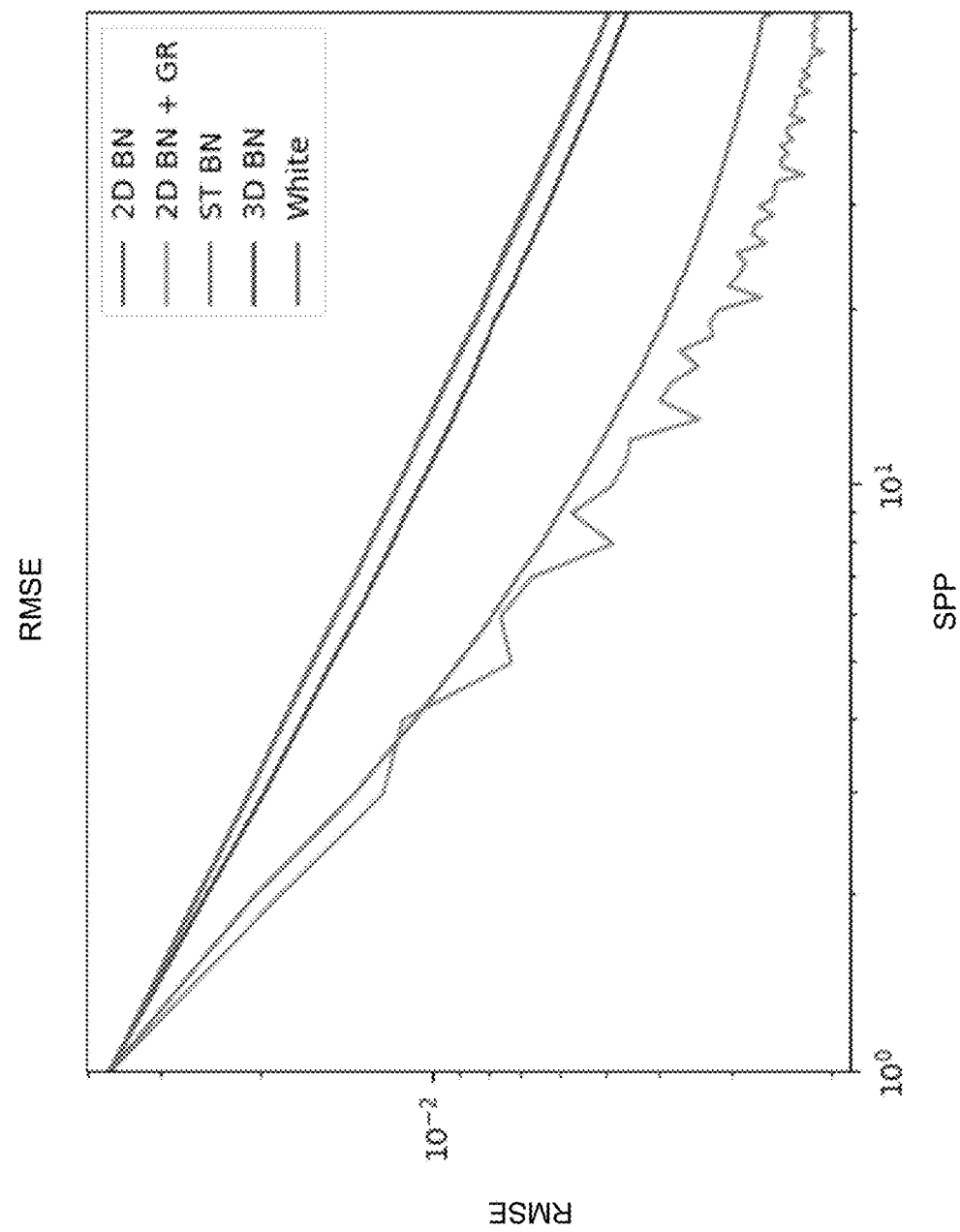
FIGS. 15A, 15B, and 15C illustrate graphs of ray marching fog convergence rates with various types of noise, according to at least one embodiment.
Figure 15B:
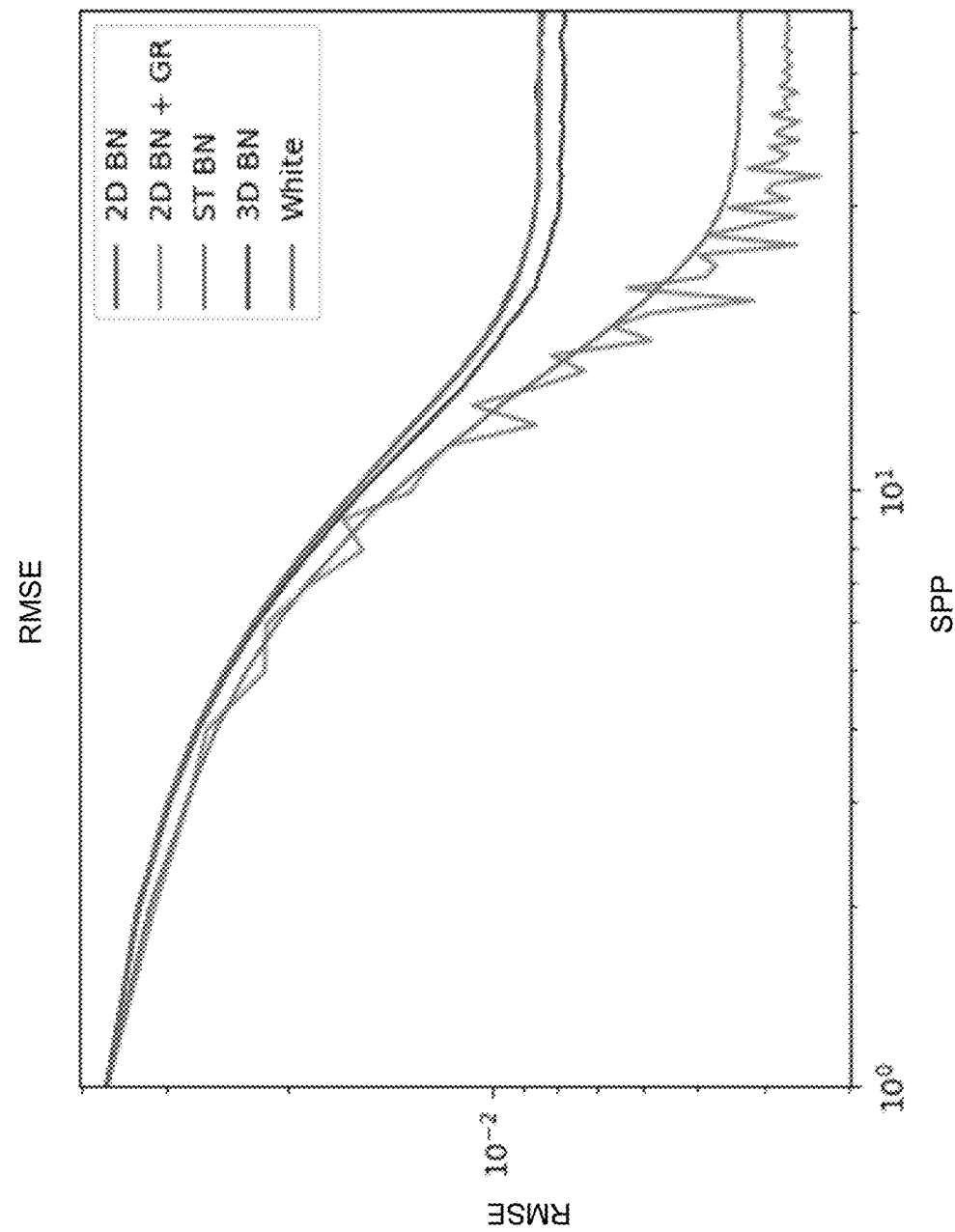
Figure 15C:
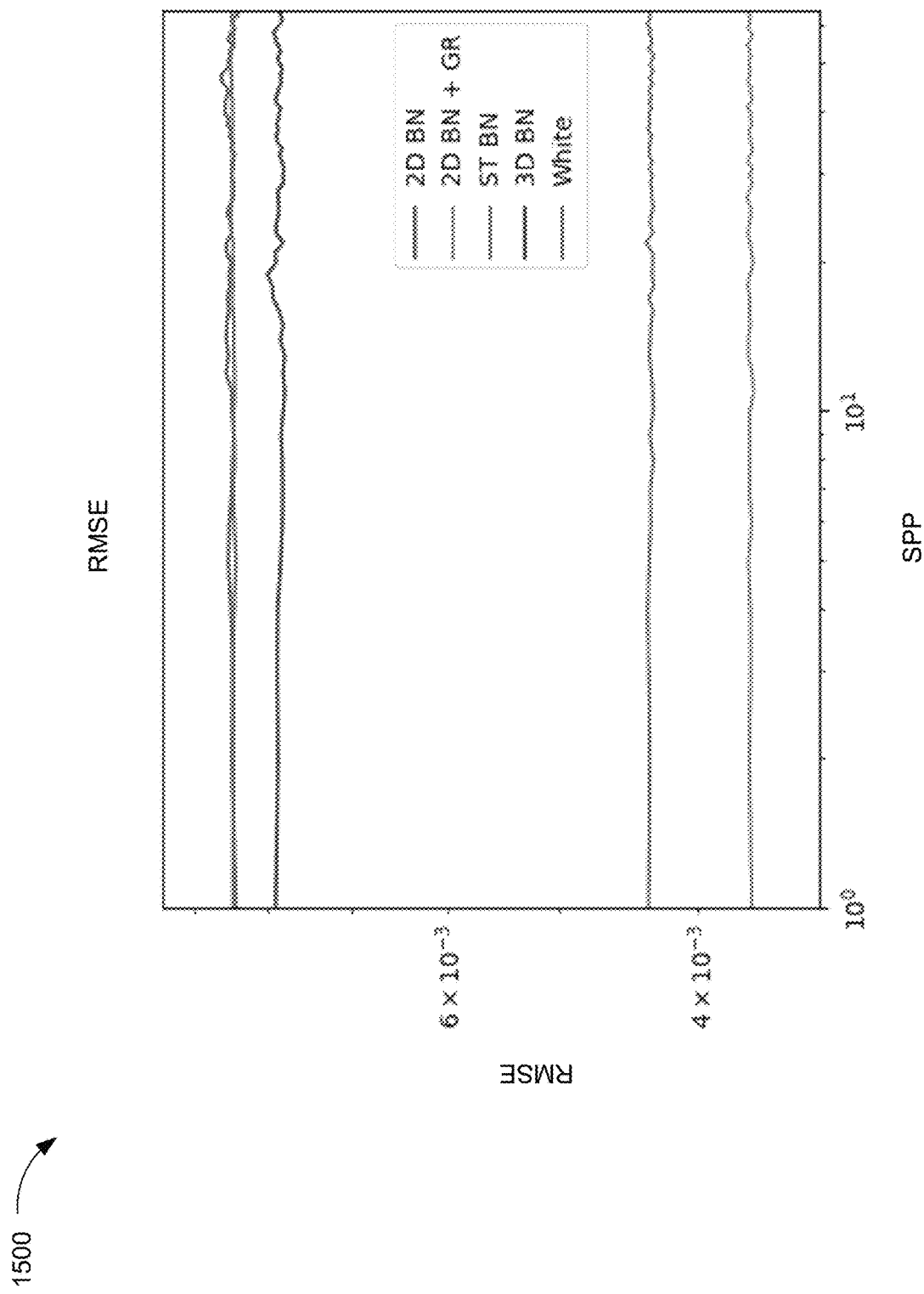

FIGS. 15A, 15B, and 15C illustrate graphs of ray marching fog convergence rates with various types of noise, according to at least one embodiment. In an embodiment, only 4 steps of ray marching are done per pixel.

5.4. Participating Media with 2D×1D×1D Blue Noise

In an embodiment, one or more computing devices may execute an algorithm that makes use of a 2D×1D×1D blue noise mask, where the previous algorithm made use of a 2D×1D spatio-temporal blue noise mask. This algorithm may be used to indicate how higher dimensional blue noise masks can be used in rendering algorithms. In both this algorithm and the previous algorithm, the goal is to integrate single scattering participating media. In the previous algorithm, regularly spaced samples were taken along the line segment, and noise was used to offset the starting point of those samples to trade banding for noise. In this algorithm, the line segment may be broken up into n evenly spaced sections, but instead of using only a single random offset for the whole sampling sequence, the algorithm may read a random offset per sample. Then, n random values will be obtained $\xi_s \in [0, 1)$ and the sampling position $p_s$ may be calculated as follows:

$$p_s = r(s + \xi_s)\frac{d}{n}$$

The rest of the algorithm remains the same. Rendered results can be seen in FIG. 16, and convergence graphs can be seen in FIGS. 17A, 17B, and 17C. This reformulation changes it from a ray marching technique to a stratified sampling technique, and if comparing this to the spatio-temporal blue noise convergences, it improves for the same sample count.

Figure 16:
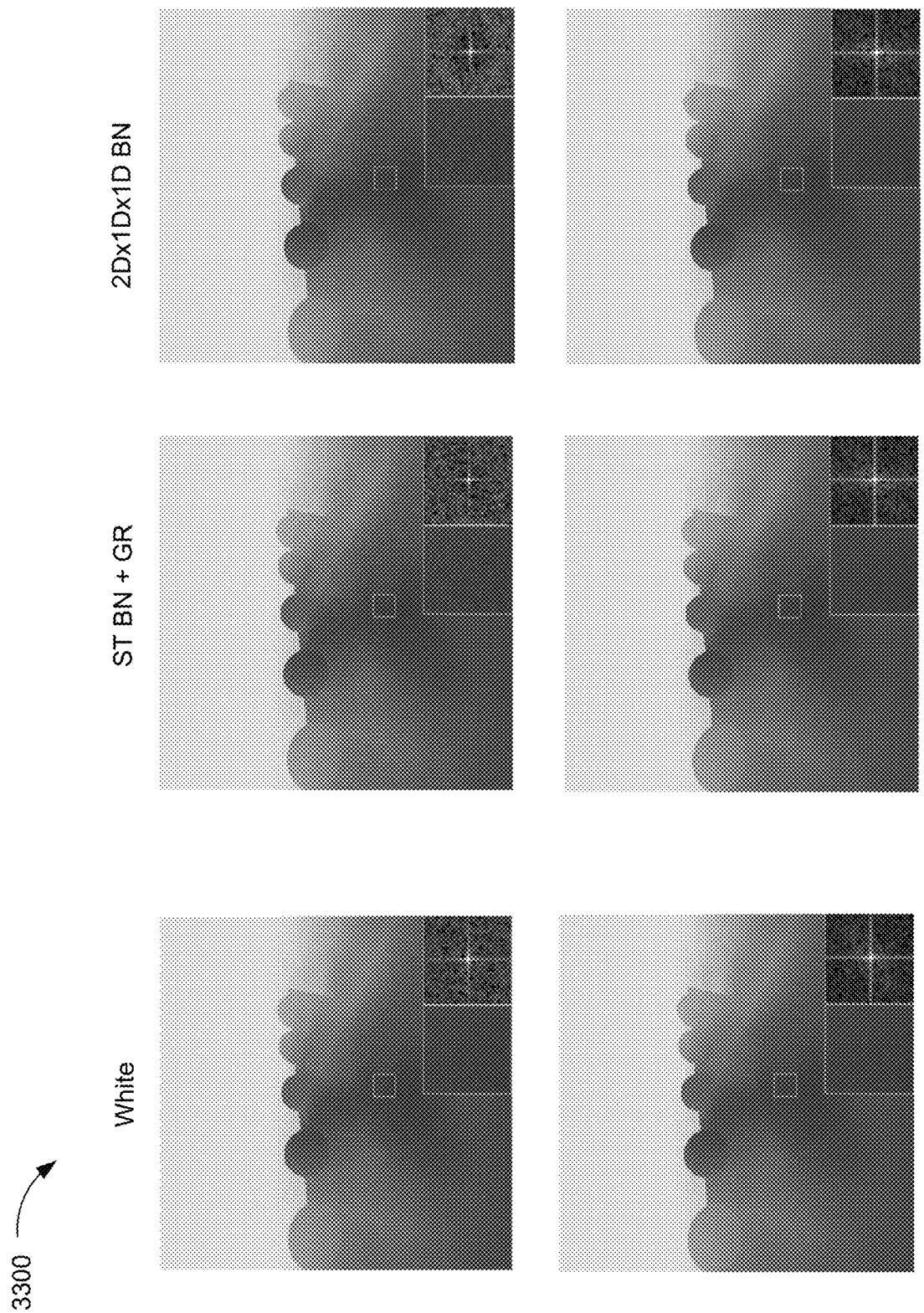
FIG. 16 illustrates using noise to stratify 16 samples of the line segment of each pixel through participating media, according to at least one embodiment.

FIG. 16 illustrates using noise to stratify 16 samples of the line segment of each pixel through participating media, according to at least one embodiment. The top images are a raw frame, bottom imagers are depth aware Gaussian blurred with a sigma of 2.

Figure 17A:
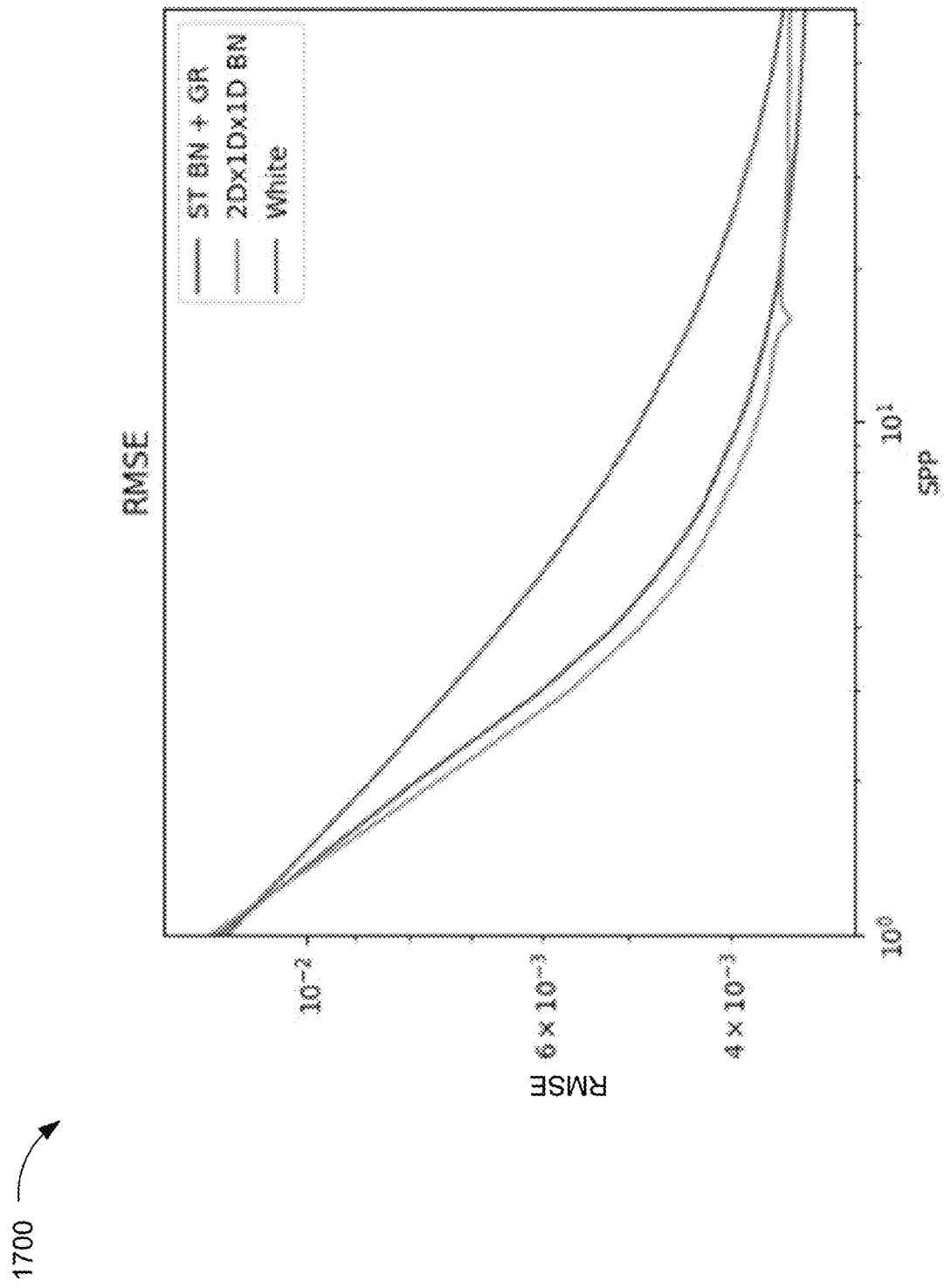
FIGS. 17A, 17B, and 17C illustrate graphs of ray marching fog convergence rates with various types of noise, according to at least one embodiment.
Figure 17B:
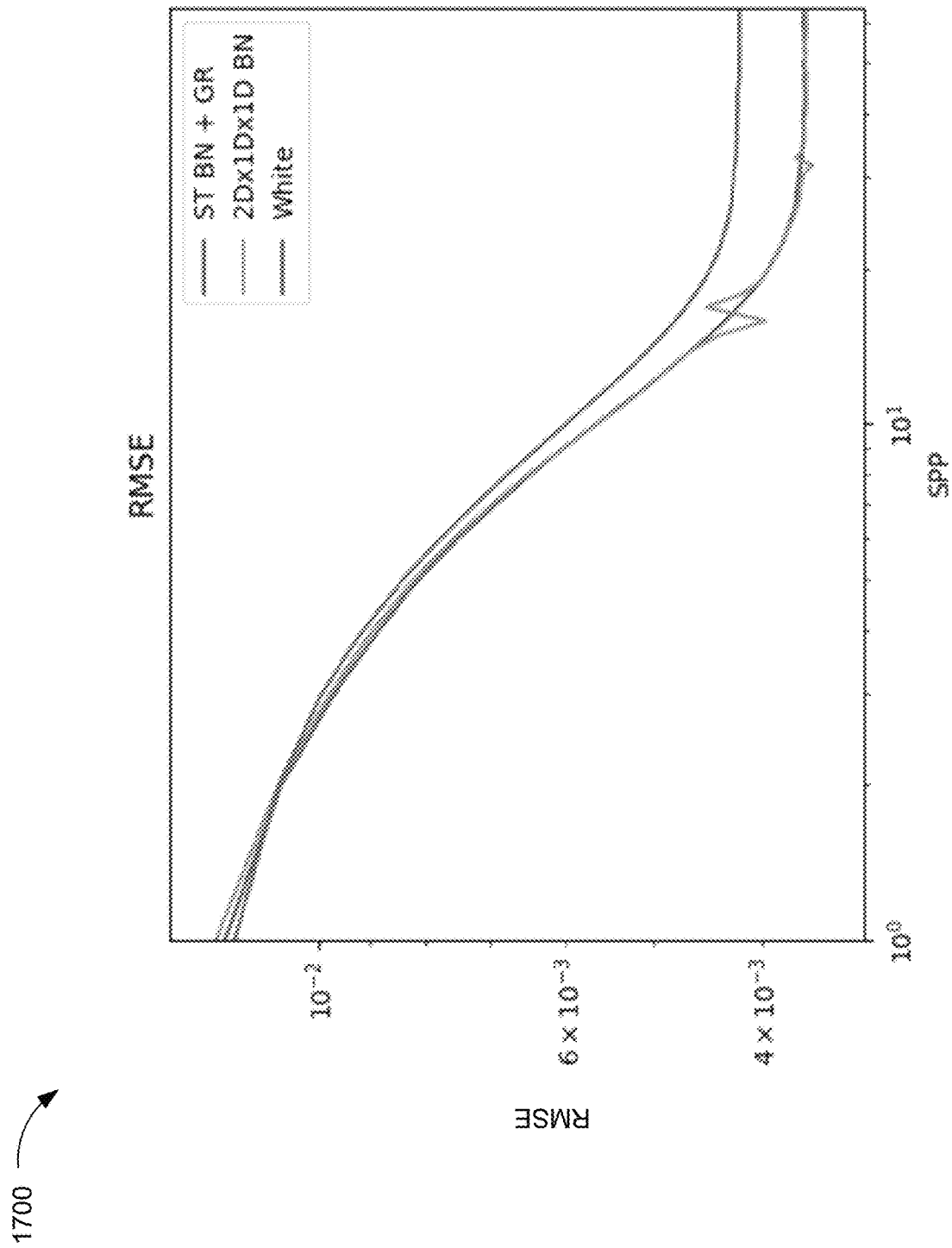
Figure 17C:
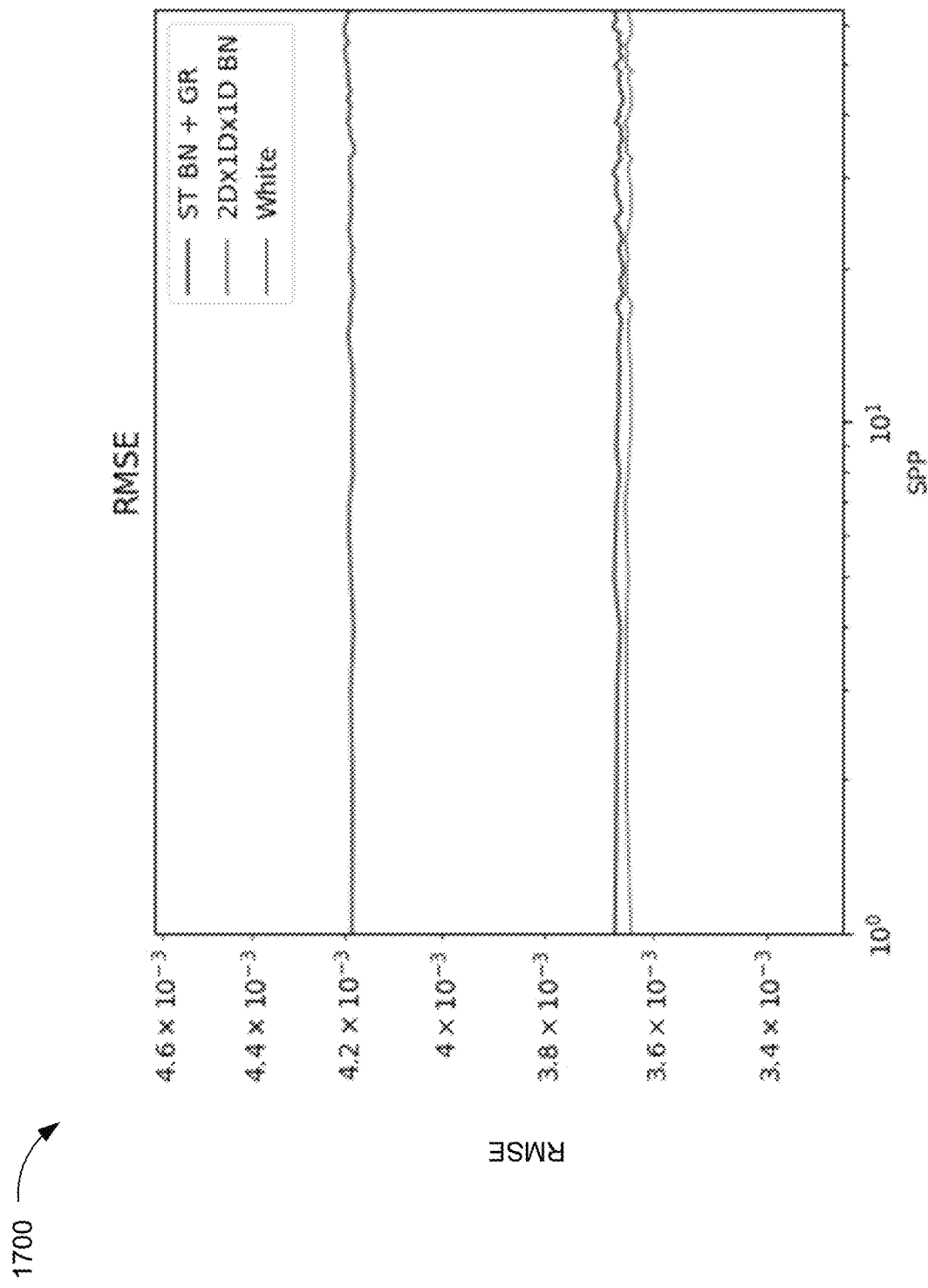
Figure 18A:
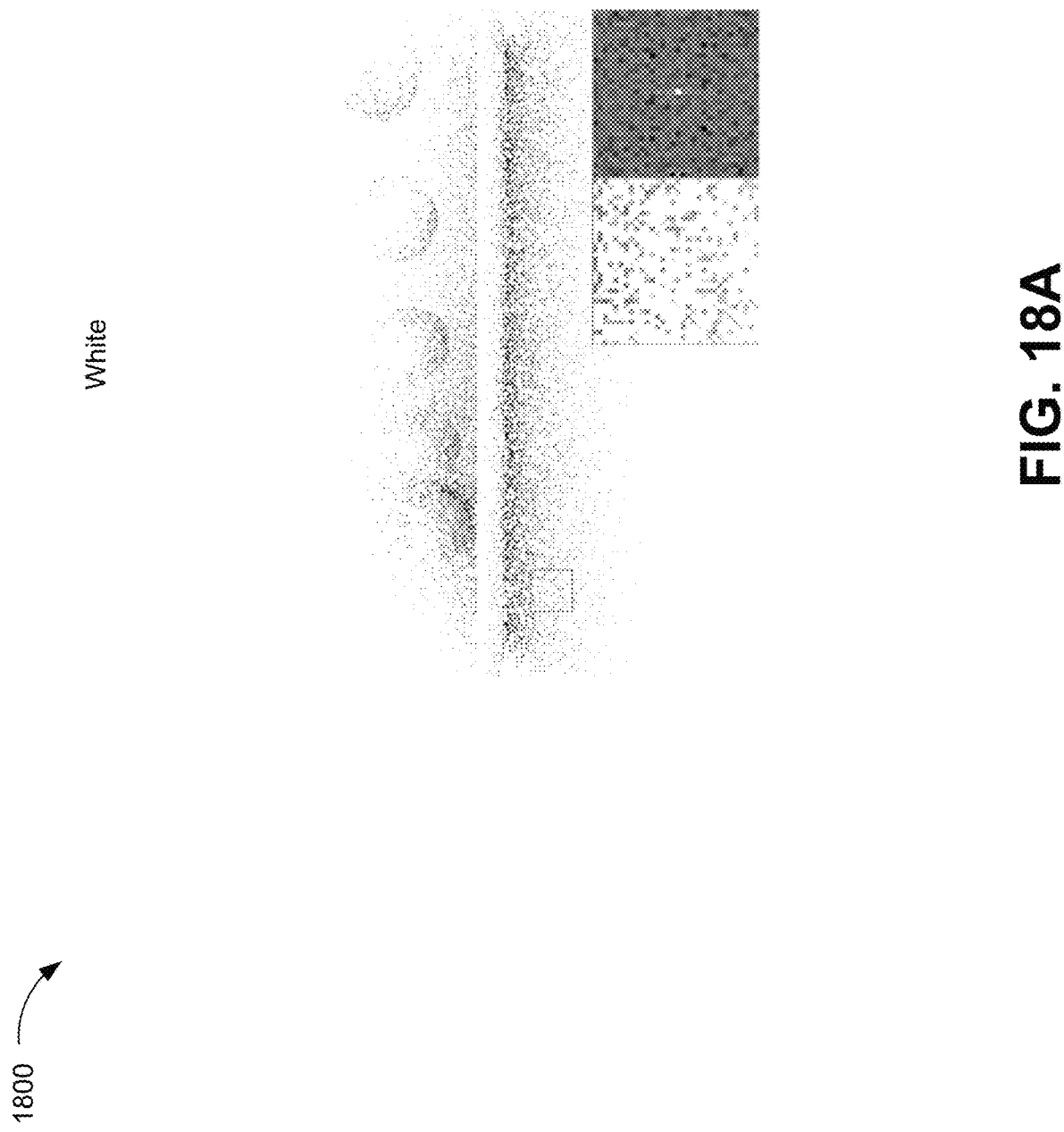
FIGS. 18A, 18B, 18C, 18D, 18E, 18F, 18G, and 18H illustrate using two independent streams of noise to generate x and y components for a 2D vector mapped to a cosine weighted hemisphere for a single Ambient Occlusion (AO) sample per pixel, according to at least one embodiment.
Figure 18B:
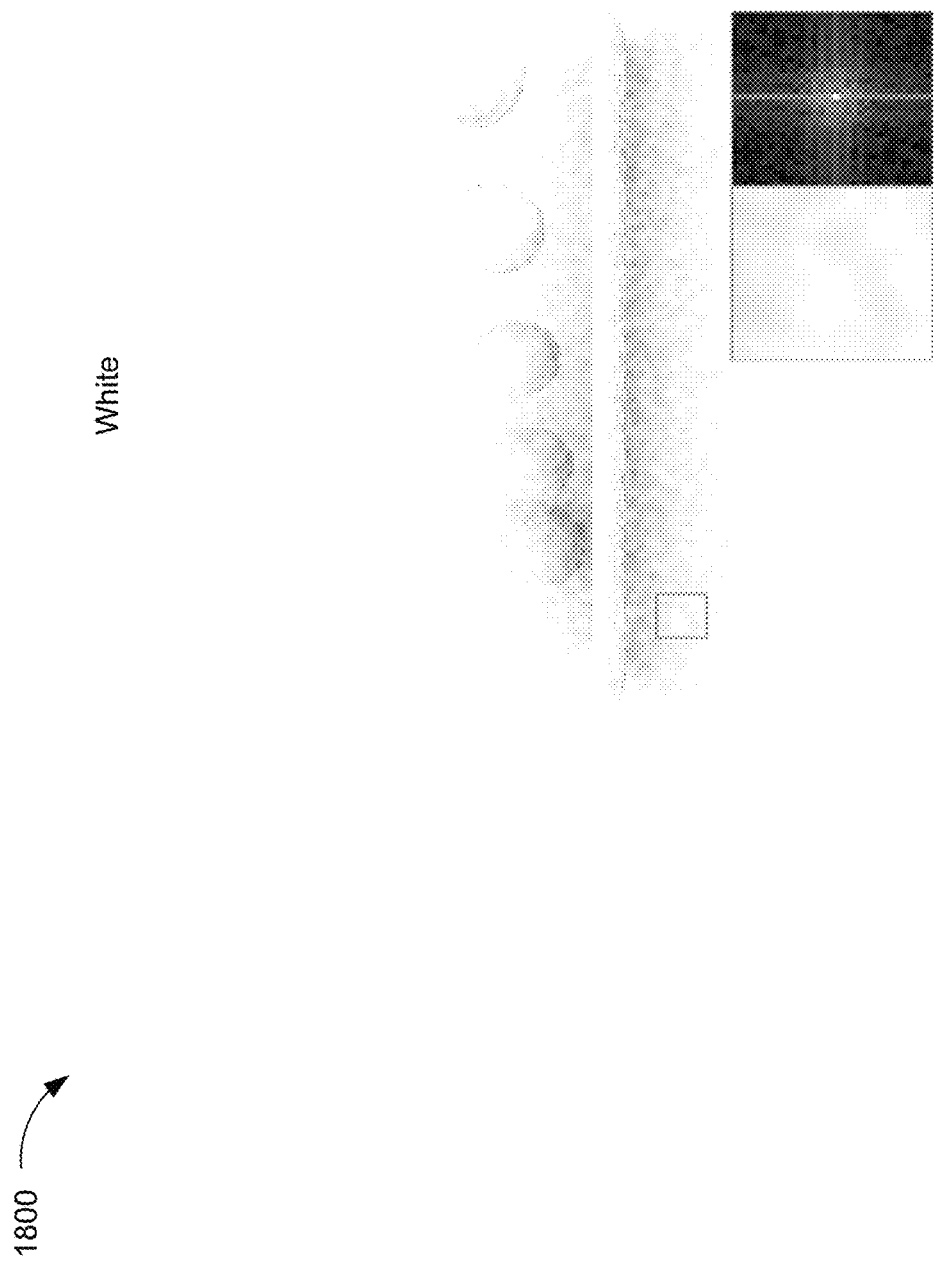
Figure 18C:
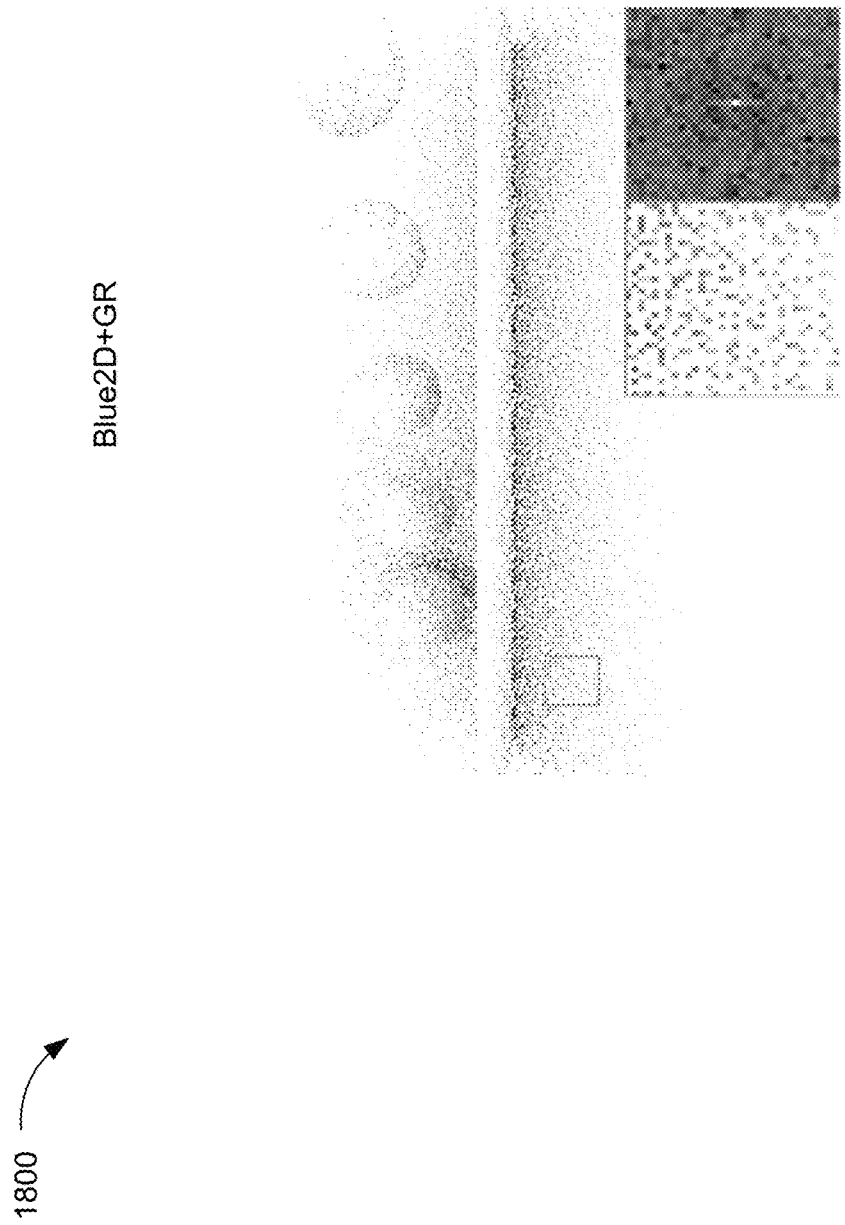
Figure 18D:
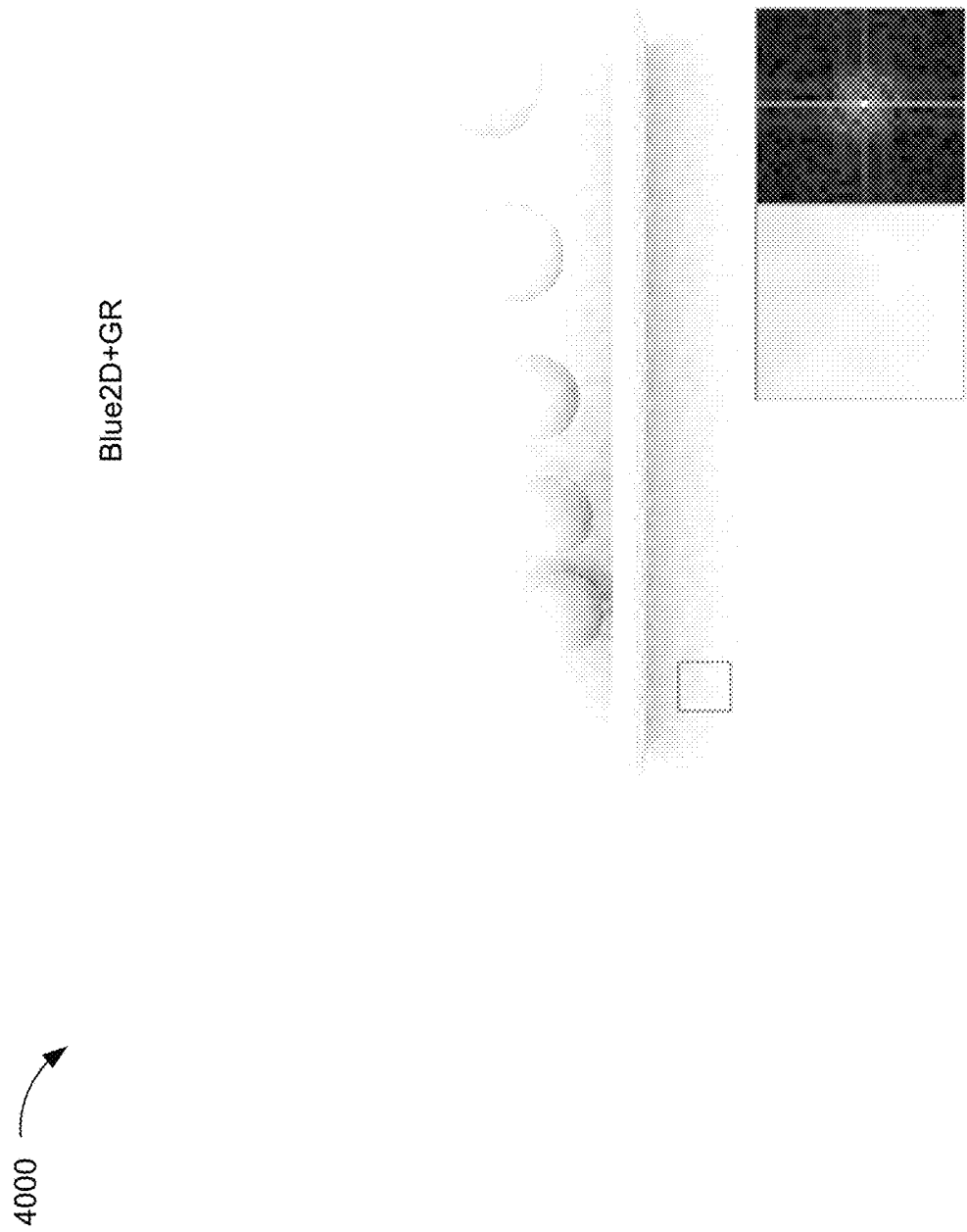
Figure 18E:
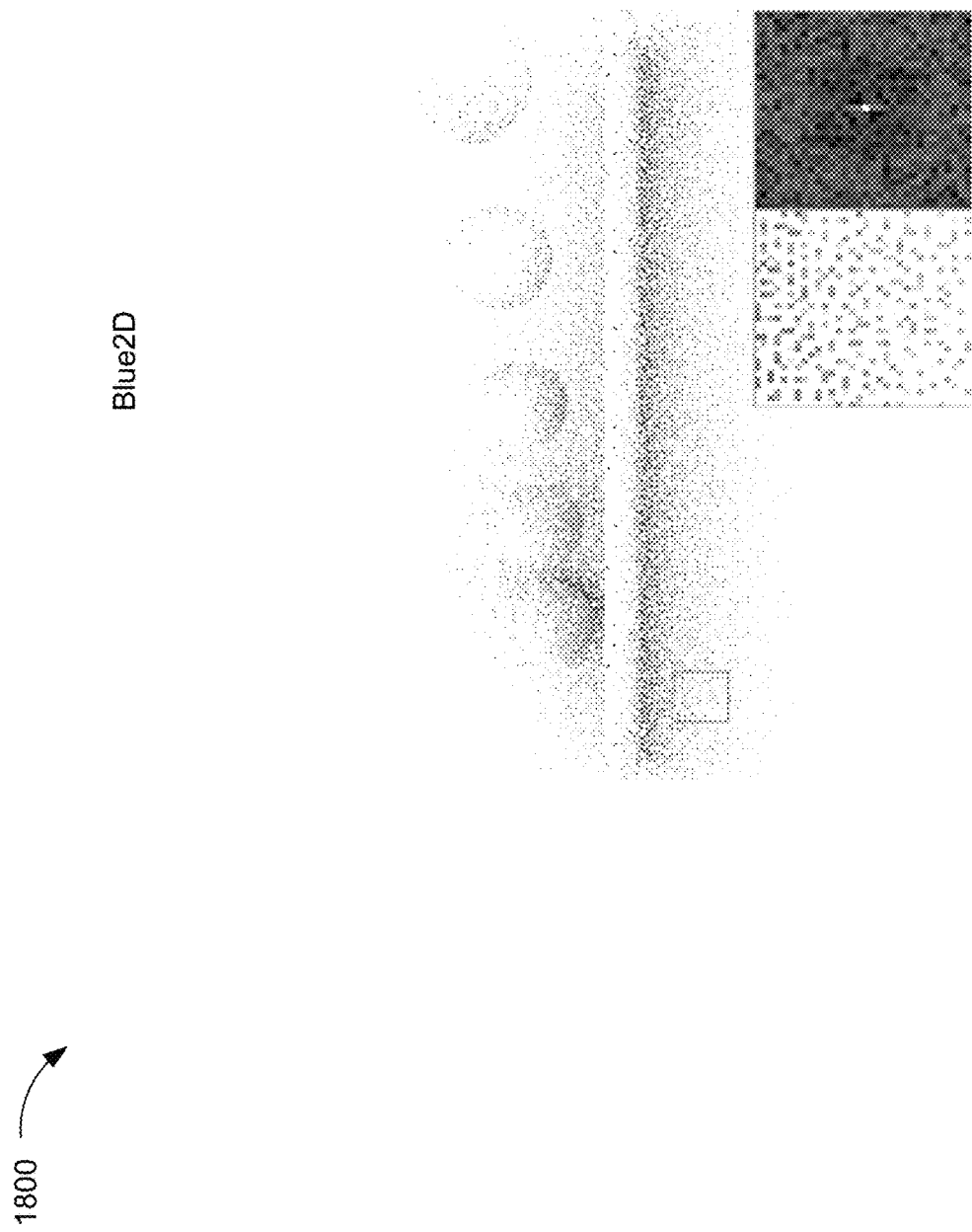
Figure 18F:
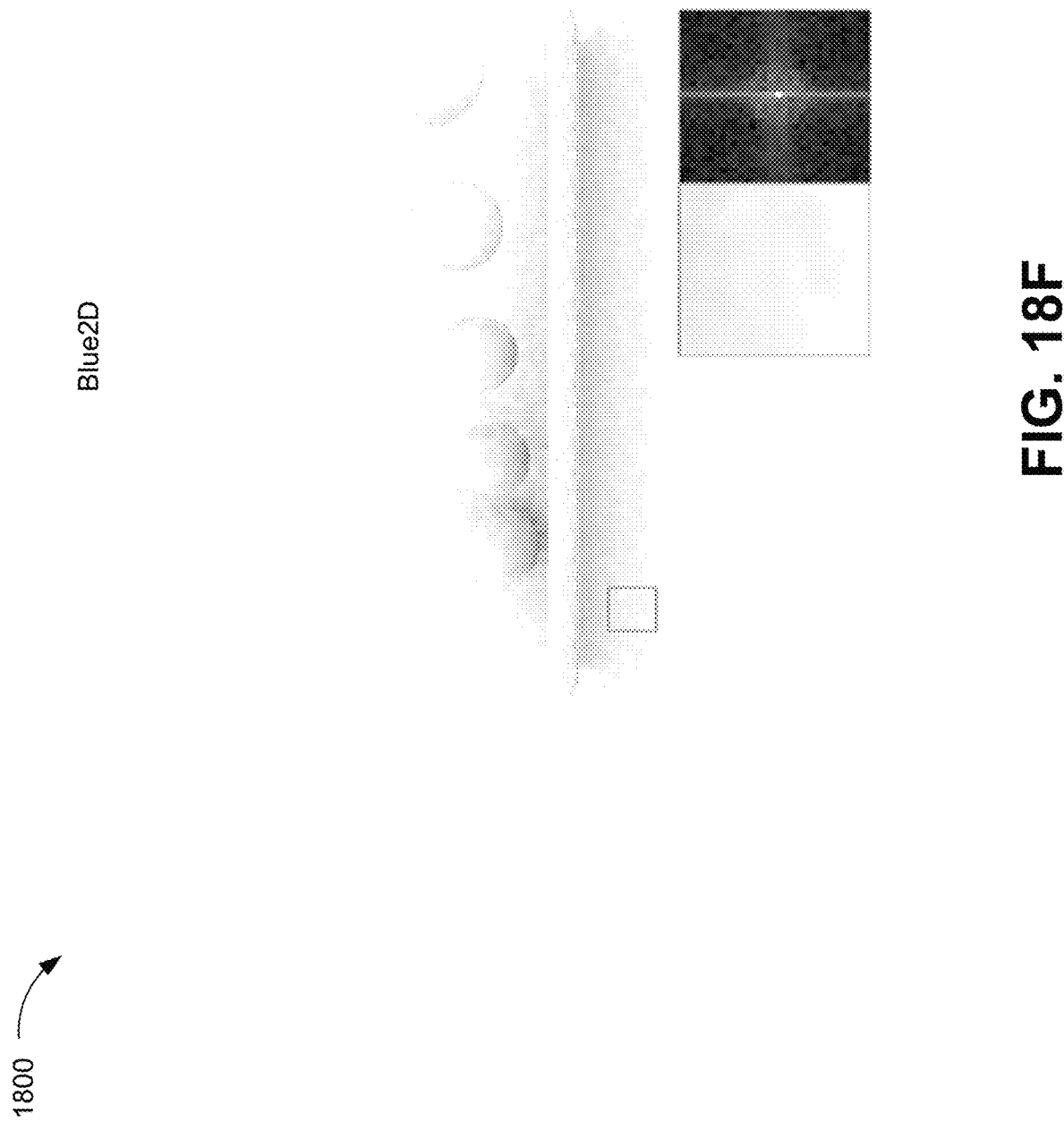
Figure 18G:
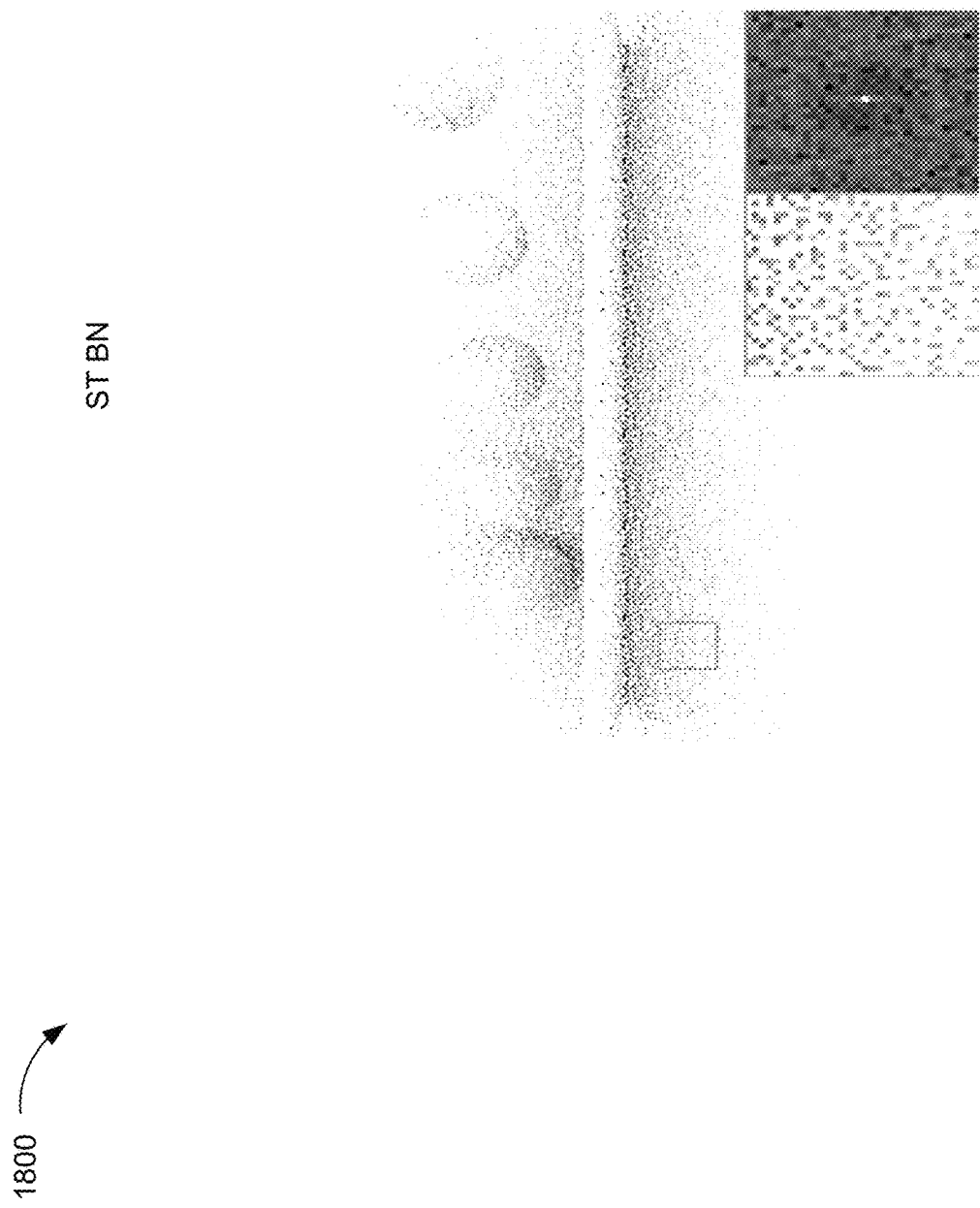
Figure 18H:
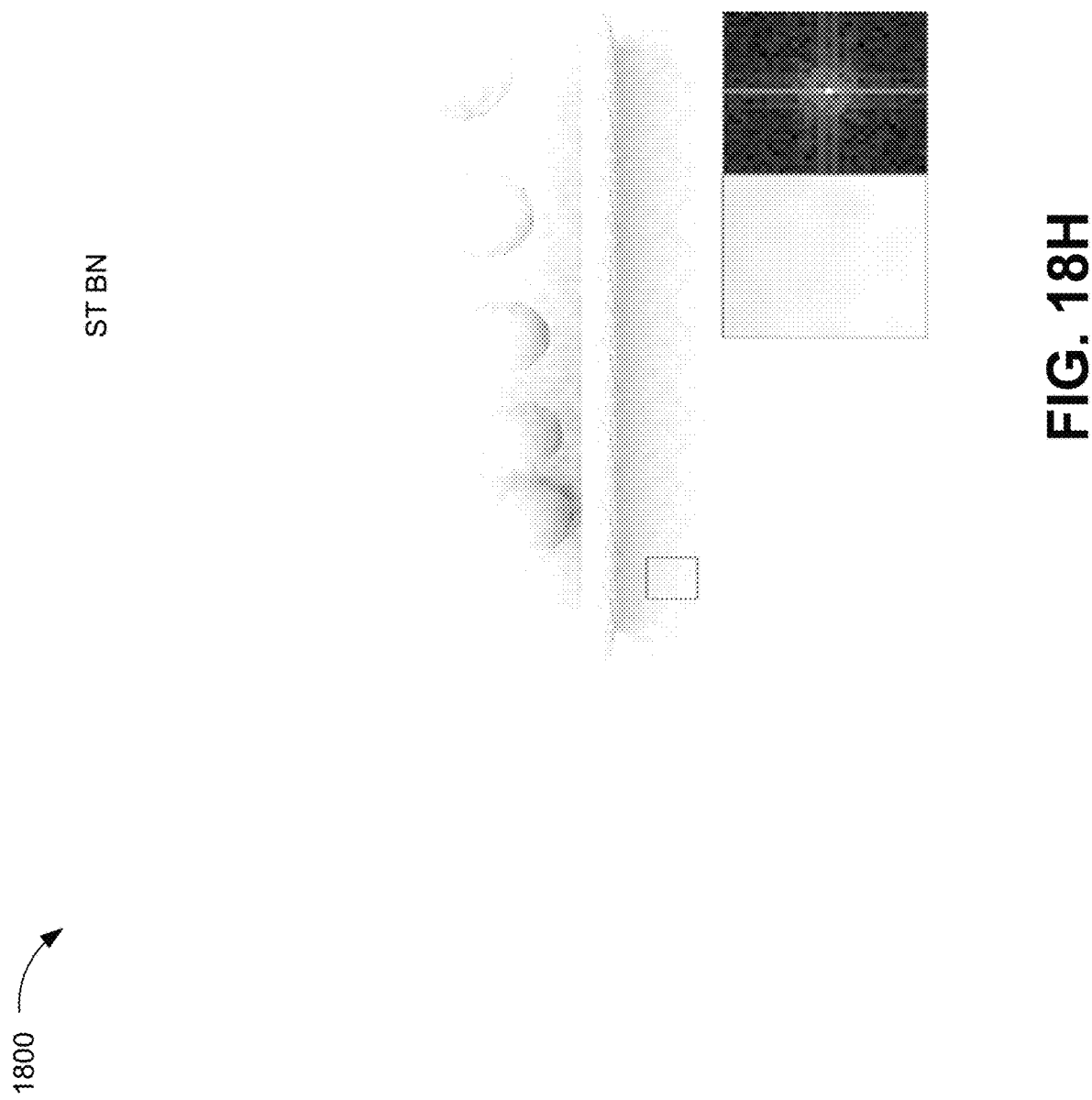

FIGS. 17A, 17B, and 17C illustrate graphs of ray marching fog convergence rates with various types of noise, according to at least one embodiment. In an embodiment, only 4 steps of ray marching are done per pixel.

5.5. Raytraced Ambient Occlusion (AO)

In an embodiment, ray traced AO is another algorithm that can be used. In an embodiment, AO uses 2D vectors per pixel to take each AO sample. In the techniques described herein, an algorithm generates blue noise masks with scalar values per entry, and not per vector. In one or more embodiments, multiple independent streams of scalar values may be derived from a single blue noise mask by having roughly maximally distanced read offsets per stream. Thus, in a ray traced AO algorithm, that extension may be used as an independent spatio-temporal blue noise data stream per axis. While there are other more sophisticated raytraced and rasterized AO algorithms, this is meant for giving high quality results with low sample counts, such as 1 ray traced sample per pixel (spp)—or lower if ran at less than full resolution.

In an embodiment, the ray traced AO algorithm runs after the primary ray hits location p, and the surface normal n is known. N random 3D unit vectors $\xi_i$ may be generated, added to the surface normal n and normalized to get N cosine weighted hemisphere samples $v_i$ where the hemisphere is oriented towards the surface normal n.

$$v_i = \frac{n + \xi_i}{\|n + \xi_i\|}$$

In an embodiment, each $v_i$ is used as a direction to shoot a ray from position p to get a hit distance d. Because AO is a local shadowing phenomenon, the hit length may be limited to a scene dependent maximum of d_max. An AO shading value a_i for this ray may be calculated as a percentage of how far the ray traveled compared to the maximum distance due to closer hits causing more occlusion and thus shadowing. This also allows more information per sample than a binary hit or miss result, leading to lower magnitude noise.

$$a_i = \frac{d}{d_{max}}$$

The AO shading values a_i may then be averaged to give a combined AO shading value of a, which can be used as a shadowing term in lighting equations.

$$a = \frac{1}{N}\sum_{i \in N} a_i$$

If using independent random numbers to generate each component of $\xi\_i$, the result will be white noise error. If using 2D blue noise, the noise cleans up spatially, and if using spatio-temporal blue noise, the AO data gains desirable sampling properties over time. Rendered results can be seen in FIGS. 18A, 18B, 18C, 18D, 18E, 18F, 18G, and 18H, and convergence graphs can be seen in FIGS. 19A, 19B, and 19C.

5.6. Spatio Temporal Blue Noise in Heitz Belcour Technique

Figure 21:
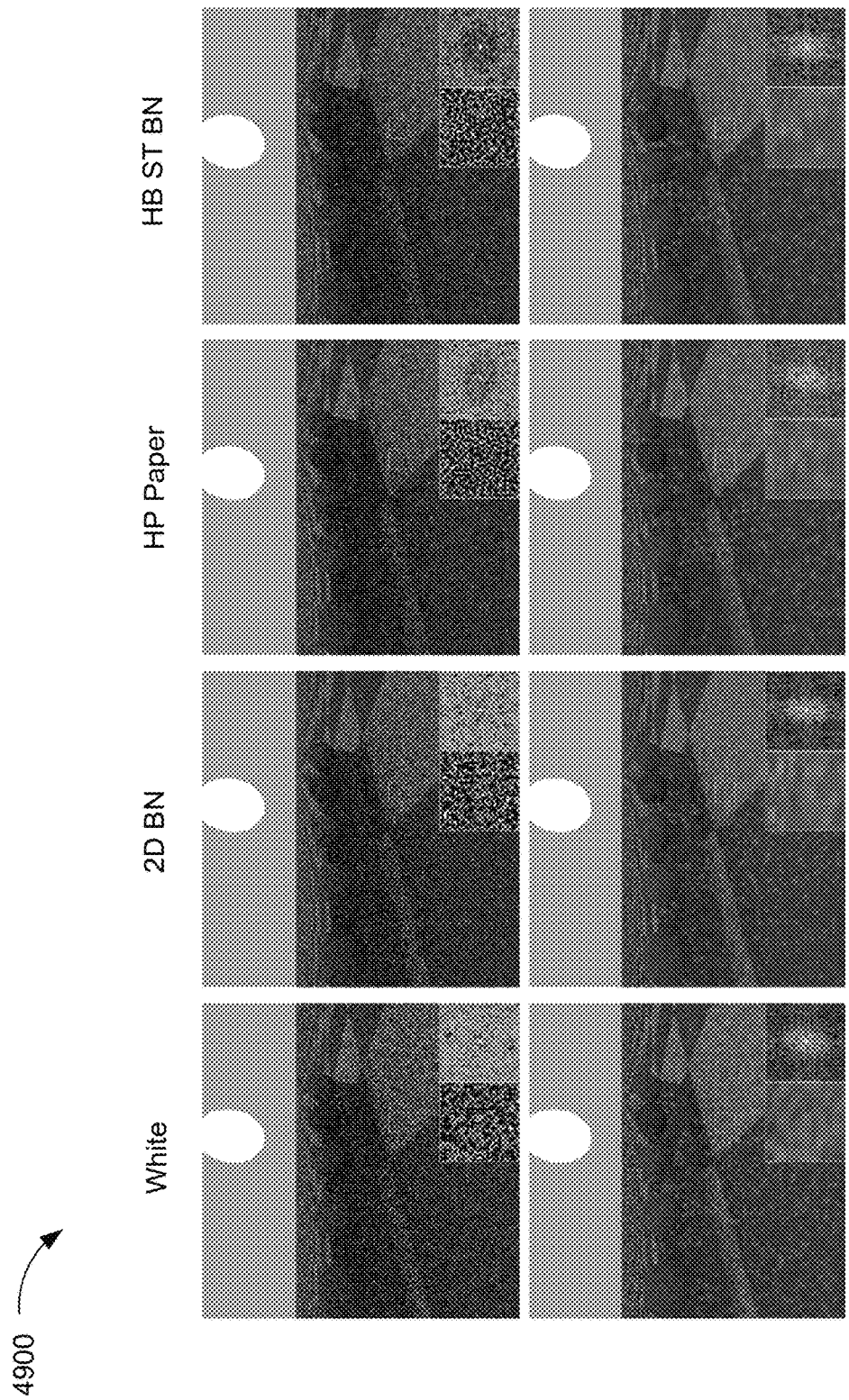
FIG. 21 illustrates images using a Sobol sequence offset, according to at least one embodiment.
Figure 23A:
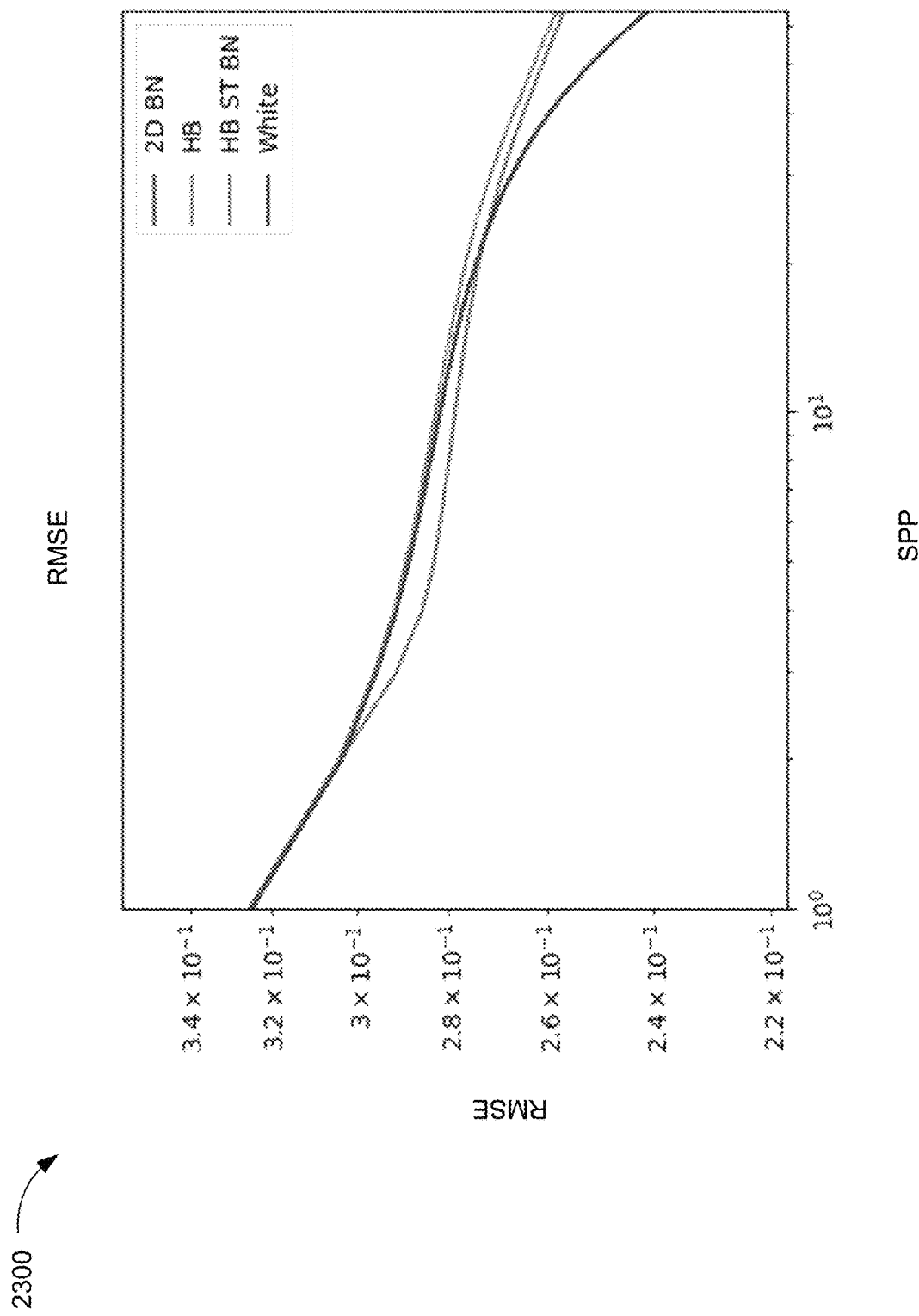
FIGS. 23A, 23B, and 23C illustrate graphs of convergence in Monte Carlo Integration, Leaky Integration, and Leaky Integration converged, according to at least one embodiment.
Figure 23B:
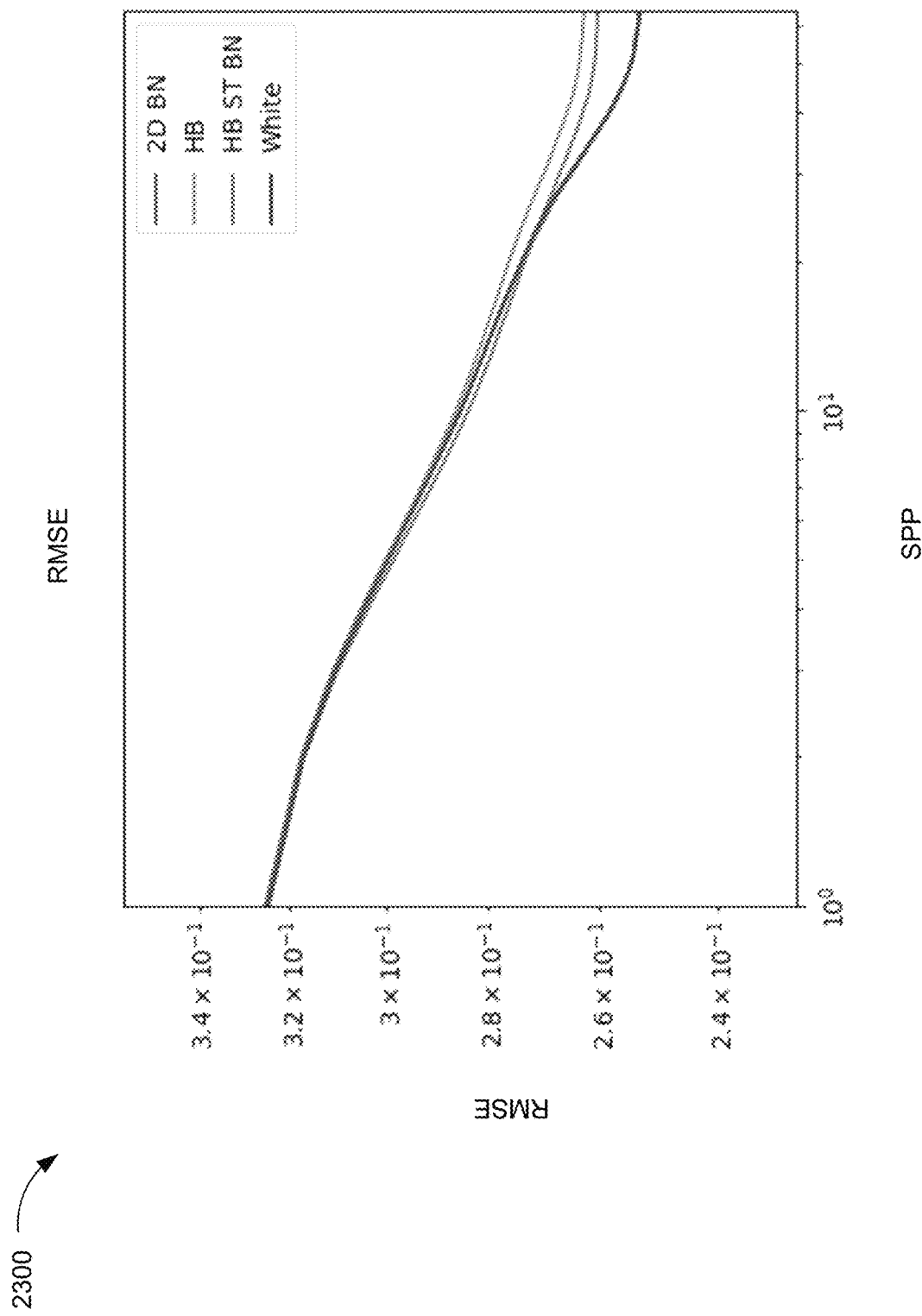
Figure 23C:
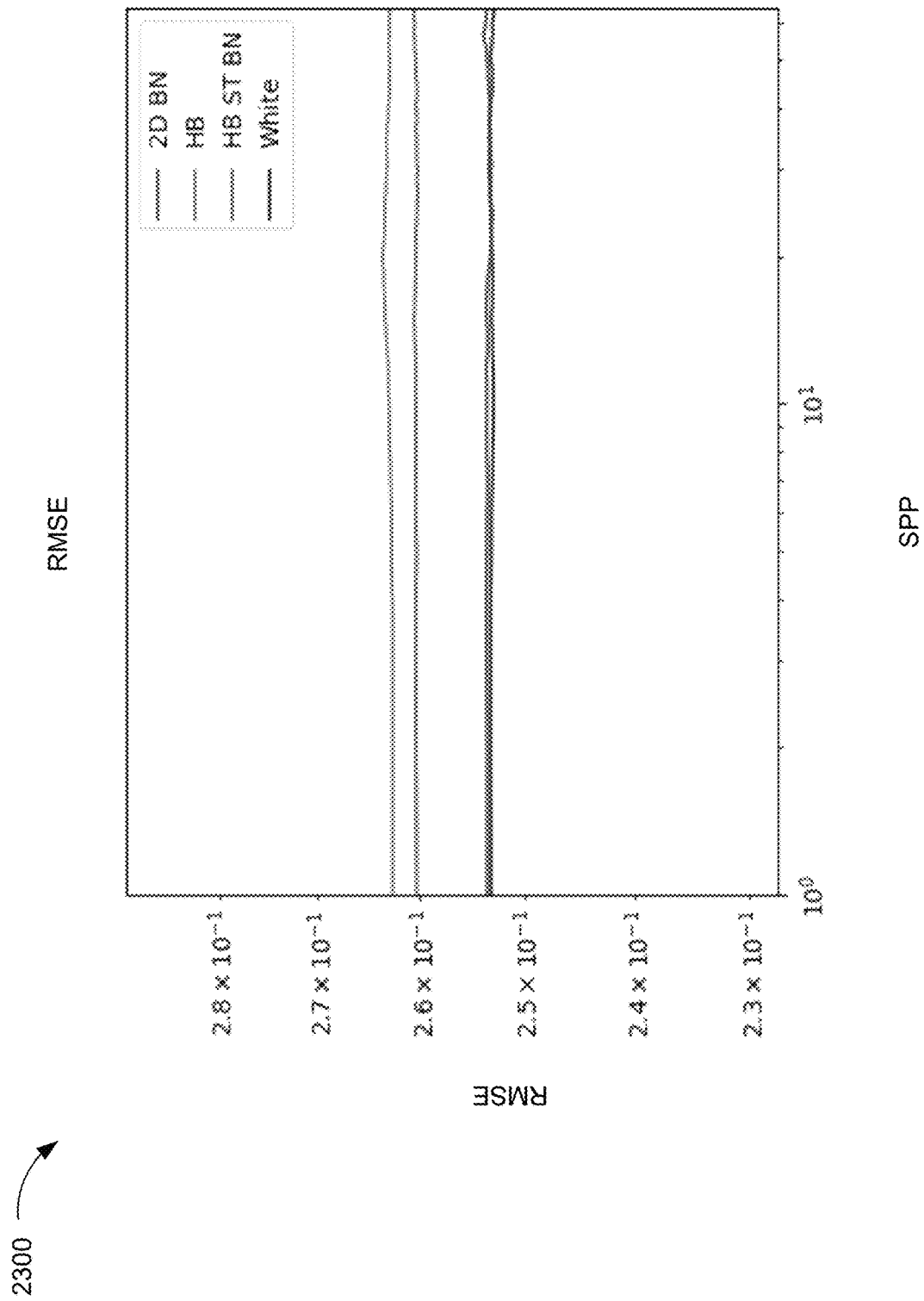

In an embodiment, blue noise masks tend to show benefits when used in algorithms that use scalars as shown with stippling, dithering, and ray marching participating media. They also show benefit when being used in simpler graphics algorithms that want vectors instead of scalars, such as ray traced AO, by using multiple independent streams of noise for each axis. In previous methods, blue noise masks tend to stop working as well when the sample count or dimensionality grow (e.g., path tracing). However, in some embodiments, techniques described herein may be used as an extension to algorithms (e.g., Heitz & Belcour technique) for generating blue noise masks in path tracing. For example, in the Heitz & Belcour technique, there may be a seed value per pixel, generated through any means desired, that is used to render the result for each pixel using whatever algorithms and sampling sequences desired. After this rendering is completed, the Heitz & Belcour technique may break the screen up into small sections on the order of 4×4 and sort the pixels in each section from darkest to brightest. In addition, the Heitz & Belcour technique may also break a blue noise texture tiled across the screen into the same small sections and sort them as well. These two sorted lists are used as a mapping for how to swap the seeds used for the previous frame's render such that if rendering again, the result will be closer to blue noise. The R2 low discrepancy sequence may be used to offset the reads into this blue noise texture every frame so that each frame has roughly uncorrelated 2D blue noise values from last frame. This gives a result of having blue noise over space, but provides white noise over time. By incorporating the techniques described herein, Heitz & Belcour technique can be made to give spatio-temporal blue noise results, thus retaining the qualities of blue noise over space, while gaining the desirable sampling properties over time. The rendered results are shown in FIG. 21 and the convergence graphs are shown in FIGS. 23A, 23B, and 23C. Due to this, virtually any target error pattern should be achievable, such as wanting to get interleaved gradient noise which is better for use under temporal anti-aliasing.

FIGS. 18A, 18B, 18C, 18D, 18E, 18F, 18G, and 18H illustrate using two independent streams of noise to generate x and y components for a 2D vector mapped to a cosine weighted hemisphere for a single AO sample per pixel, according to at least one embodiment. The top images are a raw frame, and bottom images are depth aware Gaussian blurred with a sigma of 2.

Figure 19A:
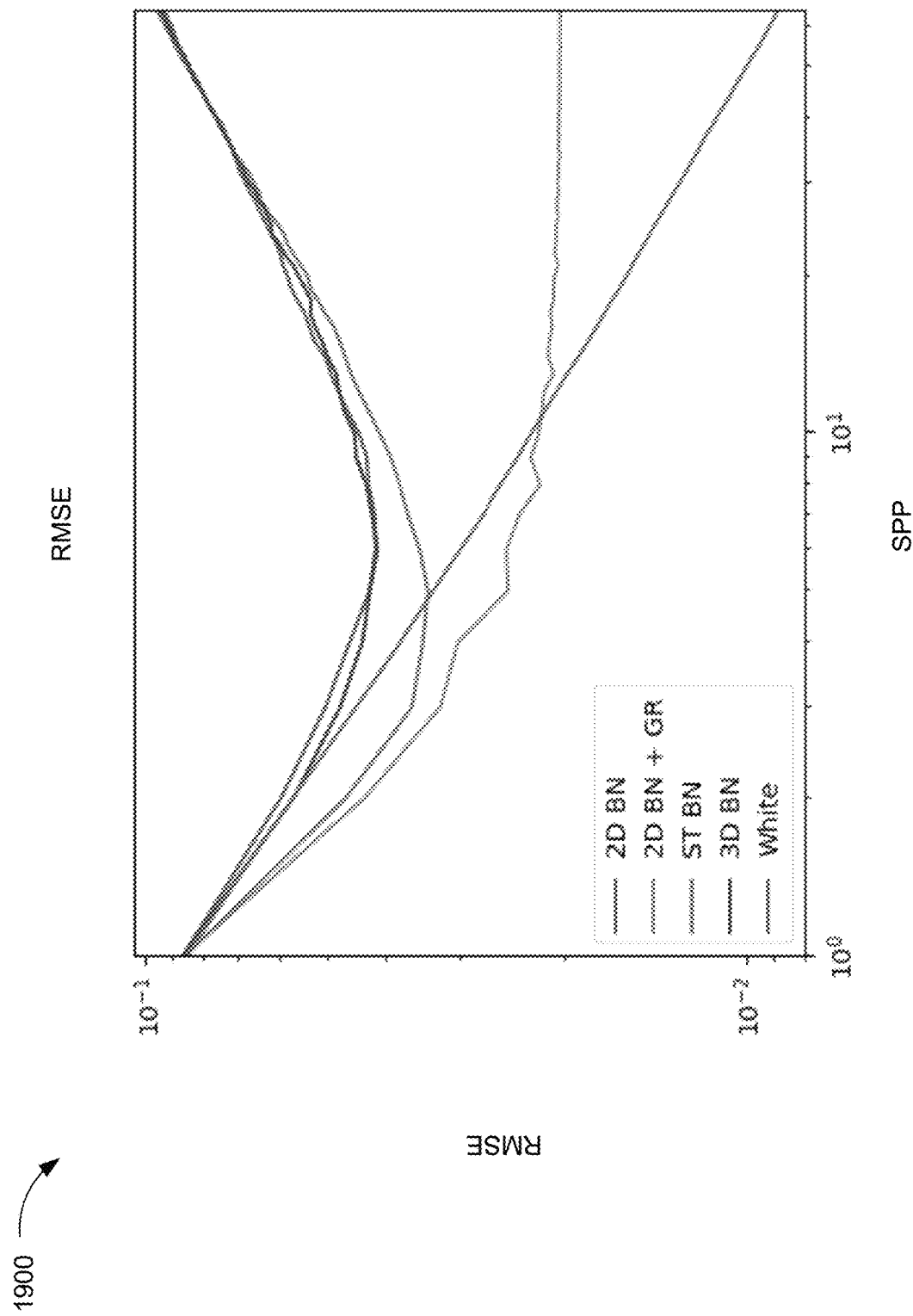
FIGS. 19A, 19B, and 19C illustrate how AO convergence relates with various types of noise, according to at least one embodiment.
Figure 19B:
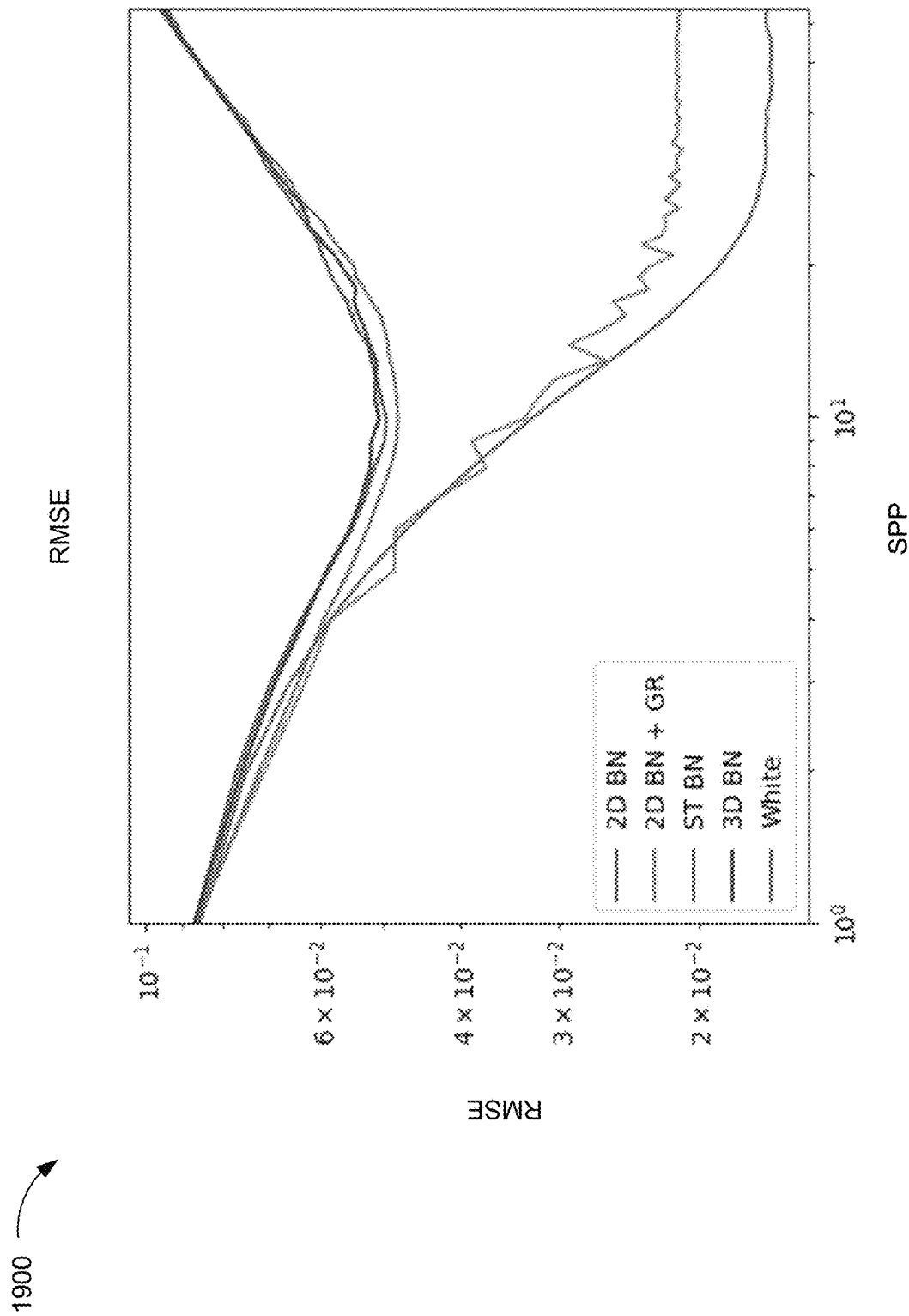
Figure 19C:
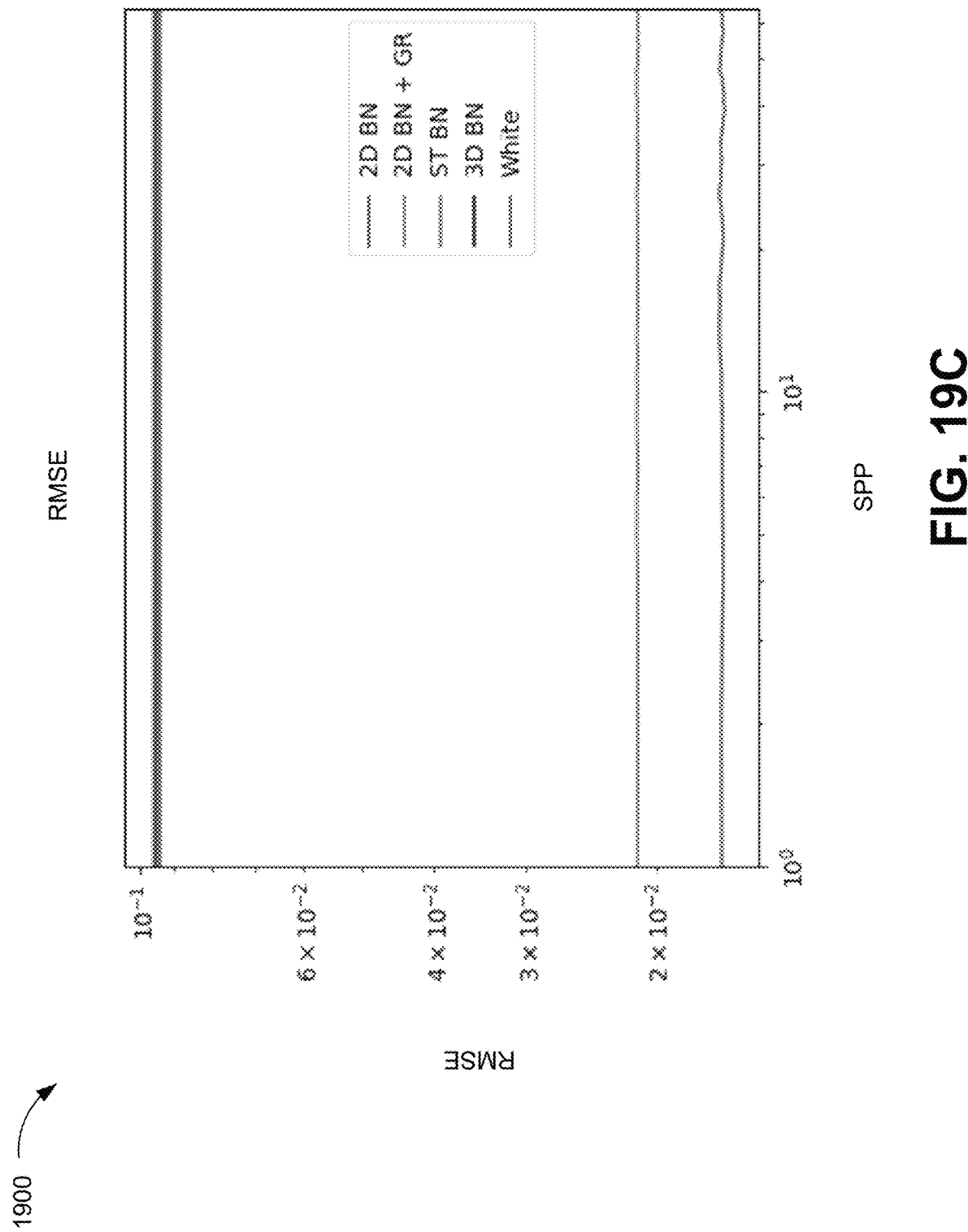

FIGS. 19A, 19B, and 19C how Ambient Occlusion (AO) convergence relates with various types of noise, according to at least one embodiment.

Figure 20:
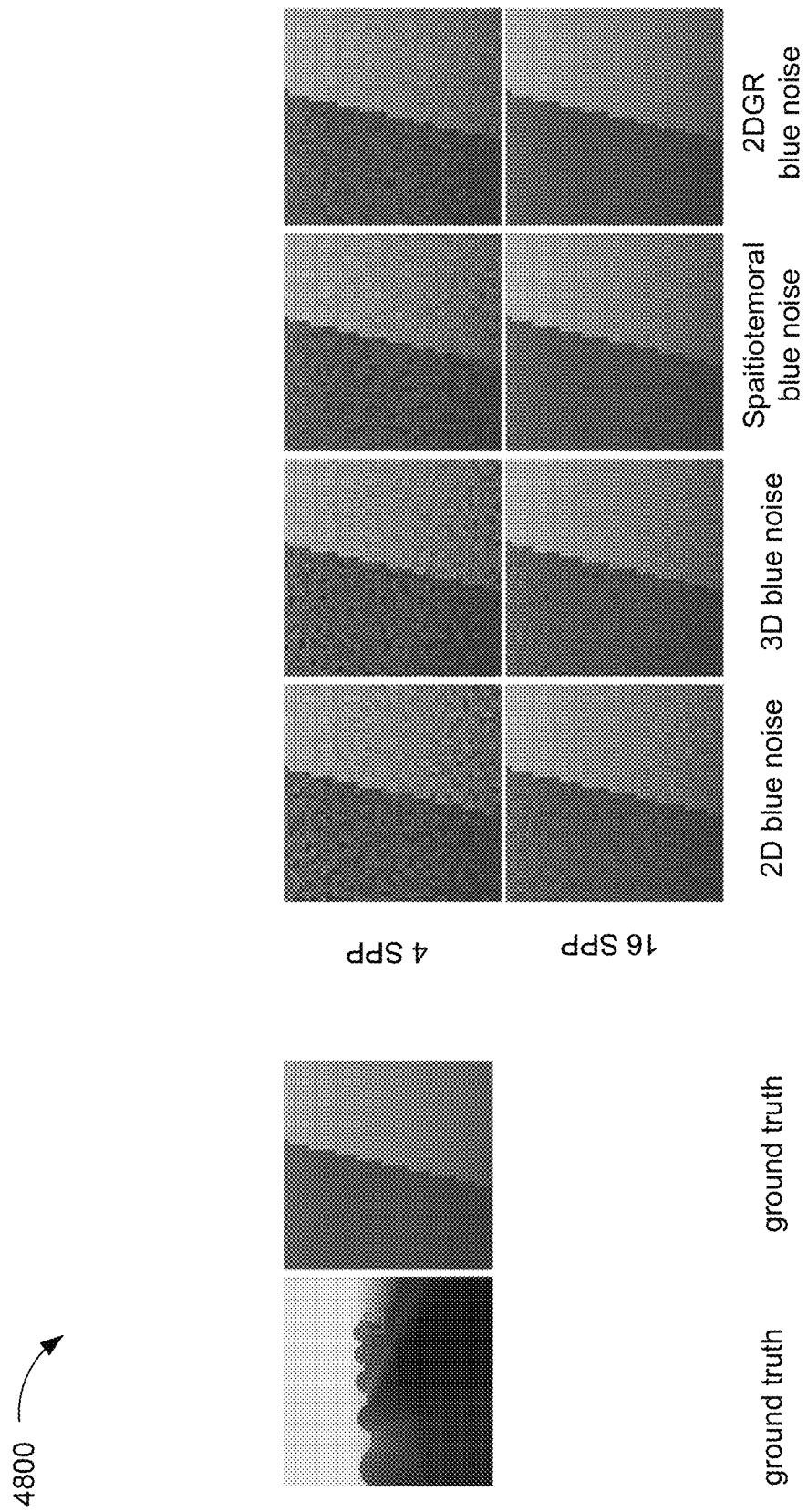
FIG. 20 illustrates one or more images of using a 2D blue noise mask, 3D blue noise mask, spatio-temporal blue noise mask, and 2DGR blue noise mask, according to at least one embodiment.

FIG. 20 illustrates one or more images of using a 2D blue noise mask, 3D blue noise mask, spatio-temporal blue noise mask, and 2DGR blue noise mask, according to at least one embodiment. In an embodiment, images from FIG. 20 show a rendered result using Monte Carlo integration with four samples per pixel.

FIG. 21 illustrates images using a Sobol sequence offset, according to at least one embodiment. In an embodiment, Sobol sequence offset by a vec2 from each mg type each frame. In an embodiment, top images are a raw frame, bottom images are depth aware Gaussian blurred with a sigma of 2.

Figure 22:
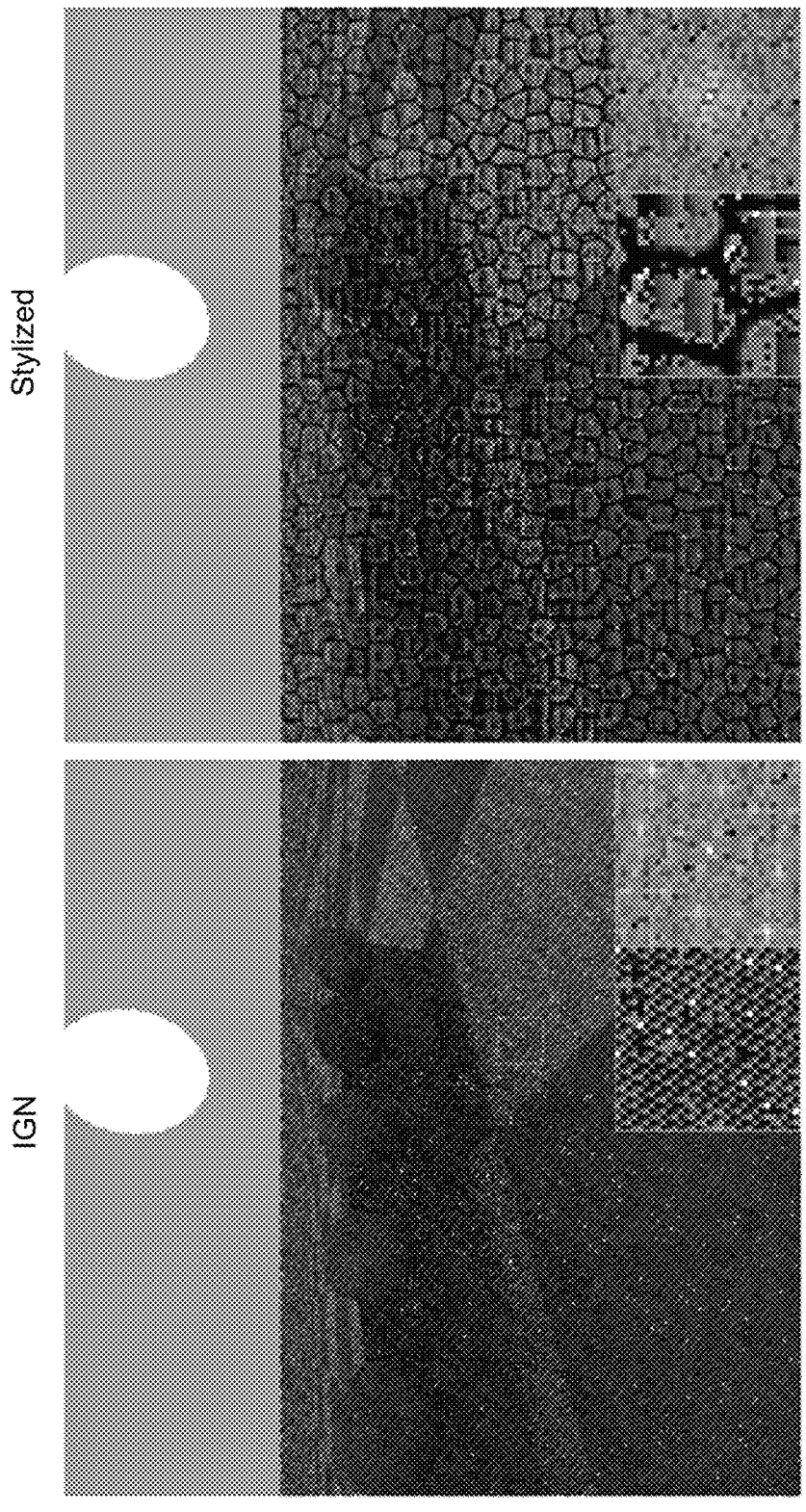
FIG. 22 illustrates a Heitz & Belcour technique using interleaved gradient noise and a stylized grey scale image for noise pattern targets, according to at least one embodiment.

FIG. 22 illustrates a Heitz & Belcour technique using interleaved gradient noise and a stylized grey scale image for noise pattern targets, according to at least one embodiment. These images were rendered using standard path tracing rendering code, but the seeds used to randomize each pixel were reordered to give a rendered result like the target images.

FIGS. 23A, 23B, and 23C graphs of convergence in Monte Carlo Integration, Leaky Integration, and Leaky Integration converged, according to at least one embodiment.

5.7. Spatio-Temporal Point Sets

In an embodiment, a void and cluster algorithm is modified to generate spatio-temporal blue noise masks. In an embodiment, spatio-temporal blue noise has the property to threshold values to some percentage, so that the corresponding percentage of the pixels will survive, and the pixels that survive will be distributed in a blue noise sample pattern within the constraints of the dimensional groups. More specifically, if thresholding all pixels in a spatio-temporal 2D×1D blue noise mask to 10%, each 2D XY slice of the mask may show roughly 10% of the pixels surviving, and they will be blue noise distributed (Randomized but roughly evenly spaced). Furthermore, looking at each pixel in isolation on the 1D Z axis, which makes a 1D image, roughly 10% of the pixels will have survived there as well, and they will also be blue noise distributed. These properties may extend to whatever dimensionality and grouping of subdimensions the mask was generated with.

An example usage case of this property could be in the situation where an importance map for some sparse raytracing may be done into a scene. A rough number of how many rays is needed may be defined to shoot out per frame, and use that per pixel, along with a per pixel random number to decide if a pixel should have a ray shot out for it or not, each frame. When using random numbers that are white over space, and over time, clumping and voids occur, and thus is uneven and redundant sampling in both space and time. When using a flip book of independent 2D blue noise textures, the result improves spatially, but there is still redundant sampling over time. When using a spatio-temporal blue noise mask, both time and space are more evenly sampled as the noise pattern may be the desirable blue noise pattern in screen space, but also more unique pixels will have a ray shot out for them, for the same number of frames, thus maximizing unique information received per ray, per frame. A graph of unique pixel counts over time can be seen in FIG. 27 and this can also be seen visually in FIG. 26.

Figure 24:
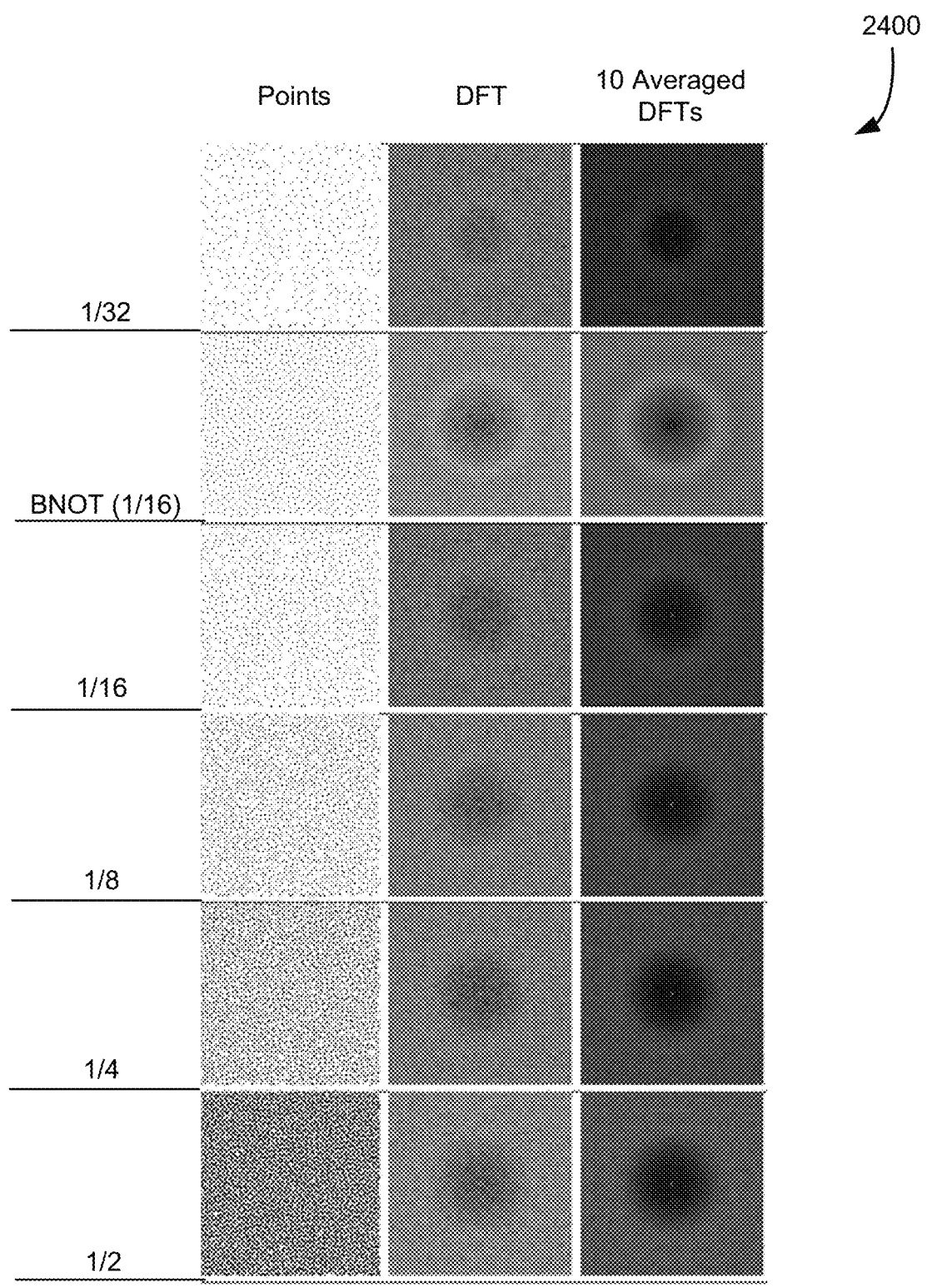
FIG. 24 shows how threshold masks are able to make point sets of any density, according to at least one embodiment.

FIG. 24 shows how threshold masks are able to make point sets of any density, according to at least one embodiment. That is, in FIG. 24, 1024 Blue Noise through Optimal Transport (BNOT) samples are compared with a 128×128×10 2D×1D blue noise mask threshold to different levels. BNOT is much higher quality over space but has a fixed density and gives no treatment to the time axis, necessitating independent sample sets to be white noise over time.

Figure 25:
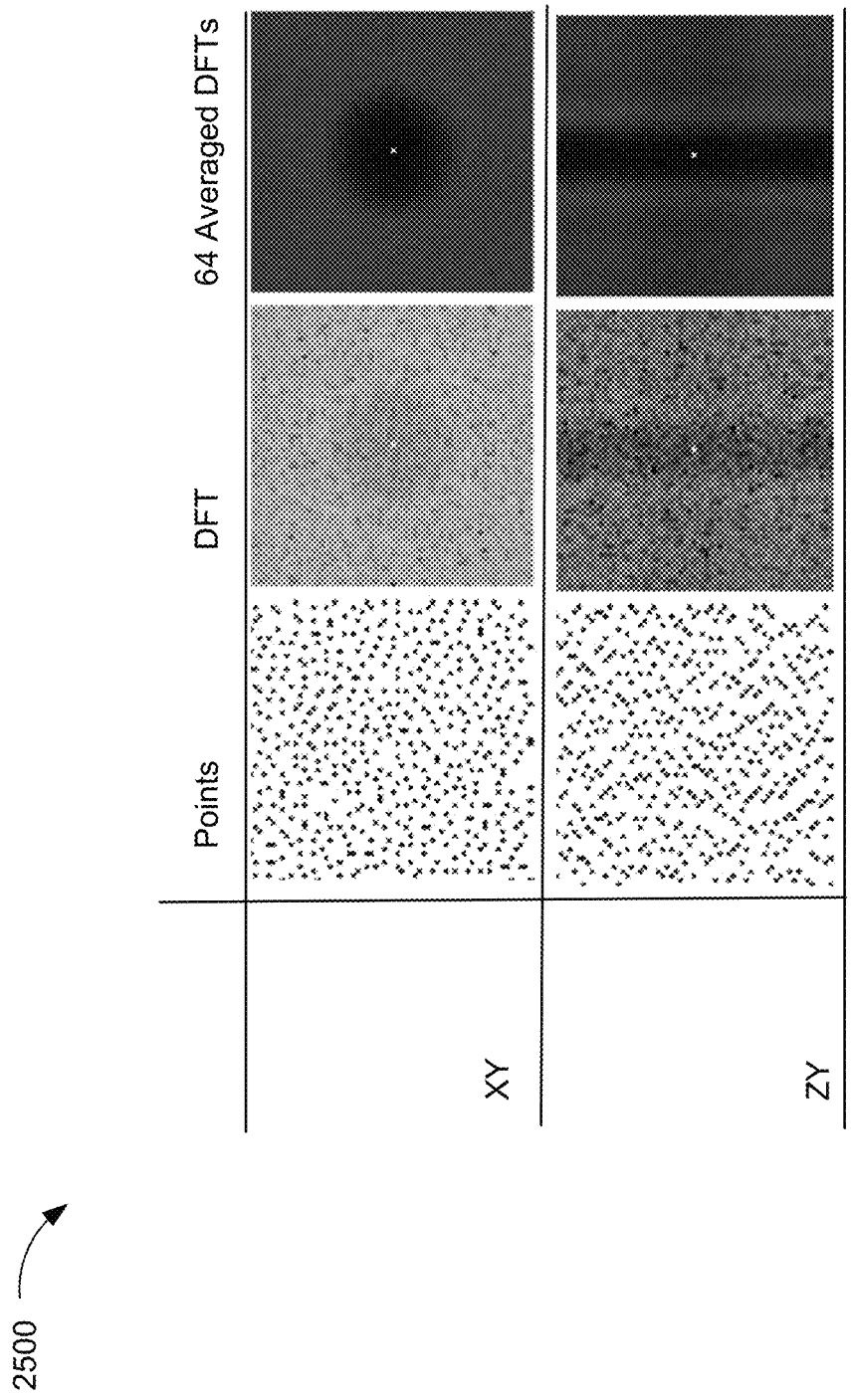
FIG. 25 shows how the threshold point sets keep their desired frequency spectra over axis groups, according to at least one embodiment.

FIG. 25 shows how the threshold point sets keep their desired frequency spectra over axis groups, according to at least one embodiment. The threshold pixels being blue noise sample points is a property of blue noise masks made with the void and cluster algorithm, but is not true in general for blue noise masks. That is, FIG. 25 illustrates DFT of 2D projections of 64×64×64 2D×1D blue noise masks with a $\frac{1}{8}^{th}$ threshold to show how the threshold point sets keep their blue noise spectrum that the masks have.

In an embodiment, modifications to the void and cluster algorithm are described herein where blue noise masks of any dimension which have blue noise properties confined to subspace axis groups are generated. In an embodiment, these blue noise masks can be useful for a variety of low sample count rendering algorithms with the goal of getting desirable blue noise error patterns while also converging faster than other methods which use blue noise masks. In an embodiment, these blue noise masks can have a threshold to take these properties into the realm of blue noise sampling.

In some instances, a limitation is that these blue noise masks have scalar values per entry as opposed to vector values. Many rendering techniques require stochastic vector values to operate, and while streams of scalar values show benefit in simpler algorithms like ambient occlusion or sampling area lights, they completely fall apart for more complex algorithms such as path tracing. However, in path tracing, the techniques described herein can be used with the Heitz and Belcour technique. In some instances, the blue noise masks could be extended to include vectors, to get better results more directly, without the issues associated with approximately inverting pixel rendering.

Figure 26:
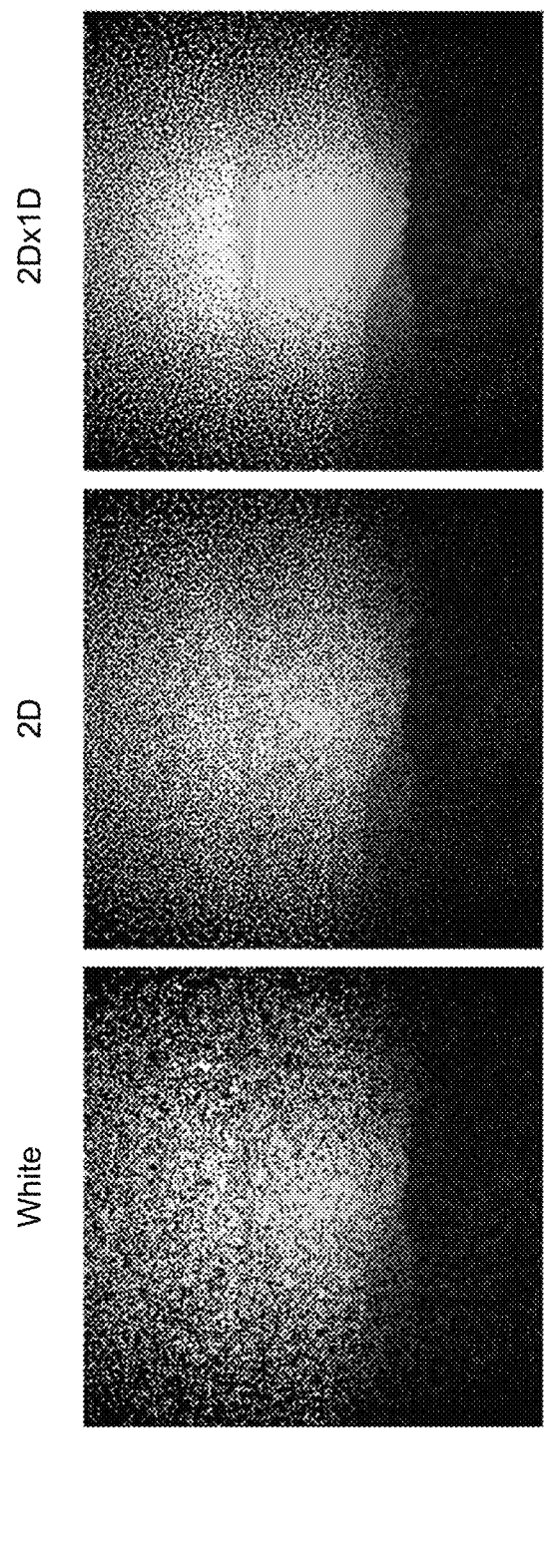
FIG. 26 shows five accumulated frames of pixels sampled from an image using a non-uniform importance map to make pixels towards the center be more likely to be sampled, according to at least one embodiment.

FIG. 26 shows five accumulated frames of pixels sampled from an image using a non-uniform importance map to make pixels towards the center be more likely to be sampled, according to at least one embodiment. While both 2D blue noise and spatio-temporal blue noise have desirable sampling patterns spatially, spatio-temporal blue noise samples more unique pixels in shorter numbers of frames.

As importance sampling is a topic which is largely at odds with using specific sample patterns, blue noise itself happens to keep desirable properties more often when put through warping functions. In an embodiment, these blue noise masks can be extended to not just have desired projections per axis group, but also allow them to have specific distributions per axis group. This enables blue noise to be generated in post-warp space, meaning the blue noise would not be damaged in any way and could have importance sampling PDFs baked into it. While some PDFs may be very specific for use and so perhaps not be as desirable to bake in all the time—such as a HDRI skybox image—other PDFs would get much more re-use, such as GGX for specular reflections.

Figure 27:
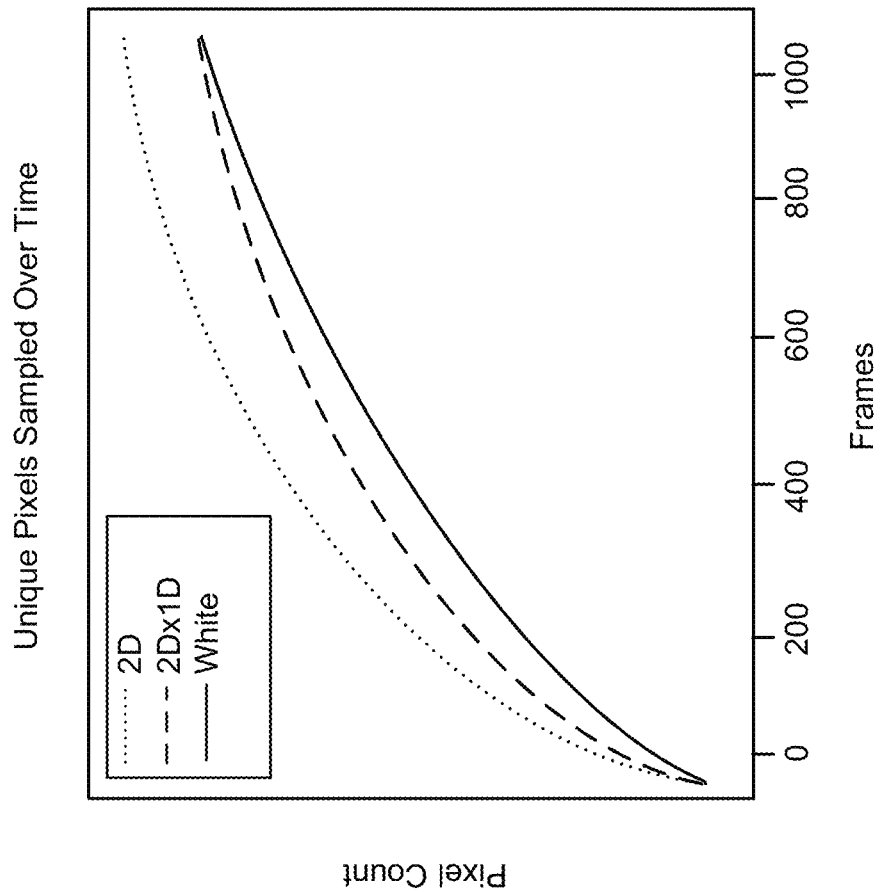
FIG. 27 illustrates that while white noise can have redundant sampled pixels each frame, and over time, spatio blue noise removes redundant pixels over space and 2D×1D spatio-temporal blue noise removes them over time as well, according to at least one embodiment.

FIG. 27 illustrates that while white noise can have redundant sampled pixels each frame, and over time, spatio blue noise removes redundant pixels over space and 2D×1D spatio-temporal blue noise removes them over time as well, according to at least one embodiment.

Although the techniques described herein refer to blue noise masks, other colors (e.g., red noise) of noise may also be applicable to improve real-time image rendering and enhancement.

Inference and Training Logic

Figure 28A:
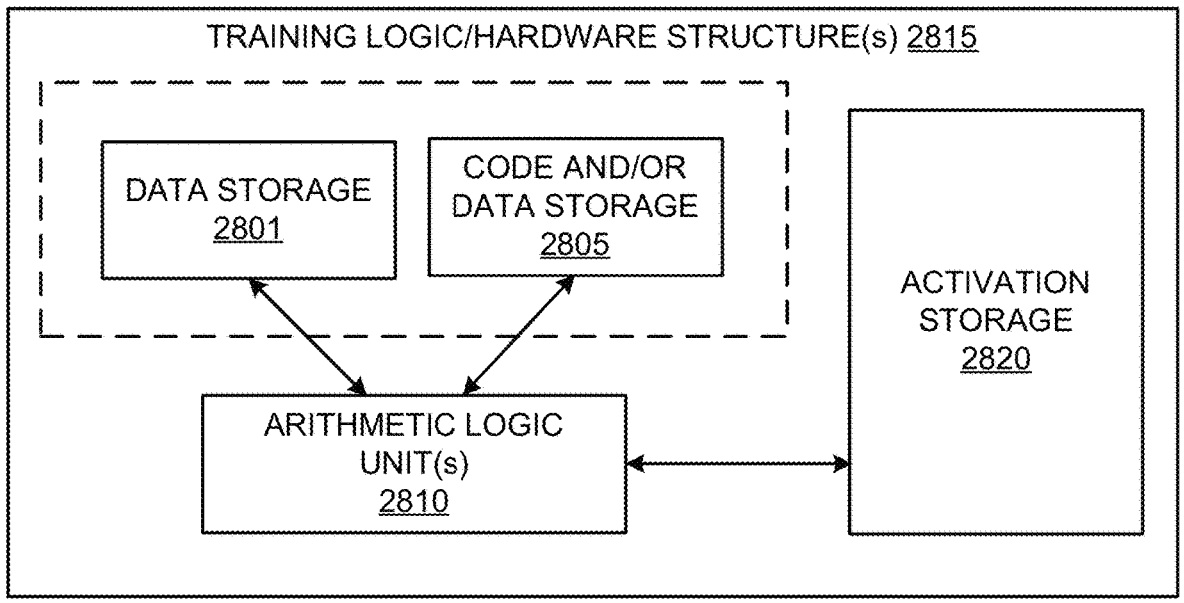
FIG. 28A illustrates inference and/or training logic, according to at least one embodiment.

FIG. 28A illustrates inference and/or training logic 2815 used to perform inferencing and/or training operations associated with one or more embodiments. Details regarding inference and/or training logic 2815 are provided below in conjunction with FIGS. 28A and/or 28B. In at least one embodiment, inference and/or training logic 2815 can be implemented with process 100 or process 106 (see FIG. 1B), e.g., to render an image using DLSS.

In at least one embodiment, inference and/or training logic 2815 may include, without limitation, code and/or data storage 2801 to store forward and/or output weight and/or input/output data, and/or other parameters to configure neurons or layers of a neural network trained and/or used for inferencing in aspects of one or more embodiments. In at least one embodiment, training logic 2815 may include, or be coupled to code and/or data storage 2801 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which such code corresponds. In at least one embodiment, code and/or data storage 2801 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 2801 may be included with other on-chip or off-chip data storage, including a processor's L1, L2, or L3 cache or system memory.

In at least one embodiment, any portion of code and/or data storage 2801 may be internal or external to one or more processors or other hardware logic devices or circuits. In at least one embodiment, code and/or code and/or data storage 2801 may be cache memory, dynamic randomly addressable memory ("DRAM"), static randomly addressable memory ("SRAM"), non-volatile memory (e.g., flash memory), or other storage. In at least one embodiment, a choice of whether code and/or code and/or data storage 2801 is internal or external to a processor, for example, or comprising DRAM, SRAM, flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 2815 may include, without limitation, a code and/or data storage 2805 to store backward and/or output weight and/or input/output data corresponding to neurons or layers of a neural network trained and/or used for inferencing in aspects of one or more embodiments. In at least one embodiment, code and/or data storage 2805 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 2815 may include, or be coupled to code and/or data storage 2805 to store graph code or other software to control timing and/or order, in which weight and/or other parameter information is to be loaded to configure, logic, including integer and/or floating point units (collectively, arithmetic logic units (ALUs)).

In at least one embodiment, code, such as graph code, causes the loading of weight or other parameter information into processor ALUs based on an architecture of a neural network to which such code corresponds. In at least one embodiment, any portion of code and/or data storage 2805 may be included with other on-chip or off-chip data storage, including a processor's L1, L2, or L3 cache or system memory. In at least one embodiment, any portion of code and/or data storage 2805 may be internal or external to one or more processors or other hardware logic devices or circuits. In at least one embodiment, code and/or data storage 2805 may be cache memory, DRAM, SRAM, non-volatile memory (e.g., flash memory), or other storage. In at least one embodiment, a choice of whether code and/or data storage 2805 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 2801 and code and/or data storage 2805 may be separate storage structures. In at least one embodiment, code and/or data storage 2801 and code and/or data storage 2805 may be a combined storage structure. In at least one embodiment, code and/or data storage 2801 and code and/or data storage 2805 may be partially combined and partially separate. In at least one embodiment, any portion of code and/or data storage 2801 and code and/or data storage 2805 may be included with other on-chip or off-chip data storage, including a processor's L1, L2, or L3 cache or system memory.

In at least one embodiment, inference and/or training logic 2815 may include, without limitation, one or more arithmetic logic unit(s) ("ALU(s)") 2810, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 2820 that are functions of input/output and/or weight parameter data stored in code and/or data storage 2801 and/or code and/or data storage 2805. In at least one embodiment, activations stored in activation storage 2820 are generated according to linear algebraic and or matrix-based mathematics performed by ALU(s) 2810 in response to performing instructions or other code, wherein weight values stored in code and/or data storage 2805 and/or data storage 2801 are used as operands along with other values, such as bias values, gradient information, momentum values, or other parameters or hyperparameters, any or all of which may be stored in code and/or data storage 2805 or code and/or data storage 2801 or another storage on or off-chip.

In at least one embodiment, ALU(s) 2810 are included within one or more processors or other hardware logic devices or circuits, whereas in another embodiment, ALU(s) 2810 may be external to a processor or other hardware logic device or circuit that uses them (e.g., a co-processor). In at least one embodiment, ALUs 2810 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 2801, code and/or data storage 2805, and activation storage 2820 may share a processor or other hardware logic device or circuit, whereas in another embodiment, they may be in different processors or other hardware logic devices or circuits, or some combination of same and different processors or other hardware logic devices or circuits. In at least one embodiment, any portion of activation storage 2820 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 2820 may be cache memory, DRAM, SRAM, non-volatile memory (e.g., flash memory), or other storage. In at least one embodiment, activation storage 2820 may be completely or partially within or external to one or more processors or other logical circuits. In at least one embodiment, a choice of whether activation storage 2820 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 2815 illustrated in FIG. 28A may be used in conjunction with an application-specific integrated circuit ("ASIC"), such as a TensorFlow® Processing Unit from Google, an inference processing unit (IPU) from Graphcore™, or a Nervana® (e.g., "Lake Crest") processor from Intel Corp. In at least one embodiment, inference and/or training logic 2815 illustrated in FIG. 28A may be used in conjunction with central processing unit ("CPU") hardware, graphics processing unit ("GPU") hardware or other hardware, such as field programmable gate arrays ("FPGAs").

Figure 28B:
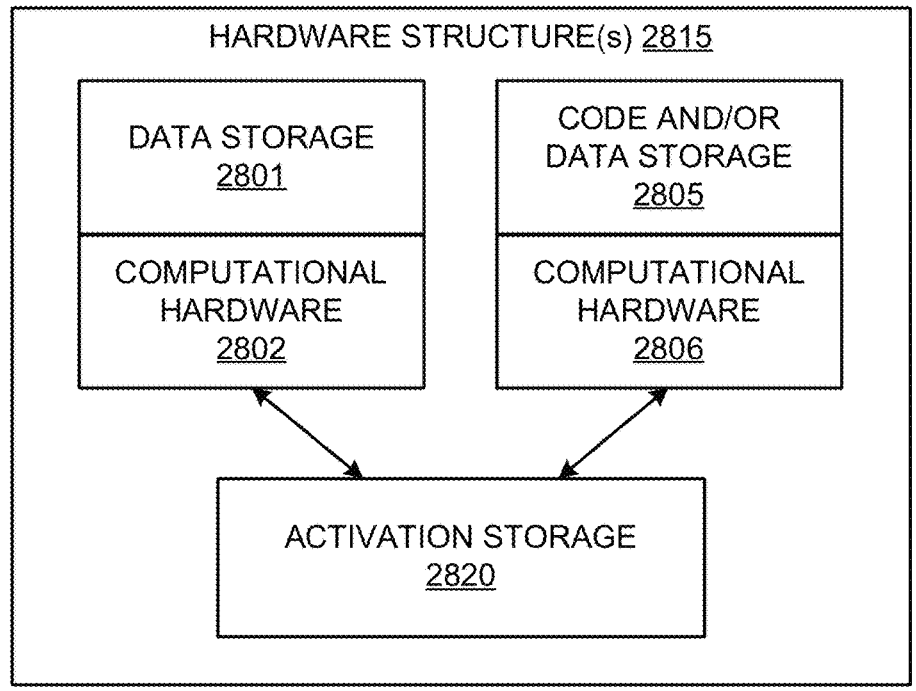
FIG. 28B illustrates inference and/or training logic, according to at least one embodiment.

FIG. 28B illustrates inference and/or training logic 2815, according to at least one embodiment. In at least one embodiment, inference and/or training logic 2815 may include, without limitation, hardware logic in which computational resources are dedicated or otherwise exclusively used in conjunction with weight values or other information corresponding to one or more layers of neurons within a neural network. In at least one embodiment, inference and/or training logic 2815 illustrated in FIG. 28B may be used in conjunction with an application-specific integrated circuit (ASIC), such as TensorFlow® Processing Unit from Google, an inference processing unit (IPU) from Graphcore™, or a Nervana® (e.g., "Lake Crest") processor from Intel Corp. In at least one embodiment, inference and/or training logic 2815 illustrated in FIG. 28B may be used in conjunction with central processing unit (CPU) hardware, graphics processing unit (GPU) hardware or other hardware, such as field programmable gate arrays (FPGAs). In at least one embodiment, inference and/or training logic 2815 includes, without limitation, code and/or data storage 2801 and code and/or data storage 2805, which may be used to store code (e.g., graph code), weight values and/or other information, including bias values, gradient information, momentum values, and/or other parameter or hyperparameter information. In at least one embodiment illustrated in FIG. 28B, each of code and/or data storage 2801 and code and/or data storage 2805 is associated with a dedicated computational resource, such as computational hardware 2802 and computational hardware 2806, respectively. In at least one embodiment, each of computational hardware 2802 and computational hardware 2806 comprises one or more ALUs that perform mathematical functions, such as linear algebraic functions, only on information stored in code and/or data storage 2801 and code and/or data storage 2805, respectively, result of which is stored in activation storage 2820.

In at least one embodiment, each of code and/or data storage 2801 and 2805 and corresponding computational hardware 2802 and 2806, respectively, correspond to different layers of a neural network, such that resulting activation from one storage/computational pair 2801/2802 of code and/or data storage 2801 and computational hardware 2802 is provided as an input to a next storage/computational pair 2805/2806 of code and/or data storage 2805 and computational hardware 2806, in order to mirror a conceptual organization of a neural network. In at least one embodiment, each of storage/computational pairs 2801/2802 and 2805/2806 may correspond to more than one neural network layer. In at least one embodiment, additional storage/computation pairs (not shown) subsequent to or in parallel with storage/computation pairs 2801/2802 and 2805/2806 may be included in inference and/or training logic 2815.

In at least one embodiment, one or more systems depicted in FIGS. 28A and 28B are utilized to implement a framework for image processing (e.g., real-time image rendering and enhancement). In at least one embodiment, one or more systems depicted in FIGS. 28A and 28B are utilized to perform various processes such as those described in connection with FIGS. 1-27. In at least one embodiment, one or more systems depicted in FIGS. 28A and 28B are utilized to generate and apply blue noise masks to images that are able to handle the temporal domain, i.e., adding time to the spatial (image) domain to improve image quality when rendering images over multiple frames (e.g., time).

Neural Network Training and Deployment

Figure 29:
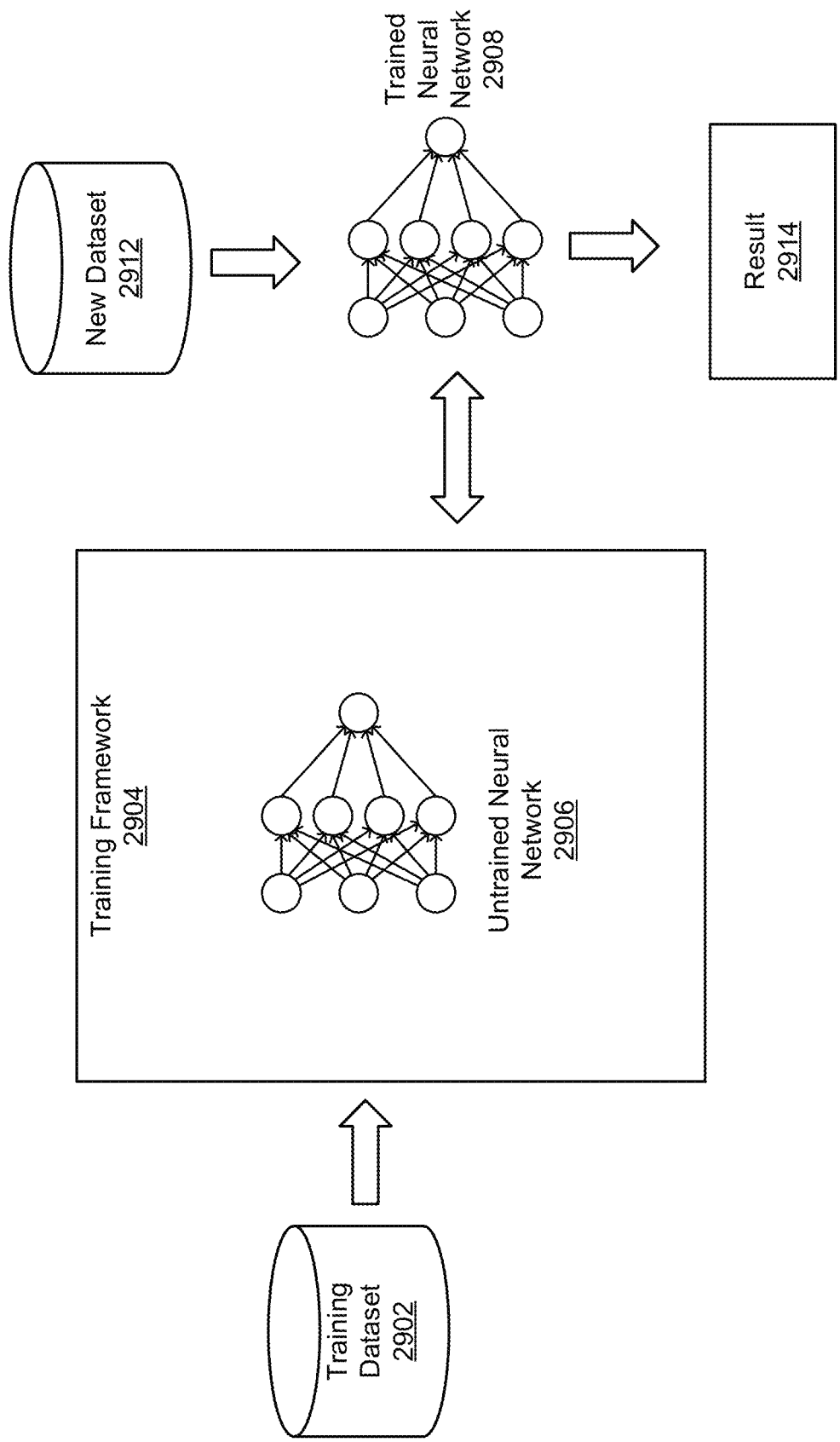
FIG. 29 illustrates training and deployment of a neural network, according to at least one embodiment.

FIG. 29 illustrates training and deployment of a deep neural network, according to at least one embodiment. In at least one embodiment, untrained neural network 2906 is trained using a training dataset 2902. In at least one embodiment, untrained neural network 2906 can be implemented with process 100 or process 106 (see FIG. 1B), e.g., to render an image using DLSS or another neural network operation. In at least one embodiment, training framework 2904 is a PyTorch framework, whereas in other embodiments, training framework 2904 is a TensorFlow, Boost, Caffe, Microsoft Cognitive Toolkit/CNTK, MXNet, Chainer, Keras, Deeplearning4j, or other training framework. In at least one embodiment, training framework 2904 trains an untrained neural network 2906 and enables it to be trained using processing resources described herein to generate a trained neural network 2908. In at least one embodiment, weights may be chosen randomly or by pre-training using a deep belief network. In at least one embodiment, training may be performed in either a supervised, partially supervised, or unsupervised manner.

In at least one embodiment, untrained neural network 2906 is trained using supervised learning, wherein training dataset 2902 includes an input paired with a desired output for an input, or where training dataset 2902 includes input having a known output and an output of neural network 2906 is manually graded. In at least one embodiment, untrained neural network 2906 is trained in a supervised manner and processes inputs from training dataset 2902 and compares resulting outputs against a set of expected or desired outputs. In at least one embodiment, errors are then propagated back through untrained neural network 2906. In at least one embodiment, training framework 2904 adjusts weights that control untrained neural network 2906. In at least one embodiment, training framework 2904 includes tools to monitor how well untrained neural network 2906 is converging towards a model, such as trained neural network 2908, suitable to generating correct answers, such as in result 2914, based on input data such as a new dataset 2912. In at least one embodiment, training framework 2904 trains untrained neural network 2906 repeatedly while adjust weights to refine an output of untrained neural network 2906 using a loss function and adjustment algorithm, such as stochastic gradient descent. In at least one embodiment, training framework 2904 trains untrained neural network 2906 until untrained neural network 2906 achieves a desired accuracy. In at least one embodiment, trained neural network 2908 can then be deployed to implement any number of machine learning operations.

In at least one embodiment, untrained neural network 2906 is trained using unsupervised learning, wherein untrained neural network 2906 attempts to train itself using unlabeled data. In at least one embodiment, unsupervised learning training dataset 2902 will include input data without any associated output data or "ground truth" data. In at least one embodiment, untrained neural network 2906 can learn groupings within training dataset 2902 and can determine how individual inputs are related to untrained dataset 2902. In at least one embodiment, unsupervised training can be used to generate a self-organizing map in trained neural network 2908 capable of performing operations useful in reducing dimensionality of new dataset 2912. In at least one embodiment, unsupervised training can also be used to perform anomaly detection, which allows identification of data points in new dataset 2912 that deviate from normal patterns of new dataset 2912.

In at least one embodiment, semi-supervised learning may be used, which is a technique in which in training dataset 2902 includes a mix of labeled and unlabeled data. In at least one embodiment, training framework 2904 may be used to perform incremental learning, such as through transferred learning techniques. In at least one embodiment, incremental learning enables trained neural network 2908 to adapt to new dataset 2912 without forgetting knowledge instilled within trained neural network 2908 during initial training.

In at least one embodiment, one or more systems depicted in FIGS. 28A and 28B are utilized to implement a framework for image processing (e.g., real-time image rendering and enhancement). In at least one embodiment, one or more systems depicted in FIGS. 28A and 28B are utilized to perform various processes such as those described in connection with FIGS. 1-27. In at least one embodiment, one or more systems depicted in FIGS. 28A and 28B are utilized to generate and apply blue noise masks to images that are able to handle the temporal domain, i.e., adding time to the spatial (image) domain to improve image quality when rendering images over multiple frames (e.g., time).

Data Center

Figure 30:
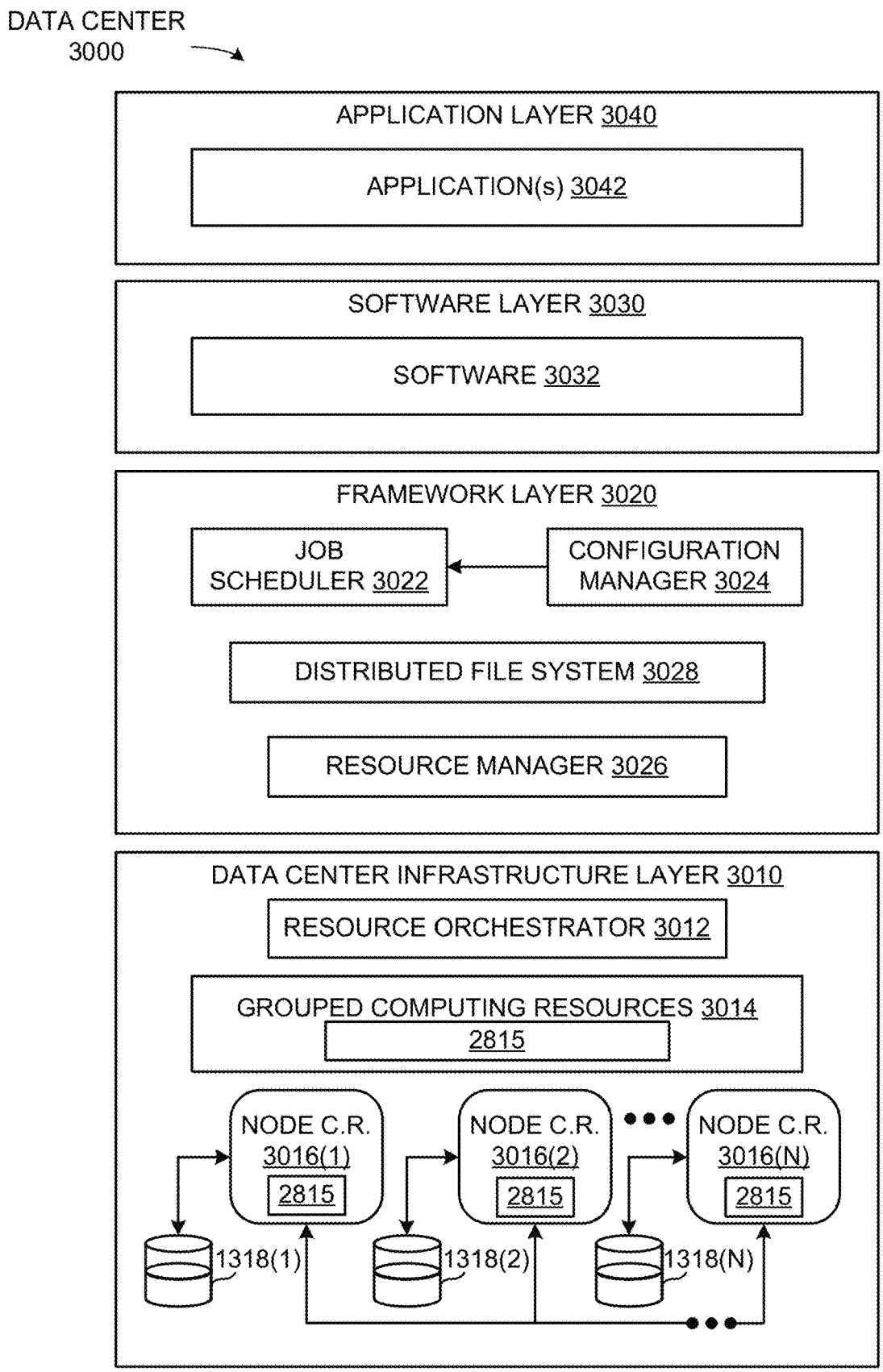
FIG. 30 illustrates an example data center system, according to at least one embodiment.

FIG. 30 illustrates an example data center 3000, in which at least one embodiment may be used. In at least one embodiment, data center 3000 includes a data center infrastructure layer 3010, a framework layer 3020, a software layer 3030 and an application layer 3040. Data center 3000 can implement process 100 or process 106 (see FIG. 1B).

In at least one embodiment, as shown in FIG. 30, data center infrastructure layer 3010 may include a resource orchestrator 3012, grouped computing resources 3014, and node computing resources ("node C.R.s") 3016(1)-3016(N), where "N" represents a positive integer (which may be a different integer "N" than used in other figures). In at least one embodiment, node C.R.s 3016(1)-3016(N) may include, but are not limited to, any number of central processing units ("CPUs") or other processors (including accelerators, field programmable gate arrays (FPGAs), graphics processors, etc.), memory storage devices 3018(1)-3018(N) (e.g., dynamic read-only memory, solid state storage or disk drives), network input/output ("NW I/O") devices, network switches, virtual machines ("VMs"), power modules, and cooling modules, etc. In at least one embodiment, one or more node C.R.s from among node C.R.s 3016(1)-3016(N) may be a server having one or more of above-mentioned computing resources.

In at least one embodiment, grouped computing resources 3014 may include separate groupings of node C.R.s housed within one or more racks (not shown), or many racks housed in data centers at various geographical locations (also not shown). In at least one embodiment, separate groupings of node C.R.s within grouped computing resources 3014 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 3012 may configure or otherwise control one or more node C.R.s 3016(1)-3016(N) and/or grouped computing resources 3014. In at least one embodiment, resource orchestrator 3012 may include a software design infrastructure ("SDI") management entity for data center 3000. In at least one embodiment, resource orchestrator 2812 may include hardware, software or some combination thereof.

In at least one embodiment, as shown in FIG. 30, framework layer 3020 includes a job scheduler 3022, a configuration manager 3024, a resource manager 3026 and a distributed file system 3028. In at least one embodiment, framework layer 3020 may include a framework to support software 3032 of software layer 3030 and/or one or more application(s) 3042 of application layer 3040. In at least one embodiment, software 3032 or application(s) 3042 may respectively include web-based service software or applications, such as those provided by Amazon Web Services, Google Cloud and Microsoft Azure. In at least one embodiment, framework layer 3020 may be, but is not limited to, a type of free and open-source software web application framework such as Apache Spark™ (hereinafter "Spark") that may utilize distributed file system 3028 for large-scale data processing (e.g., "big data"). In at least one embodiment, job scheduler 3022 may include a Spark driver to facilitate scheduling of workloads supported by various layers of data center 3000. In at least one embodiment, configuration manager 3024 may be capable of configuring different layers such as software layer 3030 and framework layer 3020 including Spark and distributed file system 3028 for supporting large-scale data processing. In at least one embodiment, resource manager 3026 may be capable of managing clustered or grouped computing resources mapped to or allocated for support of distributed file system 3028 and job scheduler 3022. In at least one embodiment, clustered or grouped computing resources may include grouped computing resources 3014 at data center infrastructure layer 3010. In at least one embodiment, resource manager 3026 may coordinate with resource orchestrator 3012 to manage these mapped or allocated computing resources.

In at least one embodiment, software 3032 included in software layer 3030 may include software used by at least portions of node C.R.s 3016(1)-3016(N), grouped computing resources 3014, and/or distributed file system 3028 of framework layer 3020. In at least one embodiment, one or more types of software may include, but are not limited to, Internet web page search software, e-mail virus scan software, database software, and streaming video content software.

In at least one embodiment, application(s) 3042 included in application layer 3040 may include one or more types of applications used by at least portions of node C.R.s 3016(1)-3016(N), grouped computing resources 3014, and/or distributed file system 3028 of framework layer 3020. In at least one embodiment, one or more types of applications may include, but are not limited to, any number of a genomics application, a cognitive compute, application and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 3024, resource manager 3026, and resource orchestrator 3012 may implement any number and type of self-modifying actions based on any amount and type of data acquired in any technically feasible fashion. In at least one embodiment, self-modifying actions may relieve a data center operator of data center 3000 from making possibly bad configuration decisions and possibly avoiding underutilized and/or poor performing portions of a data center.

In at least one embodiment, data center 3000 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 3000. In at least one embodiment, trained machine learning models corresponding to one or more neural networks may be used to infer or predict information using resources described above with respect to data center 3000 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 2815 are used to perform inferencing and/or training operations associated with one or more embodiments. Details regarding inference and/or training logic 2815 are provided herein in conjunction with FIGS. 28A and/or 28B. In at least one embodiment, inference and/or training logic 2815 may be used in system FIG. 30 for inferencing or predicting operations based, at least in part, on weight parameters calculated using neural network training operations, neural network functions and/or architectures, or neural network use cases described herein.

In at least one embodiment, one or more systems depicted in FIGS. 28A and 28B are utilized to implement a framework for image processing (e.g., real-time image rendering and enhancement). In at least one embodiment, one or more systems depicted in FIGS. 28A and 28B are utilized to perform various processes such as those described in connection with FIGS. 1-27. In at least one embodiment, one or more systems depicted in FIGS. 28A and 28B are utilized to generate and apply blue noise masks to images that are able to handle the temporal domain, i.e., adding time to the spatial (image) domain to improve image quality when rendering images over multiple frames (e.g., time).

Supercomputing

The following figures set forth, without limitation, exemplary supercomputer-based systems that can be used to implement at least one embodiment.

In at least one embodiment, a supercomputer may refer to a hardware system exhibiting substantial parallelism and comprising at least one chip, where chips in a system are interconnected by a network and are placed in hierarchically organized enclosures. In at least one embodiment, a large hardware system filling a machine room, with several racks, each containing several boards/rack modules, each containing several chips, all interconnected by a scalable network, is one particular example of a supercomputer. In at least one embodiment, a single rack of such a large hardware system is another example of a supercomputer. In at least one embodiment, a single chip exhibiting substantial parallelism and containing several hardware components can equally be considered to be a supercomputer, since as feature sizes may decrease, an amount of hardware that can be incorporated in a single chip may also increase.

Figure 31A:
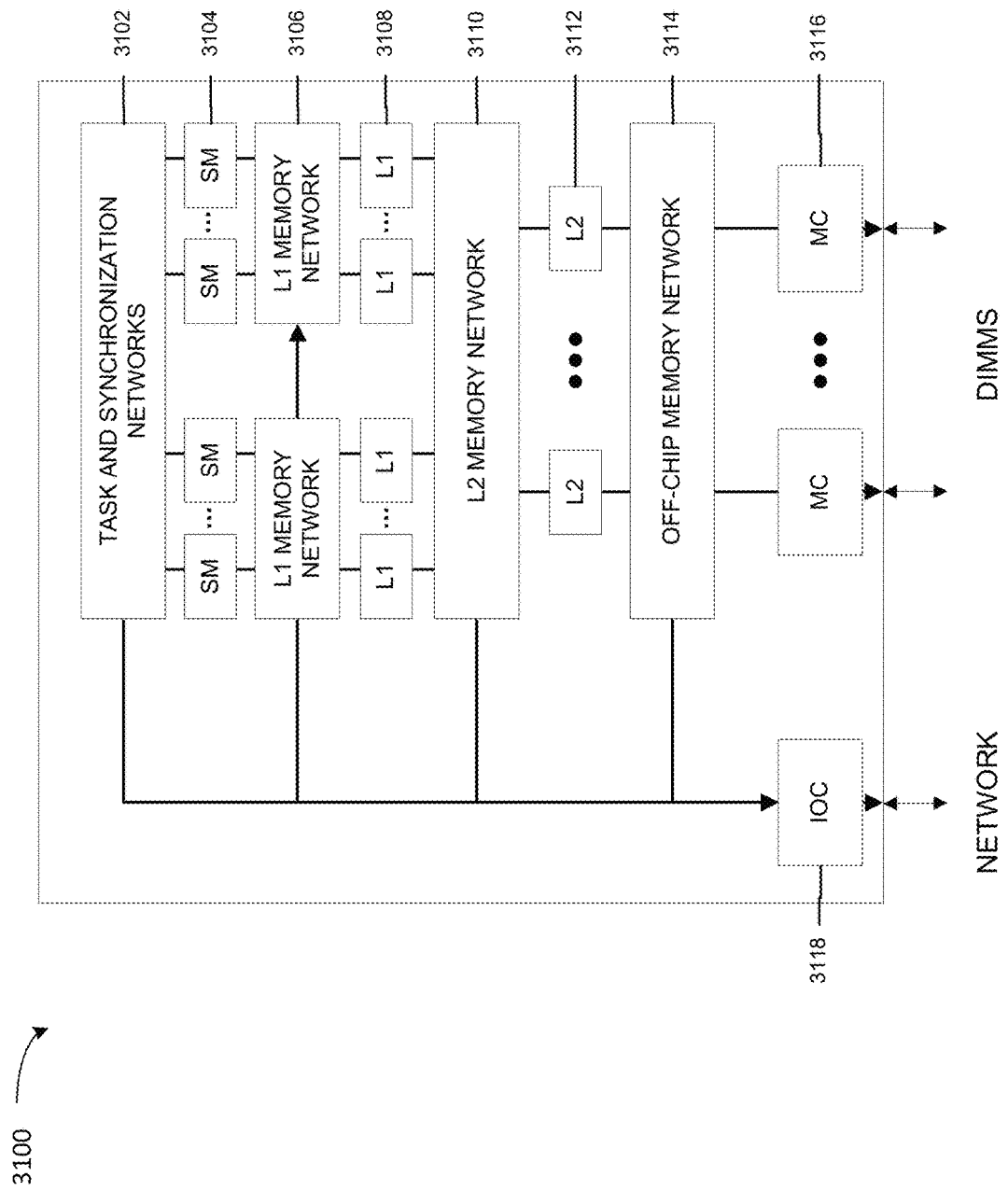
FIG. 31A illustrates a supercomputer at a chip level, in accordance with at least one embodiment.

FIG. 31A illustrates a supercomputer 3100 at a chip level, in accordance with at least one embodiment. In at least one embodiment, inside an FPGA or ASIC chip, main computation is performed within finite state machines (3104) called thread units. In an embodiment, the supercomputer 3100 can implement process 100 or process 106 (see FIG. 1B). In at least one embodiment, task and synchronization networks (3102) connect finite state machines and are used to dispatch threads and execute operations in correct order. In at least one embodiment, a multi-level partitioned on-chip cache hierarchy (3108, 3112) is accessed using memory networks (3106, 3110). In at least one embodiment, off-chip memory is accessed using memory controllers (3116) and an off-chip memory network (3114). In at least one embodiment, I/O controller (3118) is used for cross-chip communication when a design does not fit in a single logic chip.

Figure 31B:
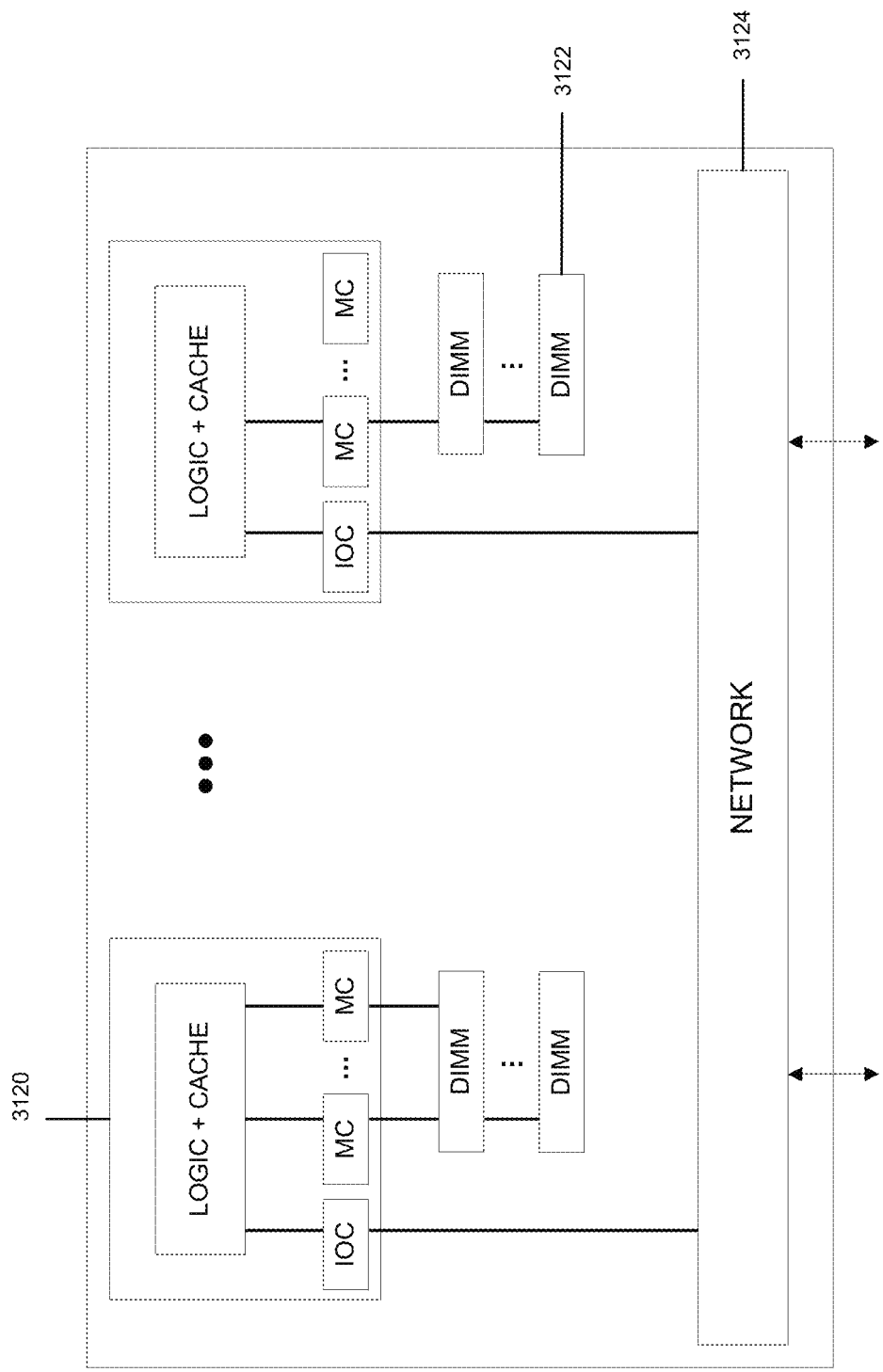
FIG. 31B illustrates a supercomputer at a rack module level, in accordance with at least one embodiment.

FIG. 31B illustrates a supercomputer at a rock module level, in accordance with at least one embodiment. In at least one embodiment, within a rack module, there are multiple FPGA or ASIC chips (3120) that are connected to one or more DRAM units (3122) which constitute main accelerator memory. In at least one embodiment, each FPGA/ASIC chip is connected to its neighbor FPGA/ASIC chip using wide busses on a board, with differential high speed signaling (3124). In at least one embodiment, each FPGA/ASIC chip is also connected to at least one high-speed serial communication cable.

Figure 31C:
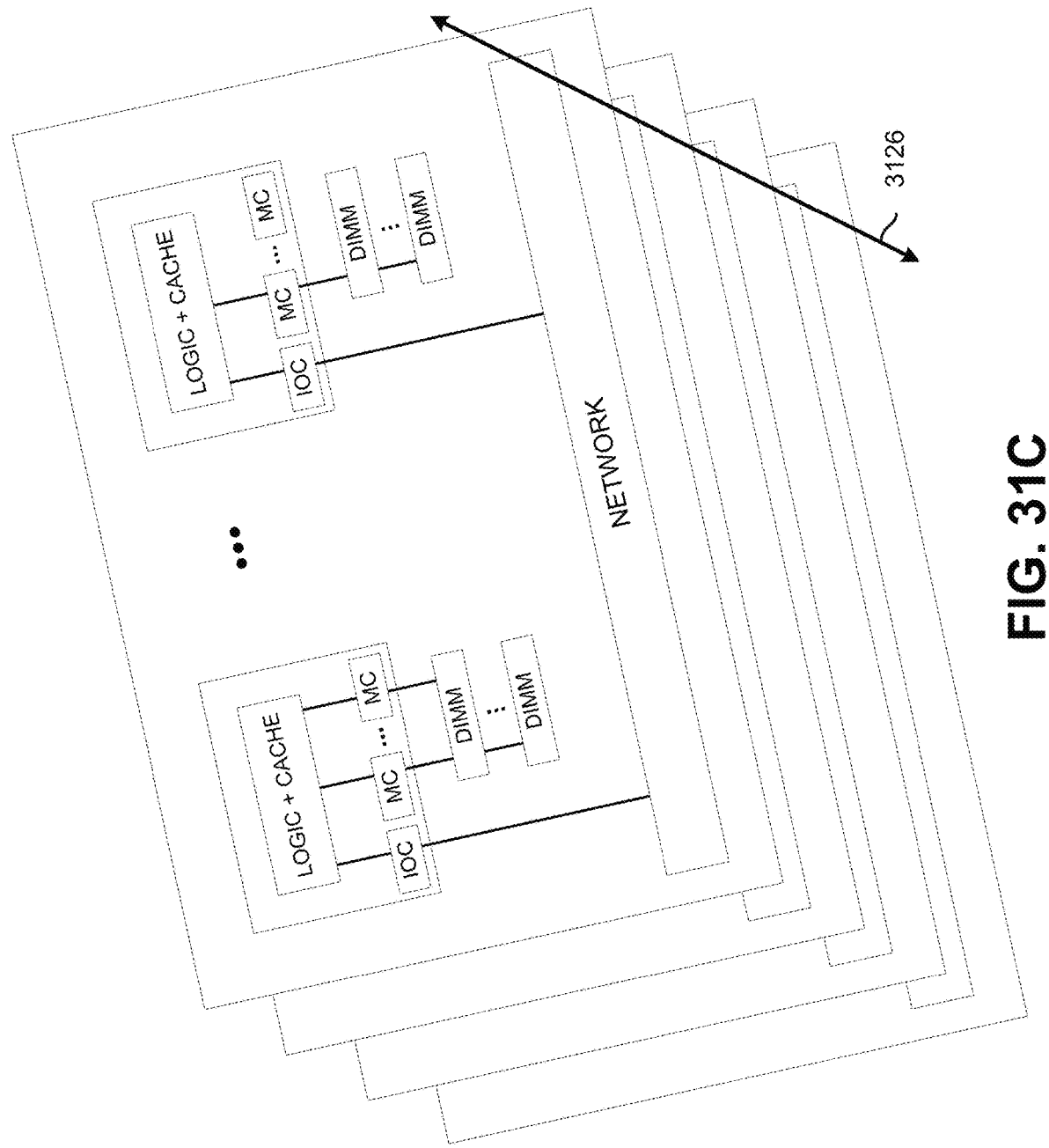
FIG. 31C illustrates a supercomputer at a rack level, in accordance with at least one embodiment.
Figure 31D:
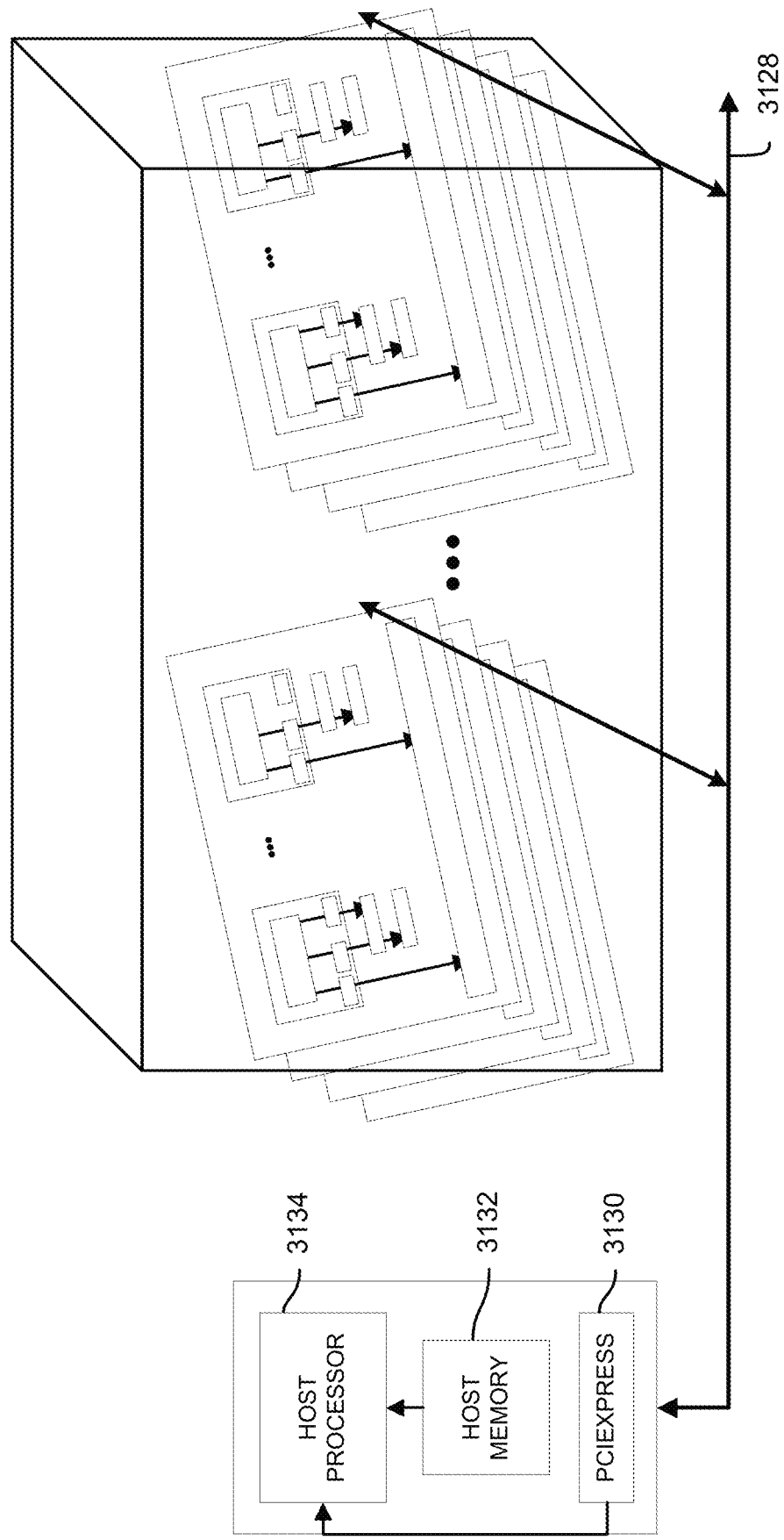
FIG. 31D illustrates a supercomputer at a whole system level, in accordance with at least one embodiment.

FIG. 31C illustrates a supercomputer at a rack level, in accordance with at least one embodiment. FIG. 31D illustrates a supercomputer at a whole system level, in accordance with at least one embodiment. In at least one embodiment, referring to FIG. 31C and FIG. 31D, between rack modules in a rack and across racks throughout an entire system, high-speed serial optical or copper cables (3126, 3128) are used to realize a scalable, possibly incomplete hypercube network. In at least one embodiment, one of FPGA/ASIC chips of an accelerator is connected to a host system through a PCI-Express connection (3130). In at least one embodiment, host system comprises a host microprocessor (3134) that a software part of an application runs on and a memory consisting of one or more host memory DRAM units (3132) that is kept coherent with memory on an accelerator. In at least one embodiment, host system can be a separate module on one of racks, or can be integrated with one of a supercomputer's modules. In at least one embodiment, cube-connected cycles topology provide communication links to create a hypercube network for a large supercomputer. In at least one embodiment, a small group of FPGA/ASIC chips on a rack module can act as a single hypercube node, such that a total number of external links of each group is increased, compared to a single chip. In at least one embodiment, a group contains chips A, B, C and D on a rack module with internal wide differential busses connecting A, B, C and D in a torus organization. In at least one embodiment, there are 12 serial communication cables connecting a rack module to an outside world. In at least one embodiment, chip A on a rack module connects to serial communication cables 0, 1, 2. In at least one embodiment, chip B connects to cables 3, 4, 5. In at least one embodiment, chip C connects to 6, 7, 8. In at least one embodiment, chip D connects to 9, 10, 11. In at least one embodiment, an entire group {A, B, C, D} constituting a rack module can form a hypercube node within a supercomputer system, with up to 212=4096 rack modules (16384 FPGA/ASIC chips). In at least one embodiment, for chip A to send a message out on link 4 of group {A, B, C, D}, a message has to be routed first to chip B with an on-board differential wide bus connection. In at least one embodiment, a message arriving into a group {A, B, C, D} on link 4 (i.e., arriving at B) destined to chip A, also has to be routed first to a correct destination chip (A) internally within a group {A, B, C, D}. In at least one embodiment, parallel supercomputer systems of other sizes may also be implemented.

In at least one embodiment, one or more systems depicted in FIGS. 28A and 28B are utilized to implement a framework for image processing (e.g., real-time image rendering and enhancement). In at least one embodiment, one or more systems depicted in FIGS. 28A and 28B are utilized to perform various processes such as those described in connection with FIGS. 1-27. In at least one embodiment, one or more systems depicted in FIGS. 28A and 28B are utilized to generate and apply blue noise masks to images that are able to handle the temporal domain, i.e., adding time to the spatial (image) domain to improve image quality when rendering images over multiple frames (e.g., time).

Computer Systems

Figure 32:
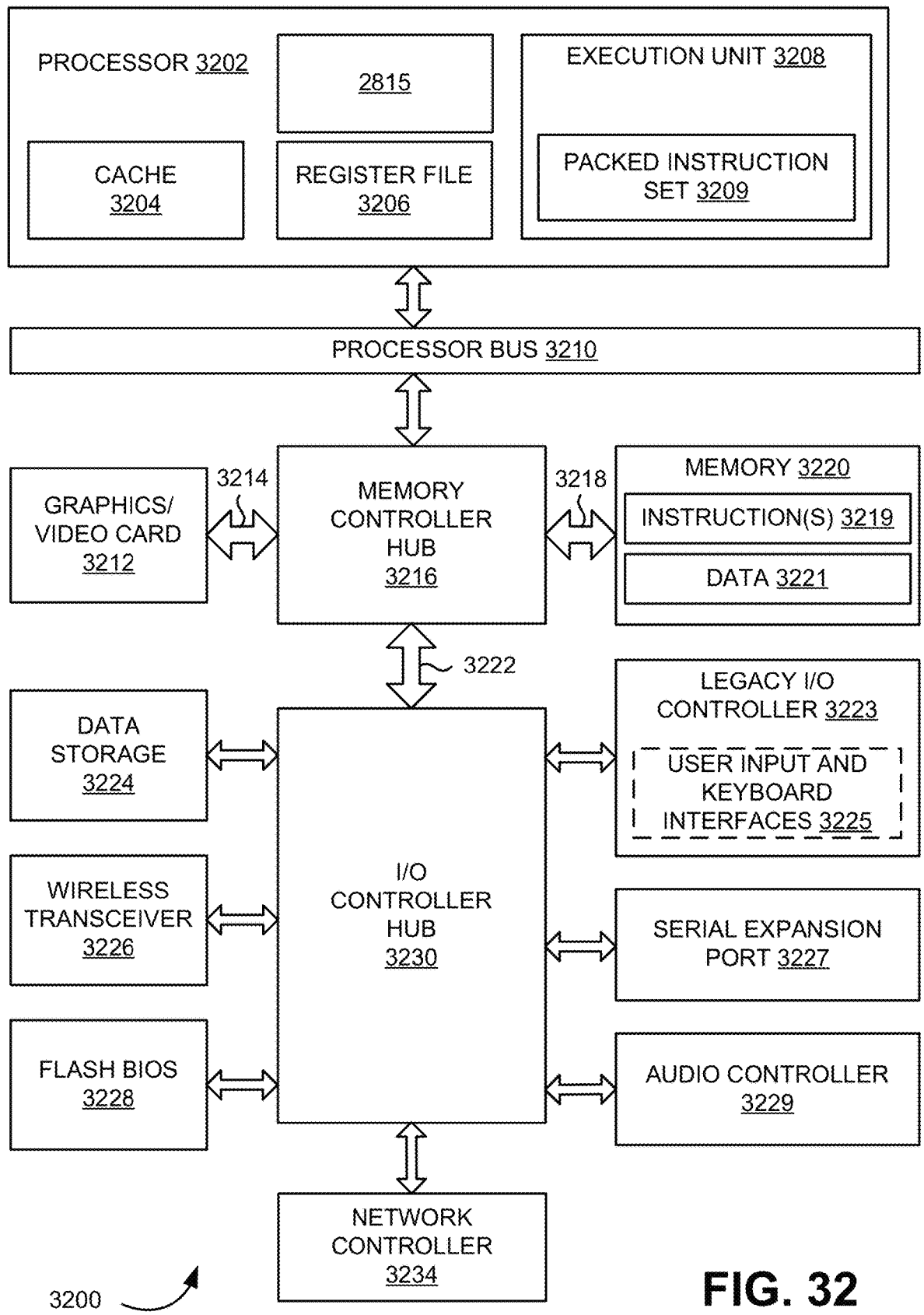
FIG. 32 is a block diagram illustrating a computer system, according to at least one embodiment.

FIG. 32 is a block diagram illustrating an exemplary computer system, which may be a system with interconnected devices and components, a system-on-a-chip (SOC) or some combination thereof formed with a processor that may include execution units to execute an instruction, according to at least one embodiment. In at least one embodiment, a computer system 3200 may include, without limitation, a component, such as a processor 3202 to employ execution units including logic to perform algorithms for process data, in accordance with present disclosure, such as in embodiment described herein. In at least one embodiment, the system 3200 can implement process 100 or process 106 (see FIG. 1B). In at least one embodiment, computer system 3200 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 3200 may execute a version of WINDOWS operating system available from Microsoft Corporation of Redmond, Wash., although other operating systems (UNIX and Linux, for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 3200 may include, without limitation, processor 3202 that may include, without limitation, one or more execution units 3208 to perform machine learning model training and/or inferencing according to techniques described herein. In at least one embodiment, computer system 3200 is a single processor desktop or server system, but in another embodiment, computer system 3200 may be a multiprocessor system. In at least one embodiment, processor 3202 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 3202 may be coupled to a processor bus 3210 that may transmit data signals between processor 3202 and other components in computer system 3200.

In at least one embodiment, processor 3202 may include, without limitation, a Level 1 ("L1") internal cache memory ("cache") 3204. In at least one embodiment, processor 3202 may have a single internal cache or multiple levels of internal cache. In at least one embodiment, cache memory may reside external to processor 3202. Other embodiments may also include a combination of both internal and external caches depending on particular implementation and needs. In at least one embodiment, a register file 3206 may store different types of data in various registers including, without limitation, integer registers, floating point registers, status registers, and an instruction pointer register.

In at least one embodiment, execution unit 3208, including, without limitation, logic to perform integer and floating point operations, also resides in processor 3202. In at least one embodiment, processor 3202 may also include a microcode ("ucode") read only memory ("ROM") that stores microcode for certain macro instructions. In at least one embodiment, execution unit 3208 may include logic to handle a packed instruction set 3209. In at least one embodiment, by including packed instruction set 3209 in an instruction set of a general-purpose processor, along with associated circuitry to execute instructions, operations used by many multimedia applications may be performed using packed data in processor 3202. In at least one embodiment, many multimedia applications may be accelerated and executed more efficiently by using a full width of a processor's data bus for performing operations on packed data, which may eliminate a need to transfer smaller units of data across that processor's data bus to perform one or more operations one data element at a time.

In at least one embodiment, execution unit 3208 may also be used in microcontrollers, embedded processors, graphics devices, DSPs, and other types of logic circuits. In at least one embodiment, computer system 3200 may include, without limitation, a memory 3220. In at least one embodiment, memory 3220 may be a Dynamic Random Access Memory ("DRAM") device, a Static Random Access Memory ("SRAM") device, a flash memory device, or another memory device. In at least one embodiment, memory 3220 may store instruction(s) 3219 and/or data 3221 represented by data signals that may be executed by processor 3202.

In at least one embodiment, a system logic chip may be coupled to processor bus 3210 and memory 3220. In at least one embodiment, a system logic chip may include, without limitation, a memory controller hub ("MCH") 3216, and processor 3202 may communicate with MCH 3216 via processor bus 3210. In at least one embodiment, MCH 3216 may provide a high bandwidth memory path 3218 to memory 3220 for instruction and data storage and for storage of graphics commands, data and textures. In at least one embodiment, MCH 3216 may direct data signals between processor 3202, memory 3220, and other components in computer system 3200 and to bridge data signals between processor bus 3210, memory 3220, and a system I/O interface 3222. In at least one embodiment, a system logic chip may provide a graphics port for coupling to a graphics controller. In at least one embodiment, MCH 3216 may be coupled to memory 3220 through high bandwidth memory path 3218 and a graphics/video card 3212 may be coupled to MCH 3216 through an Accelerated Graphics Port ("AGP") interconnect 3214.

In at least one embodiment, computer system 3200 may use system I/O interface 3222 as a proprietary hub interface bus to couple MCH 3216 to an I/O controller hub ("ICH") 3230. In at least one embodiment, ICH 3230 may provide direct connections to some I/O devices via a local I/O bus. In at least one embodiment, a local I/O bus may include, without limitation, a high-speed I/O bus for connecting peripherals to memory 3220, a chipset, and processor 3202. Examples may include, without limitation, an audio controller 3229, a firmware hub ("flash BIOS") 3228, a wireless transceiver 3226, a data storage 3224, a legacy I/O controller 3223 containing user input and keyboard interfaces 3225, a serial expansion port 3227, such as a Universal Serial Bus ("USB") port, and a network controller 3234. In at least one embodiment, data storage 3224 may comprise a hard disk drive, a floppy disk drive, a CD-ROM device, a flash memory device, or other mass storage device.

In at least one embodiment, FIG. 32 illustrates a system, which includes interconnected hardware devices or "chips", whereas in other embodiments, FIG. 32 may illustrate an exemplary SoC. In at least one embodiment, devices illustrated in FIG. 32 may be interconnected with proprietary interconnects, standardized interconnects (e.g., PCIe) or some combination thereof. In at least one embodiment, one or more components of computer system 3200 are interconnected using compute express link (CXL) interconnects.

Inference and/or training logic 2815 are used to perform inferencing and/or training operations associated with one or more embodiments. Details regarding inference and/or training logic 2815 are provided herein in conjunction with FIGS. 28A and/or 28B. In at least one embodiment, inference and/or training logic 2815 may be used in system FIG. 32 for inferencing or predicting operations based, at least in part, on weight parameters calculated using neural network training operations, neural network functions and/or architectures, or neural network use cases described herein.

In at least one embodiment, one or more systems depicted in FIGS. 28A and 28B are utilized to implement a framework for image processing (e.g., real-time image rendering and enhancement). In at least one embodiment, one or more systems depicted in FIGS. 28A and 28B are utilized to perform various processes such as those described in connection with FIGS. 1-27. In at least one embodiment, one or more systems depicted in FIGS. 28A and 28B are utilized to generate and apply blue noise masks to images that are able to handle the temporal domain, i.e., adding time to the spatial (image) domain to improve image quality when rendering images over multiple frames (e.g., time).

Figure 33:
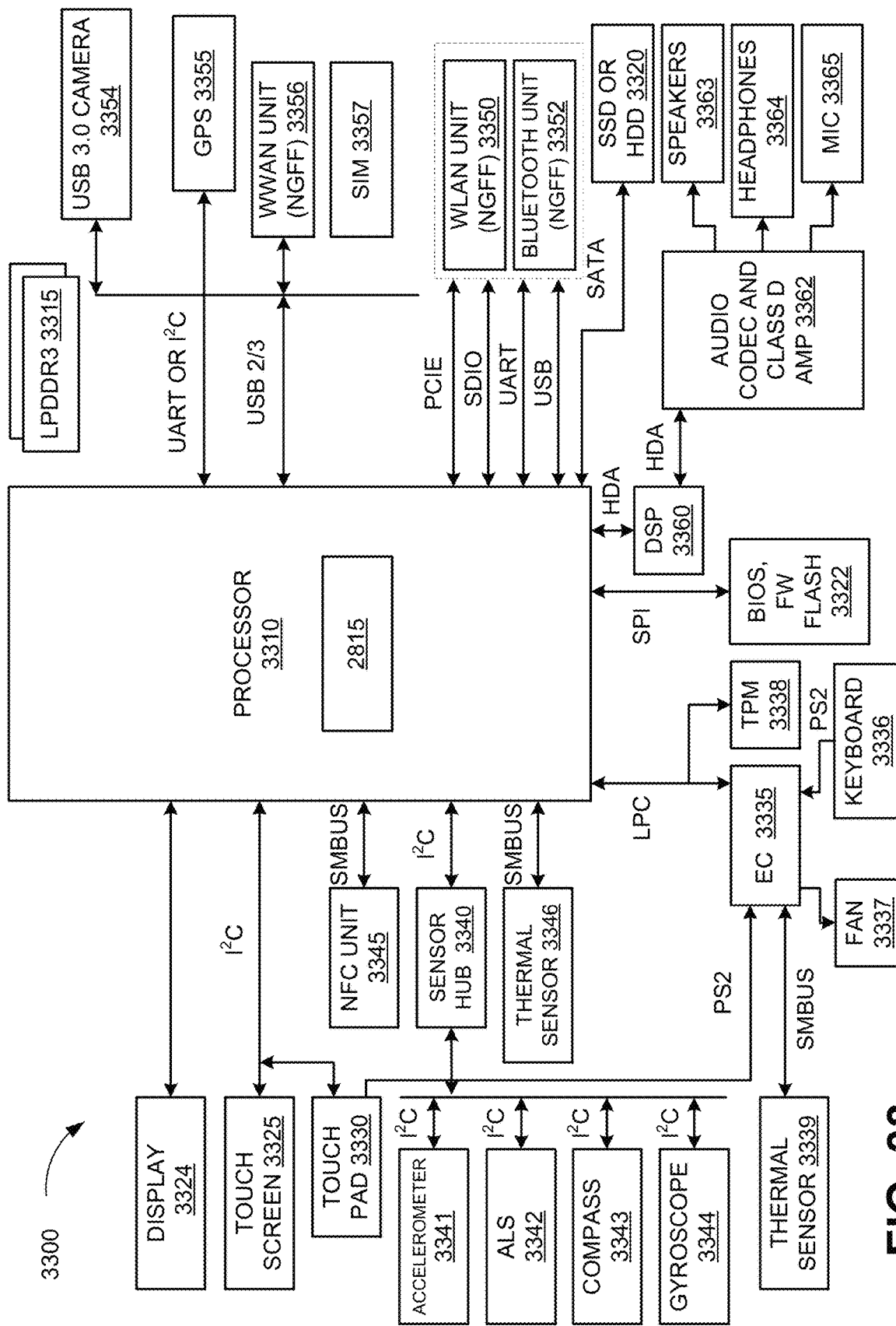
FIG. 33 is a block diagram illustrating a computer system, according to at least one embodiment.

FIG. 33 is a block diagram illustrating an electronic device 3300 for utilizing a processor 3310, according to at least one embodiment. In at least one embodiment, electronic device 3300 may be, for example and without limitation, a notebook, a tower server, a rack server, a blade server, a laptop, a desktop, a tablet, a mobile device, a phone, an embedded computer, or any other suitable electronic device. In at least one embodiment, the electronic device 3300 can implement process 100 or process 106 (see FIG. 1B).

In at least one embodiment, electronic device 3300 may include, without limitation, processor 3310 communicatively coupled to any suitable number or kind of components, peripherals, modules, or devices. In at least one embodiment, processor 3310 is coupled using a bus or interface, such as a I²C bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3, etc.), or a Universal Asynchronous Receiver/Transmitter ("UART") bus. In at least one embodiment, FIG. 33 illustrates a system, which includes interconnected hardware devices or "chips", whereas in other embodiments, FIG. 33 may illustrate an exemplary SoC. In at least one embodiment, devices illustrated in FIG. 33 may be interconnected with proprietary interconnects, standardized interconnects (e.g., PCIe) or some combination thereof. In at least one embodiment, one or more components of FIG. 33 are interconnected using compute express link (CXL) interconnects.

In at least one embodiment, FIG. 33 may include a display 3324, a touch screen 3325, a touch pad 3330, a Near Field Communications unit ("NFC") 3345, a sensor hub 3340, a thermal sensor 3346, an Express Chipset ("EC") 3335, a Trusted Platform Module ("TPM") 3338, BIOS/firmware/flash memory ("BIOS, FW Flash") 3322, a DSP 3360, a drive 3320 such as a Solid State Disk ("SSD") or a Hard Disk Drive ("HDD"), a wireless local area network unit ("WLAN") 3350, a Bluetooth unit 3352, a Wireless Wide Area Network unit ("WWAN") 3356, a Global Positioning System (GPS) unit 3355, a camera ("USB 3.0 camera") 3354 such as a USB 3.0 camera, and/or a Low Power Double Data Rate ("LPDDR") memory unit ("LPDDR3") 3315 implemented in, for example, an LPDDR3 standard. These components may each be implemented in any suitable manner.

In at least one embodiment, other components may be communicatively coupled to processor 3310 through components described herein. In at least one embodiment, an accelerometer 3341, an ambient light sensor ("ALS") 3342, a compass 3343, and a gyroscope 3344 may be communicatively coupled to sensor hub 3340. In at least one embodiment, a thermal sensor 3339, a fan 3337, a keyboard 3336, and touch pad 3330 may be communicatively coupled to EC 3335. In at least one embodiment, speakers 3363, headphones 3364, and a microphone ("mic") 3365 may be communicatively coupled to an audio unit ("audio codec and class D amp") 3362, which may in turn be communicatively coupled to DSP 3360. In at least one embodiment, audio unit 3362 may include, for example and without limitation, an audio coder/decoder ("codec") and a class D amplifier. In at least one embodiment, a SIM card ("SIM") 3357 may be communicatively coupled to WWAN unit 3356. In at least one embodiment, components such as WLAN unit 3350 and Bluetooth unit 3352, as well as WWAN unit 3356 may be implemented in a Next Generation Form Factor ("NGFF").

Inference and/or training logic 2815 are used to perform inferencing and/or training operations associated with one or more embodiments. Details regarding inference and/or training logic 2815 are provided herein in conjunction with FIGS. 28A and/or 28B. In at least one embodiment, inference and/or training logic 2815 may be used in system FIG. 33 for inferencing or predicting operations based, at least in part, on weight parameters calculated using neural network training operations, neural network functions and/or architectures, or neural network use cases described herein.

In at least one embodiment, one or more systems depicted in FIGS. 28A and 28B are utilized to implement a framework for image processing (e.g., real-time image rendering and enhancement). In at least one embodiment, one or more systems depicted in FIGS. 28A and 28B are utilized to perform various processes such as those described in connection with FIGS. 1-27. In at least one embodiment, one or more systems depicted in FIGS. 28A and 28B are utilized to generate and apply blue noise masks to images that are able to handle the temporal domain, i.e., adding time to the spatial (image) domain to improve image quality when rendering images over multiple frames (e.g., time).

Figure 34:
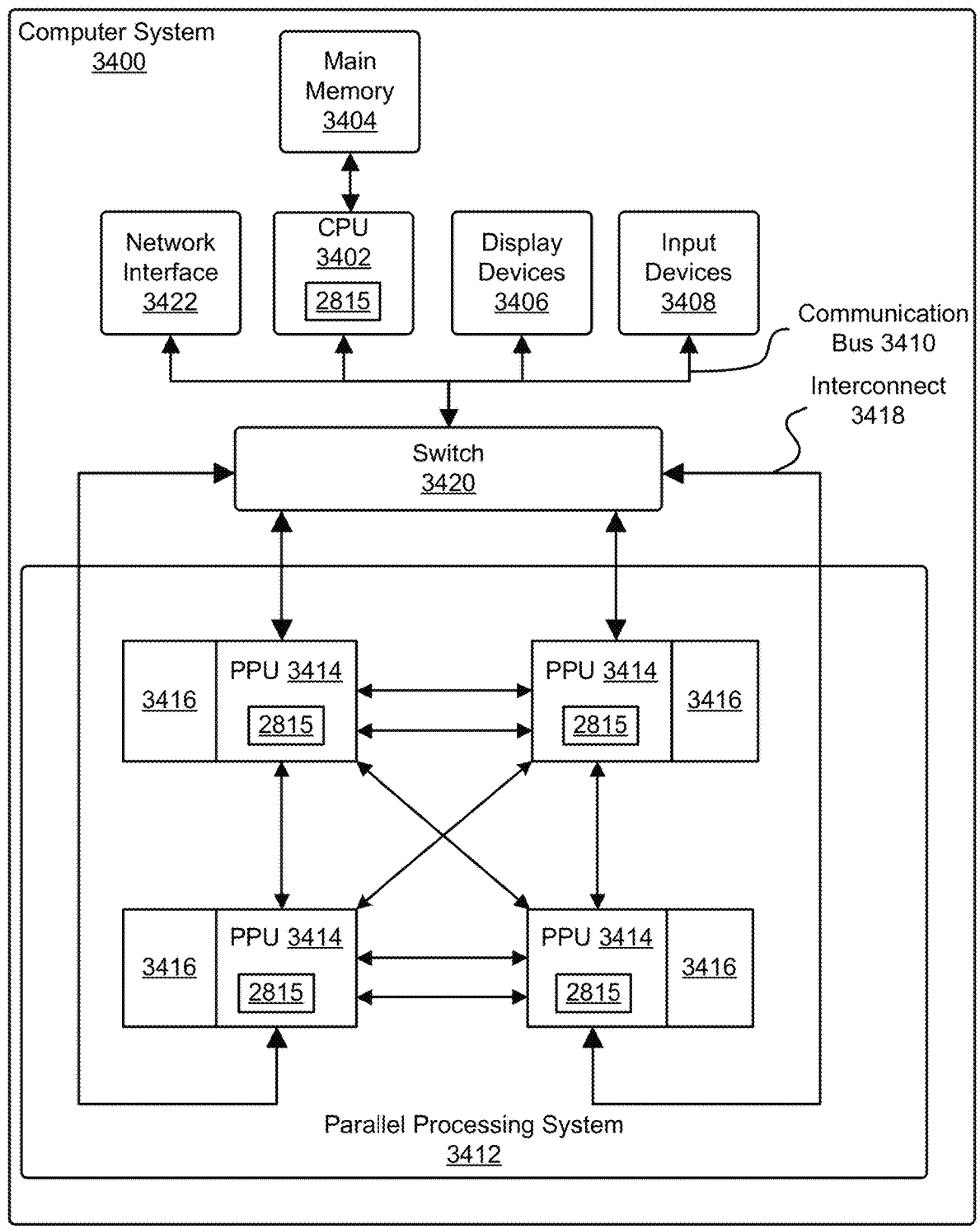
FIG. 34 illustrates a computer system, according to at least one embodiment.

FIG. 34 illustrates a computer system 3400, according to at least one embodiment. In at least one embodiment, computer system 3400 is configured to implement various processes and methods described throughout this disclosure. In at least one embodiment, the computer system 3400 can implement process 100 or process 106 (see FIG. 1B).

In at least one embodiment, computer system 3400 comprises, without limitation, at least one central processing unit ("CPU") 3402 that is connected to a communication bus 3410 implemented using any suitable protocol, such as PCI ("Peripheral Component Interconnect"), peripheral component interconnect express ("PCI-Express"), AGP ("Accelerated Graphics Port"), HyperTransport, or any other bus or point-to-point communication protocol(s). In at least one embodiment, computer system 3400 includes, without limitation, a main memory 3404 and control logic (e.g., implemented as hardware, software, or a combination thereof) and data are stored in main memory 3404, which may take form of random access memory ("RAM"). In at least one embodiment, a network interface subsystem ("network interface") 3422 provides an interface to other computing devices and networks for receiving data from and transmitting data to other systems with computer system 3400.

In at least one embodiment, computer system 3400, in at least one embodiment, includes, without limitation, input devices 3408, a parallel processing system 3412, and display devices 3406 that can be implemented using a conventional cathode ray tube ("CRT"), a liquid crystal display ("LCD"), a light emitting diode ("LED") display, a plasma display, or other suitable display technologies. In at least one embodiment, user input is received from input devices 3408 such as keyboard, mouse, touchpad, microphone, etc. In at least one embodiment, each module described herein can be situated on a single semiconductor platform to form a processing system.

Inference and/or training logic 2815 are used to perform inferencing and/or training operations associated with one or more embodiments. Details regarding inference and/or training logic 2815 are provided herein in conjunction with FIGS. 28A and/or 28B. In at least one embodiment, inference and/or training logic 2815 may be used in system FIG. 34 for inferencing or predicting operations based, at least in part, on weight parameters calculated using neural network training operations, neural network functions and/or architectures, or neural network use cases described herein.

In at least one embodiment, one or more systems depicted in FIGS. 28A and 28B are utilized to implement a framework for image processing (e.g., real-time image rendering and enhancement). In at least one embodiment, one or more systems depicted in FIGS. 28A and 28B are utilized to perform various processes such as those described in connection with FIGS. 1-27. In at least one embodiment, one or more systems depicted in FIGS. 28A and 28B are utilized to generate and apply blue noise masks to images that are able to handle the temporal domain, i.e., adding time to the spatial (image) domain to improve image quality when rendering images over multiple frames (e.g., time).

Figure 35:
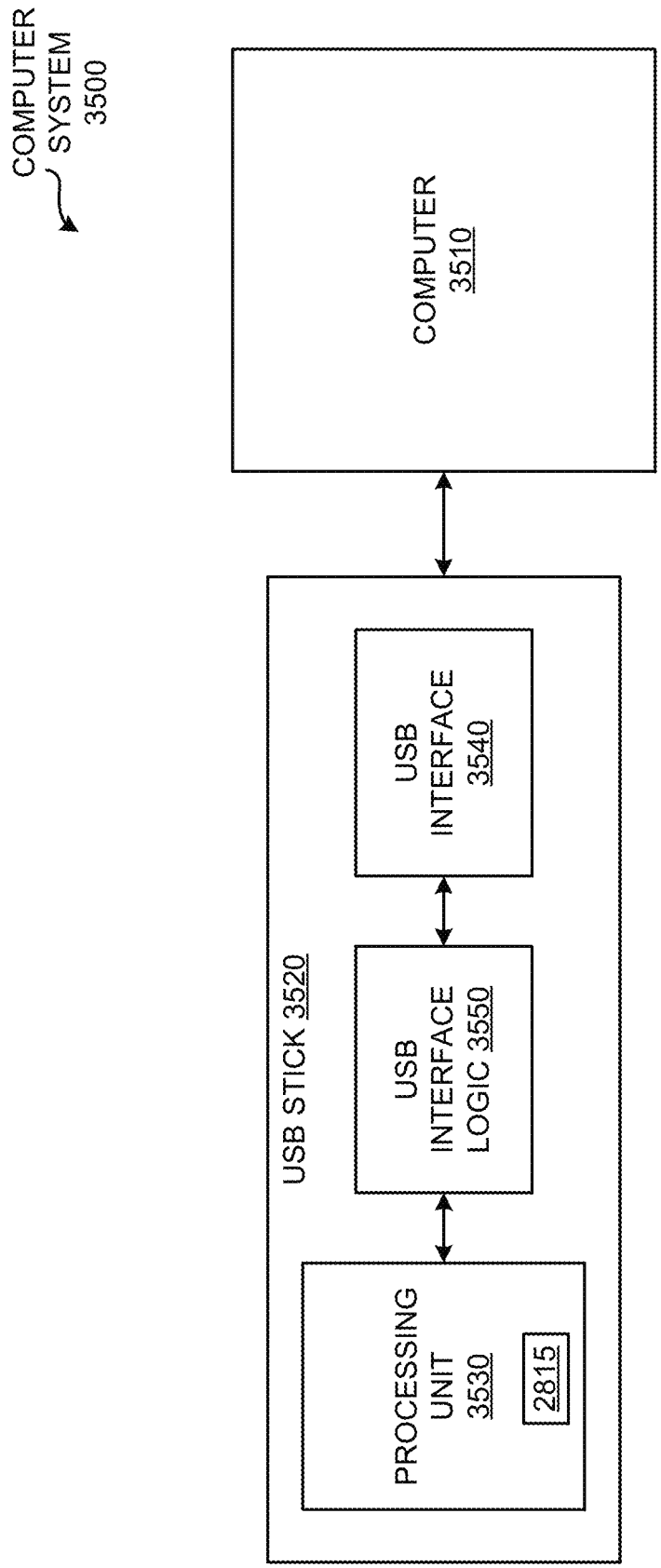
FIG. 35 illustrates a computer system, according to at least one embodiment.

FIG. 35 illustrates a computer system 3500, according to at least one embodiment. In at least one embodiment, computer system 3500 includes, without limitation, a computer 3510 and a USB stick 3520. In at least one embodiment, computer 3510 may include, without limitation, any number and type of processor(s) (not shown) and a memory (not shown). In at least one embodiment, computer 3510 includes, without limitation, a server, a cloud instance, a laptop, and a desktop computer. In at least one embodiment, the computer system 3500 can implement process 100 or process 106 (see FIG. 1B).

In at least one embodiment, USB stick 3520 includes, without limitation, a processing unit 3530, a USB interface 3540, and USB interface logic 3550. In at least one embodiment, processing unit 3530 may be any instruction execution system, apparatus, or device capable of executing instructions. In at least one embodiment, processing unit 3530 may include, without limitation, any number and type of processing cores (not shown). In at least one embodiment, processing unit 3530 comprises an application specific integrated circuit ("ASIC") that is optimized to perform any amount and type of operations associated with machine learning. For instance, in at least one embodiment, processing unit 3530 is a tensor processing unit ("TPC") that is optimized to perform machine learning inference operations. In at least one embodiment, processing unit 3530 is a vision processing unit ("VPU") that is optimized to perform machine vision and machine learning inference operations.

In at least one embodiment, USB interface 3540 may be any type of USB connector or USB socket. For instance, in at least one embodiment, USB interface 3540 is a USB 3.0 Type-C socket for data and power. In at least one embodiment, USB interface 3540 is a USB 3.0 Type-A connector. In at least one embodiment, USB interface logic 3550 may include any amount and type of logic that enables processing unit 3530 to interface with devices (e.g., computer 3510) via USB connector 3540.

Inference and/or training logic 2815 are used to perform inferencing and/or training operations associated with one or more embodiments. Details regarding inference and/or training logic 2815 are provided herein in conjunction with FIGS. 28A and/or 28B. In at least one embodiment, inference and/or training logic 2815 may be used in system FIG. 35 for inferencing or predicting operations based, at least in part, on weight parameters calculated using neural network training operations, neural network functions and/or architectures, or neural network use cases described herein.

In at least one embodiment, one or more systems depicted in FIGS. 28A and 28B are utilized to implement a framework for image processing (e.g., real-time image rendering and enhancement). In at least one embodiment, one or more systems depicted in FIGS. 28A and 28B are utilized to perform various processes such as those described in connection with FIGS. 1-27. In at least one embodiment, one or more systems depicted in FIGS. 28A and 28B are utilized to generate and apply blue noise masks to images that are able to handle the temporal domain, i.e., adding time to the spatial (image) domain to improve image quality when rendering images over multiple frames (e.g., time).

Figure 36:
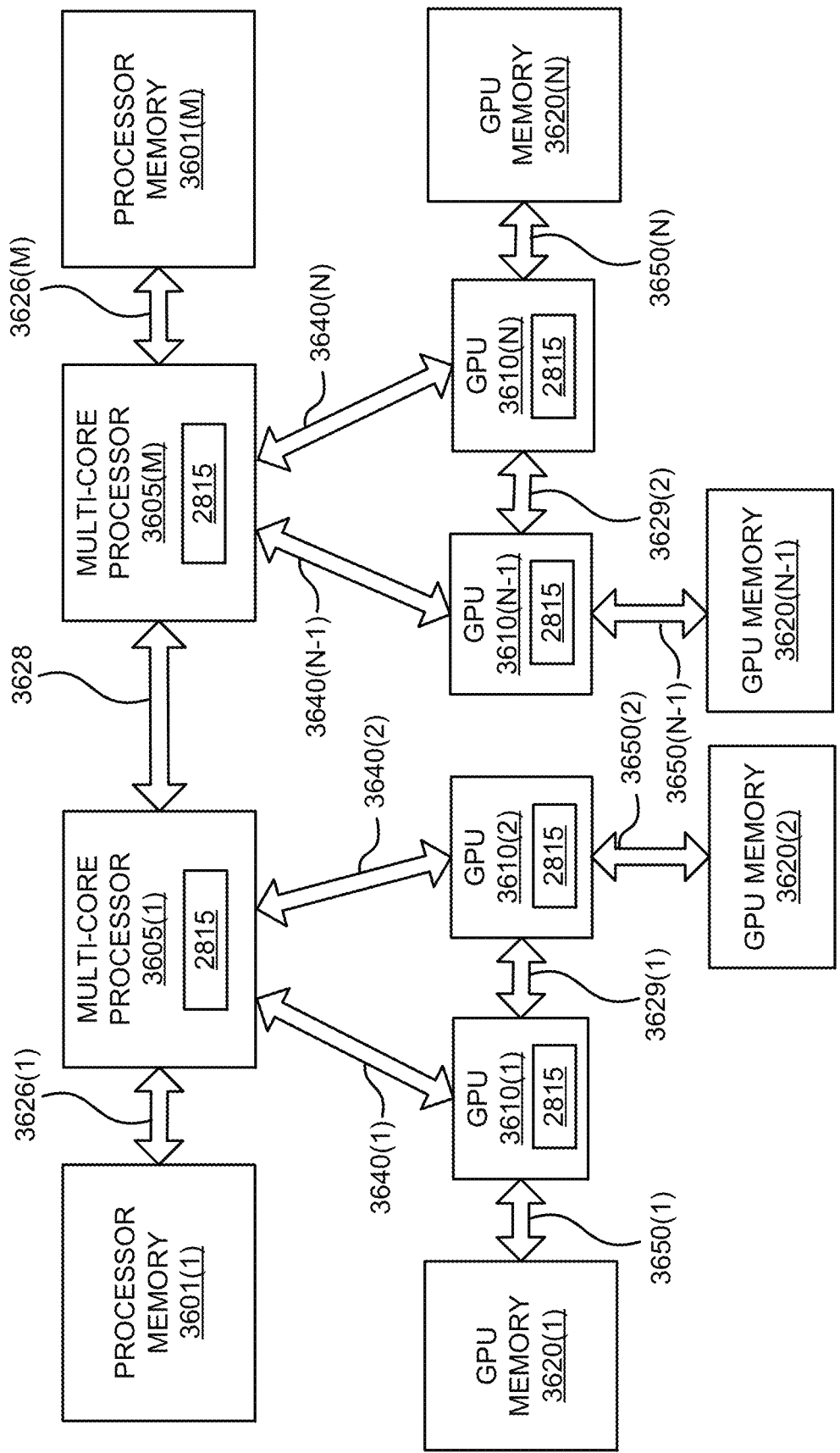
FIG. 36A illustrates a computer system, according to at least one embodiment.
FIG. 36B illustrates a computer system, according to at least one embodiment.
FIG. 36C illustrates a computer system, according to at least one embodiment.
FIG. 36D illustrates a computer system, according to at least one embodiment.
FIGS. 36E and 36F illustrate a shared programming model, according to at least one embodiment.
Figure 36:
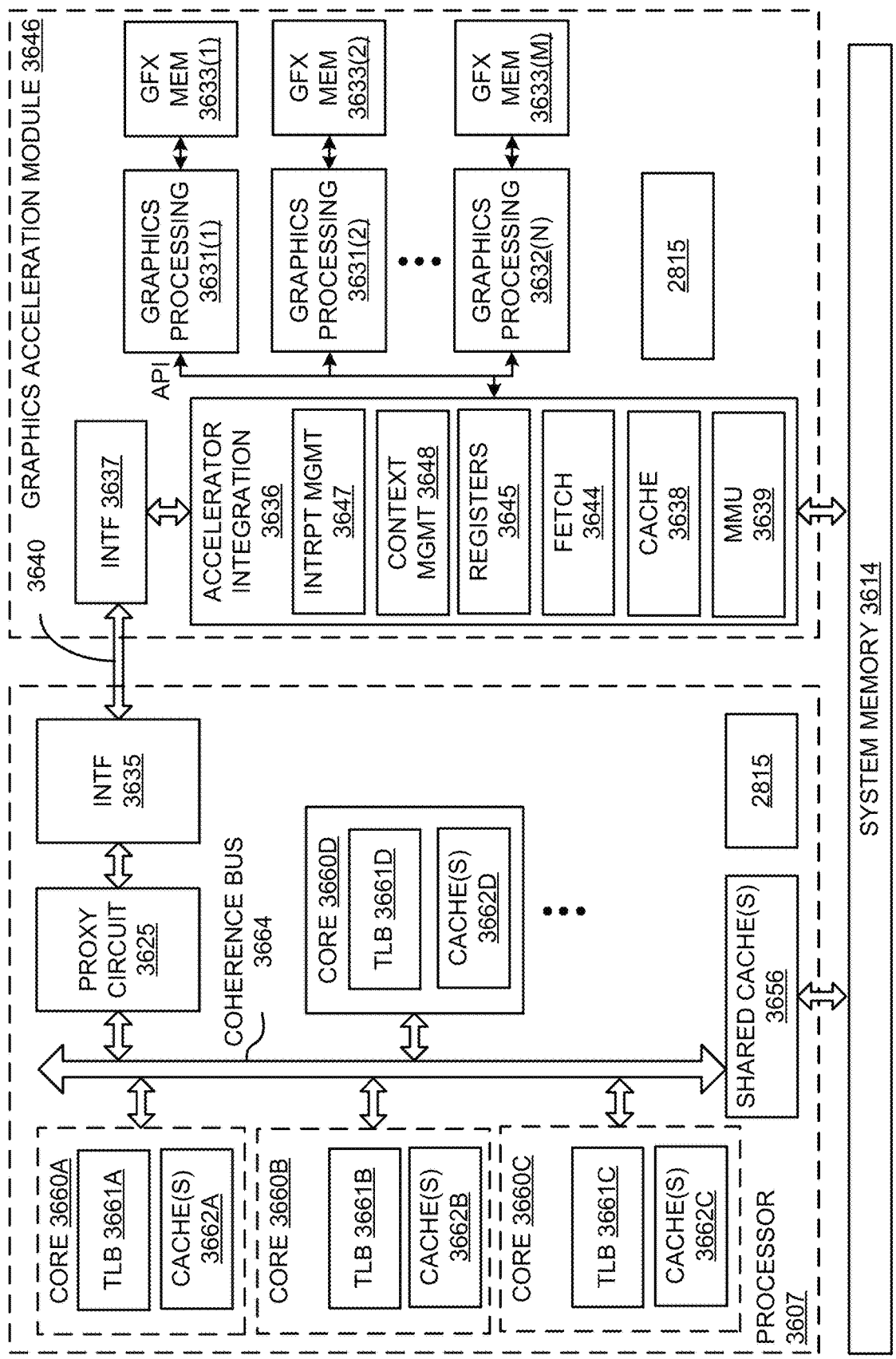
Figure 36:
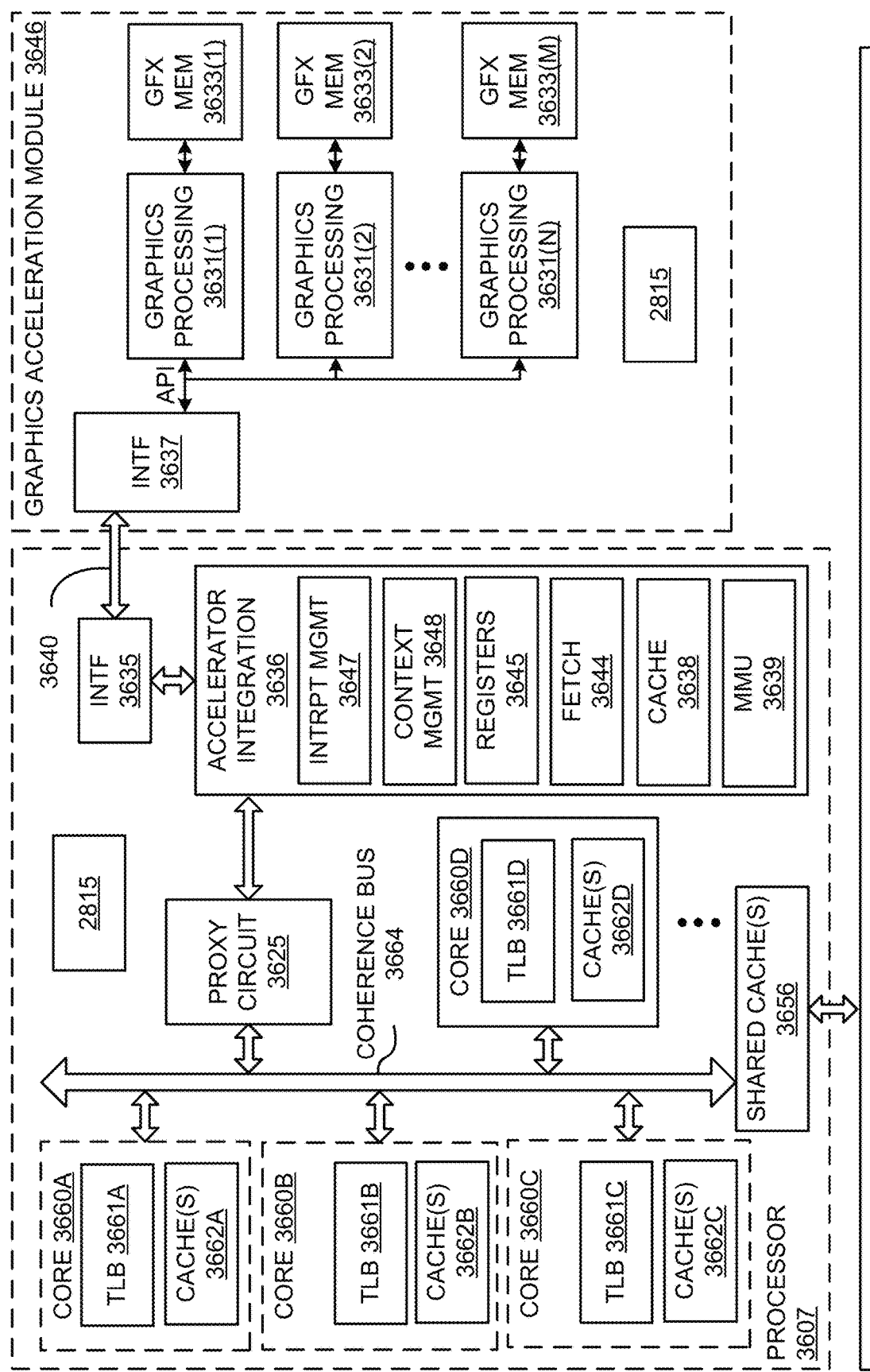
Figure 36:
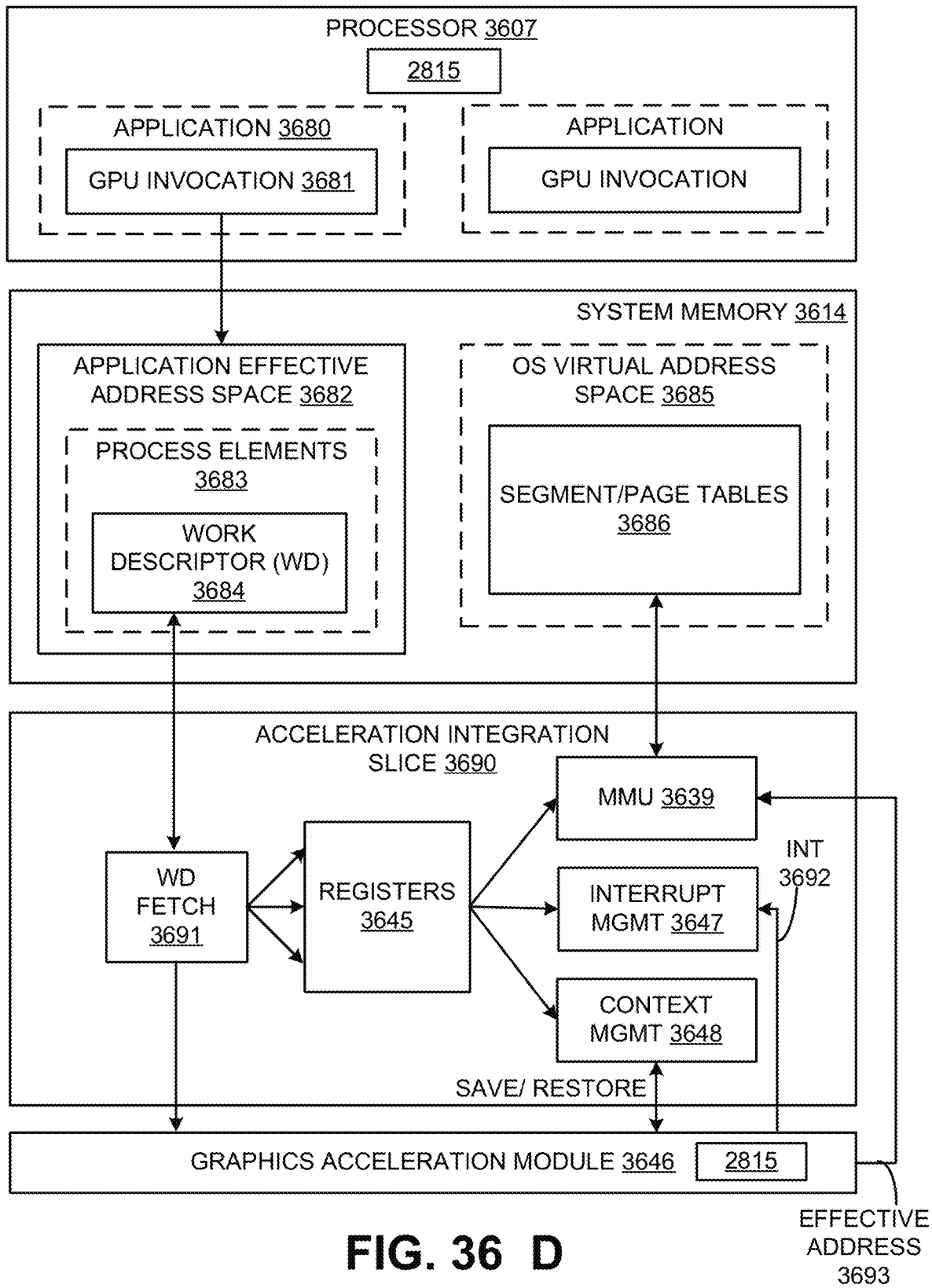
Figure 36:
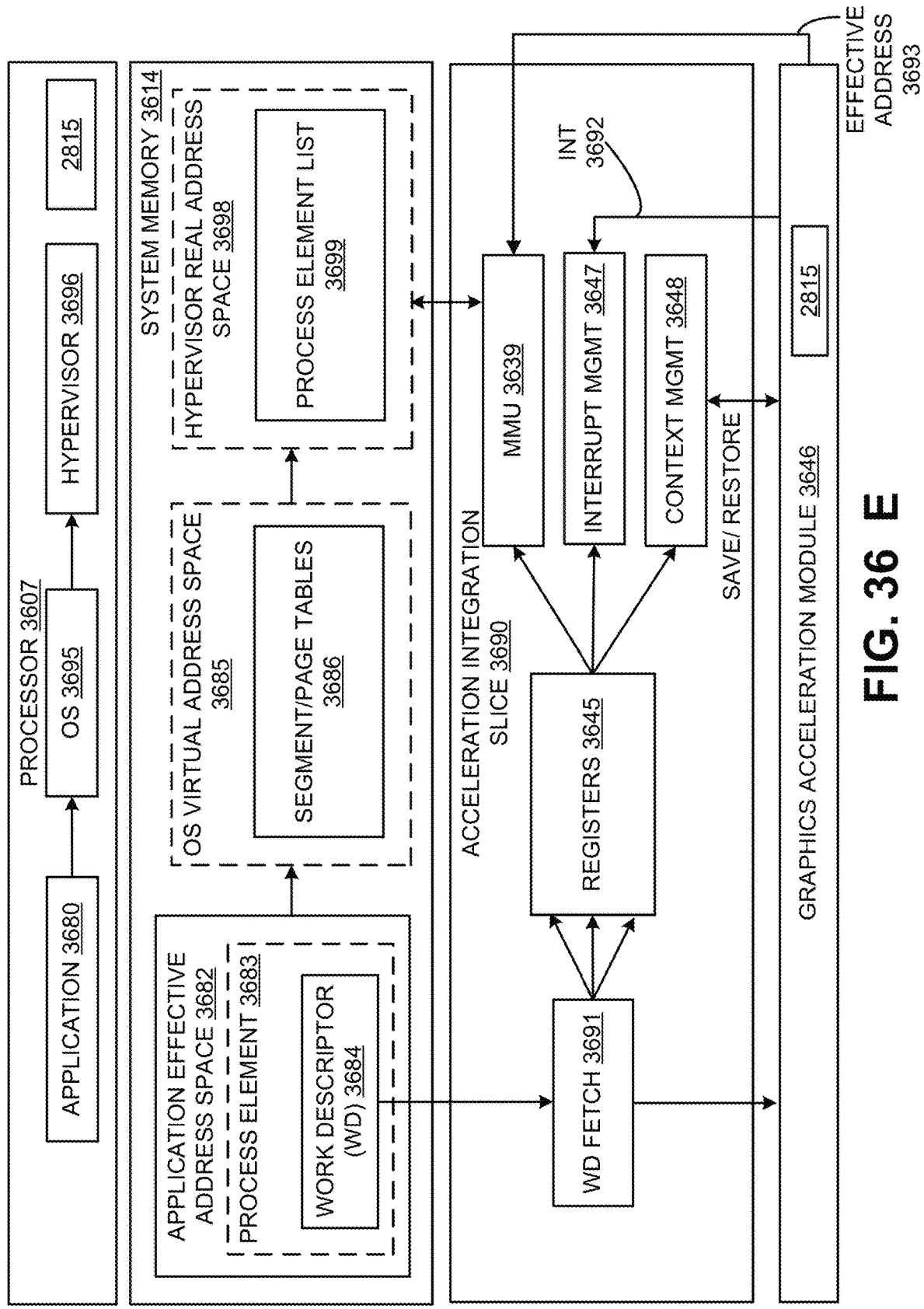
Figure 36:
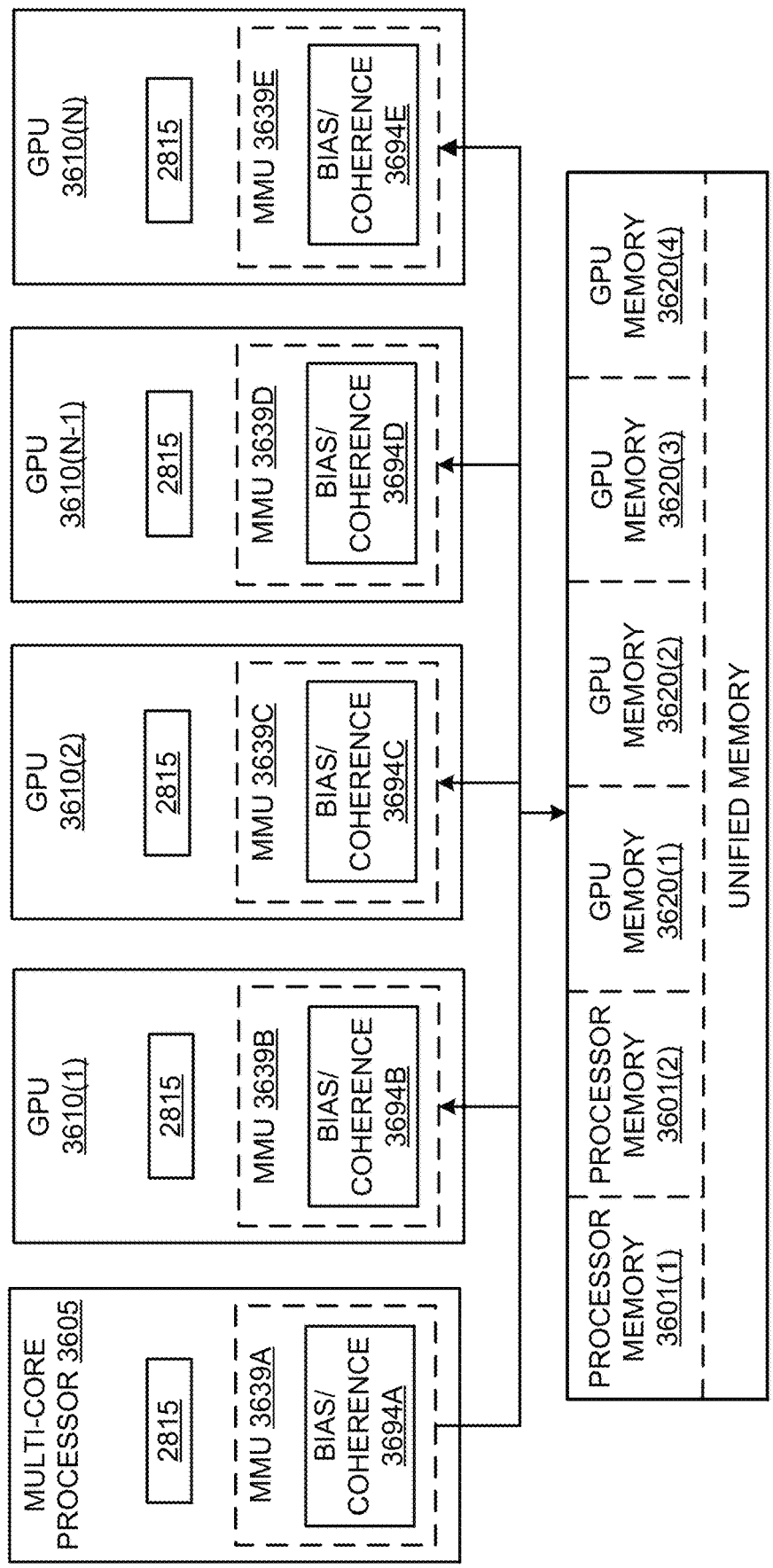

FIG. 36A illustrates an exemplary architecture in which a plurality of GPUs 3610(1)-3610(N) is communicatively coupled to a plurality of multi-core processors 3605(1)-3605(M) over high-speed links 3640(1)-3640(N) (e.g., buses, point-to-point interconnects, etc.). In at least one embodiment, high-speed links 3640(1)-3640(N) support a communication throughput of 4 GB/s, 30 GB/s, 80 GB/s or higher. In at least one embodiment, various interconnect protocols may be used including, but not limited to, PCIe 4.0 or 5.0 and NVLink 2.0. In various figures, "N" and "M" represent positive integers, values of which may be different from figure to figure. In at least one embodiment, the plurality of GPUs 3610(1)-3610(N) can individually or in combination implement process 100 or process 106 (see FIG. 1B).

In addition, and in at least one embodiment, two or more of GPUs 3610 are interconnected over high-speed links 3629(1)-3629(2), which may be implemented using similar or different protocols/links than those used for high-speed links 3640(1)-3640(N). Similarly, two or more of multi-core processors 3605 may be connected over a high-speed link 3628 which may be symmetric multi-processor (SMP) buses operating at 20 GB/s, 30 GB/s, 120 GB/s or higher. Alternatively, all communication between various system components shown in FIG. 36A may be accomplished using similar protocols/links (e.g., over a common interconnection fabric).

In at least one embodiment, each multi-core processor 3605 is communicatively coupled to a processor memory 3601(1)-3601(M), via memory interconnects 3626(1)-3626(M), respectively, and each GPU 3610(1)-3610(N) is communicatively coupled to GPU memory 3620(1)-3620(N) over GPU memory interconnects 3650(1)-3650(N), respectively. In at least one embodiment, memory interconnects 3626 and 3650 may utilize similar or different memory access technologies. By way of example, and not limitation, processor memories 3601(1)-3601(M) and GPU memories 3620 may be volatile memories such as dynamic random access memories (DRAMs) (including stacked DRAMs), Graphics DDR SDRAM (GDDR) (e.g., GDDR5, GDDR6), or High Bandwidth Memory (HBM) and/or may be non-volatile memories such as 3D XPoint or Nano-Ram. In at least one embodiment, some portion of processor memories 3601 may be volatile memory and another portion may be non-volatile memory (e.g., using a two-level memory (2LM) hierarchy).

As described herein, although various multi-core processors 3605 and GPUs 3610 may be physically coupled to a particular memory 3601, 3620, respectively, and/or a unified memory architecture may be implemented in which a virtual system address space (also referred to as "effective address" space) is distributed among various physical memories. For example, processor memories 3601(1)-3601(M) may each comprise 64 GB of system memory address space and GPU memories 3620(1)-3620(N) may each comprise 32 GB of system memory address space resulting in a total of 256 GB addressable memory when M=2 and N=4. Other values for N and M are possible.

FIG. 36B illustrates additional details for an interconnection between a multi-core processor 3607 and a graphics acceleration module 3646 in accordance with one exemplary embodiment. In at least one embodiment, graphics acceleration module 3646 may include one or more GPU chips integrated on a line card which is coupled to processor 3607 via high-speed link 3640 (e.g., a PCIe bus, NVLink, etc.). In at least one embodiment, graphics acceleration module 3646 may alternatively be integrated on a package or chip with processor 3607.

In at least one embodiment, processor 3607 includes a plurality of cores 3660A-3660D, each with a translation lookaside buffer ("TLB") 3661A-3661D and one or more caches 3662A-3662D. In at least one embodiment, cores 3660A-3660D may include various other components for executing instructions and processing data that are not illustrated. In at least one embodiment, caches 3662A-3662D may comprise Level 1 (L1) and Level 2 (L2) caches. In addition, one or more shared caches 3656 may be included in caches 3662A-3662D and shared by sets of cores 3660A-3660D. For example, one embodiment of processor 3607 includes 24 cores, each with its own L1 cache, twelve shared L2 caches, and twelve shared L3 caches. In this embodiment, one or more L2 and L3 caches are shared by two adjacent cores. In at least one embodiment, processor 3607 and graphics acceleration module 3646 connect with system memory 3614, which may include processor memories 3601(1)-3601(M) of FIG. 36A.

In at least one embodiment, coherency is maintained for data and instructions stored in various caches 3662A-3662D, 3656 and system memory 3614 via inter-core communication over a coherence bus 3664. In at least one embodiment, for example, each cache may have cache coherency logic/circuitry associated therewith to communicate to over coherence bus 3664 in response to detected reads or writes to particular cache lines. In at least one embodiment, a cache snooping protocol is implemented over coherence bus 3664 to snoop cache accesses.

In at least one embodiment, a proxy circuit 3625 communicatively couples graphics acceleration module 3646 to coherence bus 3664, allowing graphics acceleration module 3646 to participate in a cache coherence protocol as a peer of cores 3660A-3660D. In particular, in at least one embodiment, an interface 3635 provides connectivity to proxy circuit 3625 over high-speed link 3640 and an interface 3637 connects graphics acceleration module 3646 to high-speed link 3640.

In at least one embodiment, an accelerator integration circuit 3636 provides cache management, memory access, context management, and interrupt management services on behalf of a plurality of graphics processing engines 3631(1)-3631(N) of graphics acceleration module 3646. In at least one embodiment, graphics processing engines 3631(1)-3631(N) may each comprise a separate graphics processing unit (GPU). In at least one embodiment, graphics processing engines 3631(1)-3631(N) alternatively may comprise different types of graphics processing engines within a GPU, such as graphics execution units, media processing engines (e.g., video encoders/decoders), samplers, and blit engines. In at least one embodiment, graphics acceleration module 3646 may be a GPU with a plurality of graphics processing engines 3631(1)-3631(N) or graphics processing engines 3631(1)-3631(N) may be individual GPUs integrated on a common package, line card, or chip.

In at least one embodiment, accelerator integration circuit 3636 includes a memory management unit (MMU) 3639 for performing various memory management functions such as virtual-to-physical memory translations (also referred to as effective-to-real memory translations) and memory access protocols for accessing system memory 3614. In at least one embodiment, MMU 3639 may also include a translation lookaside buffer (TLB) (not shown) for caching virtual/effective to physical/real address translations. In at least one embodiment, a cache 3638 can store commands and data for efficient access by graphics processing engines 3631(1)-3631(N). In at least one embodiment, data stored in cache 3638 and graphics memories 3633(1)-3633(M) is kept coherent with core caches 3662A-3662D, 3656 and system memory 3614, possibly using a fetch unit 3644. As mentioned, this may be accomplished via proxy circuit 3625 on behalf of cache 3638 and memories 3633(1)-3633(M) (e.g., sending updates to cache 3638 related to modifications/accesses of cache lines on processor caches 3662A-3662D, 3656 and receiving updates from cache 3638).

In at least one embodiment, a set of registers 3645 store context data for threads executed by graphics processing engines 3631(1)-3631(N) and a context management circuit 3648 manages thread contexts. For example, context management circuit 3648 may perform save and restore operations to save and restore contexts of various threads during contexts switches (e.g., where a first thread is saved and a second thread is stored so that a second thread can be execute by a graphics processing engine). For example, on a context switch, context management circuit 3648 may store current register values to a designated region in memory (e.g., identified by a context pointer). It may then restore register values when returning to a context. In at least one embodiment, an interrupt management circuit 3647 receives and processes interrupts received from system devices.

In at least one embodiment, virtual/effective addresses from a graphics processing engine 3631 are translated to real/physical addresses in system memory 3614 by MMU 3639. In at least one embodiment, accelerator integration circuit 3636 supports multiple (e.g., 4, 8, 16) graphics accelerator modules 3646 and/or other accelerator devices. In at least one embodiment, graphics accelerator module 3646 may be dedicated to a single application executed on processor 3607 or may be shared between multiple applications. In at least one embodiment, a virtualized graphics execution environment is presented in which resources of graphics processing engines 3631(1)-3631(N) are shared with multiple applications or virtual machines (VMs). In at least one embodiment, resources may be subdivided into "slices" which are allocated to different VMs and/or applications based on processing requirements and priorities associated with VMs and/or applications.

In at least one embodiment, accelerator integration circuit 3636 performs as a bridge to a system for graphics acceleration module 3646 and provides address translation and system memory cache services. In addition, in at least one embodiment, accelerator integration circuit 3636 may provide virtualization facilities for a host processor to manage virtualization of graphics processing engines 3631(1)-3631(N), interrupts, and memory management.

In at least one embodiment, because hardware resources of graphics processing engines 3631(1)-3631(N) are mapped explicitly to a real address space seen by host processor 3607, any host processor can address these resources directly using an effective address value. In at least one embodiment, one function of accelerator integration circuit 3636 is physical separation of graphics processing engines 3631(1)-3631(N) so that they appear to a system as independent units.

In at least one embodiment, one or more graphics memories 3633(1)-3633(M) are coupled to each of graphics processing engines 3631(1)-3631(N), respectively and N=M. In at least one embodiment, graphics memories 3633(1)-3633 (M) store instructions and data being processed by each of graphics processing engines 3631(1)-3631(N). In at least one embodiment, graphics memories 3633(1)-3633(M) may be volatile memories such as DRAMs (including stacked DRAMs), GDDR memory (e.g., GDDR5, GDDR6), or HBM, and/or may be non-volatile memories such as 3D XPoint or Nano-Ram.

In at least one embodiment, to reduce data traffic over high-speed link 3640, biasing techniques can be used to ensure that data stored in graphics memories 3633(1)-3633 (M) is data that will be used most frequently by graphics processing engines 3631(1)-3631(N) and preferably not used by cores 3660A-3660D (at least not frequently). Similarly, in at least one embodiment, a biasing mechanism attempts to keep data needed by cores (and preferably not graphics processing engines 3631(1)-3631(N)) within caches 3662A-3662D, 3656 and system memory 3614.

FIG. 36C illustrates another exemplary embodiment in which accelerator integration circuit 3636 is integrated within processor 3607. In this embodiment, graphics processing engines 3631(1)-3631(N) communicate directly over high-speed link 3640 to accelerator integration circuit 3636 via interface 3637 and interface 3635 (which, again, may be any form of bus or interface protocol). In at least one embodiment, accelerator integration circuit 3636 may perform similar operations as those described with respect to FIG. 36B, but potentially at a higher throughput given its close proximity to coherence bus 3664 and caches 3662A-3662D, 3656. In at least one embodiment, an accelerator integration circuit supports different programming models including a dedicated-process programming model (no graphics acceleration module virtualization) and shared programming models (with virtualization), which may include programming models which are controlled by accelerator integration circuit 3636 and programming models which are controlled by graphics acceleration module 3646.

In at least one embodiment, graphics processing engines 3631(1)-3631(N) are dedicated to a single application or process under a single operating system. In at least one embodiment, a single application can funnel other application requests to graphics processing engines 3631(1)-3631 (N), providing virtualization within a VM/partition.

In at least one embodiment, graphics processing engines 3631(1)-3631(N), may be shared by multiple VM/application partitions. In at least one embodiment, shared models may use a system hypervisor to virtualize graphics processing engines 3631(1)-3631(N) to allow access by each operating system. In at least one embodiment, for single-partition systems without a hypervisor, graphics processing engines 3631(1)-3631(N) are owned by an operating system. In at least one embodiment, an operating system can virtualize graphics processing engines 3631(1)-3631(N) to provide access to each process or application.

In at least one embodiment, graphics acceleration module 3646 or an individual graphics processing engine 3631(1)-3631(N) selects a process element using a process handle. In at least one embodiment, process elements are stored in system memory 3614 and are addressable using an effective address to real address translation technique described herein. In at least one embodiment, a process handle may be an implementation-specific value provided to a host process when registering its context with graphics processing engine 3631(1)-3631(N) (that is, calling system software to add a process element to a process element linked list). In at least one embodiment, a lower 16-bits of a process handle may be an offset of a process element within a process element linked list.

FIG. 36D illustrates an exemplary accelerator integration slice 3690. In at least one embodiment, a "slice" comprises a specified portion of processing resources of accelerator integration circuit 3636. In at least one embodiment, the slice accelerator integration slice 3690 implements process 100 or process 106 (see FIG. 1B). In at least one embodiment, an application is effective address space 3682 within system memory 3614 stores process elements 3683. In at least one embodiment, process elements 3683 are stored in response to GPU invocations 3681 from applications 3680 executed on processor 3607. In at least one embodiment, a process element 3683 contains process state for corresponding application 3680. In at least one embodiment, a work descriptor (WD) 3684 contained in process element 3683 can be a single job requested by an application or may contain a pointer to a queue of jobs. In at least one embodiment, WD 3684 is a pointer to a job request queue in an application's effective address space 3682.

In at least one embodiment, graphics acceleration module 3646 and/or individual graphics processing engines 3631 (1)-3631(N) can be shared by all or a subset of processes in a system. In at least one embodiment, an infrastructure for setting up process states and sending a WD 3684 to a graphics acceleration module 3646 to start a job in a virtualized environment may be included.

In at least one embodiment, a dedicated-process programming model is implementation-specific. In at least one embodiment, in this model, a single process owns graphics acceleration module 3646 or an individual graphics processing engine 3631. In at least one embodiment, when graphics acceleration module 3646 is owned by a single process, a hypervisor initializes accelerator integration circuit 3636 for an owning partition and an operating system initializes accelerator integration circuit 3636 for an owning process when graphics acceleration module 3646 is assigned.

In at least one embodiment, in operation, a WD fetch unit 3691 in accelerator integration slice 3690 fetches next WD 3684, which includes an indication of work to be done by one or more graphics processing engines of graphics acceleration module 3646. In at least one embodiment, data from WD 3684 may be stored in registers 3645 and used by MMU 3639, interrupt management circuit 3647 and/or context management circuit 3648 as illustrated. For example, one embodiment of MMU 3639 includes segment/page walk circuitry for accessing segment/page tables 3686 within an OS virtual address space 3685. In at least one embodiment, interrupt management circuit 3647 may process interrupt events 3692 received from graphics acceleration module 3646. In at least one embodiment, when performing graphics operations, an effective address 3693 generated by a graphics processing engine 3631(1)-3631(N) is translated to a real address by MMU 3639.

In at least one embodiment, registers 3645 are duplicated for each graphics processing engine 3631(1)-3631(N) and/or graphics acceleration module 3646 and may be initialized by a hypervisor or an operating system. In at least one embodiment, each of these duplicated registers may be included in an accelerator integration slice 3690. Exemplary registers that may be initialized by a hypervisor are shown in Table 1.

TABLE 1

Hypervisor Initialized Registers

| Register # | Description |
| --- | --- |
| 1 | Slice Control Register |
| 2 | Real Address (RA) Scheduled Processes Area Pointer |
| 3 | Authority Mask Override Register |
| 4 | Interrupt Vector Table Entry Offset |
| 5 | Interrupt Vector Table Entry Limit |
| 6 | State Register |
| 7 | Logical Partition ID |
| 8 | Real address (RA) Hypervisor Accelerator Utilization Record Pointer |
| 9 | Storage Description Register |

Exemplary registers that may be initialized by an operating system are shown in Table 2.

TABLE 2

Operating System Initialized Registers

| Register # | Description |
| --- | --- |
| 1 | Process and Thread Identification |
| 2 | Effective Address (EA) Context Save/Restore Pointer |
| 3 | Virtual Address (VA) Accelerator Utilization Record Pointer |
| 4 | Virtual Address (VA) Storage Segment Table Pointer |
| 5 | Authority Mask |
| 6 | Work descriptor |

In at least one embodiment, each WD 3684 is specific to a particular graphics acceleration module 3646 and/or graphics processing engines 3631(1)-3631(N). In at least one embodiment, it contains all information required by a graphics processing engine 3631(1)-3631(N) to do work, or it can be a pointer to a memory location where an application has set up a command queue of work to be completed.

FIG. 36E illustrates additional details for one exemplary embodiment of a shared model. This embodiment includes a hypervisor real address space 3698 in which a process element list 3699 is stored. In at least one embodiment, hypervisor real address space 3698 is accessible via a hypervisor 3696 which virtualizes graphics acceleration module engines for operating system 3695.

In at least one embodiment, shared programming models allow for all or a subset of processes from all or a subset of partitions in a system to use a graphics acceleration module 3646. In at least one embodiment, there are two programming models where graphics acceleration module 3646 is shared by multiple processes and partitions, namely time-sliced shared and graphics directed shared.

In at least one embodiment, in this model, system hypervisor 3696 owns graphics acceleration module 3646 and makes its function available to all operating systems 3695. In at least one embodiment, for a graphics acceleration module 3646 to support virtualization by system hypervisor 3696, graphics acceleration module 3646 may adhere to certain requirements, such as (1) an application's job request must be autonomous (that is, state does not need to be maintained between jobs), or graphics acceleration module 3646 must provide a context save and restore mechanism, (2) an application's job request is guaranteed by graphics acceleration module 3646 to complete in a specified amount of time, including any translation faults, or graphics acceleration module 3646 provides an ability to preempt processing of a job, and (3) graphics acceleration module 3646 must be guaranteed fairness between processes when operating in a directed shared programming model.

In at least one embodiment, application 3680 is required to make an operating system 3695 system call with a graphics acceleration module type, a work descriptor (WD), an authority mask register (AMR) value, and a context save/restore area pointer (CSRP). In at least one embodiment, graphics acceleration module type describes a targeted acceleration function for a system call. In at least one embodiment, graphics acceleration module type may be a system-specific value. In at least one embodiment, WD is formatted specifically for graphics acceleration module 3646 and can be in a form of a graphics acceleration module 3646 command, an effective address pointer to a user-defined structure, an effective address pointer to a queue of commands, or any other data structure to describe work to be done by graphics acceleration module 3646.

In at least one embodiment, an AMR value is an AMR state to use for a current process. In at least one embodiment, a value passed to an operating system is similar to an application setting an AMR. In at least one embodiment, if accelerator integration circuit 3636 (not shown) and graphics acceleration module 3646 implementations do not support a User Authority Mask Override Register (UAMOR), an operating system may apply a current UAMOR value to an AMR value before passing an AMR in a hypervisor call. In at least one embodiment, hypervisor 3696 may optionally apply a current Authority Mask Override Register (AMOR) value before placing an AMR into process element 3683. In at least one embodiment, CSRP is one of registers 3645 containing an effective address of an area in an application's effective address space 3682 for graphics acceleration module 3646 to save and restore context state. In at least one embodiment, this pointer is optional if no state is required to be saved between jobs or when a job is preempted. In at least one embodiment, context save/restore area may be pinned system memory.

Upon receiving a system call, operating system 3695 may verify that application 3680 has registered and been given authority to use graphics acceleration module 3646. In at least one embodiment, operating system 3695 then calls hypervisor 3696 with information shown in Table 3.

TABLE 3

OS to Hypervisor Call Parameters

| Parameter # | Description |
| --- | --- |
| 1 | A work descriptor (WD) |
| 2 | An Authority Mask Register (AMR) value (potentially masked) |
| 3 | An effective address (EA) Context Save/Restore Area Pointer (CSRP) |
| 4 | A process ID (PID) and optional thread ID (TID) |
| 5 | A virtual address (VA) accelerator utilization record pointer (AURP) |
| 6 | Virtual address of storage segment table pointer (SSTP) |
| 7 | A logical interrupt service number (LISN) |

In at least one embodiment, upon receiving a hypervisor call, hypervisor 3696 verifies that operating system 3695 has registered and been given authority to use graphics acceleration module 3646. In at least one embodiment, hypervisor 3696 then puts process element 3683 into a process element linked list for a corresponding graphics acceleration module 3646 type. In at least one embodiment, a process element may include information shown in Table 4.

TABLE 4

Process Element Information

| Element # | Description |
|---|---|
| 1 | A work descriptor (WD) |
| 2 | An Authority Mask Register (AMR) value (potentially masked). |
| 3 | An effective address (EA) Context Save/Restore Area Pointer (CSRP) |
| 4 | A process ID (PID) and optional thread ID (TID) |
| 5 | A virtual address (VA) accelerator utilization record pointer (AURP) |
| 6 | Virtual address of storage segment table pointer (SSTP) |
| 7 | A logical interrupt service number (LISN) |
| 8 | Interrupt vector table, derived from hypervisor call parameters |
| 9 | A state register (SR) value |
| 10 | A logical partition ID (LPID) |
| 11 | A real address (RA) hypervisor accelerator utilization record pointer |
| 12 | Storage Descriptor Register (SDR) |

In at least one embodiment, hypervisor initializes a plurality of accelerator integration slice 3690 registers 3645.

As illustrated in FIG. 36F, in at least one embodiment, a unified memory is used, addressable via a common virtual memory address space used to access physical processor memories 3601(1)-3601(N) and GPU memories 3620(1)-3620(N). In this implementation, operations executed on GPUs 3610(1)-3610(N) utilize a same virtual/effective memory address space to access processor memories 3601(1)-3601(M) and vice versa, thereby simplifying programmability. In at least one embodiment, a first portion of a virtual/effective address space is allocated to processor memory 3601(1), a second portion to second processor memory 3601(N), a third portion to GPU memory 3620(1), and so on. In at least one embodiment, an entire virtual/effective memory space (sometimes referred to as an effective address space) is thereby distributed across each of processor memories 3601 and GPU memories 3620, allowing any processor or GPU to access any physical memory with a virtual address mapped to that memory.

In at least one embodiment, bias/coherence management circuitry 3694A-3694E within one or more of MMUs 3639A-3639E ensures cache coherence between caches of one or more host processors (e.g., 3605) and GPUs 3610 and implements biasing techniques indicating physical memories in which certain types of data should be stored. In at least one embodiment, while multiple instances of bias/coherence management circuitry 3694A-3694E are illustrated in FIG. 36F, bias/coherence circuitry may be implemented within an MMU of one or more host processors 3605 and/or within accelerator integration circuit 3636.

One embodiment allows GPU memories 3620 to be mapped as part of system memory, and accessed using shared virtual memory (SVM) technology, but without suffering performance drawbacks associated with full system cache coherence. In at least one embodiment, an ability for GPU memories 3620 to be accessed as system memory without onerous cache coherence overhead provides a beneficial operating environment for GPU offload. In at least one embodiment, this arrangement allows software of host processor 3605 to setup operands and access computation results, without overhead of tradition I/O DMA data copies. In at least one embodiment, such traditional copies involve driver calls, interrupts and memory mapped I/O (MMIO) accesses that are all inefficient relative to simple memory accesses. In at least one embodiment, an ability to access GPU memories 3620 without cache coherence overheads can be critical to execution time of an offloaded computation. In at least one embodiment, in cases with substantial streaming write memory traffic, for example, cache coherence overhead can significantly reduce an effective write bandwidth seen by a GPU 3610. In at least one embodiment, efficiency of operand setup, efficiency of results access, and efficiency of GPU computation may play a role in determining effectiveness of a GPU offload.

In at least one embodiment, selection of GPU bias and host processor bias is driven by a bias tracker data structure. In at least one embodiment, a bias table may be used, for example, which may be a page-granular structure (e.g., controlled at a granularity of a memory page) that includes 1 or 2 bits per GPU-attached memory page. In at least one embodiment, a bias table may be implemented in a stolen memory range of one or more GPU memories 3620, with or without a bias cache in a GPU 3610 (e.g., to cache frequently/recently used entries of a bias table). Alternatively, in at least one embodiment, an entire bias table may be maintained within a GPU.

In at least one embodiment, a bias table entry associated with each access to a GPU attached memory 3620 is accessed prior to actual access to a GPU memory, causing following operations. In at least one embodiment, local requests from a GPU 3610 that find their page in GPU bias are forwarded directly to a corresponding GPU memory 3620. In at least one embodiment, local requests from a GPU that find their page in host bias are forwarded to processor 3605 (e.g., over a high-speed link as described herein). In at least one embodiment, requests from processor 3605 that find a requested page in host processor bias complete a request like a normal memory read. Alternatively, requests directed to a GPU-biased page may be forwarded to a GPU 3610. In at least one embodiment, a GPU may then transition a page to a host processor bias if it is not currently using a page. In at least one embodiment, a bias state of a page can be changed either by a software-based mechanism, a hardware-assisted software-based mechanism, or, for a limited set of cases, a purely hardware-based mechanism.

In at least one embodiment, one mechanism for changing bias state employs an API call (e.g., OpenCL), which, in turn, calls a GPU's device driver which, in turn, sends a message (or enqueues a command descriptor) to a GPU directing it to change a bias state and, for some transitions, perform a cache flushing operation in a host. In at least one embodiment, a cache flushing operation is used for a transition from host processor 3605 bias to GPU bias, but is not for an opposite transition.

In at least one embodiment, cache coherency is maintained by temporarily rendering GPU-biased pages uncacheable by host processor 3605. In at least one embodiment, to access these pages, processor 3605 may request access from GPU 3610, which may or may not grant access right away. In at least one embodiment, thus, to reduce communication between processor 3605 and GPU 3610 it is beneficial to ensure that GPU-biased pages are those which are required by a GPU but not host processor 3605 and vice versa.

Figure 37:
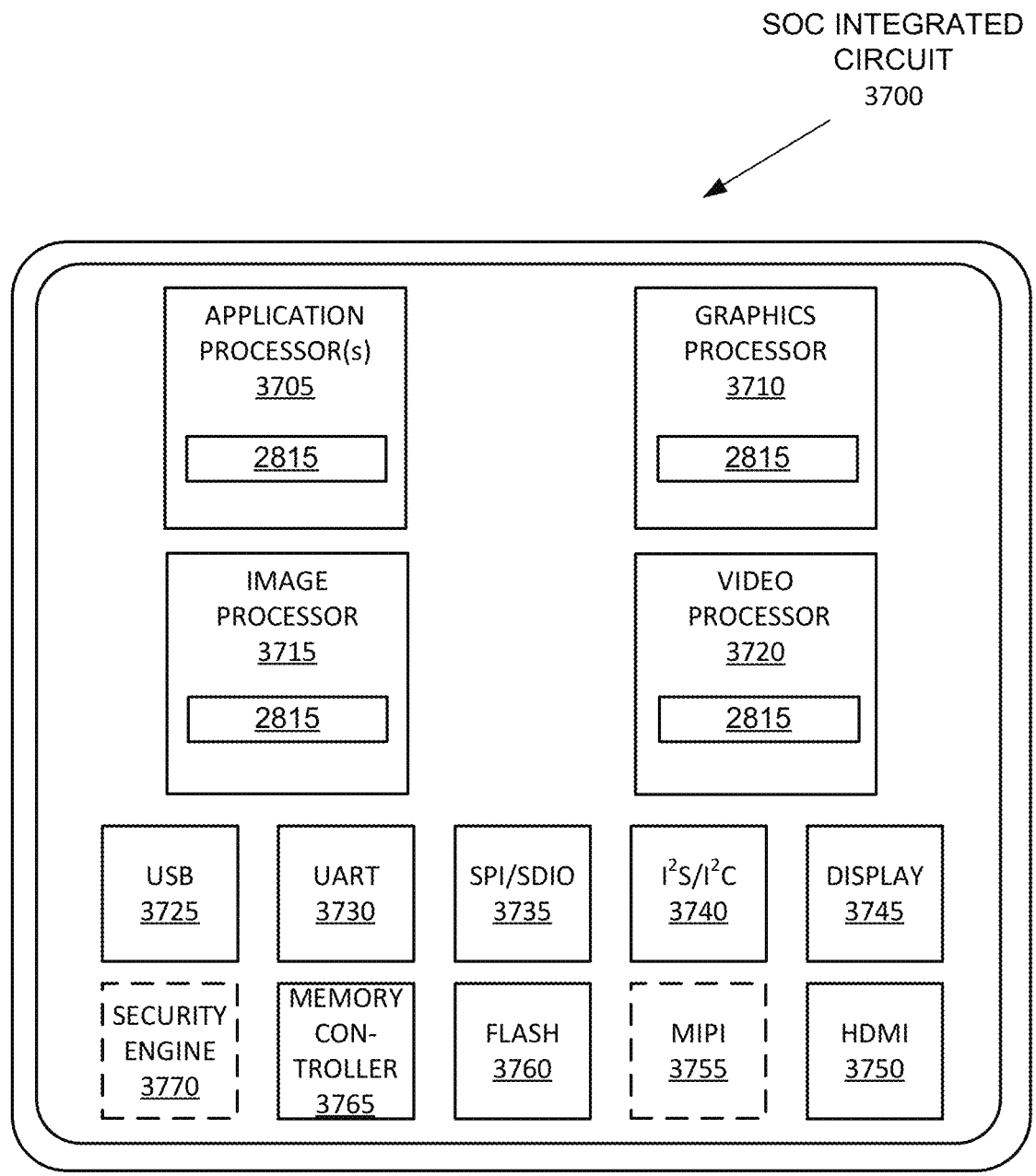
FIG. 37 illustrates exemplary integrated circuits and associated graphics processors, according to at least one embodiment.

FIG. 37 illustrates exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIG. 37 is a block diagram illustrating an exemplary system on a chip integrated circuit 3700 that may be fabricated using one or more IP cores, according to at least one embodiment. In at least one embodiment, integrated circuit 3700 includes one or more application processor(s) 3705 (e.g., CPUs), at least one graphics processor 3710, and may additionally include an image processor 3715 and/or a video processor 3720, any of which may be a modular IP core. In at least one embodiment, integrated circuit 3700 includes peripheral or bus logic including a USB controller 3725, a UART controller 3730, an SPI/SDIO controller 3735, and an $I^2S/I^2C$ controller 3740. In at least one embodiment, integrated circuit 3700 can include a display device 3745 coupled to one or more of a high-definition multimedia interface (HDMI) controller 3750 and a mobile industry processor interface (MIPI) display interface 3755. In at least one embodiment, storage may be provided by a flash memory subsystem 3760 including flash memory and a flash memory controller. In at least one embodiment, a memory interface may be provided via a memory controller 3765 for access to SDRAM or SRAM memory devices. In at least one embodiment, some integrated circuits additionally include an embedded security engine 3770.

Inference and/or training logic 2815 are used to perform inferencing and/or training operations associated with one or more embodiments. Details regarding inference and/or training logic 2815 are provided herein in conjunction with FIGS. 28A and/or 28B. In at least one embodiment, inference and/or training logic 2815 may be used in integrated circuit 3700 for inferencing or predicting operations based, at least in part, on weight parameters calculated using neural network training operations, neural network functions and/or architectures, or neural network use cases described herein.

In at least one embodiment, one or more systems depicted in FIGS. 28A and 28B are utilized to implement a framework for image processing (e.g., real-time image rendering and enhancement). In at least one embodiment, one or more systems depicted in FIGS. 28A and 28B are utilized to perform various processes such as those described in connection with FIGS. 1-27. In at least one embodiment, one or more systems depicted in FIGS. 28A and 28B are utilized to generate and apply blue noise masks to images that are able to handle the temporal domain, i.e., adding time to the spatial (image) domain to improve image quality when rendering images over multiple frames (e.g., time).

Figure 38A:
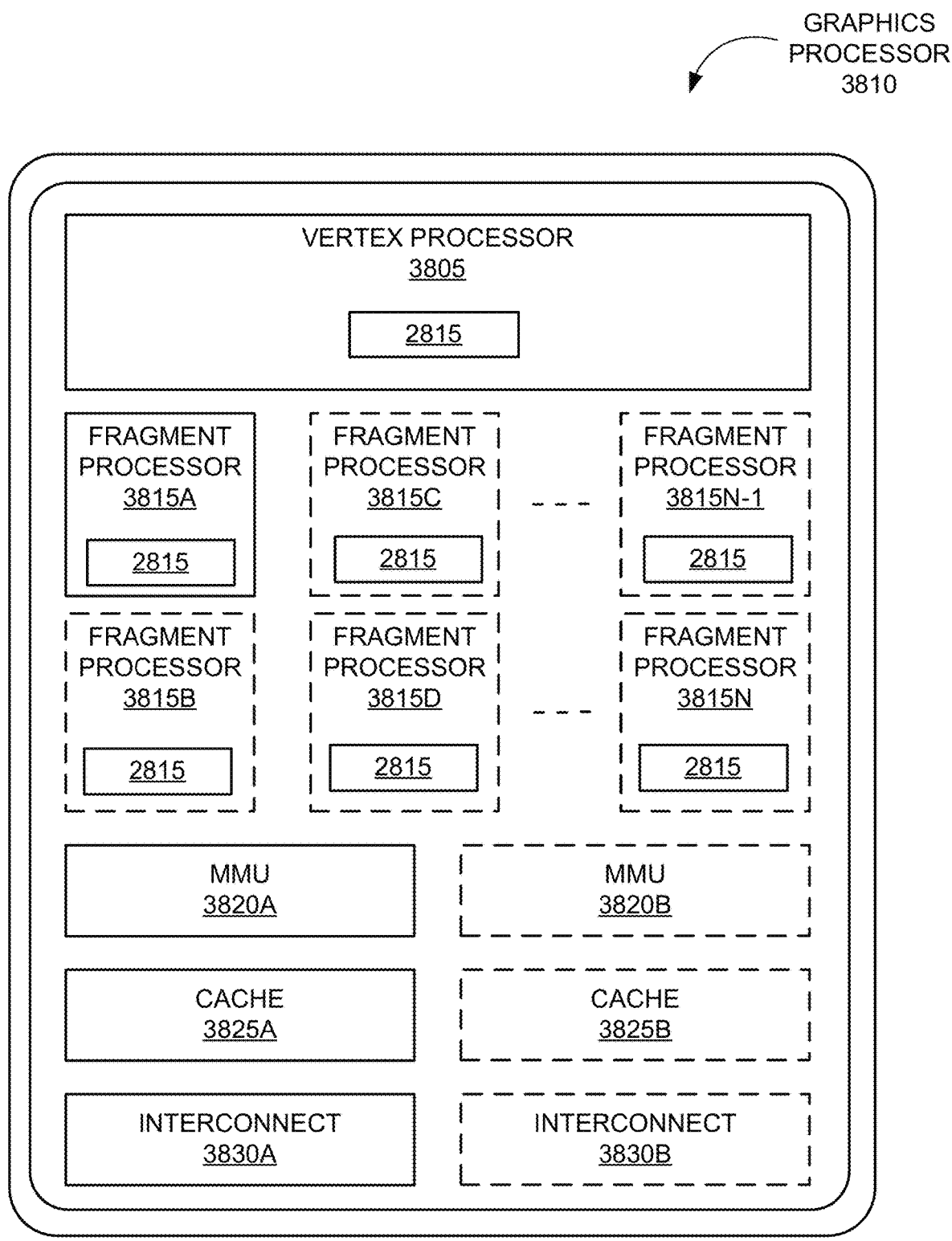
FIGS. 38A and 38B illustrate exemplary integrated circuits and associated graphics processors, according to at least one embodiment.
Figure 38B:
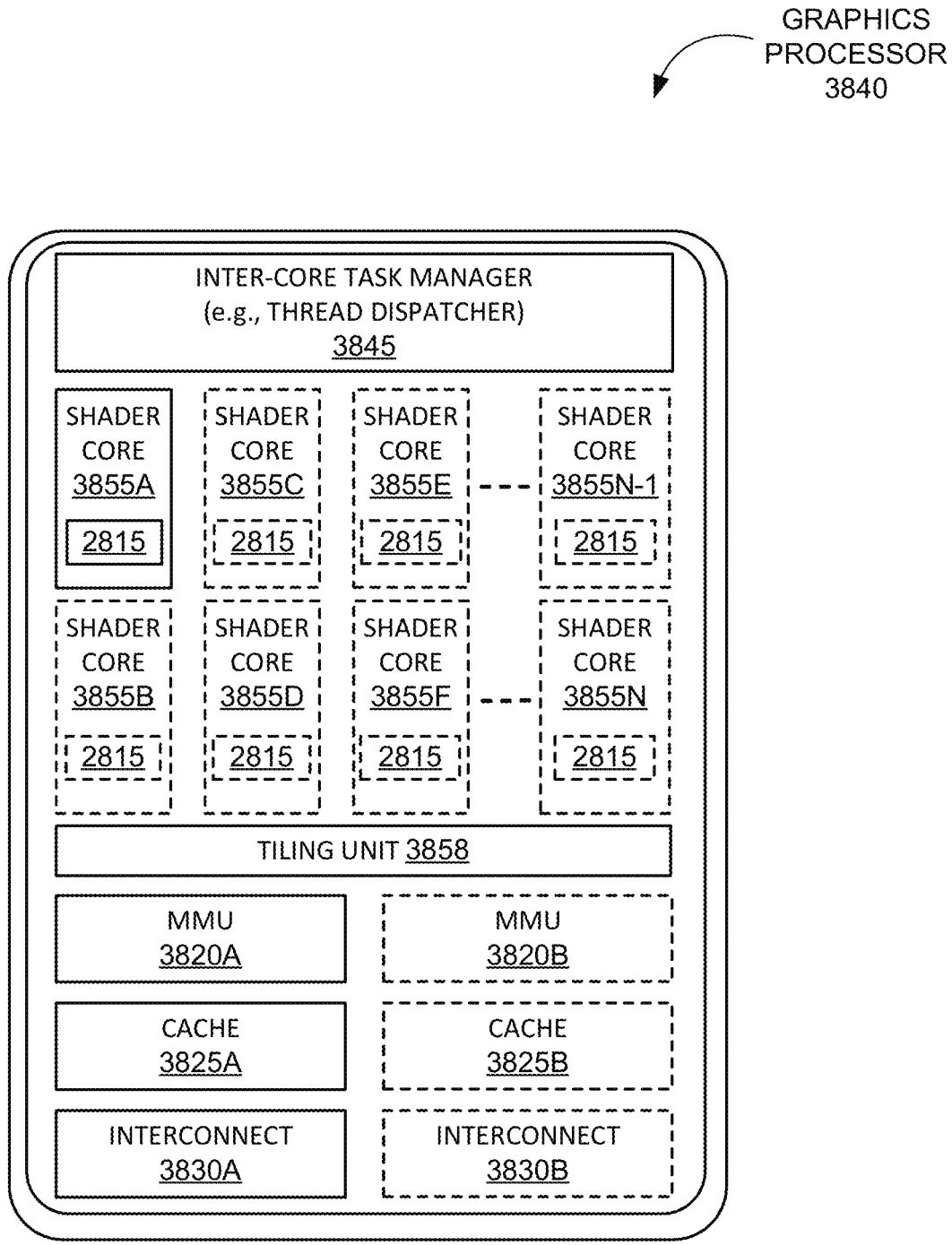

FIGS. 38A and 38B illustrate exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIGS. 38A and 38B are block diagrams illustrating exemplary graphics processors for use within an SoC, according to embodiments described herein. FIG. 38A illustrates an exemplary graphics processor 3810 of a system on a chip integrated circuit that may be fabricated using one or more IP cores, according to at least one embodiment. FIG. 38B illustrates an additional exemplary graphics processor 3840 of a system on a chip integrated circuit that may be fabricated using one or more IP cores, according to at least one embodiment. In at least one embodiment, graphics processor 3810 of FIG. 38A is a low power graphics processor core. In at least one embodiment, graphics processor 3840 of FIG. 38B is a higher performance graphics processor core. In at least one embodiment, each of graphics processors 3810, 3840 can be variants of graphics processor 3710 of FIG. 37. In at least one embodiment, graphics processor 3810 implements process 100 and/or process 106 (see FIG. 1B).

In at least one embodiment, graphics processor 3810 includes a vertex processor 3805 and one or more fragment processor(s) 3815A-3815N (e.g., 3815A, 3815B, 3815C, 3815D, through 3815N-1, and 3815N). In at least one embodiment, graphics processor 3810 can execute different shader programs via separate logic, such that vertex processor 3805 is optimized to execute operations for vertex shader programs, while one or more fragment processor(s) 3815A-3815N execute fragment (e.g., pixel) shading operations for fragment or pixel shader programs. In at least one embodiment, vertex processor 3805 performs a vertex processing stage of a 3D graphics pipeline and generates primitives and vertex data. In at least one embodiment, fragment processor(s) 3815A-3815N use primitive and vertex data generated by vertex processor 3805 to produce a framebuffer that is displayed on a display device. In at least one embodiment, fragment processor(s) 3815A-3815N are optimized to execute fragment shader programs as provided for in an OpenGL API, which may be used to perform similar operations as a pixel shader program as provided for in a Direct 3D API.

In at least one embodiment, graphics processor 3810 additionally includes one or more memory management units (MMUs) 3820A-3820B, cache(s) 3825A-3825B, and circuit interconnect(s) 3830A-3830B. In at least one embodiment, one or more MMU(s) 3820A-3820B provide for virtual to physical address mapping for graphics processor 3810, including for vertex processor 3805 and/or fragment processor(s) 3815A-3815N, which may reference vertex or image/texture data stored in memory, in addition to vertex or image/texture data stored in one or more cache(s) 3825A-3825B. In at least one embodiment, one or more MMU(s) 3820A-3820B may be synchronized with other MMUs within a system, including one or more MMUs associated with one or more application processor(s) 3705, image processors 3715, and/or video processors 3720 of FIG. 37, such that each processor 3705-3720 can participate in a shared or unified virtual memory system. In at least one embodiment, one or more circuit interconnect(s) 3830A-3830B enable graphics processor 3810 to interface with other IP cores within SoC, either via an internal bus of SoC or via a direct connection.

In at least one embodiment, graphics processor 3840 includes one or more shader core(s) 3855A-3855N (e.g., 3855A, 3855B, 3855C, 3855D, 3855E, 3855F, through 3855N-1, and 3855N) as shown in FIG. 38B, which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 3840 includes an inter-core task manager 3845, which acts as a thread dispatcher to dispatch execution threads to one or more shader cores 3855A-3855N and a tiling unit 3858 to accelerate tiling operations for tile-based rendering, in which rendering operations for a scene are subdivided in image space, for example to exploit local spatial coherence within a scene or to optimize use of internal caches.

Inference and/or training logic 2815 are used to perform inferencing and/or training operations associated with one or more embodiments. Details regarding inference and/or training logic 2815 are provided herein in conjunction with FIGS. 28A and/or 28B. In at least one embodiment, inference and/or training logic 2815 may be used in integrated circuit 38A and/or 38B for inferencing or predicting operations based, at least in part, on weight parameters calculated using neural network training operations, neural network functions and/or architectures, or neural network use cases described herein.

In at least one embodiment, one or more systems depicted in FIGS. 28A and 28B are utilized to implement a framework for image processing (e.g., real-time image rendering and enhancement). In at least one embodiment, one or more systems depicted in FIGS. 28A and 28B are utilized to perform various processes such as those described in connection with FIGS. 1-27. In at least one embodiment, one or more systems depicted in FIGS. 28A and 28B are utilized to generate and apply blue noise masks to images that are able to handle the temporal domain, i.e., adding time to the spatial (image) domain to improve image quality when rendering images over multiple frames (e.g., time).

Figure 39A:
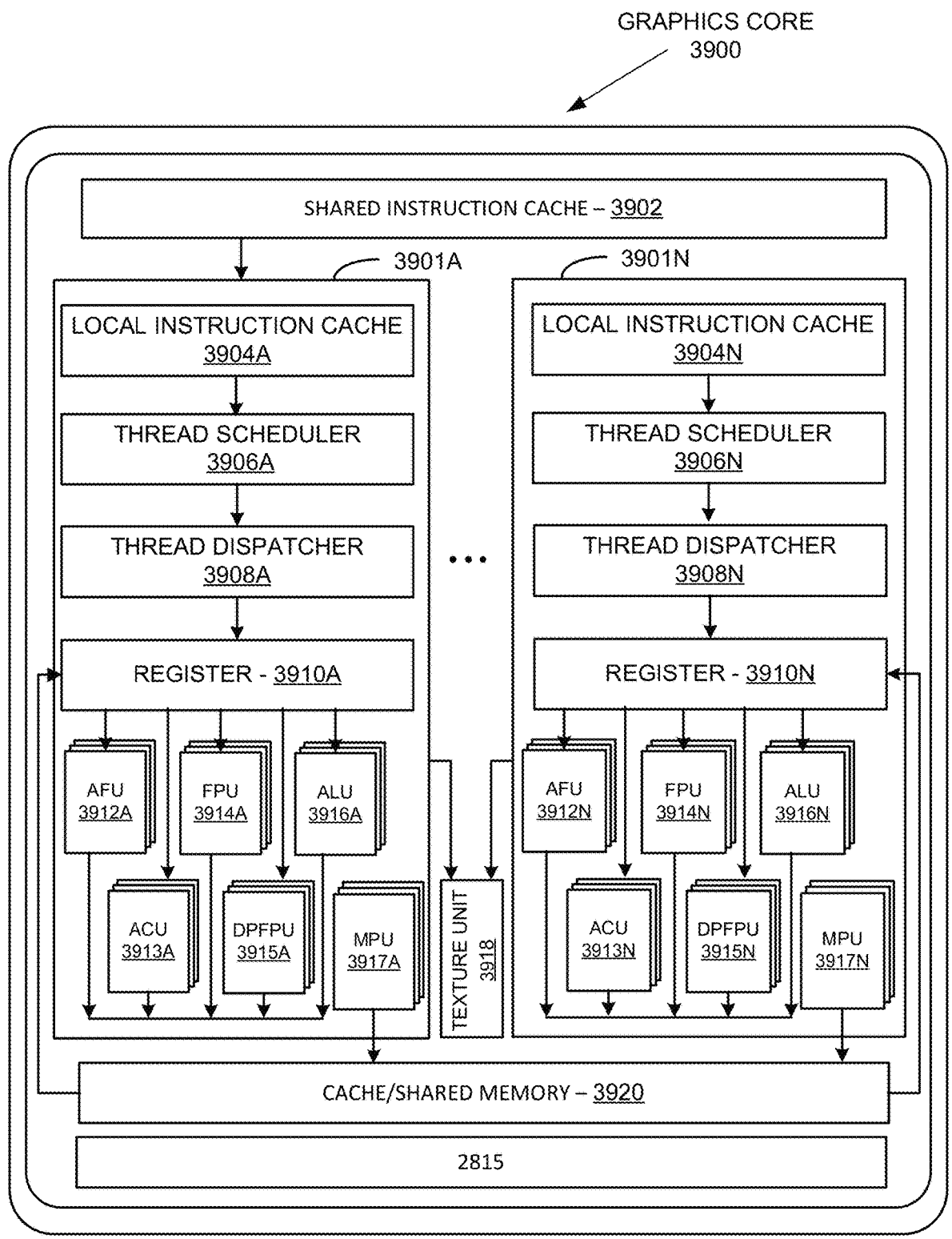
FIGS. 39A and 39B illustrate additional exemplary graphics processor logic, according to at least one embodiment.
Figure 39B:
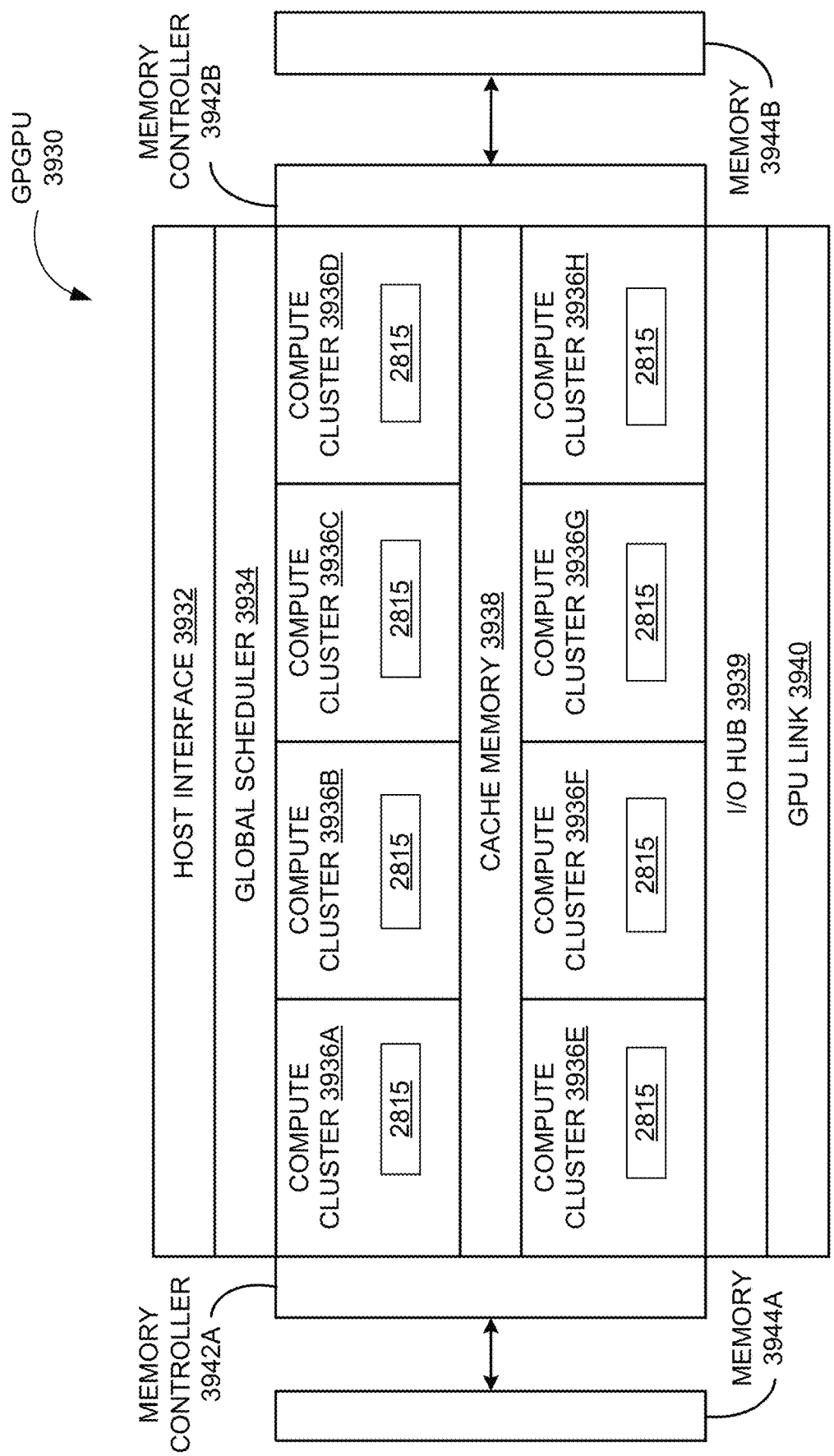

FIGS. 39A and 39B illustrate additional exemplary graphics processor logic according to embodiments described herein. FIG. 39A illustrates a graphics core 3900 that may be included within graphics processor 3710 of FIG. 37, in at least one embodiment, and may be a unified shader core 3855A-3855N as in FIG. 38B in at least one embodiment. FIG. 39B illustrates a highly-parallel general-purpose graphics processing unit ("GPGPU") 3930 suitable for deployment on a multi-chip module in at least one embodiment. In at least one embodiment, graphics core 3900 implements process 100 (FIG. 1A) or process 106 (see FIG. 1B).

In at least one embodiment, graphics core 3900 includes a shared instruction cache 3902, a texture unit 3918, and a cache/shared memory 3920 that are common to execution resources within graphics core 3900. In at least one embodiment, graphics core 3900 can include multiple slices 3901A-3901N or a partition for each core, and a graphics processor can include multiple instances of graphics core 3900. In at least one embodiment, slices 3901A-3901N can include support logic including a local instruction cache 3904A-3904N, a thread scheduler 3906A-3906N, a thread dispatcher 3908A-3908N, and a set of registers 3910A-3910N. In at least one embodiment, slices 3901A-3901N can include a set of additional function units (AFUs 3912A-3912N), floating-point units (FPUs 3914A-3914N), integer arithmetic logic units (ALUs 3916A-3916N), address computational units (ACUs 3913A-3913N), double-precision floating-point units (DPFPUs 3915A-3915N), and matrix processing units (MPUs 3917A-3917N).

In at least one embodiment, FPUs 3914A-3914N can perform single-precision (32-bit) and half-precision (16-bit) floating point operations, while DPFPUs 3915A-3915N perform double precision (64-bit) floating point operations. In at least one embodiment, ALUs 3916A-3916N can perform variable precision integer operations at 8-bit, 16-bit, and 32-bit precision, and can be configured for mixed precision operations. In at least one embodiment, MPUs 3917A-3917N can also be configured for mixed precision matrix operations, including half-precision floating point and 8-bit integer operations. In at least one embodiment, MPUs 3917-3917N can perform a variety of matrix operations to accelerate machine learning application frameworks, including enabling support for accelerated general matrix to matrix multiplication (GEMM). In at least one embodiment, AFUs 3912A-3912N can perform additional logic operations not supported by floating-point or integer units, including trigonometric operations (e.g., sine, cosine, etc.).

Inference and/or training logic 2815 are used to perform inferencing and/or training operations associated with one or more embodiments. Details regarding inference and/or training logic 2815 are provided herein in conjunction with FIGS. 28A and/or 28B. In at least one embodiment, inference and/or training logic 2815 may be used in graphics core 3900 for inferencing or predicting operations based, at least in part, on weight parameters calculated using neural network training operations, neural network functions and/or architectures, or neural network use cases described herein.

In at least one embodiment, one or more systems depicted in FIGS. 28A and 28B are utilized to implement a framework for image processing (e.g., real-time image rendering and enhancement). In at least one embodiment, one or more systems depicted in FIGS. 28A and 28B are utilized to perform various processes such as those described in connection with FIGS. 1-27. In at least one embodiment, one or more systems depicted in FIGS. 28A and 28B are utilized to generate and apply blue noise masks to images that are able to handle the temporal domain, i.e., adding time to the spatial (image) domain to improve image quality when rendering images over multiple frames (e.g., time).

FIG. 39B illustrates a general-purpose processing unit (GPGPU) 3930 that can be configured to enable highly-parallel compute operations to be performed by an array of graphics processing units, in at least one embodiment. In at least one embodiment, GPGPU 3930 can be linked directly to other instances of GPGPU 3930 to create a multi-GPU cluster to improve training speed for deep neural networks. In at least one embodiment, GPGPU 3930 includes a host interface 3932 to enable a connection with a host processor. In at least one embodiment, host interface 3932 is a PCI Express interface. In at least one embodiment, host interface 3932 can be a vendor-specific communications interface or communications fabric. In at least one embodiment, GPGPU 3930 receives commands from a host processor and uses a global scheduler 3934 to distribute execution threads associated with those commands to a set of compute clusters 3936A-3936H. In at least one embodiment, compute clusters 3936A-3936H share a cache memory 3938. In at least one embodiment, cache memory 3938 can serve as a higher-level cache for cache memories within compute clusters 3936A-3936H.

In at least one embodiment, GPGPU 3930 includes memory 3944A-3944B coupled with compute clusters 3936A-3936H via a set of memory controllers 3942A-3942B. In at least one embodiment, memory 3944A-3944B can include various types of memory devices including dynamic random access memory (DRAM) or graphics random access memory, such as synchronous graphics random access memory (SGRAM), including graphics double data rate (GDDR) memory.

In at least one embodiment, compute clusters 3936A-3936H each include a set of graphics cores, such as graphics core 3900 of FIG. 39A, which can include multiple types of integer and floating point logic units that can perform computational operations at a range of precisions including suited for machine learning computations. For example, in at least one embodiment, at least a subset of floating point units in each of compute clusters 3936A-3936H can be configured to perform 16-bit or 32-bit floating point operations, while a different subset of floating point units can be configured to perform 64-bit floating point operations.

In at least one embodiment, multiple instances of GPGPU 3930 can be configured to operate as a compute cluster. In at least one embodiment, communication used by compute clusters 3936A-3936H for synchronization and data exchange varies across embodiments. In at least one embodiment, multiple instances of GPGPU 3930 communicate over host interface 3932. In at least one embodiment, GPGPU 3930 includes an I/O hub 3939 that couples GPGPU 3930 with a GPU link 3940 that enables a direct connection to other instances of GPGPU 3930. In at least one embodiment, GPU link 3940 is coupled to a dedicated GPU-to-GPU bridge that enables communication and synchronization between multiple instances of GPGPU 3930. In at least one embodiment, GPU link 3940 couples with a high-speed interconnect to transmit and receive data to other GPGPUs or parallel processors. In at least one embodiment, multiple instances of GPGPU 3930 are located in separate data processing systems and communicate via a network device that is accessible via host interface 3932. In at least one embodiment GPU link 3940 can be configured to enable a connection to a host processor in addition to or as an alternative to host interface 3932.

In at least one embodiment, GPGPU 3930 can be configured to train neural networks. In at least one embodiment, GPGPU 3930 can be used within an inferencing platform. In at least one embodiment, in which GPGPU 3930 is used for inferencing, GPGPU 3930 may include fewer compute clusters 3936A-3936H relative to when GPGPU 3930 is used for training a neural network. In at least one embodiment, memory technology associated with memory 3944A-3944B may differ between inferencing and training configurations, with higher bandwidth memory technologies devoted to training configurations. In at least one embodiment, an inferencing configuration of GPGPU 3930 can support inferencing specific instructions. For example, in at least one embodiment, an inferencing configuration can provide support for one or more 8-bit integer dot product instructions, which may be used during inferencing operations for deployed neural networks.

Inference and/or training logic 2815 are used to perform inferencing and/or training operations associated with one or more embodiments. Details regarding inference and/or training logic 2815 are provided herein in conjunction with FIGS. 28A and/or 28B. In at least one embodiment, inference and/or training logic 2815 may be used in GPGPU 3930 for inferencing or predicting operations based, at least in part, on weight parameters calculated using neural network training operations, neural network functions and/or architectures, or neural network use cases described herein.

In at least one embodiment, one or more systems depicted in FIGS. 28A and 28B are utilized to implement a framework for image processing (e.g., real-time image rendering and enhancement). In at least one embodiment, one or more systems depicted in FIGS. 28A and 28B are utilized to perform various processes such as those described in connection with FIGS. 1-27. In at least one embodiment, one or more systems depicted in FIGS. 28A and 28B are utilized to generate and apply blue noise masks to images that are able to handle the temporal domain, i.e., adding time to the spatial (image) domain to improve image quality when rendering images over multiple frames (e.g., time).

Figure 40:
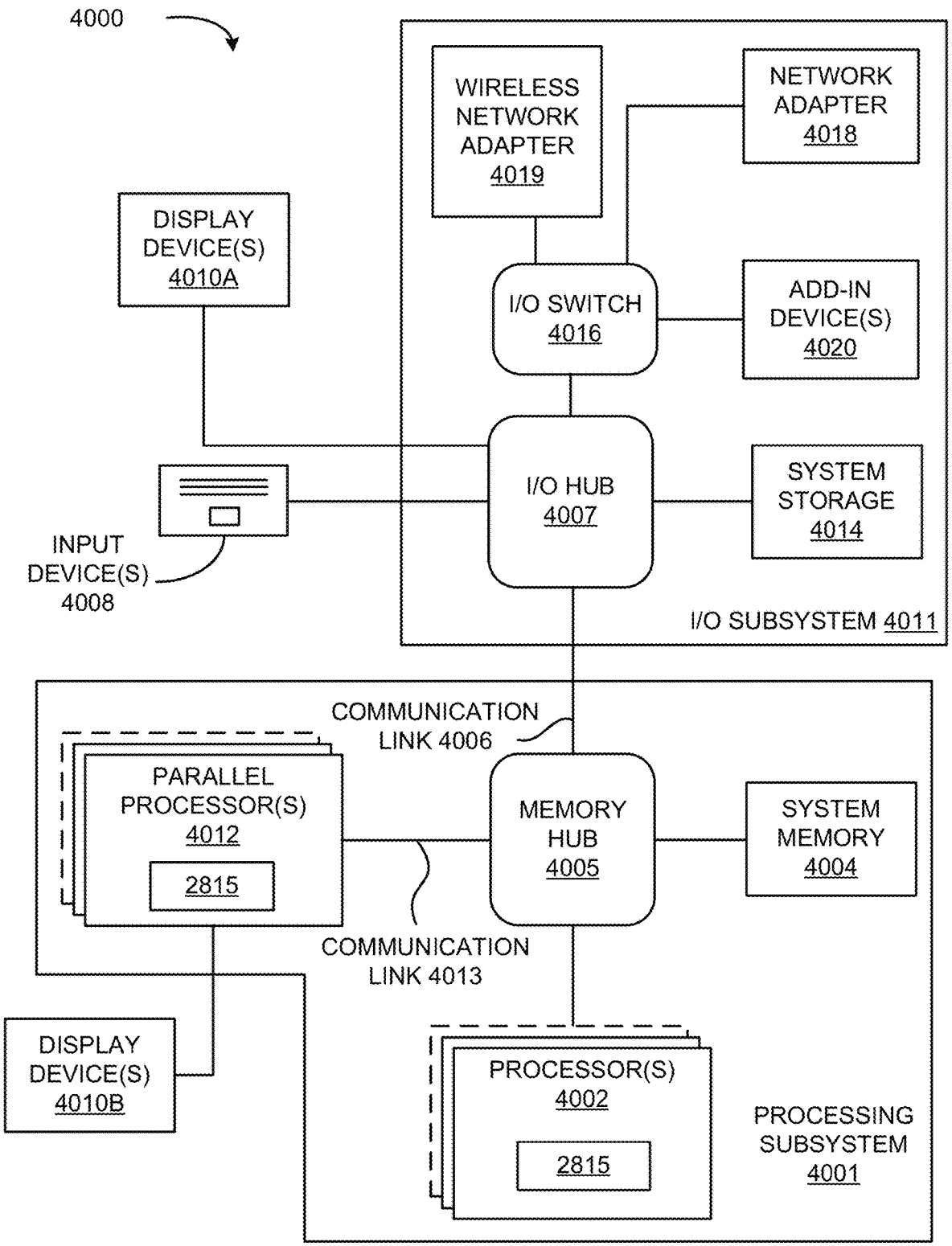
FIG. 40 illustrates a computer system, according to at least one embodiment.

FIG. 40 is a block diagram illustrating a computing system 4000 according to at least one embodiment. In at least one embodiment, computing system 4000 includes a processing subsystem 4001 having one or more processor(s) 4002 and a system memory 4004 communicating via an interconnection path that may include a memory hub 4005. In at least one embodiment, memory hub 4005 may be a separate component within a chipset component or may be integrated within one or more processor(s) 4002. In at least one embodiment, memory hub 4005 couples with an I/O subsystem 4011 via a communication link 4006. In at least one embodiment, I/O subsystem 4011 includes an I/O hub 4007 that can enable computing system 4000 to receive input from one or more input device(s) 4008. In at least one embodiment, I/O hub 4007 can enable a display controller, which may be included in one or more processor(s) 4002, to provide outputs to one or more display device(s) 4010A. In at least one embodiment, one or more display device(s) 4010A coupled with I/O hub 4007 can include a local, internal, or embedded display device. In at least one embodiment, computing system 4000 implements process 100 (see FIG. 1A) or process 106 (see FIG. 1B).

In at least one embodiment, processing subsystem 4001 includes one or more parallel processor(s) 4012 coupled to memory hub 4005 via a bus or other communication link 4013. In at least one embodiment, communication link 4013 may use one of any number of standards based communication link technologies or protocols, such as, but not limited to PCI Express, or may be a vendor-specific communications interface or communications fabric. In at least one embodiment, one or more parallel processor(s) 4012 form a computationally focused parallel or vector processing system that can include a large number of processing cores and/or processing clusters, such as a many-integrated core (MIC) processor. In at least one embodiment, some or all of parallel processor(s) 4012 form a graphics processing subsystem that can output pixels to one of one or more display device(s) 4010A coupled via I/O Hub 4007. In at least one embodiment, parallel processor(s) 4012 can also include a display controller and display interface (not shown) to enable a direct connection to one or more display device(s) 4010B.

In at least one embodiment, a system storage unit 4014 can connect to I/O hub 4007 to provide a storage mechanism for computing system 4000. In at least one embodiment, an I/O switch 4016 can be used to provide an interface mechanism to enable connections between I/O hub 4007 and other components, such as a network adapter 4018 and/or a wireless network adapter 4019 that may be integrated into platform, and various other devices that can be added via one or more add-in device(s) 4020. In at least one embodiment, network adapter 4018 can be an Ethernet adapter or another wired network adapter. In at least one embodiment, wireless network adapter 4019 can include one or more of a Wi-Fi, Bluetooth, near field communication (NFC), or other network device that includes one or more wireless radios.

In at least one embodiment, computing system 4000 can include other components not explicitly shown, including USB or other port connections, optical storage drives, video capture devices, and like, may also be connected to I/O hub 4007. In at least one embodiment, communication paths interconnecting various components in FIG. 40 may be implemented using any suitable protocols, such as PCI (Peripheral Component Interconnect) based protocols (e.g., PCI-Express), or other bus or point-to-point communication interfaces and/or protocol(s), such as NV-Link high-speed interconnect, or interconnect protocols.

In at least one embodiment, parallel processor(s) 4012 incorporate circuitry optimized for graphics and video processing, including, for example, video output circuitry, and constitutes a graphics processing unit (GPU). In at least one embodiment, parallel processor(s) 4012 incorporate circuitry optimized for general purpose processing. In at least embodiment, components of computing system 4000 may be integrated with one or more other system elements on a single integrated circuit. For example, in at least one embodiment, parallel processor(s) 4012, memory hub 4005, processor(s) 4002, and I/O hub 4007 can be integrated into a system on chip (SoC) integrated circuit. In at least one embodiment, components of computing system 4000 can be integrated into a single package to form a system in package (SIP) configuration. In at least one embodiment, at least a portion of components of computing system 4000 can be integrated into a multi-chip module (MCM), which can be interconnected with other multi-chip modules into a modular computing system.

Inference and/or training logic 2815 are used to perform inferencing and/or training operations associated with one or more embodiments. Details regarding inference and/or training logic 2815 are provided herein in conjunction with FIGS. 28A and/or 28B. In at least one embodiment, inference and/or training logic 2815 may be used in system FIG. 4000 for inferencing or predicting operations based, at least in part, on weight parameters calculated using neural network training operations, neural network functions and/or architectures, or neural network use cases described herein.

In at least one embodiment, one or more systems depicted in FIGS. 28A and 28B are utilized to implement a framework for image processing (e.g., real-time image rendering and enhancement). In at least one embodiment, one or more systems depicted in FIGS. 28A and 28B are utilized to perform various processes such as those described in connection with FIGS. 1-27. In at least one embodiment, one or more systems depicted in FIGS. 28A and 28B are utilized to generate and apply blue noise masks to images that are able to handle the temporal domain, i.e., adding time to the spatial (image) domain to improve image quality when rendering images over multiple frames (e.g., time).

Processors

FIG. 41A illustrates a parallel processor 4100 according to at least one embodiment. In at least one embodiment, various components of parallel processor 4100 may be implemented using one or more integrated circuit devices, such as programmable processors, application specific integrated circuits (ASICs), or field programmable gate arrays (FPGA). In at least one embodiment, illustrated parallel processor 4100 is a variant of one or more parallel processor(s) 4012 shown in FIG. 40 according to an exemplary embodiment. In at least one embodiment, parallel processor 4100 implements process 100 (see FIG. 1A) or process 106 (see FIG. 1B).

In at least one embodiment, parallel processor 4100 includes a parallel processing unit 4102. In at least one embodiment, parallel processing unit 4102 includes an I/O unit 4104 that enables communication with other devices, including other instances of parallel processing unit 4102. In at least one embodiment, I/O unit 4104 may be directly connected to other devices. In at least one embodiment, I/O unit 4104 connects with other devices via use of a hub or switch interface, such as a memory hub 4105. In at least one embodiment, connections between memory hub 4105 and I/O unit 4104 form a communication link 4113. In at least one embodiment, I/O unit 4104 connects with a host interface 4106 and a memory crossbar 4116, where host interface 4106 receives commands directed to performing processing operations and memory crossbar 4116 receives commands directed to performing memory operations.

In at least one embodiment, when host interface 4106 receives a command buffer via I/O unit 4104, host interface 4106 can direct work operations to perform those commands to a front end 4108. In at least one embodiment, front end 4108 couples with a scheduler 4110, which is configured to distribute commands or other work items to a processing cluster array 4112. In at least one embodiment, scheduler 4110 ensures that processing cluster array 4112 is properly configured and in a valid state before tasks are distributed to a cluster of processing cluster array 4112. In at least one embodiment, scheduler 4110 is implemented via firmware logic executing on a microcontroller. In at least one embodiment, microcontroller implemented scheduler 4110 is configurable to perform complex scheduling and work distribution operations at coarse and fine granularity, enabling rapid preemption and context switching of threads executing on processing array 4112. In at least one embodiment, host software can prove workloads for scheduling on processing cluster array 4112 via one of multiple graphics processing paths. In at least one embodiment, workloads can then be automatically distributed across processing array cluster 4112 by scheduler 4110 logic within a microcontroller including scheduler 4110.

In at least one embodiment, processing cluster array 4112 can include up to "N" processing clusters (e.g., cluster 4114A, cluster 4114B, through cluster 4114N), where "N" represents a positive integer (which may be a different integer "N" than used in other figures). In at least one embodiment, each cluster 4114A-4114N of processing cluster array 4112 can execute a large number of concurrent threads. In at least one embodiment, scheduler 4110 can allocate work to clusters 4114A-4114N of processing cluster array 4112 using various scheduling and/or work distribution algorithms, which may vary depending on workload arising for each type of program or computation. In at least one embodiment, scheduling can be handled dynamically by scheduler 4110, or can be assisted in part by compiler logic during compilation of program logic configured for execution by processing cluster array 4112. In at least one embodiment, different clusters 4114A-4114N of processing cluster array 4112 can be allocated for processing different types of programs or for performing different types of computations.

In at least one embodiment, processing cluster array 4112 can be configured to perform various types of parallel processing operations. In at least one embodiment, processing cluster array 4112 is configured to perform general-purpose parallel compute operations. For example, in at least one embodiment, processing cluster array 4112 can include logic to execute processing tasks including filtering of video and/or audio data, performing modeling operations, including physics operations, and performing data transformations.

In at least one embodiment, processing cluster array 4112 is configured to perform parallel graphics processing operations. In at least one embodiment, processing cluster array 4112 can include additional logic to support execution of such graphics processing operations, including but not limited to, texture sampling logic to perform texture operations, as well as tessellation logic and other vertex processing logic. In at least one embodiment, processing cluster array 4112 can be configured to execute graphics processing related shader programs such as, but not limited to, vertex shaders, tessellation shaders, geometry shaders, and pixel shaders. In at least one embodiment, parallel processing unit 4102 can transfer data from system memory via I/O unit 4104 for processing. In at least one embodiment, during processing, transferred data can be stored to on-chip memory (e.g., parallel processor memory 4122) during processing, then written back to system memory.

In at least one embodiment, when parallel processing unit 4102 is used to perform graphics processing, scheduler 4110 can be configured to divide a processing workload into approximately equal sized tasks, to better enable distribution of graphics processing operations to multiple clusters 4114A-4114N of processing cluster array 4112. In at least one embodiment, portions of processing cluster array 4112 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 4114A-4114N may be stored in buffers to allow intermediate data to be transmitted between clusters 4114A-4114N for further processing.

In at least one embodiment, processing cluster array 4112 can receive processing tasks to be executed via scheduler 4110, which receives commands defining processing tasks from front end 4108. In at least one embodiment, processing tasks can include indices of data to be processed, e.g., surface (patch) data, primitive data, vertex data, and/or pixel data, as well as state parameters and commands defining how data is to be processed (e.g., what program is to be executed). In at least one embodiment, scheduler 4110 may be configured to fetch indices corresponding to tasks or may receive indices from front end 4108. In at least one embodiment, front end 4108 can be configured to ensure processing cluster array 4112 is configured to a valid state before a workload specified by incoming command buffers (e.g., batch-buffers, push buffers, etc.) is initiated.

In at least one embodiment, each of one or more instances of parallel processing unit 4102 can couple with a parallel processor memory 4122. In at least one embodiment, parallel processor memory 4122 can be accessed via memory crossbar 4116, which can receive memory requests from processing cluster array 4112 as well as I/O unit 4104. In at least one embodiment, memory crossbar 4116 can access parallel processor memory 4122 via a memory interface 4118. In at least one embodiment, memory interface 4118 can include multiple partition units (e.g., partition unit 4120A, partition unit 4120B, through partition unit 4120N) that can each couple to a portion (e.g., memory unit) of parallel processor memory 4122. In at least one embodiment, a number of partition units 4120A-4120N is configured to be equal to a number of memory units, such that a first partition unit 4120A has a corresponding first memory unit 4124A, a second partition unit 4120B has a corresponding memory unit 4124B, and an N-th partition unit 4120N has a corresponding N-th memory unit 4124N. In at least one embodiment, a number of partition units 4120A-4120N may not be equal to a number of memory units.

In at least one embodiment, memory units 4124A-4124N can include various types of memory devices, including dynamic random access memory (DRAM) or graphics random access memory, such as synchronous graphics random access memory (SGRAM), including graphics double data rate (GDDR) memory. In at least one embodiment, memory units 4124A-4124N may also include 3D stacked memory, including but not limited to high bandwidth memory (HBM). In at least one embodiment, render targets, such as frame buffers or texture maps may be stored across memory units 4124A-4124N, allowing partition units 4120A-4120N to write portions of each render target in parallel to efficiently use available bandwidth of parallel processor memory 4122. In at least one embodiment, a local instance of parallel processor memory 4122 may be excluded in favor of a unified memory design that utilizes system memory in conjunction with local cache memory.

In at least one embodiment, any one of clusters 4114A-4114N of processing cluster array 4112 can process data that will be written to any of memory units 4124A-4124N within parallel processor memory 4122. In at least one embodiment, memory crossbar 4116 can be configured to transfer an output of each cluster 4114A-4114N to any partition unit 4120A-4120N or to another cluster 4114A-4114N, which can perform additional processing operations on an output. In at least one embodiment, each cluster 4114A-4114N can communicate with memory interface 4118 through memory crossbar 4116 to read from or write to various external memory devices. In at least one embodiment, memory crossbar 4116 has a connection to memory interface 4118 to communicate with I/O unit 4104, as well as a connection to a local instance of parallel processor memory 4122, enabling processing units within different processing clusters 4114A-4114N to communicate with system memory or other memory that is not local to parallel processing unit 4102. In at least one embodiment, memory crossbar 4116 can use virtual channels to separate traffic streams between clusters 4114A-4114N and partition units 4120A-4120N.

In at least one embodiment, multiple instances of parallel processing unit 4102 can be provided on a single add-in card, or multiple add-in cards can be interconnected. In at least one embodiment, different instances of parallel processing unit 4102 can be configured to interoperate even if different instances have different numbers of processing cores, different amounts of local parallel processor memory, and/or other configuration differences. For example, in at least one embodiment, some instances of parallel processing unit 4102 can include higher precision floating point units relative to other instances. In at least one embodiment, systems incorporating one or more instances of parallel processing unit 4102 or parallel processor 4100 can be implemented in a variety of configurations and form factors, including but not limited to desktop, laptop, or handheld personal computers, servers, workstations, game consoles, and/or embedded systems.

Figure 41:
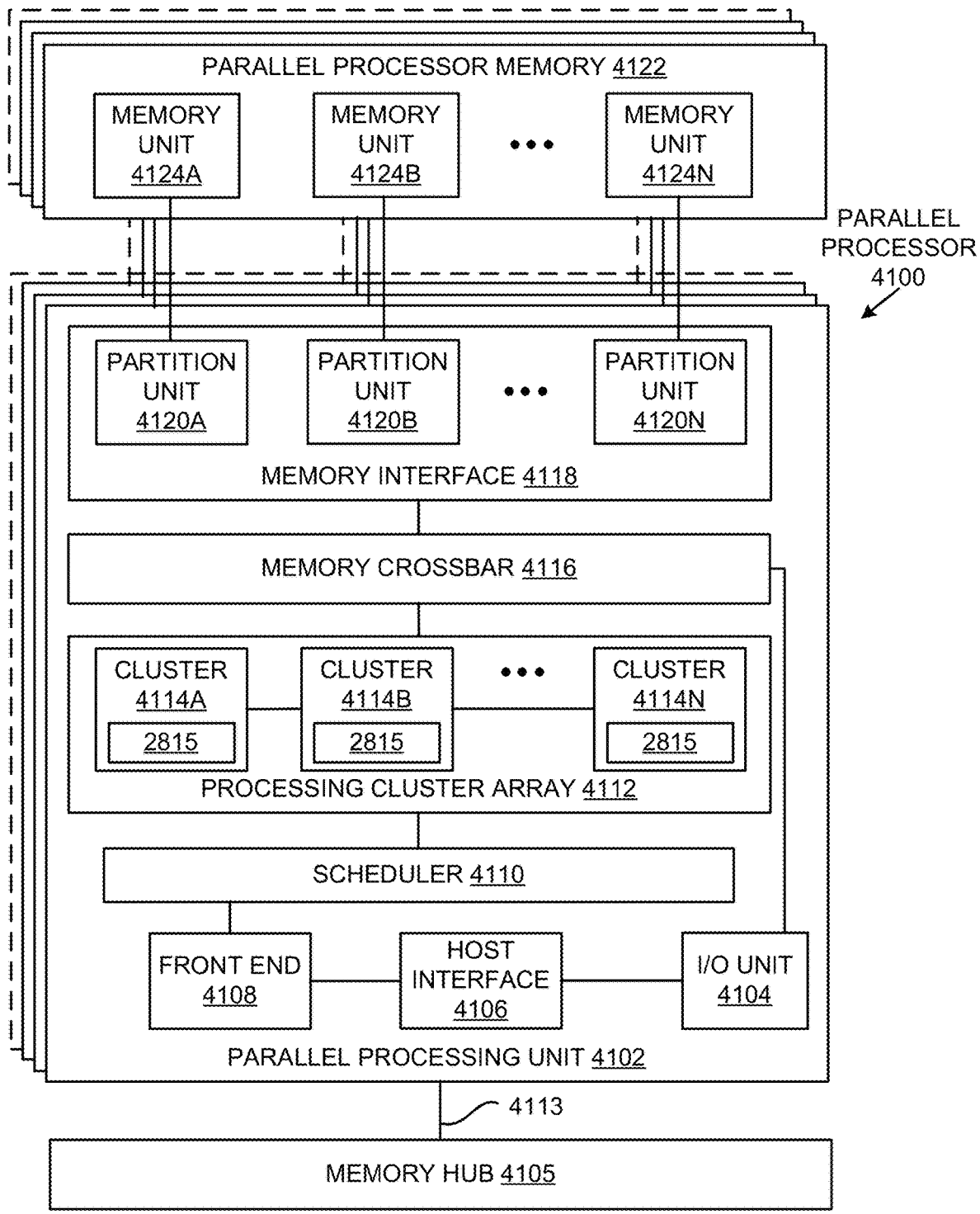
FIG. 41A illustrates a parallel processor, according to at least one embodiment.
FIG. 41B illustrates a partition unit, according to at least one embodiment.
FIG. 41C illustrates a processing cluster, according to at least one embodiment.
FIG. 41D illustrates a graphics multiprocessor, according to at least one embodiment.
Figure 41:
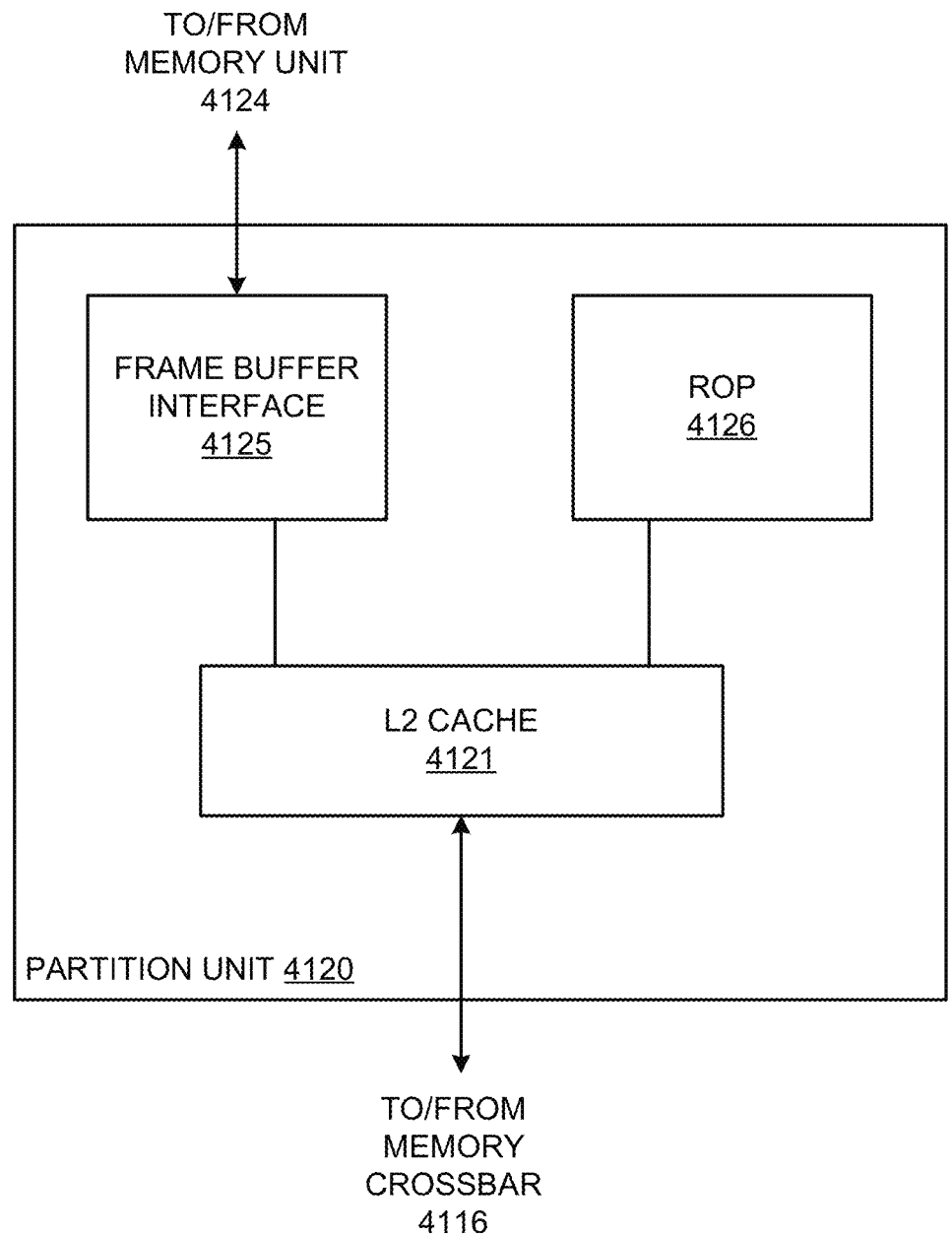
Figure 41:
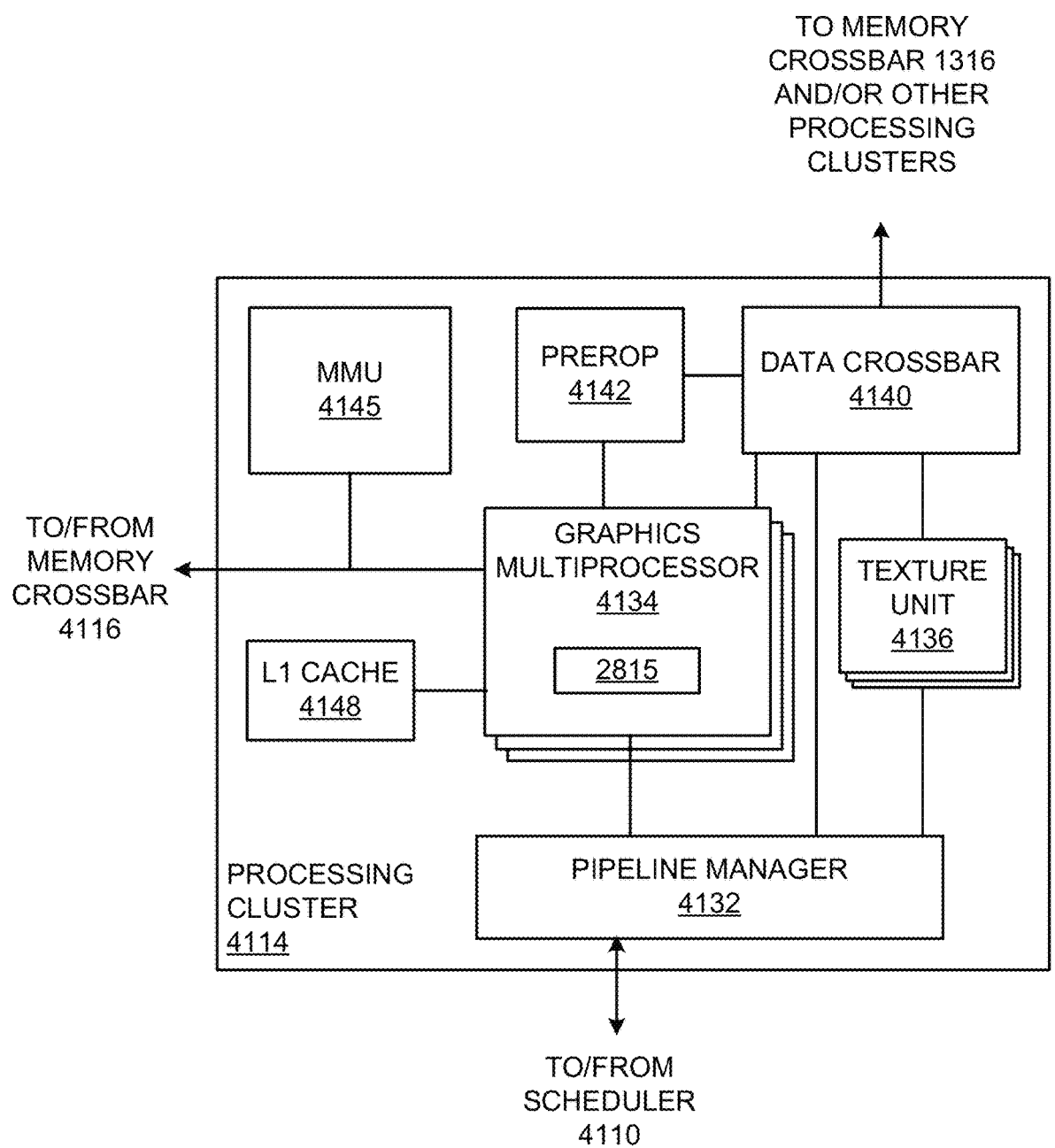
Figure 41:
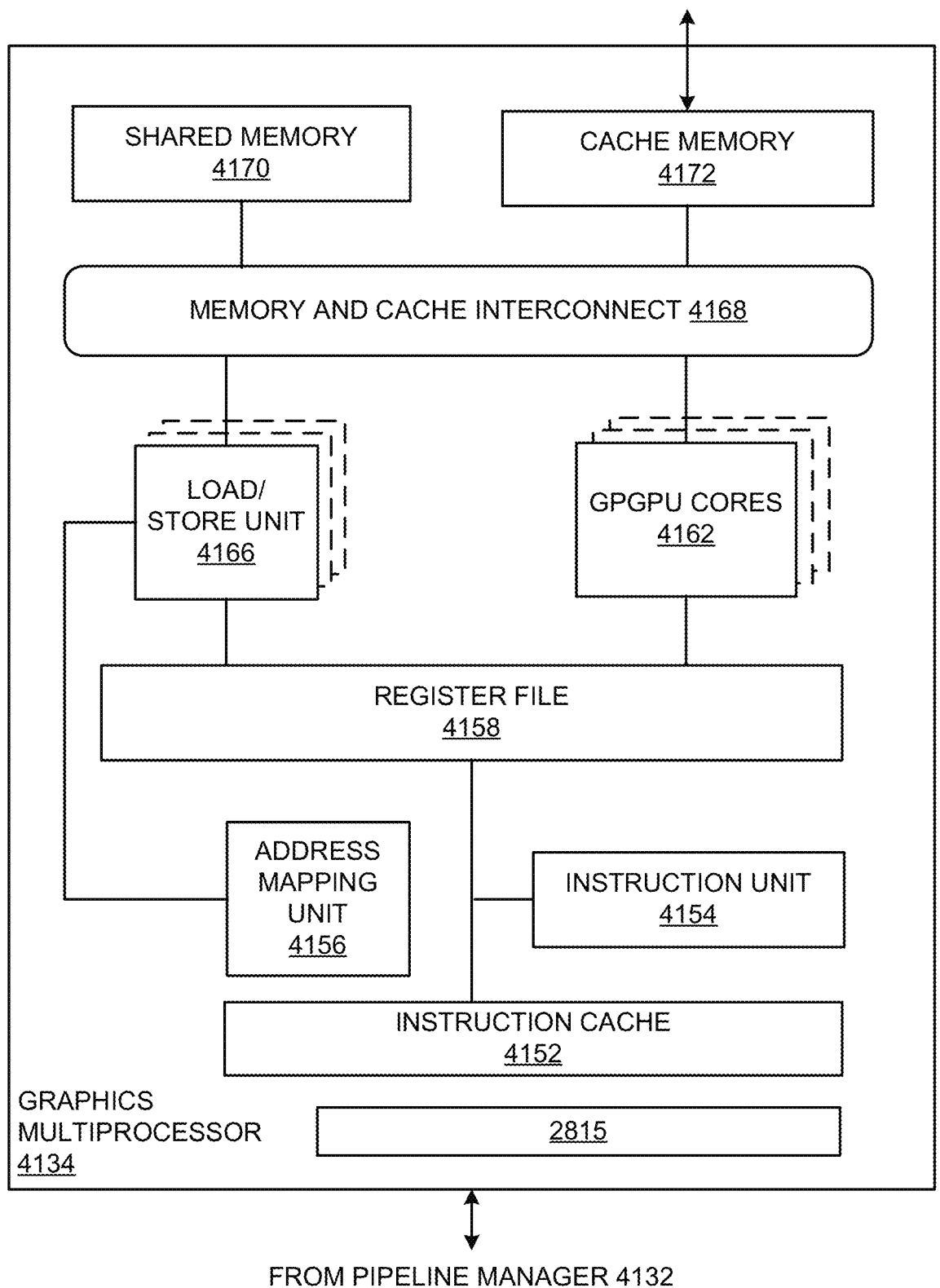

FIG. 41B is a block diagram of a partition unit 4120 according to at least one embodiment. In at least one embodiment, partition unit 4120 is an instance of one of partition units 4120A-4120N of FIG. 41A. In at least one embodiment, partition unit 4120 includes an L2 cache 4121, a frame buffer interface 4125, and a ROP 4126 (raster operations unit). In at least one embodiment, L2 cache 4121 is a read/write cache that is configured to perform load and store operations received from memory crossbar 4116 and ROP 4126. In at least one embodiment, read misses and urgent write-back requests are output by L2 cache 4121 to frame buffer interface 4125 for processing. In at least one embodiment, updates can also be sent to a frame buffer via frame buffer interface 4125 for processing. In at least one embodiment, frame buffer interface 4125 interfaces with one of memory units in parallel processor memory, such as memory units 4124A-4124N of FIG. 41 (e.g., within parallel processor memory 4122).

In at least one embodiment, ROP 4126 is a processing unit that performs raster operations such as stencil, z test, blending, etc. In at least one embodiment, ROP 4126 then outputs processed graphics data that is stored in graphics memory. In at least one embodiment, ROP 4126 includes compression logic to compress depth or color data that is written to memory and decompress depth or color data that is read from memory. In at least one embodiment, compression logic can be lossless compression logic that makes use of one or more of multiple compression algorithms. In at least one embodiment, a type of compression that is performed by ROP 4126 can vary based on statistical characteristics of data to be compressed. For example, in at least one embodiment, delta color compression is performed on depth and color data on a per-tile basis.

In at least one embodiment, ROP 4126 is included within each processing cluster (e.g., cluster 4114A-4114N of FIG. 41A) instead of within partition unit 4120. In at least one embodiment, read and write requests for pixel data are transmitted over memory crossbar 4116 instead of pixel fragment data. In at least one embodiment, processed graphics data may be displayed on a display device, such as one of one or more display device(s) 4010 of FIG. 40, routed for further processing by processor(s) 4002, or routed for further processing by one of processing entities within parallel processor 4100 of FIG. 41A.

FIG. 41C is a block diagram of a processing cluster 4114 within a parallel processing unit according to at least one embodiment. In at least one embodiment, a processing cluster is an instance of one of processing clusters 4114A-4114N of FIG. 41A. In at least one embodiment, processing cluster 4114 can be configured to execute many threads in parallel, where "thread" refers to an instance of a particular program executing on a particular set of input data. In at least one embodiment, single-instruction, multiple-data (SIMD) instruction issue techniques are used to support parallel execution of a large number of threads without providing multiple independent instruction units. In at least one embodiment, single-instruction, multiple-thread (SIMT) techniques are used to support parallel execution of a large number of generally synchronized threads, using a common instruction unit configured to issue instructions to a set of processing engines within each one of processing clusters.

In at least one embodiment, operation of processing cluster 4114 can be controlled via a pipeline manager 4132 that distributes processing tasks to SIMT parallel processors. In at least one embodiment, pipeline manager 4132 receives instructions from scheduler 4110 of FIG. 41A and manages execution of those instructions via a graphics multiprocessor 4134 and/or a texture unit 4136. In at least one embodiment, graphics multiprocessor 4134 is an exemplary instance of a SIMT parallel processor. However, in at least one embodiment, various types of SIMT parallel processors of differing architectures may be included within processing cluster 4114. In at least one embodiment, one or more instances of graphics multiprocessor 4134 can be included within a processing cluster 4114. In at least one embodiment, graphics multiprocessor 4134 can process data and a data crossbar 4140 can be used to distribute processed data to one of multiple possible destinations, including other shader units. In at least one embodiment, pipeline manager 4132 can facilitate distribution of processed data by specifying destinations for processed data to be distributed via data crossbar 4140.

In at least one embodiment, each graphics multiprocessor 4134 within processing cluster 4114 can include an identical set of functional execution logic (e.g., arithmetic logic units, load-store units, etc.). In at least one embodiment, functional execution logic can be configured in a pipelined manner in which new instructions can be issued before previous instructions are complete. In at least one embodiment, functional execution logic supports a variety of operations including integer and floating point arithmetic, comparison operations, Boolean operations, bit-shifting, and computation of various algebraic functions. In at least one embodiment, same functional-unit hardware can be leveraged to perform different operations and any combination of functional units may be present.

In at least one embodiment, instructions transmitted to processing cluster 4114 constitute a thread. In at least one embodiment, a set of threads executing across a set of parallel processing engines is a thread group. In at least one embodiment, a thread group executes a common program on different input data. In at least one embodiment, each thread within a thread group can be assigned to a different processing engine within a graphics multiprocessor 4134. In at least one embodiment, a thread group may include fewer threads than a number of processing engines within graphics multiprocessor 4134. In at least one embodiment, when a thread group includes fewer threads than a number of processing engines, one or more of processing engines may be idle during cycles in which that thread group is being processed. In at least one embodiment, a thread group may also include more threads than a number of processing engines within graphics multiprocessor 4134. In at least one embodiment, when a thread group includes more threads than number of processing engines within graphics multiprocessor 4134, processing can be performed over consecutive clock cycles. In at least one embodiment, multiple thread groups can be executed concurrently on a graphics multiprocessor 4134.

In at least one embodiment, graphics multiprocessor 4134 includes an internal cache memory to perform load and store operations. In at least one embodiment, graphics multiprocessor 4134 can forego an internal cache and use a cache memory (e.g., L1 cache 4148) within processing cluster 4114. In at least one embodiment, each graphics multiprocessor 4134 also has access to L2 caches within partition units (e.g., partition units 4120A-4120N of FIG. 41A) that are shared among all processing clusters 4114 and may be used to transfer data between threads. In at least one embodiment, graphics multiprocessor 4134 may also access off-chip global memory, which can include one or more of local parallel processor memory and/or system memory. In at least one embodiment, any memory external to parallel processing unit 4102 may be used as global memory. In at least one embodiment, processing cluster 4114 includes multiple instances of graphics multiprocessor 4134 and can share common instructions and data, which may be stored in L1 cache 4148.

In at least one embodiment, each processing cluster 4114 may include an MMU 4145 (memory management unit) that is configured to map virtual addresses into physical addresses. In at least one embodiment, one or more instances of MMU 4145 may reside within memory interface 4118 of FIG. 41A. In at least one embodiment, MMU 4145 includes a set of page table entries (PTEs) used to map a virtual address to a physical address of a tile and optionally a cache line index. In at least one embodiment, MMU 4145 may include address translation lookaside buffers (TLB) or caches that may reside within graphics multiprocessor 4134 or L1 4148 cache or processing cluster 4114. In at least one embodiment, a physical address is processed to distribute surface data access locally to allow for efficient request interleaving among partition units. In at least one embodiment, a cache line index may be used to determine whether a request for a cache line is a hit or miss.

In at least one embodiment, a processing cluster 4114 may be configured such that each graphics multiprocessor 4134 is coupled to a texture unit 4136 for performing texture mapping operations, e.g., determining texture sample positions, reading texture data, and filtering texture data. In at least one embodiment, texture data is read from an internal texture L1 cache (not shown) or from an L1 cache within graphics multiprocessor 4134 and is fetched from an L2 cache, local parallel processor memory, or system memory, as needed. In at least one embodiment, each graphics multiprocessor 4134 outputs processed tasks to data crossbar 4140 to provide processed task to another processing cluster 4114 for further processing or to store processed task in an L2 cache, local parallel processor memory, or system memory via memory crossbar 4116. In at least one embodiment, a preROP 4142 (pre-raster operations unit) is configured to receive data from graphics multiprocessor 4134, and direct data to ROP units, which may be located with partition units as described herein (e.g., partition units 4120A-4120N of FIG. 41A). In at least one embodiment, preROP 4142 unit can perform optimizations for color blending, organizing pixel color data, and performing address translations.

Inference and/or training logic 2815 are used to perform inferencing and/or training operations associated with one or more embodiments. Details regarding inference and/or training logic 2815 are provided herein in conjunction with FIGS. 28A and/or 28B. In at least one embodiment, inference and/or training logic 2815 may be used in graphics processing cluster 4114 for inferencing or predicting operations based, at least in part, on weight parameters calculated using neural network training operations, neural network functions and/or architectures, or neural network use cases described herein.

In at least one embodiment, one or more systems depicted in FIGS. 28A and 28B are utilized to implement a framework for image processing (e.g., real-time image rendering and enhancement). In at least one embodiment, one or more systems depicted in FIGS. 28A and 28B are utilized to perform various processes such as those described in connection with FIGS. 1-27. In at least one embodiment, one or more systems depicted in FIGS. 28A and 28B are utilized to generate and apply blue noise masks to images that are able to handle the temporal domain, i.e., adding time to the spatial (image) domain to improve image quality when rendering images over multiple frames (e.g., time).

FIG. 41D shows a graphics multiprocessor 4134 according to at least one embodiment. In at least one embodiment, graphics multiprocessor 4134 couples with pipeline manager 4132 of processing cluster 4114. In at least one embodiment, graphics multiprocessor 4134 has an execution pipeline including but not limited to an instruction cache 4152, an instruction unit 4154, an address mapping unit 4156, a register file 4158, one or more general purpose graphics processing unit (GPGPU) cores 4162, and one or more load/store units 4166. In at least one embodiment, GPGPU cores 4162 and load/store units 4166 are coupled with cache memory 4172 and shared memory 4170 via a memory and cache interconnect 4168.

In at least one embodiment, instruction cache 4152 receives a stream of instructions to execute from pipeline manager 4132. In at least one embodiment, instructions are cached in instruction cache 4152 and dispatched for execution by an instruction unit 4154. In at least one embodiment, instruction unit 4154 can dispatch instructions as thread groups (e.g., warps), with each thread of thread group assigned to a different execution unit within GPGPU cores 4162. In at least one embodiment, an instruction can access any of a local, shared, or global address space by specifying an address within a unified address space. In at least one embodiment, address mapping unit 4156 can be used to translate addresses in a unified address space into a distinct memory address that can be accessed by load/store units 4166.

In at least one embodiment, register file 4158 provides a set of registers for functional units of graphics multiprocessor 4134. In at least one embodiment, register file 4158 provides temporary storage for operands connected to data paths of functional units (e.g., GPGPU cores 4162, load/store units 4166) of graphics multiprocessor 4134. In at least one embodiment, register file 4158 is divided between each of functional units such that each functional unit is allocated a dedicated portion of register file 4158. In at least one embodiment, register file 4158 is divided between different warps being executed by graphics multiprocessor 4134.

In at least one embodiment, GPGPU cores 4162 can each include floating point units (FPUs) and/or integer arithmetic logic units (ALUs) that are used to execute instructions of graphics multiprocessor 4134. In at least one embodiment, GPGPU cores 4162 can be similar in architecture or can differ in architecture. In at least one embodiment, a first portion of GPGPU cores 4162 include a single precision FPU and an integer ALU while a second portion of GPGPU cores include a double precision FPU. In at least one embodiment, FPUs can implement IEEE 754-2008 standard floating point arithmetic or enable variable precision floating point arithmetic. In at least one embodiment, graphics multiprocessor 4134 can additionally include one or more fixed function or special function units to perform specific functions such as copy rectangle or pixel blending operations. In at least one embodiment, one or more of GPGPU cores 4162 can also include fixed or special function logic.

In at least one embodiment, GPGPU cores 4162 include SIMD logic capable of performing a single instruction on multiple sets of data. In at least one embodiment, GPGPU cores 4162 can physically execute SIMD4, SIMD8, and SIMD16 instructions and logically execute SIMD1, SIMD2, and SIMD32 instructions. In at least one embodiment, SIMD instructions for GPGPU cores can be generated at compile time by a shader compiler or automatically generated when executing programs written and compiled for single program multiple data (SPMD) or SIMT architectures. In at least one embodiment, multiple threads of a program configured for an SIMT execution model can executed via a single SIMD instruction. For example, in at least one embodiment, eight SIMT threads that perform same or similar operations can be executed in parallel via a single SIMD8 logic unit.

In at least one embodiment, memory and cache interconnect 4168 is an interconnect network that connects each functional unit of graphics multiprocessor 4134 to register file 4158 and to shared memory 4170. In at least one embodiment, memory and cache interconnect 4168 is a crossbar interconnect that allows load/store unit 4166 to implement load and store operations between shared memory 4170 and register file 4158. In at least one embodiment, register file 4158 can operate at a same frequency as GPGPU cores 4162, thus data transfer between GPGPU cores 4162 and register file 4158 can have very low latency. In at least one embodiment, shared memory 4170 can be used to enable communication between threads that execute on functional units within graphics multiprocessor 4134. In at least one embodiment, cache memory 4172 can be used as a data cache for example, to cache texture data communicated between functional units and texture unit 4136. In at least one embodiment, shared memory 4170 can also be used as a program managed cache. In at least one embodiment, threads executing on GPGPU cores 4162 can programmatically store data within shared memory in addition to automatically cached data that is stored within cache memory 4172.

In at least one embodiment, a parallel processor or GPGPU as described herein is communicatively coupled to host/processor cores to accelerate graphics operations, machine-learning operations, pattern analysis operations, and various general purpose GPU (GPGPU) functions. In at least one embodiment, a GPU may be communicatively coupled to host processor/cores over a bus or other interconnect (e.g., a high-speed interconnect such as PCIe or NVLink). In at least one embodiment, a GPU may be integrated on a package or chip as cores and communicatively coupled to cores over an internal processor bus/interconnect internal to a package or chip. In at least one embodiment, regardless a manner in which a GPU is connected, processor cores may allocate work to such GPU in a form of sequences of commands/instructions contained in a work descriptor. In at least one embodiment, that GPU then uses dedicated circuitry/logic for efficiently processing these commands/instructions.

Inference and/or training logic 2815 are used to perform inferencing and/or training operations associated with one or more embodiments. Details regarding inference and/or training logic 2815 are provided herein in conjunction with FIGS. 28A and/or 28B. In at least one embodiment, inference and/or training logic 2815 may be used in graphics multiprocessor 4134 for inferencing or predicting operations based, at least in part, on weight parameters calculated using neural network training operations, neural network functions and/or architectures, or neural network use cases described herein.

In at least one embodiment, one or more systems depicted in FIGS. 28A and 28B are utilized to implement a framework for image processing (e.g., real-time image rendering and enhancement). In at least one embodiment, one or more systems depicted in FIGS. 28A and 28B are utilized to perform various processes such as those described in connection with FIGS. 1-27. In at least one embodiment, one or more systems depicted in FIGS. 28A and 28B are utilized to generate and apply blue noise masks to images that are able to handle the temporal domain, i.e., adding time to the spatial (image) domain to improve image quality when rendering images over multiple frames (e.g., time).

Figure 42:
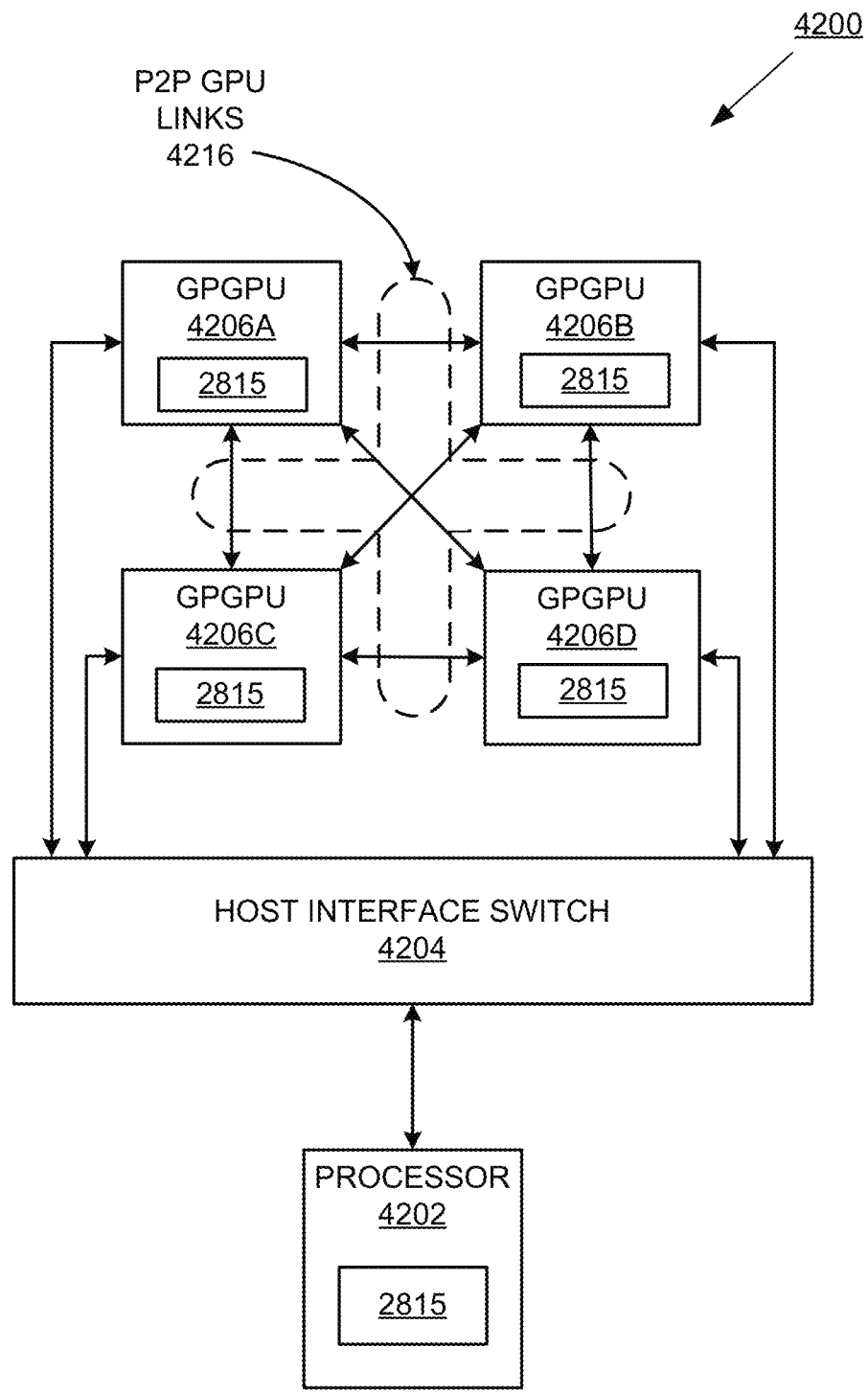
FIG. 42 illustrates a multi-graphics processing unit (GPU) system, according to at least one embodiment.

FIG. 42 illustrates a multi-GPU computing system 4200, according to at least one embodiment. In at least one embodiment, multi-GPU computing system 4200 can include a processor 4202 coupled to multiple general purpose graphics processing units (GPGPUs) 4206A-D via a host interface switch 4204. In at least one embodiment, host interface switch 4204 is a PCI express switch device that couples processor 4202 to a PCI express bus over which processor 4202 can communicate with GPGPUs 4206A-D. In at least one embodiment, GPGPUs 4206A-D can interconnect via a set of high-speed point-to-point GPU-to-GPU links 4216. In at least one embodiment, GPU-to-GPU links 4216 connect to each of GPGPUs 4206A-D via a dedicated GPU link. In at least one embodiment, P2P GPU links 4216 enable direct communication between each of GPGPUs 4206A-D without requiring communication over host interface switch 4204 to which processor 4202 is connected. In at least one embodiment, with GPU-to-GPU traffic directed to P2P GPU links 4216, host interface switch 4204 remains available for system memory access or to communicate with other instances of multi-GPU computing system 4200, for example, via one or more network devices. While in at least one embodiment GPGPUs 4206A-D connect to processor 4202 via host interface switch 4204, in at least one embodiment processor 4202 includes direct support for P2P GPU links 4216 and can connect directly to GPGPUs 4206A-D.

In at least one embodiment, multi-GPU computing system 4200 performs process 100 (see FIG. 1A) or process 106 (see FIG. 1B).

Inference and/or training logic 2815 are used to perform inferencing and/or training operations associated with one or more embodiments. Details regarding inference and/or training logic 2815 are provided herein in conjunction with FIGS. 28A and/or 28B. In at least one embodiment, inference and/or training logic 2815 may be used in multi-GPU computing system 4200 for inferencing or predicting operations based, at least in part, on weight parameters calculated using neural network training operations, neural network functions and/or architectures, or neural network use cases described herein.

In at least one embodiment, one or more systems depicted in FIGS. 28A and 28B are utilized to implement a framework for image processing (e.g., real-time image rendering and enhancement). In at least one embodiment, one or more systems depicted in FIGS. 28A and 28B are utilized to perform various processes such as those described in connection with FIGS. 1-27. In at least one embodiment, one or more systems depicted in FIGS. 28A and 28B are utilized to generate and apply blue noise masks to images that are able to handle the temporal domain, i.e., adding time to the spatial (image) domain to improve image quality when rendering images over multiple frames (e.g., time).

Figure 43:
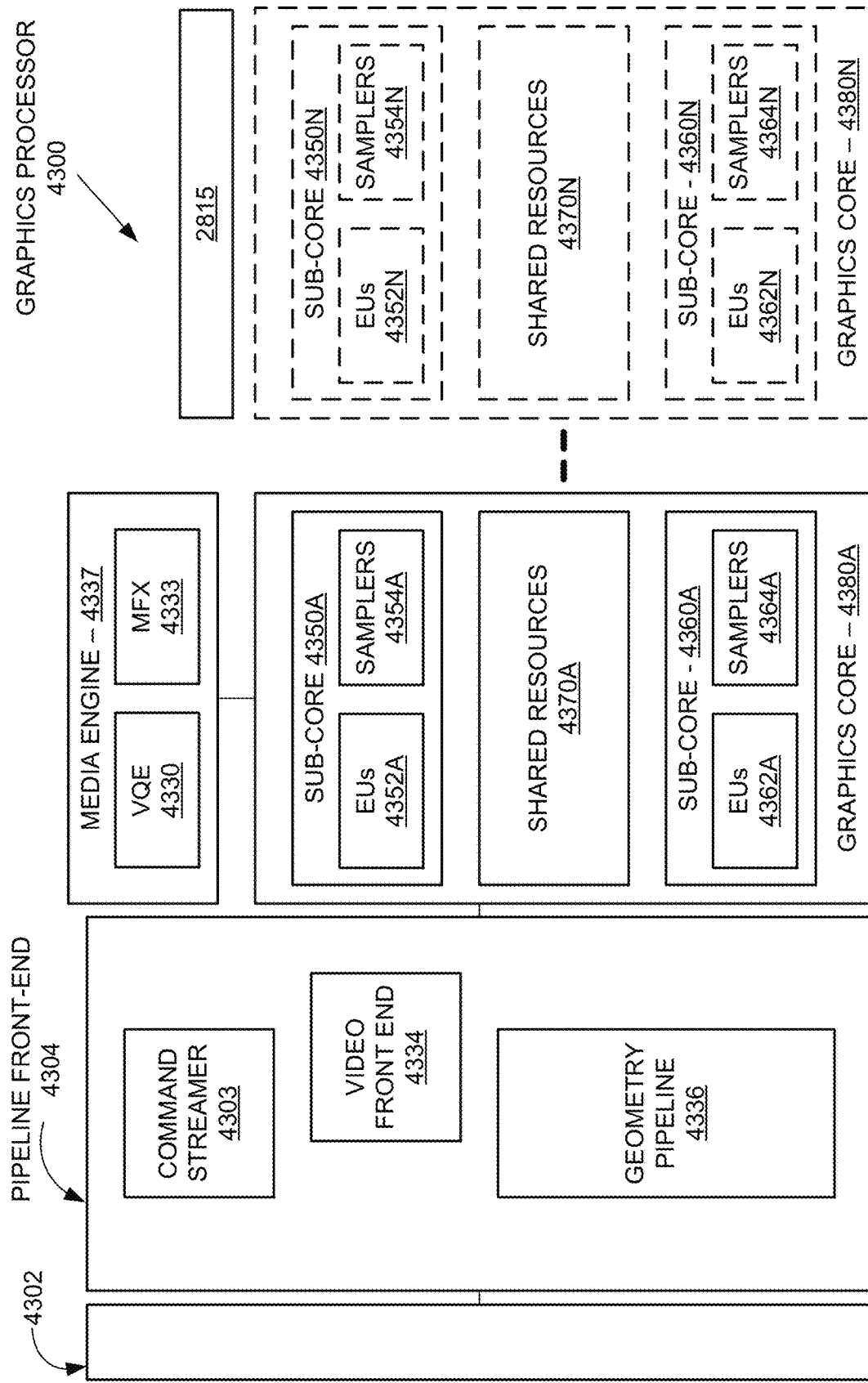
FIG. 43 illustrates a graphics processor, according to at least one embodiment.

FIG. 43 is a block diagram of a graphics processor 4300, according to at least one embodiment. In at least one embodiment, graphics processor 4300 includes a ring interconnect 4302, a pipeline front-end 4304, a media engine 4337, and graphics cores 4380A-4380N. In at least one embodiment, ring interconnect 4302 couples graphics processor 4300 to other processing units, including other graphics processors or one or more general-purpose processor cores. In at least one embodiment, graphics processor 4300 is one of many processors integrated within a multi-core processing system.

In at least one embodiment, graphics processor 4300 receives batches of commands via ring interconnect 4302. In at least one embodiment, incoming commands are interpreted by a command streamer 4303 in pipeline front-end 4304. In at least one embodiment, graphics processor 4300 includes scalable execution logic to perform 3D geometry processing and media processing via graphics core(s) 4380A-4380N. In at least one embodiment, for 3D geometry processing commands, command streamer 4303 supplies commands to geometry pipeline 4336. In at least one embodiment, for at least some media processing commands, command streamer 4303 supplies commands to a video front end 4334, which couples with media engine 4337. In at least one embodiment, media engine 4337 includes a Video Quality Engine (VQE) 4330 for video and image post-processing and a multi-format encode/decode (MFX) 4333 engine to provide hardware-accelerated media data encoding and decoding. In at least one embodiment, geometry pipeline 4336 and media engine 4337 each generate execution threads for thread execution resources provided by at least one graphics core 4380.

In at least one embodiment, graphics processor 4300 includes scalable thread execution resources featuring graphics cores 4380A-4380N (which can be modular and are sometimes referred to as core slices), each having multiple sub-cores 4350A-50N, 4360A-4360N (sometimes referred to as core sub-slices). In at least one embodiment, graphics processor 4300 can have any number of graphics cores 4380A. In at least one embodiment, graphics processor 4300 includes a graphics core 4380A having at least a first sub-core 4350A and a second sub-core 4360A. In at least one embodiment, graphics processor 4300 is a low power processor with a single sub-core (e.g., 4350A). In at least one embodiment, graphics processor 4300 includes multiple graphics cores 4380A-4380N, each including a set of first sub-cores 4350A-4350N and a set of second sub-cores 4360A-4360N. In at least one embodiment, each sub-core in first sub-cores 4350A-4350N includes at least a first set of execution units 4352A-4352N and media/texture samplers 4354A-4354N. In at least one embodiment, each sub-core in second sub-cores 4360A-4360N includes at least a second set of execution units 4362A-4362N and samplers 4364A-4364N. In at least one embodiment, each sub-core 4350A-4350N, 4360A-4360N shares a set of shared resources 4370A-4370N. In at least one embodiment, shared resources include shared cache memory and pixel operation logic.

Inference and/or training logic 2815 are used to perform inferencing and/or training operations associated with one or more embodiments. Details regarding inference and/or training logic 2815 are provided herein in conjunction with FIGS. 28A and/or 28B. In at least one embodiment, inference and/or training logic 2815 may be used in graphics processor 4300 for inferencing or predicting operations based, at least in part, on weight parameters calculated using neural network training operations, neural network functions and/or architectures, or neural network use cases described herein.

In at least one embodiment, one or more systems depicted in FIGS. 28A and 28B are utilized to implement a framework for image processing (e.g., real-time image rendering and enhancement). In at least one embodiment, one or more systems depicted in FIGS. 28A and 28B are utilized to perform various processes such as those described in connection with FIGS. 1-27. In at least one embodiment, one or more systems depicted in FIGS. 28A and 28B are utilized to generate and apply blue noise masks to images that are able to handle the temporal domain, i.e., adding time to the spatial (image) domain to improve image quality when rendering images over multiple frames (e.g., time).

Figure 44:
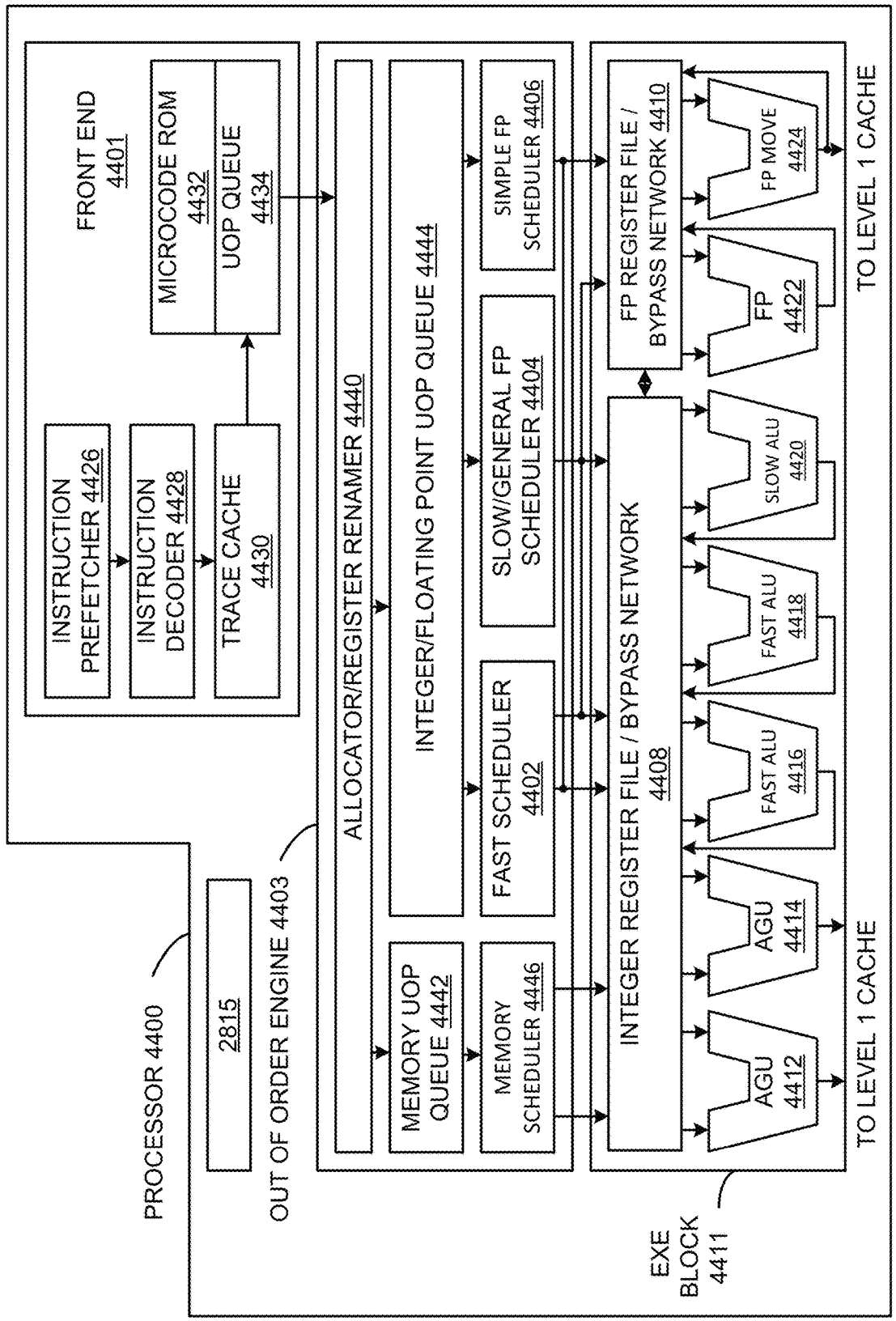
FIG. 44 is a block diagram illustrating a processor micro-architecture for a processor, according to at least one embodiment.

FIG. 44 is a block diagram illustrating micro-architecture for a processor 4400 that may include logic circuits to perform instructions, according to at least one embodiment. In at least one embodiment, processor 4400 may perform instructions, including x86 instructions, ARM instructions, specialized instructions for application-specific integrated circuits (ASICs), etc. In at least one embodiment, processor 4400 may include registers to store packed data, such as 64-bit wide MMX™ registers in microprocessors enabled with MMX technology from Intel Corporation of Santa Clara, Calif. In at least one embodiment, MMX registers, available in both integer and floating point forms, may operate with packed data elements that accompany single instruction, multiple data ("SIMD") and streaming SIMD extensions ("SSE") instructions. In at least one embodiment, 128-bit wide XMM registers relating to SSE2, SSE3, SSE4, AVX, or beyond (referred to generically as "SSEx") technology may hold such packed data operands. In at least one embodiment, processor 4400 may perform instructions to accelerate machine learning or deep learning algorithms, training, or inferencing. In at least one embodiment, processor 4400 performs process 100 (see FIG. 1A) or process 106 (see FIG. 1B).

In at least one embodiment, processor 4400 includes an in-order front end ("front end") 4401 to fetch instructions to be executed and prepare instructions to be used later in a processor pipeline. In at least one embodiment, front end 4401 may include several units. In at least one embodiment, an instruction prefetcher 4426 fetches instructions from memory and feeds instructions to an instruction decoder 4428 which in turn decodes or interprets instructions. For example, in at least one embodiment, instruction decoder 4428 decodes a received instruction into one or more operations called "micro-instructions" or "micro-operations" (also called "micro ops" or "uops") that a machine may execute. In at least one embodiment, instruction decoder 4428 parses an instruction into an opcode and corresponding data and control fields that may be used by micro-architecture to perform operations in accordance with at least one embodiment. In at least one embodiment, a trace cache 4430 may assemble decoded uops into program ordered sequences or traces in a uop queue 4434 for execution. In at least one embodiment, when trace cache 4430 encounters a complex instruction, a microcode ROM 4432 provides uops needed to complete an operation.

In at least one embodiment, some instructions may be converted into a single micro-op, whereas others need several micro-ops to complete full operation. In at least one embodiment, if more than four micro-ops are needed to complete an instruction, instruction decoder 4428 may access microcode ROM 4432 to perform that instruction. In at least one embodiment, an instruction may be decoded into a small number of micro-ops for processing at instruction decoder 4428. In at least one embodiment, an instruction may be stored within microcode ROM 4432 should a number of micro-ops be needed to accomplish such operation. In at least one embodiment, trace cache 4430 refers to an entry point programmable logic array ("PLA") to determine a correct micro-instruction pointer for reading microcode sequences to complete one or more instructions from microcode ROM 4432 in accordance with at least one embodiment. In at least one embodiment, after microcode ROM 4432 finishes sequencing micro-ops for an instruction, front end 4401 of a machine may resume fetching micro-ops from trace cache 4430.

In at least one embodiment, out-of-order execution engine ("out of order engine") 4403 may prepare instructions for execution. In at least one embodiment, out-of-order execution logic has a number of buffers to smooth out and re-order flow of instructions to optimize performance as they go down a pipeline and get scheduled for execution. In at least one embodiment, out-of-order execution engine 4403 includes, without limitation, an allocator/register renamer 4440, a memory uop queue 4442, an integer/floating point uop queue 4444, a memory scheduler 4446, a fast scheduler 4402, a slow/general floating point scheduler ("slow/general FP scheduler") 4404, and a simple floating point scheduler ("simple FP scheduler") 4406. In at least one embodiment, fast schedule 4402, slow/general floating point scheduler 4404, and simple floating point scheduler 4406 are also collectively referred to herein as "uop schedulers 4402, 4404, 4406." In at least one embodiment, allocator/register renamer 4440 allocates machine buffers and resources that each uop needs in order to execute. In at least one embodiment, allocator/register renamer 4440 renames logic registers onto entries in a register file. In at least one embodiment, allocator/register renamer 4440 also allocates an entry for each uop in one of two uop queues, memory uop queue 4442 for memory operations and integer/floating point uop queue 4444 for non-memory operations, in front of memory scheduler 4446 and uop schedulers 4402, 4404, 4406. In at least one embodiment, uop schedulers 4402, 4404, 4406, determine when a uop is ready to execute based on readiness of their dependent input register operand sources and availability of execution resources uops need to complete their operation. In at least one embodiment, fast scheduler 4402 may schedule on each half of a main clock cycle while slow/general floating point scheduler 4404 and simple floating point scheduler 4406 may schedule once per main processor clock cycle. In at least one embodiment, uop schedulers 4402, 4404, 4406 arbitrate for dispatch ports to schedule uops for execution.

In at least one embodiment, execution block 4411 includes, without limitation, an integer register file/bypass network 4408, a floating point register file/bypass network ("FP register file/bypass network") 4410, address generation units ("AGUs") 4412 and 4414, fast Arithmetic Logic Units (ALUs) ("fast ALUs") 4416 and 4418, a slow Arithmetic Logic Unit ("slow ALU") 4420, a floating point ALU ("FP") 4422, and a floating point move unit ("FP move") 4424. In at least one embodiment, integer register file/bypass network 4408 and floating point register file/bypass network 4410 are also referred to herein as "register files 4408, 4410." In at least one embodiment, AGUSs 4412 and 4414, fast ALUs 4416 and 4418, slow ALU 4420, floating point ALU 4422, and floating point move unit 4424 are also referred to herein as "execution units 4412, 4414, 4416, 4418, 4420, 4422, and 4424." In at least one embodiment, execution block 4411 may include, without limitation, any number (including zero) and type of register files, bypass networks, address generation units, and execution units, in any combination.

In at least one embodiment, register networks 4408, 4410 may be arranged between uop schedulers 4402, 4404, 4406, and execution units 4412, 4414, 4416, 4418, 4420, 4422, and 4424. In at least one embodiment, integer register file/bypass network 4408 performs integer operations. In at least one embodiment, floating point register file/bypass network 4410 performs floating point operations. In at least one embodiment, each of register networks 4408, 4410 may include, without limitation, a bypass network that may bypass or forward just completed results that have not yet been written into a register file to new dependent uops. In at least one embodiment, register networks 4408, 4410 may communicate data with each other. In at least one embodiment, integer register file/bypass network 4408 may include, without limitation, two separate register files, one register file for a low-order thirty-two bits of data and a second register file for a high order thirty-two bits of data. In at least one embodiment, floating point register file/bypass network 4410 may include, without limitation, 128-bit wide entries because floating point instructions typically have operands from 64 to 128 bits in width.

In at least one embodiment, execution units 4412, 4414, 4416, 4418, 4420, 4422, 4424 may execute instructions. In at least one embodiment, register networks 4408, 4410 store integer and floating point data operand values that microinstructions need to execute. In at least one embodiment, processor 4400 may include, without limitation, any number and combination of execution units 4412, 4414, 4416, 4418, 4420, 4422, 4424. In at least one embodiment, floating point ALU 4422 and floating point move unit 4424, may execute floating point, MMX, SIMD, AVX and SSE, or other operations, including specialized machine learning instructions. In at least one embodiment, floating point ALU 4422 may include, without limitation, a 64-bit by 64-bit floating point divider to execute divide, square root, and remainder micro ops. In at least one embodiment, instructions involving a floating point value may be handled with floating point hardware. In at least one embodiment, ALU operations may be passed to fast ALUs 4416, 4418. In at least one embodiment, fast ALUS 4416, 4418 may execute fast operations with an effective latency of half a clock cycle. In at least one embodiment, most complex integer operations go to slow ALU 4420 as slow ALU 4420 may include, without limitation, integer execution hardware for long-latency type of operations, such as a multiplier, shifts, flag logic, and branch processing. In at least one embodiment, memory load/store operations may be executed by AGUs 4412, 4414. In at least one embodiment, fast ALU 4416, fast ALU 4418, and slow ALU 4420 may perform integer operations on 64-bit data operands. In at least one embodiment, fast ALU 4416, fast ALU 4418, and slow ALU 4420 may be implemented to support a variety of data bit sizes including sixteen, thirty-two, 128, 256, etc. In at least one embodiment, floating point ALU 4422 and floating point move unit 4424 may be implemented to support a range of operands having bits of various widths, such as 128-bit wide packed data operands in conjunction with SIMD and multimedia instructions.

In at least one embodiment, uop schedulers 4402, 4404, 4406 dispatch dependent operations before a parent load has finished executing. In at least one embodiment, as uops may be speculatively scheduled and executed in processor 4400, processor 4400 may also include logic to handle memory misses. In at least one embodiment, if a data load misses in a data cache, there may be dependent operations in flight in a pipeline that have left a scheduler with temporarily incorrect data. In at least one embodiment, a replay mechanism tracks and re-executes instructions that use incorrect data. In at least one embodiment, dependent operations might need to be replayed and independent ones may be allowed to complete. In at least one embodiment, schedulers and a replay mechanism of at least one embodiment of a processor may also be designed to catch instruction sequences for text string comparison operations.

In at least one embodiment, "registers" may refer to on-board processor storage locations that may be used as part of instructions to identify operands. In at least one embodiment, registers may be those that may be usable from outside of a processor (from a programmer's perspective). In at least one embodiment, registers might not be limited to a particular type of circuit. Rather, in at least one embodiment, a register may store data, provide data, and perform functions described herein. In at least one embodiment, registers described herein may be implemented by circuitry within a processor using any number of different techniques, such as dedicated physical registers, dynamically allocated physical registers using register renaming, combinations of dedicated and dynamically allocated physical registers, etc. In at least one embodiment, integer registers store 32-bit integer data. A register file of at least one embodiment also contains eight multimedia SIMD registers for packed data.

Inference and/or training logic 2815 are used to perform inferencing and/or training operations associated with one or more embodiments. Details regarding inference and/or training logic 2815 are provided herein in conjunction with FIGS. 28A and/or 28B. In at least one embodiment portions or all of inference and/or training logic 2815 may be incorporated into execution block 4411 and other memory or registers shown or not shown. For example, in at least one embodiment, training and/or inferencing techniques described herein may use one or more of ALUs illustrated in execution block 4411. Moreover, weight parameters may be stored in on-chip or off-chip memory and/or registers (shown or not shown) that configure ALUs of execution block 4411 to perform one or more machine learning algorithms, neural network architectures, use cases, or training techniques described herein.

In at least one embodiment, one or more systems depicted in FIGS. 28A and 28B are utilized to implement a framework for image processing (e.g., real-time image rendering and enhancement). In at least one embodiment, one or more systems depicted in FIGS. 28A and 28B are utilized to perform various processes such as those described in connection with FIGS. 1-27. In at least one embodiment, one or more systems depicted in FIGS. 28A and 28B are utilized to generate and apply blue noise masks to images that are able to handle the temporal domain, i.e., adding time to the spatial (image) domain to improve image quality when rendering images over multiple frames (e.g., time).

Figure 45:
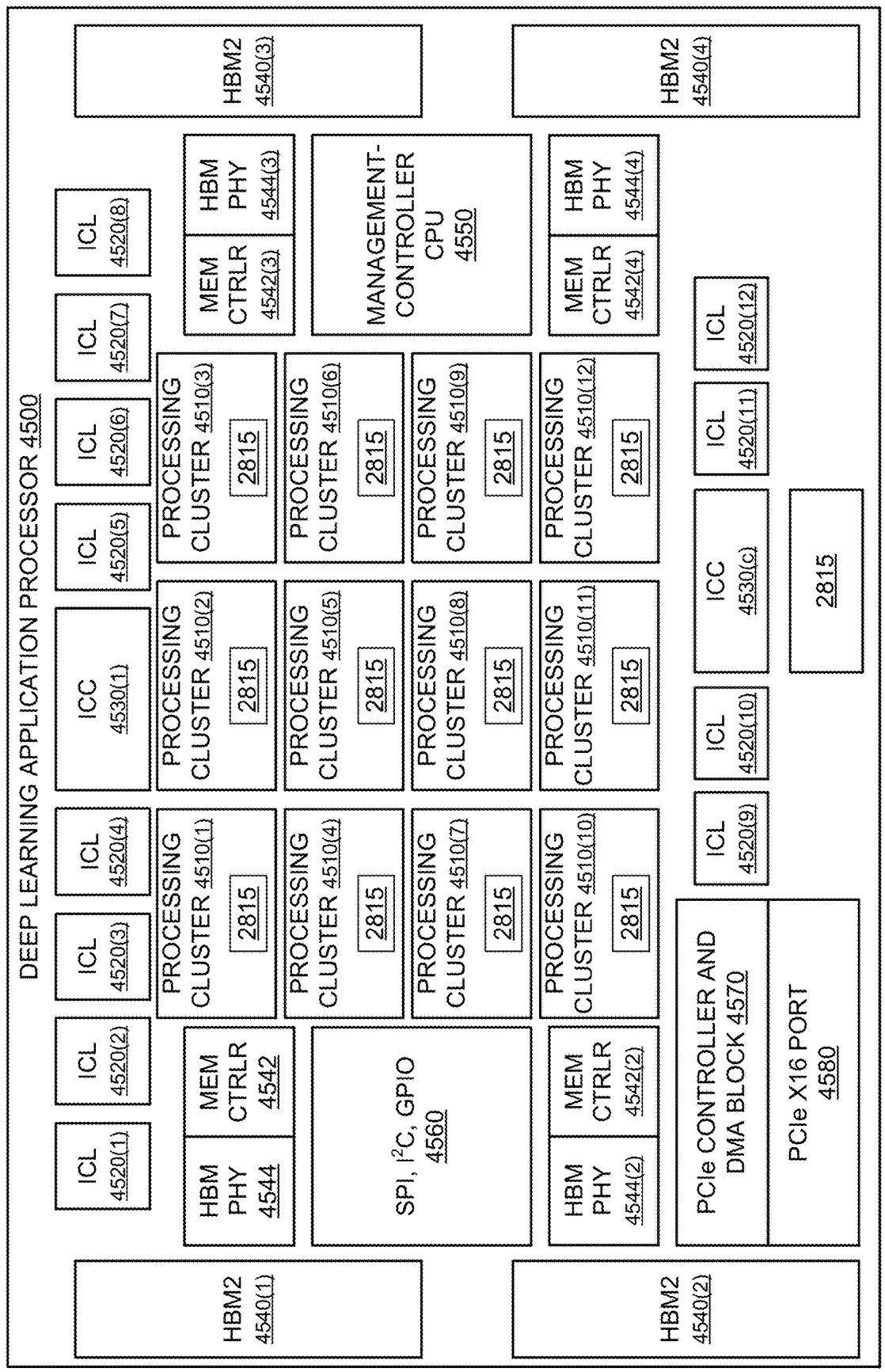
FIG. 45 illustrates a deep learning application processor, according to at least one embodiment.

FIG. 45 illustrates a deep learning application processor 4500, according to at least one embodiment. In at least one embodiment, deep learning application processor 4500 uses instructions that, if executed by deep learning application processor 4500, cause deep learning application processor 4500 to perform some or all of processes and techniques described throughout this disclosure. In at least one embodiment, deep learning application processor 4500 is an application-specific integrated circuit (ASIC). In at least one embodiment, application processor 4500 performs matrix multiply operations either "hard-wired" into hardware as a result of performing one or more instructions or both. In at least one embodiment, deep learning application processor 4500 includes, without limitation, processing clusters 4510(1)-4510(12), Inter-Chip Links ("ICLs") 4520(1)-4520(12), Inter-Chip Controllers ("ICCs") 4530(1)-4530(2), high-bandwidth memory second generation ("HBM2") 4540(1)-4540(4), memory controllers ("Mem Ctrlrs") 4542(1)-4542(4), high bandwidth memory physical layer ("HBM PHY") 4544(1)-4544(4), a management-controller central processing unit ("management-controller CPU") 4550, a Serial Peripheral Interface, Inter-Integrated Circuit, and General Purpose Input/Output block ("SPI, I²C, GPIO") 4560, a peripheral component interconnect express controller and direct memory access block ("PCIe Controller and DMA") 4570, and a sixteen-lane peripheral component interconnect express port ("PCI Express×16") 4580.

In at least one embodiment, processing clusters 4510 may perform deep learning operations, including inference or prediction operations based on weight parameters calculated one or more training techniques, including those described herein. In at least one embodiment, each processing cluster 4510 may include, without limitation, any number and type of processors. In at least one embodiment, deep learning application processor 4500 may include any number and type of processing clusters 4510. In at least one embodiment, Inter-Chip Links 4520 are bi-directional. In at least one embodiment, Inter-Chip Links 4520 and Inter-Chip Controllers 4530 enable multiple deep learning application processors 4500 to exchange information, including activation information resulting from performing one or more machine learning algorithms embodied in one or more neural networks. In at least one embodiment, deep learning application processor 4500 may include any number (including zero) and type of ICLs 4520 and ICCs 4530. In at least one embodiment, processor 4500 performs process 100 (see FIG. 1A) or process 106 (see FIG. 1B).

In at least one embodiment, HBM2s 4540 provide a total of 32 Gigabytes (GB) of memory. In at least one embodiment, HBM2 4540($i$) is associated with both memory controller 4542($i$) and HBM PHY 4544($i$) where "i" is an arbitrary integer. In at least one embodiment, any number of HBM2s 4540 may provide any type and total amount of high bandwidth memory and may be associated with any number (including zero) and type of memory controllers 4542 and HBM PHYs 4544. In at least one embodiment, SPI, I²C, GPIO 4560, PCIe Controller and DMA 4570, and/or PCIe 4580 may be replaced with any number and type of blocks that enable any number and type of communication standards in any technically feasible fashion.

Inference and/or training logic 2815 are used to perform inferencing and/or training operations associated with one or more embodiments. Details regarding inference and/or training logic 2815 are provided herein in conjunction with FIGS. 28A and/or 28B. In at least one embodiment, deep learning application processor is used to train a machine learning model, such as a neural network, to predict or infer information provided to deep learning application processor 4500. In at least one embodiment, deep learning application processor 4500 is used to infer or predict information based on a trained machine learning model (e.g., neural network) that has been trained by another processor or system or by deep learning application processor 4500. In at least one embodiment, processor 4500 may be used to perform one or more neural network use cases described herein.

In at least one embodiment, one or more systems depicted in FIGS. 28A and 28B are utilized to implement a framework for image processing (e.g., real-time image rendering and enhancement). In at least one embodiment, one or more systems depicted in FIGS. 28A and 28B are utilized to perform various processes such as those described in connection with FIGS. 1-27. In at least one embodiment, one or more systems depicted in FIGS. 28A and 28B are utilized to generate and apply blue noise masks to images that are able to handle the temporal domain, i.e., adding time to the spatial (image) domain to improve image quality when rendering images over multiple frames (e.g., time).

Figure 46:
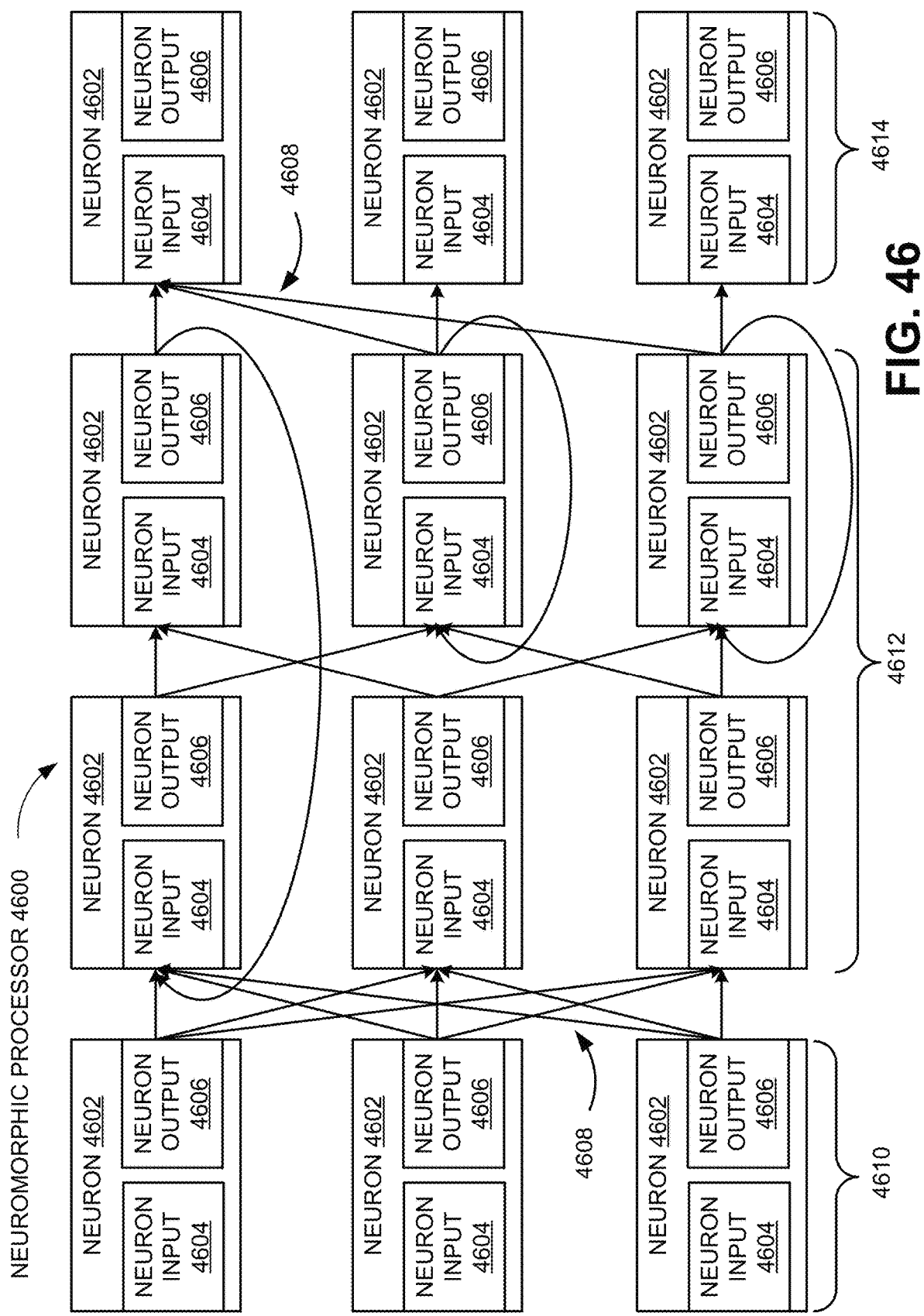
FIG. 46 is a block diagram illustrating an example neuromorphic processor, according to at least one embodiment.

FIG. 46 is a block diagram of a neuromorphic processor 4600, according to at least one embodiment. In at least one embodiment, neuromorphic processor 4600 may receive one or more inputs from sources external to neuromorphic processor 4600. In at least one embodiment, these inputs may be transmitted to one or more neurons 4602 within neuromorphic processor 4600. In at least one embodiment, neurons 4602 and components thereof may be implemented using circuitry or logic, including one or more arithmetic logic units (ALUs). In at least one embodiment, neuromorphic processor 4600 may include, without limitation, thousands or millions of instances of neurons 4602, but any suitable number of neurons 4602 may be used. In at least one embodiment, each instance of neuron 4602 may include a neuron input 4604 and a neuron output 4606. In at least one embodiment, neurons 4602 may generate outputs that may be transmitted to inputs of other instances of neurons 4602. For example, in at least one embodiment, neuron inputs 4604 and neuron outputs 4606 may be interconnected via synapses 4608.

In at least one embodiment, neurons 4602 and synapses 4608 may be interconnected such that neuromorphic processor 4600 operates to process or analyze information received by neuromorphic processor 4600. In at least one embodiment, neurons 4602 may transmit an output pulse (or "fire" or "spike") when inputs received through neuron input 4604 exceed a threshold. In at least one embodiment, neurons 4602 may sum or integrate signals received at neuron inputs 4604. For example, in at least one embodiment, neurons 4602 may be implemented as leaky integrate-and-fire neurons, wherein if a sum (referred to as a "membrane potential") exceeds a threshold value, neuron 4602 may generate an output (or "fire") using a transfer function such as a sigmoid or threshold function. In at least one embodiment, a leaky integrate-and-fire neuron may sum signals received at neuron inputs 4604 into a membrane potential and may also apply a decay factor (or leak) to reduce a membrane potential. In at least one embodiment, a leaky integrate-and-fire neuron may fire if multiple input signals are received at neuron inputs 4604 rapidly enough to exceed a threshold value (i.e., before a membrane potential decays too low to fire). In at least one embodiment, neurons 4602 may be implemented using circuits or logic that receive inputs, integrate inputs into a membrane potential, and decay a membrane potential. In at least one embodiment, inputs may be averaged, or any other suitable transfer function may be used. Furthermore, in at least one embodiment, neurons 4602 may include, without limitation, comparator circuits or logic that generate an output spike at neuron output 4606 when result of applying a transfer function to neuron input 4604 exceeds a threshold. In at least one embodiment, once neuron 4602 fires, it may disregard previously received input information by, for example, resetting a membrane potential to 0 or another suitable default value. In at least one embodiment, once membrane potential is reset to 0, neuron 4602 may resume normal operation after a suitable period of time (or refractory period).

In at least one embodiment, neurons 4602 may be interconnected through synapses 4608. In at least one embodiment, synapses 4608 may operate to transmit signals from an output of a first neuron 4602 to an input of a second neuron 4602. In at least one embodiment, neurons 4602 may transmit information over more than one instance of synapse 4608. In at least one embodiment, one or more instances of neuron output 4606 may be connected, via an instance of synapse 4608, to an instance of neuron input 4604 in same neuron 4602. In at least one embodiment, an instance of neuron 4602 generating an output to be transmitted over an instance of synapse 4608 may be referred to as a "pre-synaptic neuron" with respect to that instance of synapse 4608. In at least one embodiment, an instance of neuron 4602 receiving an input transmitted over an instance of synapse 4608 may be referred to as a "post-synaptic neuron" with respect to that instance of synapse 4608. Because an instance of neuron 4602 may receive inputs from one or more instances of synapse 4608, and may also transmit outputs over one or more instances of synapse 4608, a single instance of neuron 4602 may therefore be both a "pre-synaptic neuron" and "post-synaptic neuron," with respect to various instances of synapses 4608, in at least one embodiment.

In at least one embodiment, neurons 4602 may be organized into one or more layers. In at least one embodiment, each instance of neuron 4602 may have one neuron output 4606 that may fan out through one or more synapses 4608 to one or more neuron inputs 4604. In at least one embodiment, neuron outputs 4606 of neurons 4602 in a first layer 4610 may be connected to neuron inputs 4604 of neurons 4602 in a second layer 4612. In at least one embodiment, layer 4610 may be referred to as a "feed-forward layer." In at least one embodiment, each instance of neuron 4602 in an instance of first layer 4610 may fan out to each instance of neuron 4602 in second layer 4612. In at least one embodiment, first layer 4610 may be referred to as a "fully connected feed-forward layer." In at least one embodiment, each instance of neuron 4602 in an instance of second layer 4612 may fan out to fewer than all instances of neuron 4602 in a third layer 4614. In at least one embodiment, second layer 4612 may be referred to as a "sparsely connected feed-forward layer." In at least one embodiment, neurons 4602 in second layer 4612 may fan out to neurons 4602 in multiple other layers, including to neurons 4602 also in second layer 4612. In at least one embodiment, second layer 4612 may be referred to as a "recurrent layer." In at least one embodiment, neuromorphic processor 4600 may include, without limitation, any suitable combination of recurrent layers and feed-forward layers, including, without limitation, both sparsely connected feed-forward layers and fully connected feed-forward layers.

In at least one embodiment, neuromorphic processor 4600 may include, without limitation, a reconfigurable interconnect architecture or dedicated hard-wired interconnects to connect synapse 4608 to neurons 4602. In at least one embodiment, neuromorphic processor 4600 may include, without limitation, circuitry or logic that allows synapses to be allocated to different neurons 4602 as needed based on neural network topology and neuron fan-in/out. For example, in at least one embodiment, synapses 4608 may be connected to neurons 4602 using an interconnect fabric, such as network-on-chip, or with dedicated connections. In at least one embodiment, synapse interconnections and components thereof may be implemented using circuitry or logic.

In at least one embodiment, one or more systems depicted in FIGS. 28A and 28B are utilized to implement a framework for image processing (e.g., real-time image rendering and enhancement). In at least one embodiment, one or more systems depicted in FIGS. 28A and 28B are utilized to perform various processes such as those described in connection with FIGS. 1-27. In at least one embodiment, one or more systems depicted in FIGS. 28A and 28B are utilized to generate and apply blue noise masks to images that are able to handle the temporal domain, i.e., adding time to the spatial (image) domain to improve image quality when rendering images over multiple frames (e.g., time).

Figure 47:
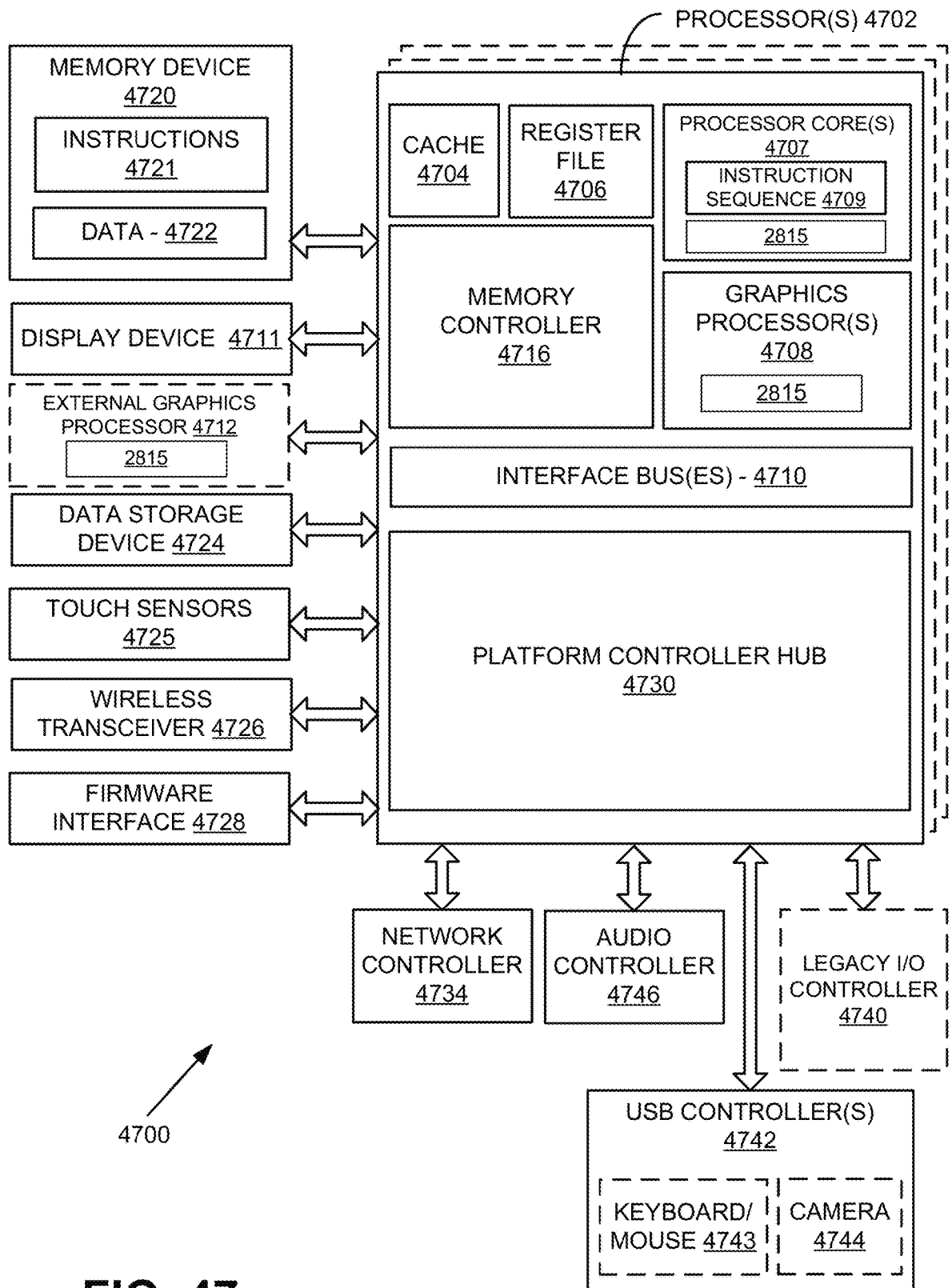
FIG. 47 illustrates at least portions of a graphics processor, according to one or more embodiments.

FIG. 47 is a block diagram of a processing system, according to at least one embodiment. In at least one embodiment, system 4700 includes one or more processors 4702 and one or more graphics processors 4708, and may be a single processor desktop system, a multiprocessor workstation system, or a server system having a large number of processors 4702 or processor cores 4707. In at least one embodiment, system 4700 is a processing platform incorporated within a system-on-a-chip (SoC) integrated circuit for use in mobile, handheld, or embedded devices. In at least one embodiment, system 4700 performs process 100 (see FIG. 1A) and/or process 106 (see FIG. 1B).

In at least one embodiment, system 4700 can include, or be incorporated within a server-based gaming platform, a game console, including a game and media console, a mobile gaming console, a handheld game console, or an online game console. In at least one embodiment, system 4700 is a mobile phone, a smart phone, a tablet computing device or a mobile Internet device. In at least one embodiment, processing system 4700 can also include, couple with, or be integrated within a wearable device, such as a smart watch wearable device, a smart eyewear device, an augmented reality device, or a virtual reality device. In at least one embodiment, processing system 4700 is a television or set top box device having one or more processors 4702 and a graphical interface generated by one or more graphics processors 4708.

In at least one embodiment, one or more processors 4702 each include one or more processor cores 4707 to process instructions which, when executed, perform operations for system and user software. In at least one embodiment, each of one or more processor cores 4707 is configured to process a specific instruction sequence 4709. In at least one embodiment, instruction sequence 4709 may facilitate Complex Instruction Set Computing (CISC), Reduced Instruction Set Computing (RISC), or computing via a Very Long Instruction Word (VLIW). In at least one embodiment, processor cores 4707 may each process a different instruction sequence 4709, which may include instructions to facilitate emulation of other instruction sequences. In at least one embodiment, processor core 4707 may also include other processing devices, such a Digital Signal Processor (DSP).

In at least one embodiment, processor 4702 includes a cache memory 4704. In at least one embodiment, processor 4702 can have a single internal cache or multiple levels of internal cache. In at least one embodiment, cache memory is shared among various components of processor 4702. In at least one embodiment, processor 4702 also uses an external cache (e.g., a Level-3 (L3) cache or Last Level Cache (LLC)) (not shown), which may be shared among processor cores 4707 using known cache coherency techniques. In at least one embodiment, a register file 4706 is additionally included in processor 4702, which may include different types of registers for storing different types of data (e.g., integer registers, floating point registers, status registers, and an instruction pointer register). In at least one embodiment, register file 4706 may include general-purpose registers or other registers.

In at least one embodiment, one or more processor(s) 4702 are coupled with one or more interface bus(es) 4710 to transmit communication signals such as address, data, or control signals between processor 4702 and other components in system 4700. In at least one embodiment, interface bus 4710 can be a processor bus, such as a version of a Direct Media Interface (DMI) bus. In at least one embodiment, interface bus 4710 is not limited to a DMI bus, and may include one or more Peripheral Component Interconnect buses (e.g., PCI, PCI Express), memory busses, or other types of interface busses. In at least one embodiment processor(s) 4702 include an integrated memory controller 4716 and a platform controller hub 4730. In at least one embodiment, memory controller 4716 facilitates communication between a memory device and other components of system 4700, while platform controller hub (PCH) 4730 provides connections to I/O devices via a local I/O bus.

In at least one embodiment, a memory device 4720 can be a dynamic random access memory (DRAM) device, a static random access memory (SRAM) device, flash memory device, phase-change memory device, or some other memory device having suitable performance to serve as process memory. In at least one embodiment, memory device 4720 can operate as system memory for system 4700, to store data 4722 and instructions 4721 for use when one or more processors 4702 executes an application or process. In at least one embodiment, memory controller 4716 also couples with an optional external graphics processor 4712, which may communicate with one or more graphics processors 4708 in processors 4702 to perform graphics and media operations. In at least one embodiment, a display device 4711 can connect to processor(s) 4702. In at least one embodiment, display device 4711 can include one or more of an internal display device, as in a mobile electronic device or a laptop device, or an external display device attached via a display interface (e.g., DisplayPort, etc.). In at least one embodiment, display device 4711 can include a head mounted display (HMD) such as a stereoscopic display device for use in virtual reality (VR) applications or augmented reality (AR) applications.

In at least one embodiment, platform controller hub 4730 enables peripherals to connect to memory device 4720 and processor 4702 via a high-speed I/O bus. In at least one embodiment, I/O peripherals include, but are not limited to, an audio controller 4746, a network controller 4734, a firmware interface 4728, a wireless transceiver 4726, touch sensors 4725, a data storage device 4724 (e.g., hard disk drive, flash memory, etc.). In at least one embodiment, data storage device 4724 can connect via a storage interface (e.g., SATA) or via a peripheral bus, such as a Peripheral Component Interconnect bus (e.g., PCI, PCI Express). In at least one embodiment, touch sensors 4725 can include touch screen sensors, pressure sensors, or fingerprint sensors. In at least one embodiment, wireless transceiver 4726 can be a Wi-Fi transceiver, a Bluetooth transceiver, or a mobile network transceiver such as a 3G, 4G, or Long Term Evolution (LTE) transceiver. In at least one embodiment, firmware interface 4728 enables communication with system firmware, and can be, for example, a unified extensible firmware interface (UEFI). In at least one embodiment, network controller 4734 can enable a network connection to a wired network. In at least one embodiment, a high-performance network controller (not shown) couples with interface bus 4710. In at least one embodiment, audio controller 4746 is a multi-channel high definition audio controller. In at least one embodiment, system 4700 includes an optional legacy I/O controller 4740 for coupling legacy (e.g., Personal System 2 (PS/2)) devices to system 4700. In at least one embodiment, platform controller hub 4730 can also connect to one or more Universal Serial Bus (USB) controllers 4742 connect input devices, such as keyboard and mouse 4743 combinations, a camera 4744, or other USB input devices.

In at least one embodiment, an instance of memory controller 4716 and platform controller hub 4730 may be integrated into a discreet external graphics processor, such as external graphics processor 4712. In at least one embodiment, platform controller hub 4730 and/or memory controller 4716 may be external to one or more processor(s) 4702. For example, in at least one embodiment, system 4700 can include an external memory controller 4716 and platform controller hub 4730, which may be configured as a memory controller hub and peripheral controller hub within a system chipset that is in communication with processor(s) 4702.

Inference and/or training logic 2815 are used to perform inferencing and/or training operations associated with one or more embodiments. Details regarding inference and/or training logic 2815 are provided herein in conjunction with FIGS. 28A and/or 28B. In at least one embodiment portions or all of inference and/or training logic 2815 may be incorporated into graphics processor(s) 4708. For example, in at least one embodiment, training and/or inferencing techniques described herein may use one or more of ALUs embodied in a 3D pipeline. Moreover, in at least one embodiment, inferencing and/or training operations described herein may be done using logic other than logic illustrated in FIG. 28A or 28B. In at least one embodiment, weight parameters may be stored in on-chip or off-chip memory and/or registers (shown or not shown) that configure ALUs of graphics processor(s) 4708 to perform one or more machine learning algorithms, neural network architectures, use cases, or training techniques described herein.

In at least one embodiment, one or more systems depicted in FIGS. 28A and 28B are utilized to implement a framework for image processing (e.g., real-time image rendering and enhancement). In at least one embodiment, one or more systems depicted in FIGS. 28A and 28B are utilized to perform various processes such as those described in connection with FIGS. 1-27. In at least one embodiment, one or more systems depicted in FIGS. 28A and 28B are utilized to generate and apply blue noise masks to images that are able to handle the temporal domain, i.e., adding time to the spatial (image) domain to improve image quality when rendering images over multiple frames (e.g., time).

Figure 48:
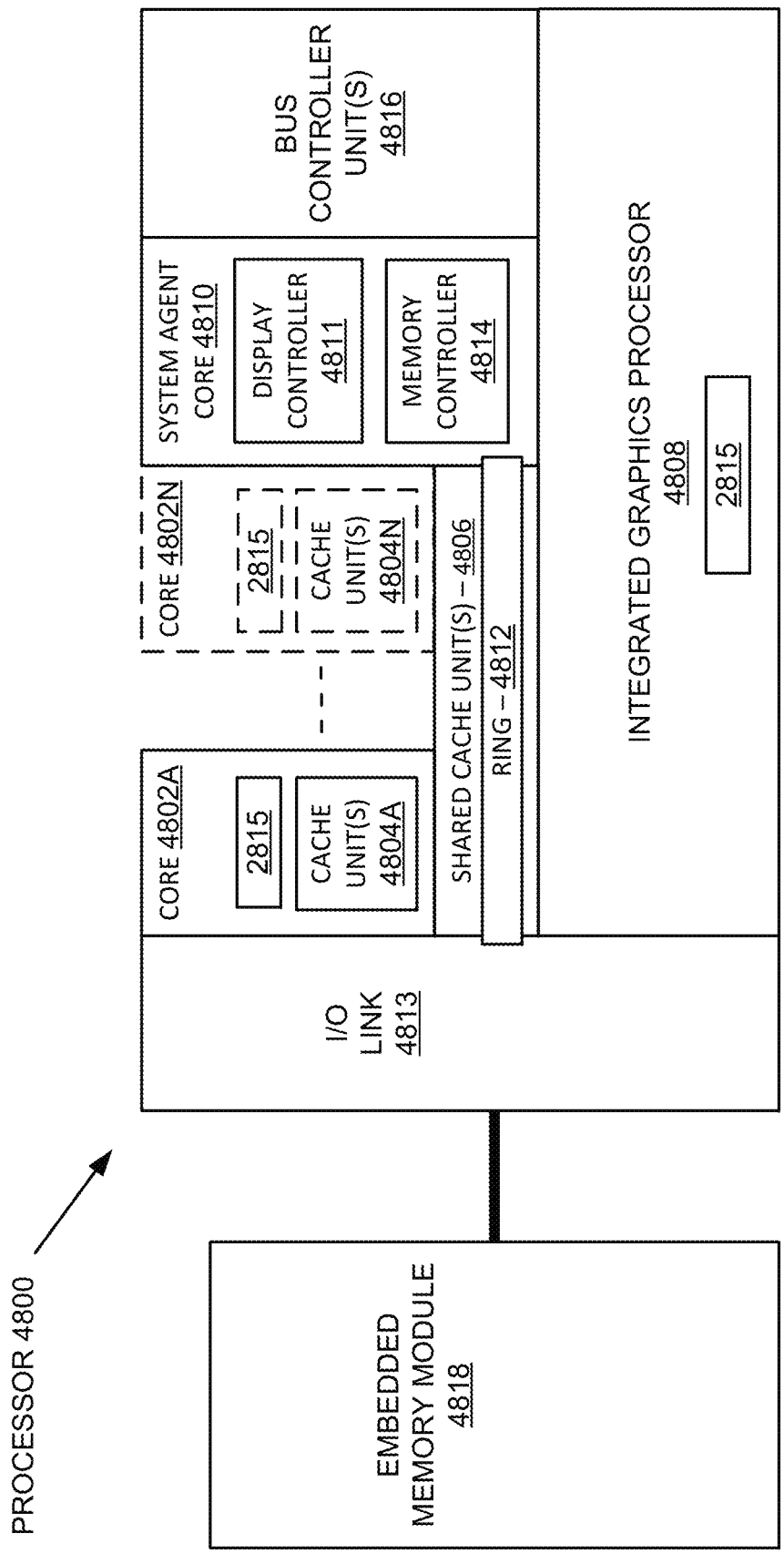
FIG. 48 illustrates at least portions of a graphics processor, according to one or more embodiments.

FIG. 48 is a block diagram of a processor 4800 having one or more processor cores 4802A-4802N, an integrated memory controller 4814, and an integrated graphics processor 4808, according to at least one embodiment. In at least one embodiment, processor 4800 can include additional cores up to and including additional core 4802N represented by dashed lined boxes. In at least one embodiment, each of processor cores 4802A-4802N includes one or more internal cache units 4804A-4804N. In at least one embodiment, each processor core also has access to one or more shared cached units 4806. In at least one embodiment, processor 4800 performs process 100 (see FIG. 1A) or process 106 (see FIG. 1B).

In at least one embodiment, internal cache units 4804A-4804N and shared cache units 4806 represent a cache memory hierarchy within processor 4800. In at least one embodiment, cache memory units 4804A-4804N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 4806 and 4804A-4804N.

In at least one embodiment, processor 4800 may also include a set of one or more bus controller units 4816 and a system agent core 4810. In at least one embodiment, bus controller units 4816 manage a set of peripheral buses, such as one or more PCI or PCI express busses. In at least one embodiment, system agent core 4810 provides management functionality for various processor components. In at least one embodiment, system agent core 4810 includes one or more integrated memory controllers 4814 to manage access to various external memory devices (not shown).

In at least one embodiment, one or more of processor cores 4802A-4802N include support for simultaneous multi-threading. In at least one embodiment, system agent core 4810 includes components for coordinating and operating cores 4802A-4802N during multi-threaded processing. In at least one embodiment, system agent core 4810 may additionally include a power control unit (PCU), which includes logic and components to regulate one or more power states of processor cores 4802A-4802N and graphics processor 4808.

In at least one embodiment, processor 4800 additionally includes graphics processor 4808 to execute graphics processing operations. In at least one embodiment, graphics processor 4808 couples with shared cache units 4806, and system agent core 4810, including one or more integrated memory controllers 4814. In at least one embodiment, system agent core 4810 also includes a display controller 4811 to drive graphics processor output to one or more coupled displays. In at least one embodiment, display controller 4811 may also be a separate module coupled with graphics processor 4808 via at least one interconnect, or may be integrated within graphics processor 4808.

In at least one embodiment, a ring-based interconnect unit 4812 is used to couple internal components of processor 4800. In at least one embodiment, an alternative interconnect unit may be used, such as a point-to-point interconnect, a switched interconnect, or other techniques. In at least one embodiment, graphics processor 4808 couples with ring interconnect 4812 via an I/O link 4813.

In at least one embodiment, I/O link 4813 represents at least one of multiple varieties of I/O interconnects, including an on package I/O interconnect which facilitates communication between various processor components and a high-performance embedded memory module 4818, such as an eDRAM module. In at least one embodiment, each of processor cores 4802A-4802N and graphics processor 4808 use embedded memory module 4818 as a shared Last Level Cache.

In at least one embodiment, processor cores 4802A-4802N are homogeneous cores executing a common instruction set architecture. In at least one embodiment, processor cores 4802A-4802N are heterogeneous in terms of instruction set architecture (ISA), where one or more of processor cores 4802A-4802N execute a common instruction set, while one or more other cores of processor cores 4802A-4802N executes a subset of a common instruction set or a different instruction set. In at least one embodiment, processor cores 4802A-4802N are heterogeneous in terms of microarchitecture, where one or more cores having a relatively higher power consumption couple with one or more power cores having a lower power consumption. In at least one embodiment, processor 4800 can be implemented on one or more chips or as an SoC integrated circuit.

Inference and/or training logic 2815 are used to perform inferencing and/or training operations associated with one or more embodiments. Details regarding inference and/or training logic 2815 are provided herein in conjunction with FIGS. 28A and/or 28B. In at least one embodiment portions or all of inference and/or training logic 2815 may be incorporated into processor 4800. For example, in at least one embodiment, training and/or inferencing techniques described herein may use one or more of ALUs embodied in a 3D pipeline, graphics core(s) 4802, shared function logic, or other logic in FIG. 48. Moreover, in at least one embodiment, inferencing and/or training operations described herein may be done using logic other than logic illustrated in FIG. 28A or 28B. In at least one embodiment, weight parameters may be stored in on-chip or off-chip memory and/or registers (shown or not shown) that configure ALUs of processor 4800 to perform one or more machine learning algorithms, neural network architectures, use cases, or training techniques described herein.

In at least one embodiment, one or more systems depicted in FIGS. 28A and 28B are utilized to implement a framework for image processing (e.g., real-time image rendering and enhancement). In at least one embodiment, one or more systems depicted in FIGS. 28A and 28B are utilized to perform various processes such as those described in connection with FIGS. 1-27. In at least one embodiment, one or more systems depicted in FIGS. 28A and 28B are utilized to generate and apply blue noise masks to images that are able to handle the temporal domain, i.e., adding time to the spatial (image) domain to improve image quality when rendering images over multiple frames (e.g., time).

Figure 49:
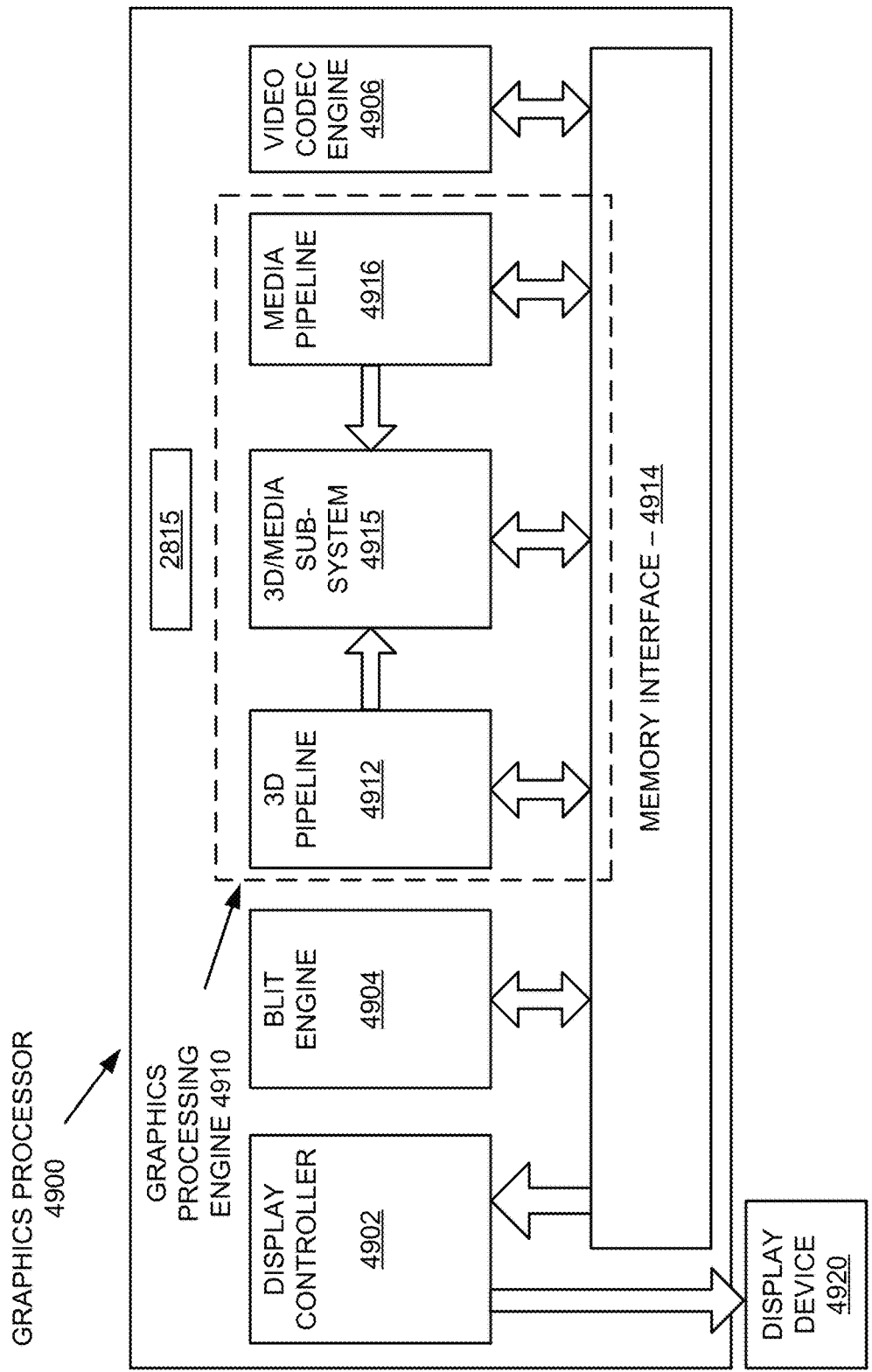
FIG. 49 illustrates at least portions of a graphics processor, according to one or more embodiments.

FIG. 49 is a block diagram of a graphics processor 4900, which may be a discrete graphics processing unit, or may be a graphics processor integrated with a plurality of processing cores. In at least one embodiment, graphics processor 4900 communicates via a memory mapped I/O interface to registers on graphics processor 4900 and with commands placed into memory. In at least one embodiment, graphics processor 4900 includes a memory interface 4914 to access memory. In at least one embodiment, memory interface 4914 is an interface to local memory, one or more internal caches, one or more shared external caches, and/or to system memory.

In at least one embodiment, graphics processor 4900 also includes a display controller 4902 to drive display output data to a display device 4920. In at least one embodiment, display controller 4902 includes hardware for one or more overlay planes for display device 4920 and composition of multiple layers of video or user interface elements. In at least one embodiment, display device 4920 can be an internal or external display device. In at least one embodiment, display device 4920 is a head mounted display device, such as a virtual reality (VR) display device or an augmented reality (AR) display device. In at least one embodiment, graphics processor 4900 includes a video codec engine 4906 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats. In at least one embodiment, graphics processor 4900 performs process 100 (see FIG. 1A) or process 106 (see FIG. 1B).

In at least one embodiment, graphics processor 4900 includes a block image transfer (BLIT) engine 4904 to perform two-dimensional (2D) rasterizer operations including, for example, bit-boundary block transfers. However, in at least one embodiment, 2D graphics operations are performed using one or more components of a graphics processing engine (GPE) 4910. In at least one embodiment, GPE 4910 is a compute engine for performing graphics operations, including three-dimensional (3D) graphics operations and media operations.

In at least one embodiment, GPE 4910 includes a 3D pipeline 4912 for performing 3D operations, such as rendering three-dimensional images and scenes using processing functions that act upon 3D primitive shapes (e.g., rectangle, triangle, etc.). In at least one embodiment, 3D pipeline 4912 includes programmable and fixed function elements that perform various tasks and/or spawn execution threads to a 3D/Media sub-system 4915. While 3D pipeline 4912 can be used to perform media operations, in at least one embodiment, GPE 4910 also includes a media pipeline 4916 that is used to perform media operations, such as video post-processing and image enhancement.

In at least one embodiment, media pipeline 4916 includes fixed function or programmable logic units to perform one or more specialized media operations, such as video decode acceleration, video de-interlacing, and video encode acceleration in place of, or on behalf of, video codec engine 4906. In at least one embodiment, media pipeline 4916 additionally includes a thread spawning unit to spawn threads for execution on 3D/Media sub-system 4915. In at least one embodiment, spawned threads perform computations for media operations on one or more graphics execution units included in 3D/Media sub-system 4915.

In at least one embodiment, 3D/Media subsystem 4915 includes logic for executing threads spawned by 3D pipeline 4912 and media pipeline 4916. In at least one embodiment, 3D pipeline 4912 and media pipeline 4916 send thread execution requests to 3D/Media subsystem 4915, which includes thread dispatch logic for arbitrating and dispatching various requests to available thread execution resources. In at least one embodiment, execution resources include an array of graphics execution units to process 3D and media threads. In at least one embodiment, 3D/Media subsystem 4915 includes one or more internal caches for thread instructions and data. In at least one embodiment, subsystem 4915 also includes shared memory, including registers and addressable memory, to share data between threads and to store output data.

Inference and/or training logic 2815 are used to perform inferencing and/or training operations associated with one or more embodiments. Details regarding inference and/or training logic 2815 are provided herein in conjunction with FIGS. 28A and/or 28B. In at least one embodiment portions or all of inference and/or training logic 2815 may be incorporated into graphics processor 4900. For example, in at least one embodiment, training and/or inferencing techniques described herein may use one or more of ALUs embodied in 3D pipeline 4912. Moreover, in at least one embodiment, inferencing and/or training operations described herein may be done using logic other than logic illustrated in FIG. 28A or 28B. In at least one embodiment, weight parameters may be stored in on-chip or off-chip memory and/or registers (shown or not shown) that configure ALUs of graphics processor 4900 to perform one or more machine learning algorithms, neural network architectures, use cases, or training techniques described herein.

In at least one embodiment, one or more systems depicted in FIGS. 28A and 28B are utilized to implement a framework for image processing (e.g., real-time image rendering and enhancement). In at least one embodiment, one or more systems depicted in FIGS. 28A and 28B are utilized to perform various processes such as those described in connection with FIGS. 1-27. In at least one embodiment, one or more systems depicted in FIGS. 28A and 28B are utilized to generate and apply blue noise masks to images that are able to handle the temporal domain, i.e., adding time to the spatial (image) domain to improve image quality when rendering images over multiple frames (e.g., time).

Figure 50:
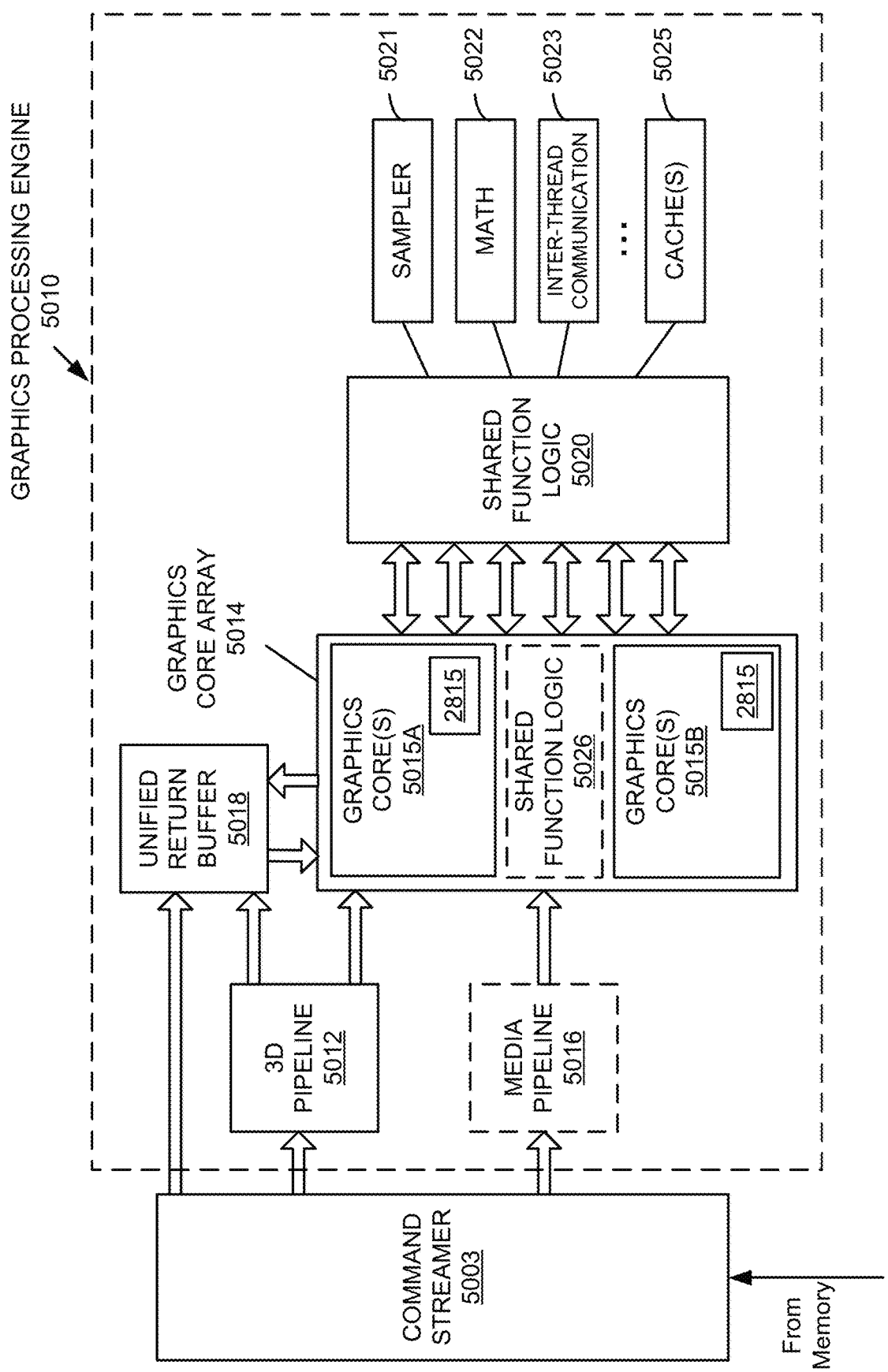
FIG. 50 is a block diagram of a graphics processing engine of a graphics processor in accordance with at least one embodiment.

FIG. 50 is a block diagram of a graphics processing engine 5010 of a graphics processor in accordance with at least one embodiment. In at least one embodiment, graphics processing engine (GPE) 5010 is a version of GPE 4910 shown in FIG. 49. In at least one embodiment, a media pipeline 5016 is optional and may not be explicitly included within GPE 5010. In at least one embodiment, a separate media and/or image processor is coupled to GPE 5010. In at least on embodiment, graphics processing engine 5010 performs process 100 (see FIG. 1A) or process 106 (see FIG. 1B).

In at least one embodiment, GPE 5010 is coupled to or includes a command streamer 5003, which provides a command stream to a 3D pipeline 5012 and/or media pipeline 5016. In at least one embodiment, command streamer 5003 is coupled to memory, which can be system memory, or one or more of internal cache memory and shared cache memory. In at least one embodiment, command streamer 5003 receives commands from memory and sends commands to 3D pipeline 5012 and/or media pipeline 5016. In at least one embodiment, commands are instructions, primitives, or micro-operations fetched from a ring buffer, which stores commands for 3D pipeline 5012 and media pipeline 5016. In at least one embodiment, a ring buffer can additionally include batch command buffers storing batches of multiple commands. In at least one embodiment, commands for 3D pipeline 5012 can also include references to data stored in memory, such as, but not limited to, vertex and geometry data for 3D pipeline 5012 and/or image data and memory objects for media pipeline 5016. In at least one embodiment, 3D pipeline 5012 and media pipeline 5016 process commands and data by performing operations or by dispatching one or more execution threads to a graphics core array 5014. In at least one embodiment, graphics core array 5014 includes one or more blocks of graphics cores (e.g., graphics core(s) 5015A, graphics core(s) 5015B), each block including one or more graphics cores. In at least one embodiment, each graphics core includes a set of graphics execution resources that includes general-purpose and graphics specific execution logic to perform graphics and compute operations, as well as fixed function texture processing and/or machine learning and artificial intelligence acceleration logic, including inference and/or training logic 2815 in FIG. 28A and FIG. 28B.

In at least one embodiment, 3D pipeline 5012 includes fixed function and programmable logic to process one or more shader programs, such as vertex shaders, geometry shaders, pixel shaders, fragment shaders, compute shaders, or other shader programs, by processing instructions and dispatching execution threads to graphics core array 5014. In at least one embodiment, graphics core array 5014 provides a unified block of execution resources for use in processing shader programs. In at least one embodiment, a multi-purpose execution logic (e.g., execution units) within graphics core(s) 5015A-5015B of graphic core array 5014 includes support for various 3D API shader languages and can execute multiple simultaneous execution threads associated with multiple shaders.

In at least one embodiment, graphics core array 5014 also includes execution logic to perform media functions, such as video and/or image processing. In at least one embodiment, execution units additionally include general-purpose logic that is programmable to perform parallel general-purpose computational operations, in addition to graphics processing operations.

In at least one embodiment, output data generated by threads executing on graphics core array 5014 can output data to memory in a unified return buffer (URB) 5018. In at least one embodiment, URB 5018 can store data for multiple threads. In at least one embodiment, URB 5018 may be used to send data between different threads executing on graphics core array 5014. In at least one embodiment, URB 5018 may additionally be used for synchronization between threads on graphics core array 5014 and fixed function logic within shared function logic 5020.

In at least one embodiment, graphics core array 5014 is scalable, such that graphics core array 5014 includes a variable number of graphics cores, each having a variable number of execution units based on a target power and performance level of GPE 5010. In at least one embodiment, execution resources are dynamically scalable, such that execution resources may be enabled or disabled as needed.

In at least one embodiment, graphics core array 5014 is coupled to shared function logic 5020 that includes multiple resources that are shared between graphics cores in graphics core array 5014. In at least one embodiment, shared functions performed by shared function logic 5020 are embodied in hardware logic units that provide specialized supplemental functionality to graphics core array 5014. In at least one embodiment, shared function logic 5020 includes but is not limited to a sampler unit 5021, a math unit 5022, and inter-thread communication (ITC) logic 5023. In at least one embodiment, one or more cache(s) 5025 are included in, or coupled to, shared function logic 5020.

In at least one embodiment, a shared function is used if demand for a specialized function is insufficient for inclusion within graphics core array 5014. In at least one embodiment, a single instantiation of a specialized function is used in shared function logic 5020 and shared among other execution resources within graphics core array 5014. In at least one embodiment, specific shared functions within shared function logic 5020 that are used extensively by graphics core array 5014 may be included within shared function logic 5026 within graphics core array 5014. In at least one embodiment, shared function logic 5026 within graphics core array 5014 can include some or all logic within shared function logic 5020. In at least one embodiment, all logic elements within shared function logic 5020 may be duplicated within shared function logic 5026 of graphics core array 5014. In at least one embodiment, shared function logic 5020 is excluded in favor of shared function logic 5026 within graphics core array 5014.

Inference and/or training logic 2815 are used to perform inferencing and/or training operations associated with one or more embodiments. Details regarding inference and/or training logic 2815 are provided herein in conjunction with FIGS. 28A and/or 28B. In at least one embodiment portions or all of inference and/or training logic 2815 may be incorporated into graphics processor 5010. For example, in at least one embodiment, training and/or inferencing techniques described herein may use one or more of ALUs embodied in 3D pipeline 5012, graphics core(s) 5015, shared function logic 5026, shared function logic 5020, or other logic in FIG. 50. Moreover, in at least one embodiment, inferencing and/or training operations described herein may be done using logic other than logic illustrated in FIG. 28A or 28B. In at least one embodiment, weight parameters may be stored in on-chip or off-chip memory and/or registers (shown or not shown) that configure ALUs of graphics processor 5010 to perform one or more machine learning algorithms, neural network architectures, use cases, or training techniques described herein.

In at least one embodiment, one or more systems depicted in FIGS. 28A and 28B are utilized to implement a framework for image processing (e.g., real-time image rendering and enhancement). In at least one embodiment, one or more systems depicted in FIGS. 28A and 28B are utilized to perform various processes such as those described in connection with FIGS. 1-27. In at least one embodiment, one or more systems depicted in FIGS. 28A and 28B are utilized to generate and apply blue noise masks to images that are able to handle the temporal domain, i.e., adding time to the spatial (image) domain to improve image quality when rendering images over multiple frames (e.g., time).

Figure 51:
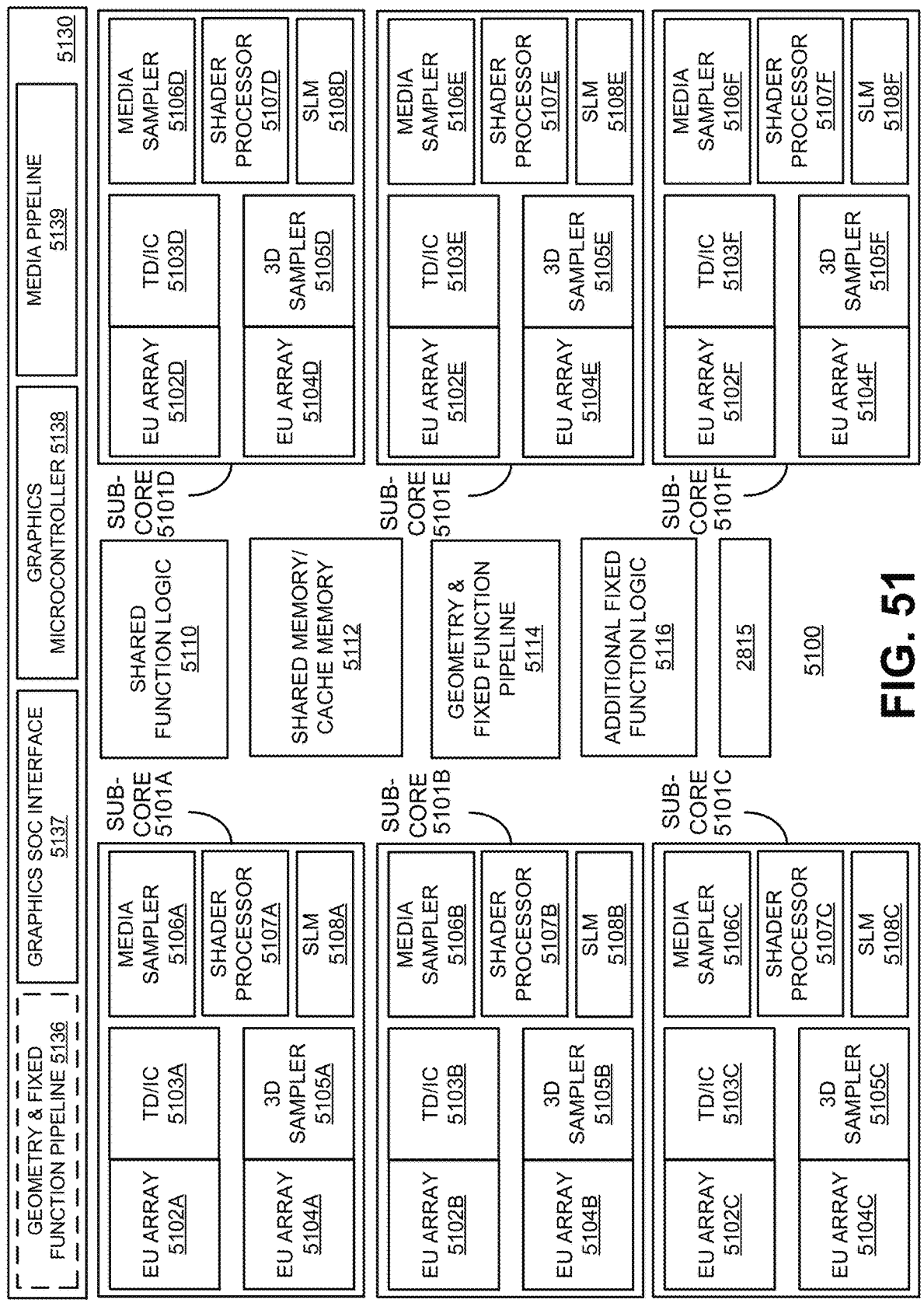
FIG. 51 is a block diagram of at least portions of a graphics processor core, according to at least one embodiment.

FIG. 51 is a block diagram of hardware logic of a graphics processor core 5100, according to at least one embodiment described herein. In at least one embodiment, graphics processor core 5100 is included within a graphics core array. In at least one embodiment, graphics processor core 5100, sometimes referred to as a core slice, can be one or multiple graphics cores within a modular graphics processor. In at least one embodiment, graphics processor core 5100 is exemplary of one graphics core slice, and a graphics processor as described herein may include multiple graphics core slices based on target power and performance envelopes. In at least one embodiment, each graphics core 5100 can include a fixed function block 5130 coupled with multiple sub-cores 5101A-5101F, also referred to as sub-slices, that include modular blocks of general-purpose and fixed function logic. In at least one embodiment, graphics processor core 5100 performs process 100 (see FIG. 1A) or process 106 (see FIG. 1B).

In at least one embodiment, fixed function block 5130 includes a geometry and fixed function pipeline 5136 that can be shared by all sub-cores in graphics processor 5100, for example, in lower performance and/or lower power graphics processor implementations. In at least one embodiment, geometry and fixed function pipeline 5136 includes a 3D fixed function pipeline, a video front-end unit, a thread spawner and thread dispatcher, and a unified return buffer manager, which manages unified return buffers.

In at least one embodiment, fixed function block 5130 also includes a graphics SoC interface 5137, a graphics microcontroller 5138, and a media pipeline 5139. In at least one embodiment, graphics SoC interface 5137 provides an interface between graphics core 5100 and other processor cores within a system on a chip integrated circuit. In at least one embodiment, graphics microcontroller 5138 is a programmable sub-processor that is configurable to manage various functions of graphics processor 5100, including thread dispatch, scheduling, and pre-emption. In at least one embodiment, media pipeline 5139 includes logic to facilitate decoding, encoding, pre-processing, and/or post-processing of multimedia data, including image and video data. In at least one embodiment, media pipeline 5139 implements media operations via requests to compute or sampling logic within sub-cores 5101A-5101F.

In at least one embodiment, SoC interface 5137 enables graphics core 5100 to communicate with general-purpose application processor cores (e.g., CPUs) and/or other components within an SoC, including memory hierarchy elements such as a shared last level cache memory, system RAM, and/or embedded on-chip or on-package DRAM. In at least one embodiment, SoC interface 5137 can also enable communication with fixed function devices within an SoC, such as camera imaging pipelines, and enables use of and/or implements global memory atomics that may be shared between graphics core 5100 and CPUs within an SoC. In at least one embodiment, graphics SoC interface 5137 can also implement power management controls for graphics processor core 5100 and enable an interface between a clock domain of graphics processor core 5100 and other clock domains within an SoC. In at least one embodiment, SoC interface 5137 enables receipt of command buffers from a command streamer and global thread dispatcher that are configured to provide commands and instructions to each of one or more graphics cores within a graphics processor. In at least one embodiment, commands and instructions can be dispatched to media pipeline 5139, when media operations are to be performed, or a geometry and fixed function pipeline (e.g., geometry and fixed function pipeline 5136, and/or a geometry and fixed function pipeline 5114) when graphics processing operations are to be performed.

In at least one embodiment, graphics microcontroller 5138 can be configured to perform various scheduling and management tasks for graphics core 5100. In at least one embodiment, graphics microcontroller 5138 can perform graphics and/or compute workload scheduling on various graphics parallel engines within execution unit (EU) arrays 5102A-5102F, 5104A-5104F within sub-cores 5101A-5101F. In at least one embodiment, host software executing on a CPU core of an SoC including graphics core 5100 can submit workloads to one of multiple graphic processor paths, which invokes a scheduling operation on an appropriate graphics engine. In at least one embodiment, scheduling operations include determining which workload to run next, submitting a workload to a command streamer, pre-empting existing workloads running on an engine, monitoring progress of a workload, and notifying host software when a workload is complete. In at least one embodiment, graphics microcontroller 5138 can also facilitate low-power or idle states for graphics core 5100, providing graphics core 5100 with an ability to save and restore registers within graphics core 5100 across low-power state transitions independently from an operating system and/or graphics driver software on a system.

In at least one embodiment, graphics core 5100 may have greater than or fewer than illustrated sub-cores 5101A-5101F, up to N modular sub-cores. For each set of N sub-cores, in at least one embodiment, graphics core 5100 can also include shared function logic 5110, shared and/or cache memory 5112, geometry/fixed function pipeline 5114, as well as additional fixed function logic 5116 to accelerate various graphics and compute processing operations. In at least one embodiment, shared function logic 5110 can include logic units (e.g., sampler, math, and/or inter-thread communication logic) that can be shared by each N sub-cores within graphics core 5100. In at least one embodiment, shared and/or cache memory 5112 can be a last-level cache for N sub-cores 5101A-5101F within graphics core 5100 and can also serve as shared memory that is accessible by multiple sub-cores. In at least one embodiment, geometry/fixed function pipeline 5114 can be included instead of geometry/fixed function pipeline 5136 within fixed function block 5130 and can include similar logic units.

In at least one embodiment, graphics core 5100 includes additional fixed function logic 5116 that can include various fixed function acceleration logic for use by graphics core 5100. In at least one embodiment, additional fixed function logic 5116 includes an additional geometry pipeline for use in position-only shading. In position-only shading, at least two geometry pipelines exist, whereas in a full geometry pipeline within geometry and fixed function pipelines 5114, 5136, and a cull pipeline, which is an additional geometry pipeline that may be included within additional fixed function logic 5116. In at least one embodiment, a cull pipeline is a trimmed down version of a full geometry pipeline. In at least one embodiment, a full pipeline and a cull pipeline can execute different instances of an application, each instance having a separate context. In at least one embodiment, position only shading can hide long cull runs of discarded triangles, enabling shading to be completed earlier in some instances. For example, in at least one embodiment, cull pipeline logic within additional fixed function logic 5116 can execute position shaders in parallel with a main application and generally generates critical results faster than a full pipeline, as a cull pipeline fetches and shades position attributes of vertices, without performing rasterization and rendering of pixels to a frame buffer. In at least one embodiment, a cull pipeline can use generated critical results to compute visibility information for all triangles without regard to whether those triangles are culled. In at least one embodiment, a full pipeline (which in this instance may be referred to as a replay pipeline) can consume visibility information to skip culled triangles to shade only visible triangles that are finally passed to a rasterization phase.

In at least one embodiment, additional fixed function logic 5116 can also include machine-learning acceleration logic, such as fixed function matrix multiplication logic, for implementations including optimizations for machine learning training or inferencing.

In at least one embodiment, within each graphics sub-core 5101A-5101F includes a set of execution resources that may be used to perform graphics, media, and compute operations in response to requests by graphics pipeline, media pipeline, or shader programs. In at least one embodiment, graphics sub-cores 5101A-5101F include multiple EU arrays 5102A-5102F, 5104A-5104F, thread dispatch and inter-thread communication (TD/IC) logic 5103A-5103F, a 3D (e.g., texture) sampler 5105A-5105F, a media sampler 5106A-5106F, a shader processor 5107A-5107F, and shared local memory (SLM) 5108A-5108F. In at least one embodiment, EU arrays 5102A-5102F, 5104A-5104F each include multiple execution units, which are general-purpose graphics processing units capable of performing floating-point and integer/fixed-point logic operations in service of a graphics, media, or compute operation, including graphics, media, or compute shader programs. In at least one embodiment, TD/IC logic 5103A-5103F performs local thread dispatch and thread control operations for execution units within a sub-core and facilitates communication between threads executing on execution units of a sub-core. In at least one embodiment, 3D samplers 5105A-5105F can read texture or other 3D graphics related data into memory. In at least one embodiment, 3D samplers can read texture data differently based on a configured sample state and texture format associated with a given texture. In at least one embodiment, media samplers 5106A-5106F can perform similar read operations based on a type and format associated with media data. In at least one embodiment, each graphics sub-core 5101A-5101F can alternately include a unified 3D and media sampler. In at least one embodiment, threads executing on execution units within each of sub-cores 5101A-5101F can make use of shared local memory 5108A-5108F within each sub-core, to enable threads executing within a thread group to execute using a common pool of on-chip memory.

Inference and/or training logic 2815 are used to perform inferencing and/or training operations associated with one or more embodiments. Details regarding inference and/or training logic 2815 are provided herein in conjunction with FIGS. 28A and/or 28B. In at least one embodiment, portions or all of inference and/or training logic 2815 may be incorporated into graphics processor 5100. For example, in at least one embodiment, training and/or inferencing techniques described herein may use one or more of ALUs embodied in a 3D pipeline, graphics microcontroller 5138, geometry and fixed function pipeline 5114 and 5136, or other logic in FIG. 51. Moreover, in at least one embodiment, inferencing and/or training operations described herein may be done using logic other than logic illustrated in FIG. 28A or 28B. In at least one embodiment, weight parameters may be stored in on-chip or off-chip memory and/or registers (shown or not shown) that configure ALUs of graphics processor 5100 to perform one or more machine learning algorithms, neural network architectures, use cases, or training techniques described herein.

In at least one embodiment, one or more systems depicted in FIGS. 28A and 28B are utilized to implement a framework for image processing (e.g., real-time image rendering and enhancement). In at least one embodiment, one or more systems depicted in FIGS. 28A and 28B are utilized to perform various processes such as those described in connection with FIGS. 1-27. In at least one embodiment, one or more systems depicted in FIGS. 28A and 28B are utilized to generate and apply blue noise masks to images that are able to handle the temporal domain, i.e., adding time to the spatial (image) domain to improve image quality when rendering images over multiple frames (e.g., time).

Figure 52:
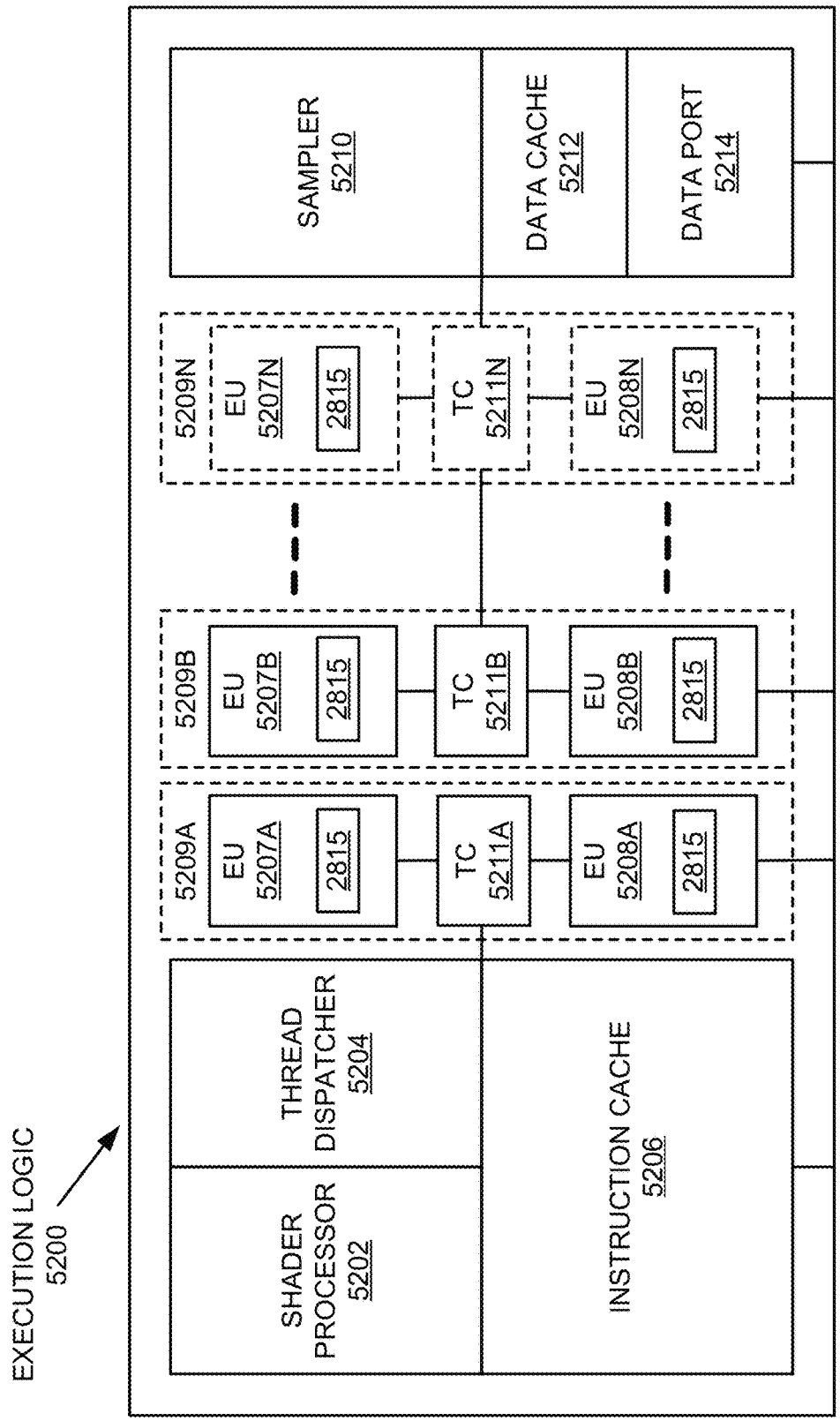
FIGS. 52A and 52B illustrate thread execution logic including an array of processing elements of a graphics processor core, according to at least one embodiment.
Figure 52:
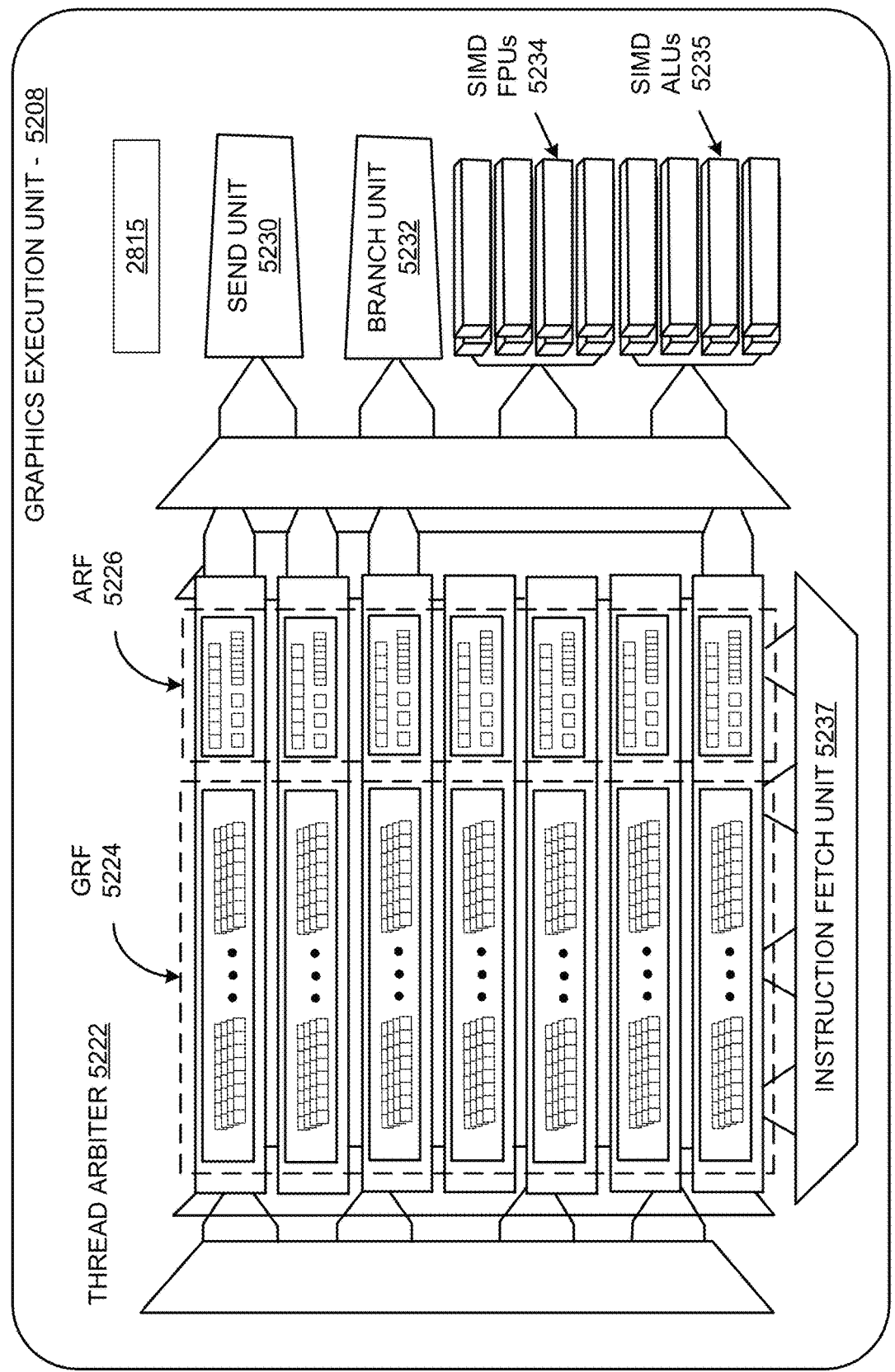

FIGS. 52A and 52B illustrate thread execution logic 5200 including an array of processing elements of a graphics processor core according to at least one embodiment. FIG. 52A illustrates at least one embodiment, in which thread execution logic 5200 is used. FIG. 52B illustrates exemplary internal details of a graphics execution unit 5208, according to at least one embodiment.

As illustrated in FIG. 52A, in at least one embodiment, thread execution logic 5200 includes a shader processor 5202, a thread dispatcher 5204, an instruction cache 5206, a scalable execution unit array including a plurality of execution units 5207A-5207N and 5208A-5208N, a sampler 5210, a data cache 5212, and a data port 5214. In at least one embodiment, a scalable execution unit array can dynamically scale by enabling or disabling one or more execution units (e.g., any of execution unit 5208A-N or 5207A-N) based on computational requirements of a workload, for example. In at least one embodiment, scalable execution units are interconnected via an interconnect fabric that links to each execution unit. In at least one embodiment, thread execution logic 5200 includes one or more connections to memory, such as system memory or cache memory, through one or more of instruction cache 5206, data port 5214, sampler 5210, and execution units 5207 or 5208. In at least one embodiment, each execution unit (e.g., 5207A) is a stand-alone programmable general-purpose computational unit that is capable of executing multiple simultaneous hardware threads while processing multiple data elements in parallel for each thread. In at least one embodiment, array of execution units 5207 and/or 5208 is scalable to include any number individual execution units.

In at least one embodiment, execution units 5207 and/or 5208 are primarily used to execute shader programs. In at least one embodiment, shader processor 5202 can process various shader programs and dispatch execution threads associated with shader programs via a thread dispatcher 5204. In at least one embodiment, thread dispatcher 5204 includes logic to arbitrate thread initiation requests from graphics and media pipelines and instantiate requested threads on one or more execution units in execution units 5207 and/or 5208. For example, in at least one embodiment, a geometry pipeline can dispatch vertex, tessellation, or geometry shaders to thread execution logic for processing. In at least one embodiment, thread dispatcher 5204 can also process runtime thread spawning requests from executing shader programs.

In at least one embodiment, execution units 5207 and/or 5208 support an instruction set that includes native support for many standard 3D graphics shader instructions, such that shader programs from graphics libraries (e.g., Direct 3D and OpenGL) are executed with a minimal translation. In at least one embodiment, execution units support vertex and geometry processing (e.g., vertex programs, geometry programs, and/or vertex shaders), pixel processing (e.g., pixel shaders, fragment shaders) and general-purpose processing (e.g., compute and media shaders). In at least one embodiment, each of execution units 5207 and/or 5208, which include one or more arithmetic logic units (ALUs), is capable of multi-issue single instruction multiple data (SIMD) execution and multi-threaded operation enables an efficient execution environment despite higher latency memory accesses. In at least one embodiment, each hardware thread within each execution unit has a dedicated high-bandwidth register file and associated independent thread-state. In at least one embodiment, execution is multi-issue per clock to pipelines capable of integer, single and double precision floating point operations, SIMD branch capability, logical operations, transcendental operations, and other miscellaneous operations. In at least one embodiment, while waiting for data from memory or one of shared functions, dependency logic within execution units 5207 and/or 5208 causes a waiting thread to sleep until requested data has been returned. In at least one embodiment, while an awaiting thread is sleeping, hardware resources may be devoted to processing other threads. For example, in at least one embodiment, during a delay associated with a vertex shader operation, an execution unit can perform operations for a pixel shader, fragment shader, or another type of shader program, including a different vertex shader.

In at least one embodiment, each execution unit in execution units 5207 and/or 5208 operates on arrays of data elements. In at least one embodiment, a number of data elements is an "execution size," or number of channels for an instruction. In at least one embodiment, an execution channel is a logical unit of execution for data element access, masking, and flow control within instructions. In at least one embodiment, a number of channels may be independent of a number of physical arithmetic logic units (ALUs) or floating point units (FPUs) for a particular graphics processor. In at least one embodiment, execution units 5207 and/or 5208 support integer and floating-point data types.

In at least one embodiment, an execution unit instruction set includes SIMD instructions. In at least one embodiment, various data elements can be stored as a packed data type in a register and execution unit will process various elements based on data size of elements. For example, in at least one embodiment, when operating on a 256-bit wide vector, 256 bits of a vector are stored in a register and an execution unit operates on a vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, in at least one embodiment, different vector widths and register sizes are possible.

In at least one embodiment, one or more execution units can be combined into a fused execution unit 5209A-5209N having thread control logic (5211A-5211N) that is common to fused EUs such as execution unit 5207A fused with execution unit 5208A into fused execution unit 5209A. In at least one embodiment, multiple EUs can be fused into an EU group. In at least one embodiment, each EU in a fused EU group can be configured to execute a separate SIMD hardware thread, with a number of EUs in a fused EU group possibly varying according to various embodiments. In at least one embodiment, various SIMD widths can be performed per-EU, including but not limited to SIMD8, SIMD16, and SIMD32. In at least one embodiment, each fused graphics execution unit 5209A-5209N includes at least two execution units. For example, in at least one embodiment, fused execution unit 5209A includes a first EU 5207A, second EU 5208A, and thread control logic 5211A that is common to first EU 5207A and second EU 5208A. In at least one embodiment, thread control logic 5211A controls threads executed on fused graphics execution unit 5209A, allowing each EU within fused execution units 5209A-5209N to execute using a common instruction pointer register.

In at least one embodiment, one or more internal instruction caches (e.g., 5206) are included in thread execution logic 5200 to cache thread instructions for execution units. In at least one embodiment, one or more data caches (e.g., 5212) are included to cache thread data during thread execution. In at least one embodiment, sampler 5210 is included to provide texture sampling for 3D operations and media sampling for media operations. In at least one embodiment, sampler 5210 includes specialized texture or media sampling functionality to process texture or media data during sampling process before providing sampled data to an execution unit.

During execution, in at least one embodiment, graphics and media pipelines send thread initiation requests to thread execution logic 5200 via thread spawning and dispatch logic. In at least one embodiment, once a group of geometric objects has been processed and rasterized into pixel data, pixel processor logic (e.g., pixel shader logic, fragment shader logic, etc.) within shader processor 5202 is invoked to further compute output information and cause results to be written to output surfaces (e.g., color buffers, depth buffers, stencil buffers, etc.). In at least one embodiment, a pixel shader or a fragment shader calculates values of various vertex attributes that are to be interpolated across a rasterized object. In at least one embodiment, pixel processor logic within shader processor 5202 then executes an application programming interface (API)-supplied pixel or fragment shader program. In at least one embodiment, to execute a shader program, shader processor 5202 dispatches threads to an execution unit (e.g., 5208A) via thread dispatcher 5204. In at least one embodiment, shader processor 5202 uses texture sampling logic in sampler 5210 to access texture data in texture maps stored in memory. In at least one embodiment, arithmetic operations on texture data and input geometry data compute pixel color data for each geometric fragment, or discards one or more pixels from further processing.

In at least one embodiment, data port 5214 provides a memory access mechanism for thread execution logic 5200 to output processed data to memory for further processing on a graphics processor output pipeline. In at least one embodiment, data port 5214 includes or couples to one or more cache memories (e.g., data cache 5212) to cache data for memory access via a data port.

As illustrated in FIG. 52B, in at least one embodiment, a graphics execution unit 5208 can include an instruction fetch unit 5237, a general register file array (GRF) 5224, an architectural register file array (ARF) 5226, a thread arbiter 5222, a send unit 5230, a branch unit 5232, a set of SIMD floating point units (FPUs) 5234, and a set of dedicated integer SIMD ALUs 5235. In at least one embodiment, GRF 5224 and ARF 5226 includes a set of general register files and architecture register files associated with each simultaneous hardware thread that may be active in graphics execution unit 5208. In at least one embodiment, per thread architectural state is maintained in ARF 5226, while data used during thread execution is stored in GRF 5224. In at least one embodiment, execution state of each thread, including instruction pointers for each thread, can be held in thread-specific registers in ARF 5226.

In at least one embodiment, graphics execution unit 5208 has an architecture that is a combination of Simultaneous Multi-Threading (SMT) and fine-grained Interleaved Multi-Threading (IMT). In at least one embodiment, architecture has a modular configuration that can be fine-tuned at design time based on a target number of simultaneous threads and number of registers per execution unit, where execution unit resources are divided across logic used to execute multiple simultaneous threads.

In at least one embodiment, graphics execution unit 5208 can co-issue multiple instructions, which may each be different instructions. In at least one embodiment, thread arbiter 5222 of graphics execution unit thread 5208 can dispatch instructions to one of send unit 5230, branch unit 5232, or SIMD FPU(s) 5234 for execution. In at least one embodiment, each execution thread can access 128 general-purpose registers within GRF 5224, where each register can store 32 bytes, accessible as a SIMD 8-element vector of 32-bit data elements. In at least one embodiment, each execution unit thread has access to 4 kilobytes within GRF 5224, although embodiments are not so limited, and greater or fewer register resources may be provided in other embodiments. In at least one embodiment, up to seven threads can execute simultaneously, although a number of threads per execution unit can also vary according to embodiments. In at least one embodiment, in which seven threads may access 4 kilobytes, GRF 5224 can store a total of 28 kilobytes. In at least one embodiment, flexible addressing modes can permit registers to be addressed together to build effectively wider registers or to represent strided rectangular block data structures.

In at least one embodiment, memory operations, sampler operations, and other longer-latency system communications are dispatched via "send" instructions that are executed by message passing to send unit 5230. In at least one embodiment, branch instructions are dispatched to branch unit 5232 to facilitate SIMD divergence and eventual convergence.

In at least one embodiment, graphics execution unit 5208 includes one or more SIMD floating point units (FPU(s)) 5234 to perform floating-point operations. In at least one embodiment, FPU(s) 5234 also support integer computation. In at least one embodiment, FPU(s) 5234 can SIMD execute up to M number of 32-bit floating-point (or integer) operations, or SIMD execute up to 2M 16-bit integer or 16-bit floating-point operations. In at least one embodiment, at least one FPU provides extended math capability to support high-throughput transcendental math functions and double precision 64-bit floating-point. In at least one embodiment, a set of 8-bit integer SIMD ALUs 5235 are also present, and may be specifically optimized to perform operations associated with machine learning computations.

In at least one embodiment, arrays of multiple instances of graphics execution unit 5208 can be instantiated in a graphics sub-core grouping (e.g., a sub-slice). In at least one embodiment, execution unit 5208 can execute instructions across a plurality of execution channels. In at least one embodiment, each thread executed on graphics execution unit 5208 is executed on a different channel.

Inference and/or training logic 2815 are used to perform inferencing and/or training operations associated with one or more embodiments. Details regarding inference and/or training logic 2815 are provided herein in conjunction with FIGS. 28A and/or 28B. In at least one embodiment, portions or all of inference and/or training logic 2815 may be incorporated into thread execution logic 5200. Moreover, in at least one embodiment, inferencing and/or training operations described herein may be done using logic other than logic illustrated in FIG. 28A or 28B. In at least one embodiment, weight parameters may be stored in on-chip or off-chip memory and/or registers (shown or not shown) that configure ALUs thread of execution logic 5200 to perform one or more machine learning algorithms, neural network architectures, use cases, or training techniques described herein.

In at least one embodiment, one or more systems depicted in FIGS. 28A and 28B are utilized to implement a framework for image processing (e.g., real-time image rendering and enhancement). In at least one embodiment, one or more systems depicted in FIGS. 28A and 28B are utilized to perform various processes such as those described in connection with FIGS. 1-27. In at least one embodiment, one or more systems depicted in FIGS. 28A and 28B are utilized to generate and apply blue noise masks to images that are able to handle the temporal domain, i.e., adding time to the spatial (image) domain to improve image quality when rendering images over multiple frames (e.g., time).

Figure 53:
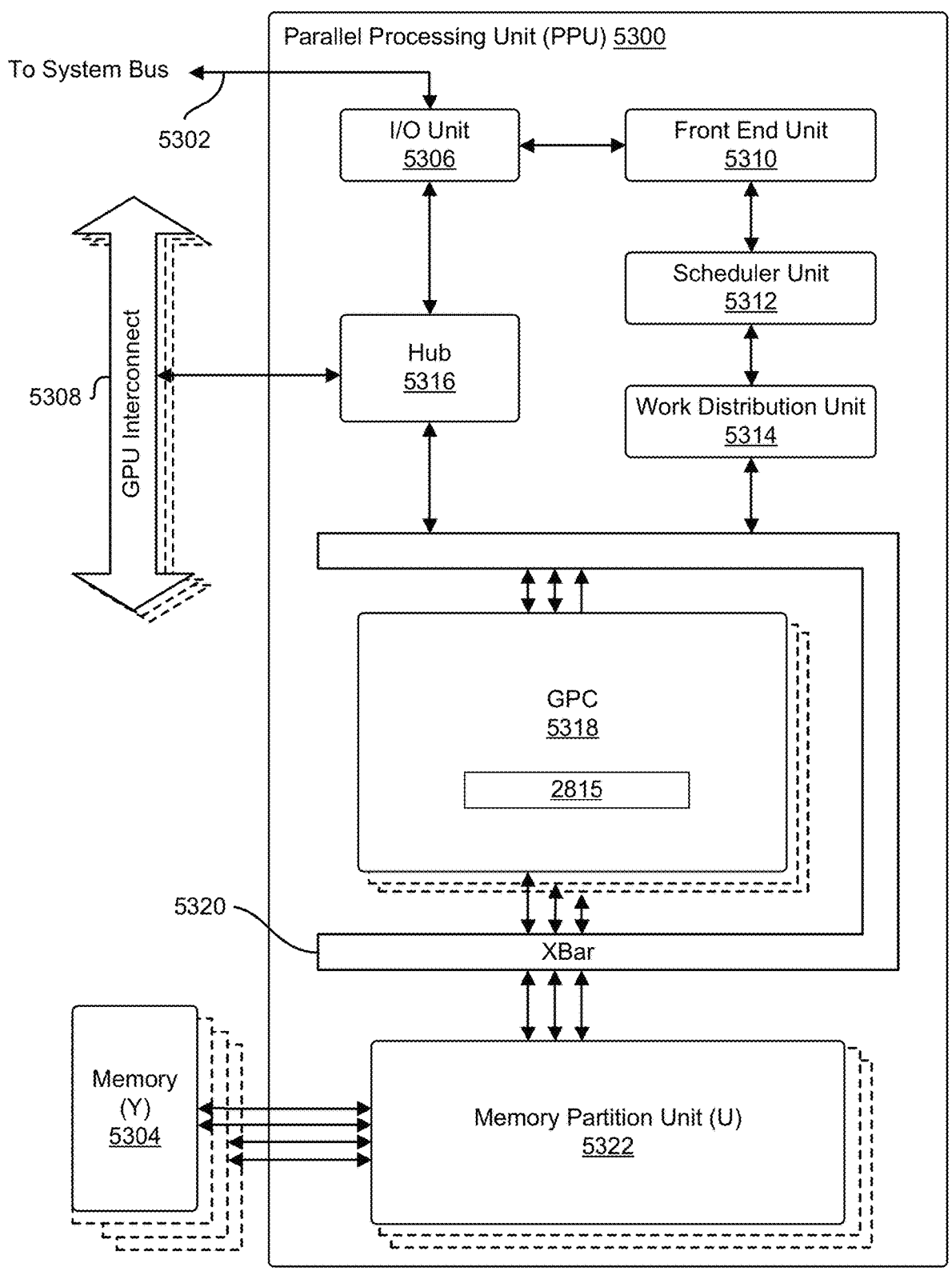
FIG. 53 illustrates a parallel processing unit ("PPU"), according to at least one embodiment.

FIG. 53 illustrates a parallel processing unit ("PPU") 5300, according to at least one embodiment. In at least one embodiment, PPU 5300 is configured with machine-readable code that, if executed by PPU 5300, causes PPU 5300 to perform some or all of processes and techniques described throughout this disclosure. In at least one embodiment, PPU 5300 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In at least one embodiment, a thread refers to a thread of execution and is an instantiation of a set of instructions configured to be executed by PPU 5300. In at least one embodiment, PPU 5300 is a graphics processing unit ("GPU") configured to implement a graphics rendering pipeline for processing three-dimensional ("3D") graphics data in order to generate two-dimensional ("2D") image data for display on a display device such as a liquid crystal display ("LCD") device. In at least one embodiment, PPU 5300 is utilized to perform computations such as linear algebra operations and machine-learning operations. FIG. 53 illustrates an example parallel processor for illustrative purposes only and should be construed as a non-limiting example of processor architectures contemplated within scope of this disclosure and that any suitable processor may be employed to supplement and/or substitute for same. In at least one embodiment, PPU 5300 performs process 100 (see FIG. 1A) or process 106 (see FIG. 1B).

In at least one embodiment, one or more PPUs 5300 are configured to accelerate High Performance Computing ("HPC"), data center, and machine learning applications. In at least one embodiment, PPU 5300 is configured to accelerate deep learning systems and applications including following non-limiting examples: autonomous vehicle platforms, deep learning, high-accuracy speech, image, text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and more.

In at least one embodiment, PPU 5300 includes, without limitation, an Input/Output ("I/O") unit 5306, a front-end unit 5310, a scheduler unit 5312, a work distribution unit 5314, a hub 5316, a crossbar ("XBar") 5320, one or more general processing clusters ("GPCs") 5318, and one or more partition units ("memory partition units") 5322. In at least one embodiment, PPU 5300 is connected to a host processor or other PPUs 5300 via one or more high-speed GPU interconnects ("GPU interconnects") 5308. In at least one embodiment, PPU 5300 is connected to a host processor or other peripheral devices via a system bus 5302. In at least one embodiment, PPU 5300 is connected to a local memory comprising one or more memory devices ("memory") 5304. In at least one embodiment, memory devices 5304 include, without limitation, one or more dynamic random access memory ("DRAM") devices. In at least one embodiment, one or more DRAM devices are configured and/or configurable as high-bandwidth memory ("HBM") subsystems, with multiple DRAM dies stacked within each device.

In at least one embodiment, high-speed GPU interconnect 5308 may refer to a wire-based multi-lane communications link that is used by systems to scale and include one or more PPUs 5300 combined with one or more central processing units ("CPUs"), supports cache coherence between PPUs 5300 and CPUs, and CPU mastering. In at least one embodiment, data and/or commands are transmitted by high-speed GPU interconnect 5308 through hub 5316 to/from other units of PPU 5300 such as one or more copy engines, video encoders, video decoders, power management units, and other components which may not be explicitly illustrated in FIG. 53.

In at least one embodiment, I/O unit 5306 is configured to transmit and receive communications (e.g., commands, data) from a host processor (not illustrated in FIG. 53) over system bus 5302. In at least one embodiment, I/O unit 5306 communicates with host processor directly via system bus 5302 or through one or more intermediate devices such as a memory bridge. In at least one embodiment, I/O unit 5306 may communicate with one or more other processors, such as one or more of PPUs 5300 via system bus 5302. In at least one embodiment, I/O unit 5306 implements a Peripheral Component Interconnect Express ("PCIe") interface for communications over a PCIe bus. In at least one embodiment, I/O unit 5306 implements interfaces for communicating with external devices.

In at least one embodiment, I/O unit 5306 decodes packets received via system bus 5302. In at least one embodiment, at least some packets represent commands configured to cause PPU 5300 to perform various operations. In at least one embodiment, I/O unit 5306 transmits decoded commands to various other units of PPU 5300 as specified by commands. In at least one embodiment, commands are transmitted to front-end unit 5310 and/or transmitted to hub 5316 or other units of PPU 5300 such as one or more copy engines, a video encoder, a video decoder, a power management unit, etc. (not explicitly illustrated in FIG. 53). In at least one embodiment, I/O unit 5306 is configured to route communications between and among various logical units of PPU 5300.

In at least one embodiment, a program executed by host processor encodes a command stream in a buffer that provides workloads to PPU 5300 for processing. In at least one embodiment, a workload comprises instructions and data to be processed by those instructions. In at least one embodiment, a buffer is a region in a memory that is accessible (e.g., read/write) by both a host processor and PPU 5300—a host interface unit may be configured to access that buffer in a system memory connected to system bus 5302 via memory requests transmitted over system bus 5302 by I/O unit 5306. In at least one embodiment, a host processor writes a command stream to a buffer and then transmits a pointer to a start of a command stream to PPU 5300 such that front-end unit 5310 receives pointers to one or more command streams and manages one or more command streams, reading commands from command streams and forwarding commands to various units of PPU 5300.

In at least one embodiment, front-end unit 5310 is coupled to scheduler unit 5312 that configures various GPCs 5318 to process tasks defined by one or more command streams. In at least one embodiment, scheduler unit 5312 is configured to track state information related to various tasks managed by scheduler unit 5312 where state information may indicate which of GPCs 5318 a task is assigned to, whether task is active or inactive, a priority level associated with task, and so forth. In at least one embodiment, scheduler unit 5312 manages execution of a plurality of tasks on one or more of GPCs 5318.

In at least one embodiment, scheduler unit 5312 is coupled to work distribution unit 5314 that is configured to dispatch tasks for execution on GPCs 5318. In at least one embodiment, work distribution unit 5314 tracks a number of scheduled tasks received from scheduler unit 5312 and work distribution unit 5314 manages a pending task pool and an active task pool for each of GPCs 5318. In at least one embodiment, pending task pool comprises a number of slots (e.g., 32 slots) that contain tasks assigned to be processed by a particular GPC 5318; an active task pool may comprise a number of slots (e.g., 4 slots) for tasks that are actively being processed by GPCs 5318 such that as one of GPCs 5318 completes execution of a task, that task is evicted from that active task pool for GPC 5318 and another task from a pending task pool is selected and scheduled for execution on GPC 5318. In at least one embodiment, if an active task is idle on GPC 5318, such as while waiting for a data dependency to be resolved, then that active task is evicted from GPC 5318 and returned to that pending task pool while another task in that pending task pool is selected and scheduled for execution on GPC 5318.

In at least one embodiment, work distribution unit 5314 communicates with one or more GPCs 5318 via XBar 5320. In at least one embodiment, XBar 5320 is an interconnect network that couples many of units of PPU 5300 to other units of PPU 5300 and can be configured to couple work distribution unit 5314 to a particular GPC 5318. In at least one embodiment, one or more other units of PPU 5300 may also be connected to XBar 5320 via hub 5316.

In at least one embodiment, tasks are managed by scheduler unit 5312 and dispatched to one of GPCs 5318 by work distribution unit 5314. In at least one embodiment, GPC 5318 is configured to process task and generate results. In at least one embodiment, results may be consumed by other tasks within GPC 5318, routed to a different GPC 5318 via XBar 5320, or stored in memory 5304. In at least one embodiment, results can be written to memory 5304 via partition units 5322, which implement a memory interface for reading and writing data to/from memory 5304. In at least one embodiment, results can be transmitted to another PPU 5300 or CPU via high-speed GPU interconnect 5308. In at least one embodiment, PPU 5300 includes, without limitation, a number U of partition units 5322 that is equal to a number of separate and distinct memory devices 5304 coupled to PPU 5300, as described in more detail herein in conjunction with FIG. 55.

In at least one embodiment, a host processor executes a driver kernel that implements an application programming interface ("API") that enables one or more applications executing on a host processor to schedule operations for execution on PPU 5300. In at least one embodiment, multiple compute applications are simultaneously executed by PPU 5300 and PPU 5300 provides isolation, quality of service ("QoS"), and independent address spaces for multiple compute applications. In at least one embodiment, an application generates instructions (e.g., in form of API calls) that cause a driver kernel to generate one or more tasks for execution by PPU 5300 and that driver kernel outputs tasks to one or more streams being processed by PPU 5300. In at least one embodiment, each task comprises one or more groups of related threads, which may be referred to as a warp. In at least one embodiment, a warp comprises a plurality of related threads (e.g., 32 threads) that can be executed in parallel. In at least one embodiment, cooperating threads can refer to a plurality of threads including instructions to perform task and that exchange data through shared memory. In at least one embodiment, threads and cooperating threads are described in more detail in conjunction with FIG. 55.

Inference and/or training logic 2815 are used to perform inferencing and/or training operations associated with one or more embodiments. Details regarding inference and/or training logic 2815 are provided herein in conjunction with FIGS. 28A and/or 28B. In at least one embodiment, deep learning application processor is used to train a machine learning model, such as a neural network, to predict or infer information provided to PPU 5300. In at least one embodiment, PPU 5300 is used to infer or predict information based on a trained machine learning model (e.g., neural network) that has been trained by another processor or system or by PPU 5300. In at least one embodiment, PPU 5300 may be used to perform one or more neural network use cases described herein.

In at least one embodiment, one or more systems depicted in FIGS. 28A and 28B are utilized to implement a framework for image processing (e.g., real-time image rendering and enhancement). In at least one embodiment, one or more systems depicted in FIGS. 28A and 28B are utilized to perform various processes such as those described in connection with FIGS. 1-27. In at least one embodiment, one or more systems depicted in FIGS. 28A and 28B are utilized to generate and apply blue noise masks to images that are able to handle the temporal domain, i.e., adding time to the spatial (image) domain to improve image quality when rendering images over multiple frames (e.g., time).

Figure 54:
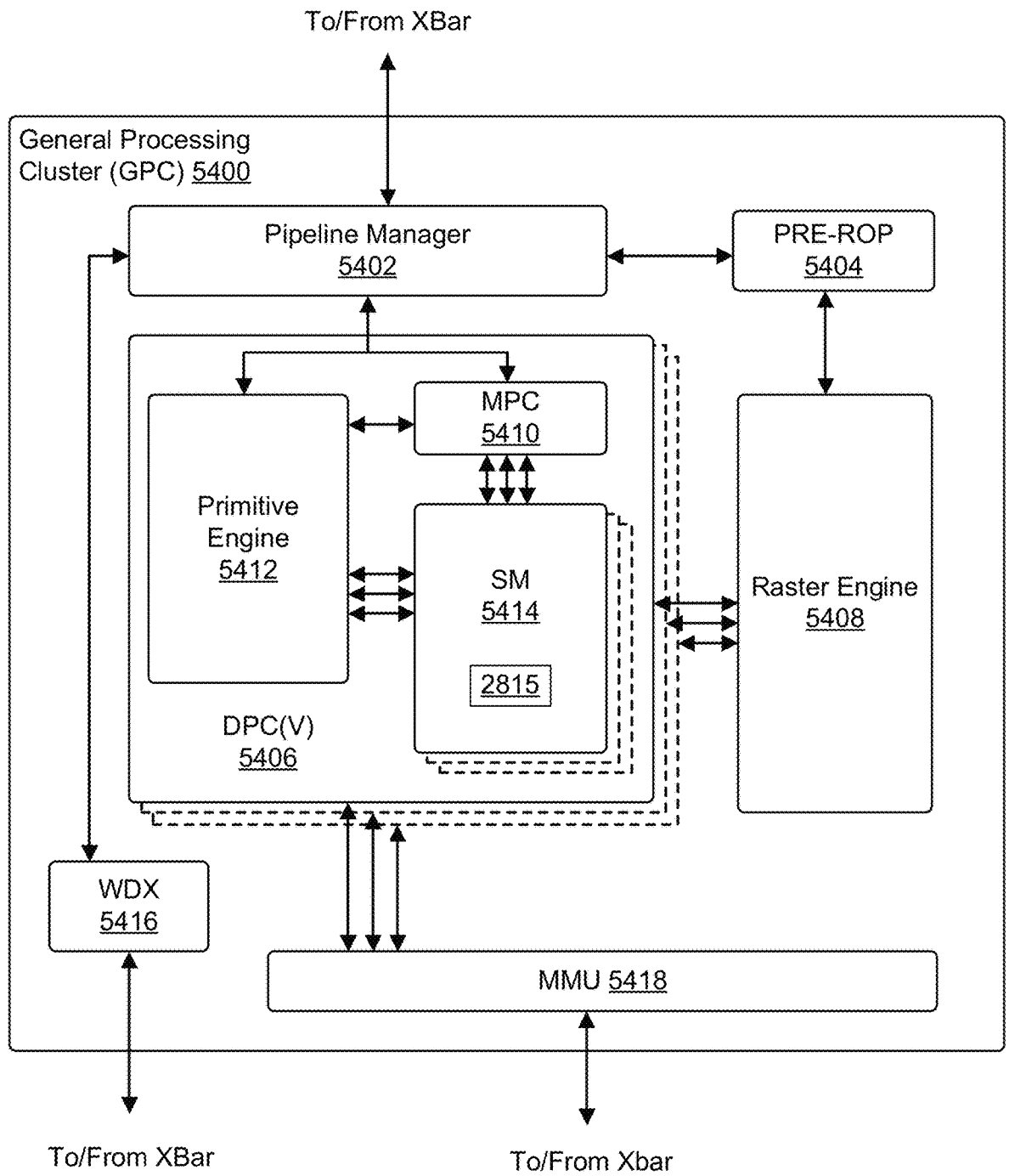
FIG. 54 illustrates a general processing cluster ("GPC"), according to at least one embodiment.

FIG. 54 illustrates a general processing cluster ("GPC") 5400, according to at least one embodiment. In at least one embodiment, GPC 5400 is GPC 5318 of FIG. 53. In at least one embodiment, each GPC 5400 includes, without limitation, a number of hardware units for processing tasks and each GPC 5400 includes, without limitation, a pipeline manager 5402, a pre-raster operations unit ("preROP") 5404, a raster engine 5408, a work distribution crossbar ("WDX") 5416, a memory management unit ("MMU") 5418, one or more Data Processing Clusters ("DPCs") 5406, and any suitable combination of parts.

In at least one embodiment, operation of GPC 5400 is controlled by pipeline manager 5402. In at least one embodiment, pipeline manager 5402 manages configuration of one or more DPCs 5406 for processing tasks allocated to GPC 5400. In at least one embodiment, pipeline manager 5402 configures at least one of one or more DPCs 5406 to implement at least a portion of a graphics rendering pipeline. In at least one embodiment, DPC 5406 is configured to execute a vertex shader program on a programmable streaming multi-processor ("SM") 5414. In at least one embodiment, pipeline manager 5402 is configured to route packets received from a work distribution unit to appropriate logical units within GPC 5400, in at least one embodiment, and some packets may be routed to fixed function hardware units in preROP 5404 and/or raster engine 5408 while other packets may be routed to DPCs 5406 for processing by a primitive engine 5412 or SM 5414. In at least one embodiment, pipeline manager 5402 configures at least one of DPCs 5406 to implement a neural network model and/or a computing pipeline.

In at least one embodiment, preROP unit 5404 is configured, in at least one embodiment, to route data generated by raster engine 5408 and DPCs 5406 to a Raster Operations ("ROP") unit in partition unit 5322, described in more detail above in conjunction with FIG. 53. In at least one embodiment, preROP unit 5404 is configured to perform optimizations for color blending, organize pixel data, perform address translations, and more. In at least one embodiment, raster engine 5408 includes, without limitation, a number of fixed function hardware units configured to perform various raster operations, in at least one embodiment, and raster engine 5408 includes, without limitation, a setup engine, a coarse raster engine, a culling engine, a clipping engine, a fine raster engine, a tile coalescing engine, and any suitable combination thereof. In at least one embodiment, setup engine receives transformed vertices and generates plane equations associated with geometric primitive defined by vertices; plane equations are transmitted to a coarse raster engine to generate coverage information (e.g., an x, y coverage mask for a tile) for primitive; output of a coarse raster engine is transmitted to a culling engine where fragments associated with a primitive that fail a z-test are culled, and transmitted to a clipping engine where fragments lying outside a viewing frustum are clipped. In at least one embodiment, fragments that survive clipping and culling are passed to a fine raster engine to generate attributes for pixel fragments based on plane equations generated by a setup engine. In at least one embodiment, an output of raster engine 5408 comprises fragments to be processed by any suitable entity, such as by a fragment shader implemented within DPC 5406.

In at least one embodiment, each DPC 5406 included in GPC 5400 comprises, without limitation, an M-Pipe Controller ("MPC") 5410; primitive engine 5412; one or more SMs 5414; and any suitable combination thereof. In at least one embodiment, MPC 5410 controls operation of DPC 5406, routing packets received from pipeline manager 5402 to appropriate units in DPC 5406. In at least one embodiment, packets associated with a vertex are routed to primitive engine 5412, which is configured to fetch vertex attributes associated with a vertex from memory; in contrast, packets associated with a shader program may be transmitted to SM 5414.

In at least one embodiment, SM 5414 comprises, without limitation, a programmable streaming processor that is configured to process tasks represented by a number of threads. In at least one embodiment, SM 5414 is multi-threaded and configured to execute a plurality of threads (e.g., 32 threads) from a particular group of threads concurrently and implements a Single-Instruction, Multiple-Data ("SIMD") architecture where each thread in a group of threads (e.g., a warp) is configured to process a different set of data based on same set of instructions. In at least one embodiment, all threads in group of threads execute a common set of instructions. In at least one embodiment, SM 5414 implements a Single-Instruction, Multiple Thread ("SIMM") architecture wherein each thread in a group of threads is configured to process a different set of data based on that common set of instructions, but where individual threads in a group of threads are allowed to diverge during execution. In at least one embodiment, a program counter, call stack, and execution state is maintained for each warp, enabling concurrency between warps and serial execution within warps when threads within a warp diverge. In another embodiment, a program counter, call stack, and execution state is maintained for each individual thread, enabling equal concurrency between all threads, within and between warps. In at least one embodiment, execution state is maintained for each individual thread and threads executing common instructions may be converged and executed in parallel for better efficiency. At least one embodiment of SM 5414 is described in more detail herein.

In at least one embodiment, MMU 5418 provides an interface between GPC 5400 and a memory partition unit (e.g., partition unit 5322 of FIG. 53) and MMU 5418 provides translation of virtual addresses into physical addresses, memory protection, and arbitration of memory requests. In at least one embodiment, MMU 5418 provides one or more translation lookaside buffers ("TLBs") for performing translation of virtual addresses into physical addresses in memory.

Inference and/or training logic 2815 are used to perform inferencing and/or training operations associated with one or more embodiments. Details regarding inference and/or training logic 2815 are provided herein in conjunction with FIGS. 28A and/or 28B. In at least one embodiment, deep learning application processor is used to train a machine learning model, such as a neural network, to predict or infer information provided to GPC 5400. In at least one embodiment, GPC 5400 is used to infer or predict information based on a trained machine learning model (e.g., neural network) that has been trained by another processor or system or by GPC 5400. In at least one embodiment, GPC 5400 may be used to perform one or more neural network use cases described herein.

In at least one embodiment, one or more systems depicted in FIGS. 28A and 28B are utilized to implement a framework for image processing (e.g., real-time image rendering and enhancement). In at least one embodiment, one or more systems depicted in FIGS. 28A and 28B are utilized to perform various processes such as those described in connection with FIGS. 1-27. In at least one embodiment, one or more systems depicted in FIGS. 28A and 28B are utilized to generate and apply blue noise masks to images that are able to handle the temporal domain, i.e., adding time to the spatial (image) domain to improve image quality when rendering images over multiple frames (e.g., time).

Figure 55:
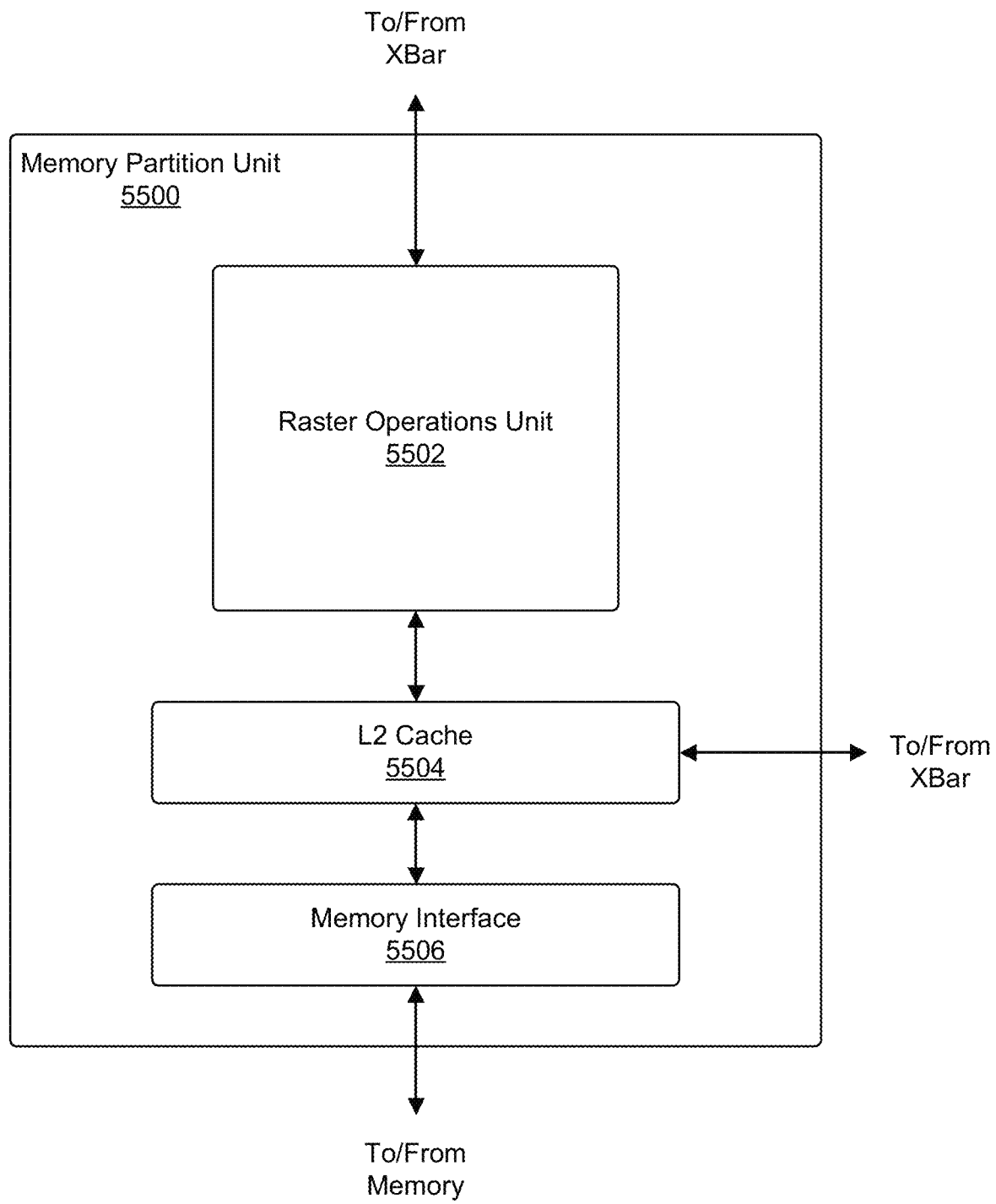
FIG. 55 illustrates a memory partition unit of a parallel processing unit ("PPU"), according to at least one embodiment.

FIG. 55 illustrates a memory partition unit 5500 of a parallel processing unit ("PPU"), in accordance with at least one embodiment. In at least one embodiment, memory partition unit 5500 includes, without limitation, a Raster Operations ("ROP") unit 5502, a level two ("L2") cache 5504, a memory interface 5506, and any suitable combination thereof. In at least one embodiment, memory interface 5506 is coupled to memory. In at least one embodiment, memory interface 5506 may implement 32, 64, 128, 1024-bit data buses, or like, for high-speed data transfer. In at least one embodiment, PPU incorporates U memory interfaces 5506 where U is a positive integer, with one memory interface 5506 per pair of partition units 5500, where each pair of partition units 5500 is connected to a corresponding memory device. For example, in at least one embodiment, PPU may be connected to up to Y memory devices, such as high bandwidth memory stacks or graphics double-data-rate, version 5, synchronous dynamic random access memory ("GDDR5 SDRAM").

In at least one embodiment, memory interface 5506 implements a high bandwidth memory second generation ("HBM2") memory interface and Y equals half of U. In at least one embodiment, HBM2 memory stacks are located on a physical package with a PPU, providing substantial power and area savings compared with conventional GDDR5 SDRAM systems. In at least one embodiment, each HBM2 stack includes, without limitation, four memory dies with Y=4, with each HBM2 stack including two 128-bit channels per die for a total of 8 channels and a data bus width of 1024 bits. In at least one embodiment, that memory supports Single-Error Correcting Double-Error Detecting ("SECDED") Error Correction Code ("ECC") to protect data. In at least one embodiment, ECC can provide higher reliability for compute applications that are sensitive to data corruption.

In at least one embodiment, PPU implements a multi-level memory hierarchy. In at least one embodiment, memory partition unit 5500 supports a unified memory to provide a single unified virtual address space for central processing unit ("CPU") and PPU memory, enabling data sharing between virtual memory systems. In at least one embodiment frequency of accesses by a PPU to a memory located on other processors is traced to ensure that memory pages are moved to physical memory of PPU that is accessing pages more frequently. In at least one embodiment, high-speed GPU interconnect 5308 supports address translation services allowing PPU to directly access a CPU's page tables and providing full access to CPU memory by a PPU.

In at least one embodiment, copy engines transfer data between multiple PPUs or between PPUs and CPUs. In at least one embodiment, copy engines can generate page faults for addresses that are not mapped into page tables and memory partition unit 5500 then services page faults, mapping addresses into page table, after which copy engine performs a transfer. In at least one embodiment, memory is pinned (i.e., non-pageable) for multiple copy engine operations between multiple processors, substantially reducing available memory. In at least one embodiment, with hardware page faulting, addresses can be passed to copy engines without regard as to whether memory pages are resident, and a copy process is transparent.

Data from memory 5304 of FIG. 53 or other system memory is fetched by memory partition unit 5500 and stored in L2 cache 5504, which is located on-chip and is shared between various GPCs, in accordance with at least one embodiment. Each memory partition unit 5500, in at least one embodiment, includes, without limitation, at least a portion of L2 cache associated with a corresponding memory device. In at least one embodiment, lower level caches are implemented in various units within GPCs. In at least one embodiment, each of SMs 5414 in FIG. 54 may implement a Level 1 ("L1") cache wherein that L1 cache is private memory that is dedicated to a particular SM 5414 and data from L2 cache 5504 is fetched and stored in each L1 cache for processing in functional units of SMs 5414. In at least one embodiment, L2 cache 5504 is coupled to memory interface 5506 and XBar 5320 shown in FIG. 53.

ROP unit 5502 performs graphics raster operations related to pixel color, such as color compression, pixel blending, and more, in at least one embodiment. ROP unit 5502, in at least one embodiment, implements depth testing in conjunction with raster engine 5408, receiving a depth for a sample location associated with a pixel fragment from a culling engine of raster engine 5408. In at least one embodiment, depth is tested against a corresponding depth in a depth buffer for a sample location associated with a fragment. In at least one embodiment, if that fragment passes that depth test for that sample location, then ROP unit 5502 updates depth buffer and transmits a result of that depth test to raster engine 5408. It will be appreciated that a number of partition units 5500 may be different than a number of GPCs and, therefore, each ROP unit 5502 can, in at least one embodiment, be coupled to each GPC. In at least one embodiment, ROP unit 5502 tracks packets received from different GPCs and determines whether a result generated by ROP unit 5502 is to be routed to through XBar 5320.

Figure 56:
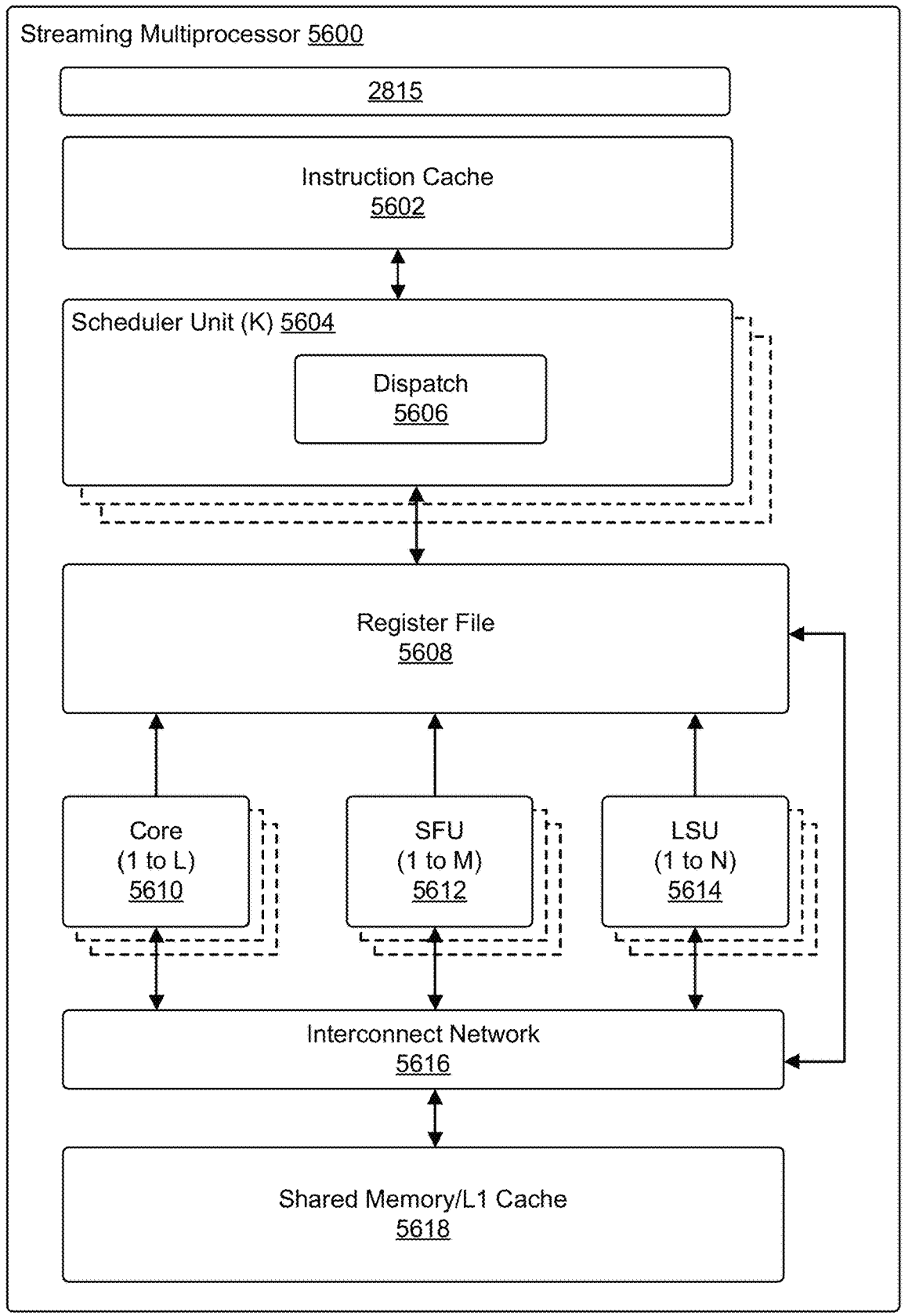
FIG. 56 illustrates a streaming multi-processor, according to at least one embodiment.

FIG. 56 illustrates a streaming multi-processor ("SM") 5600, according to at least one embodiment. In at least one embodiment, SM 5600 is SM of FIG. 54. In at least one embodiment, SM 5600 includes, without limitation, an instruction cache 5602, one or more scheduler units 5604, a register file 5608, one or more processing cores ("cores") 5610, one or more special function units ("SFUs") 5612, one or more load/store units ("LSUs") 5614, an interconnect network 5616, a shared memory/level one ("L1") cache 5618, and/or any suitable combination thereof.

In at least one embodiment, a work distribution unit dispatches tasks for execution on general processing clusters ("GPCs") of parallel processing units ("PPUs") and each task is allocated to a particular Data Processing Cluster ("DPC") within a GPC and, if a task is associated with a shader program, that task is allocated to one of SMs 5600. In at least one embodiment, scheduler unit 5604 receives tasks from a work distribution unit and manages instruction scheduling for one or more thread blocks assigned to SM 5600. In at least one embodiment, scheduler unit 5604 schedules thread blocks for execution as warps of parallel threads, wherein each thread block is allocated at least one warp. In at least one embodiment, each warp executes threads. In at least one embodiment, scheduler unit 5604 manages a plurality of different thread blocks, allocating warps to different thread blocks and then dispatching instructions from plurality of different cooperative groups to various functional units (e.g., processing cores 5610, SFUs 5612, and LSUs 5614) during each clock cycle.

In at least one embodiment, Cooperative Groups may refer to a programming model for organizing groups of communicating threads that allows developers to express granularity at which threads are communicating, enabling expression of richer, more efficient parallel decompositions. In at least one embodiment, cooperative launch APIs support synchronization amongst thread blocks for execution of parallel algorithms. In at least one embodiment, applications of conventional programming models provide a single, simple construct for synchronizing cooperating threads: a barrier across all threads of a thread block (e.g., syncthreads( ) function). However, in at least one embodiment, programmers may define groups of threads at smaller than thread block granularities and synchronize within defined groups to enable greater performance, design flexibility, and software reuse in form of collective group-wide function interfaces. In at least one embodiment, Cooperative Groups enables programmers to define groups of threads explicitly at sub-block (i.e., as small as a single thread) and multi-block granularities, and to perform collective operations such as synchronization on threads in a cooperative group. In at least one embodiment, that programming model supports clean composition across software boundaries, so that libraries and utility functions can synchronize safely within their local context without having to make assumptions about convergence. In at least one embodiment, Cooperative Groups primitives enable new patterns of cooperative parallelism, including, without limitation, producer-consumer parallelism, opportunistic parallelism, and global synchronization across an entire grid of thread blocks.

In at least one embodiment, a dispatch unit 5606 is configured to transmit instructions to one or more functional units and scheduler unit 5604 and includes, without limitation, two dispatch units 5606 that enable two different instructions from a common warp to be dispatched during each clock cycle. In at least one embodiment, each scheduler unit 5604 includes a single dispatch unit 5606 or additional dispatch units 5606.

In at least one embodiment, each SM 5600, in at least one embodiment, includes, without limitation, register file 5608 that provides a set of registers for functional units of SM 5600. In at least one embodiment, register file 5608 is divided between each functional unit such that each functional unit is allocated a dedicated portion of register file 5608. In at least one embodiment, register file 5608 is divided between different warps being executed by SM 5600 and register file 5608 provides temporary storage for operands connected to data paths of functional units. In at least one embodiment, each SM 5600 comprises, without limitation, a plurality of L processing cores 5610, where L is a positive integer. In at least one embodiment, SM 5600 includes, without limitation, a large number (e.g., 128 or more) of distinct processing cores 5610. In at least one embodiment, each processing core 5610 includes, without limitation, a fully-pipelined, single-precision, double-precision, and/or mixed precision processing unit that includes, without limitation, a floating point arithmetic logic unit and an integer arithmetic logic unit. In at least one embodiment, floating point arithmetic logic units implement IEEE 754-2008 standard for floating point arithmetic. In at least one embodiment, processing cores 5610 include, without limitation, 64 single-precision (32-bit) floating point cores, 64 integer cores, 32 double-precision (64-bit) floating point cores, and 8 tensor cores.

Tensor cores are configured to perform matrix operations in accordance with at least one embodiment. In at least one embodiment, one or more tensor cores are included in processing cores 5610. In at least one embodiment, tensor cores are configured to perform deep learning matrix arithmetic, such as convolution operations for neural network training and inferencing. In at least one embodiment, each tensor core operates on a 4×4 matrix and performs a matrix multiply and accumulate operation, D=A×B+C, where A, B, C, and D are 4×4 matrices.

In at least one embodiment, matrix multiply inputs A and B are 16-bit floating point matrices and accumulation matrices C and D are 16-bit floating point or 32-bit floating point matrices. In at least one embodiment, tensor cores operate on 16-bit floating point input data with 32-bit floating point accumulation. In at least one embodiment, 16-bit floating point multiply uses 64 operations and results in a full precision product that is then accumulated using 32-bit floating point addition with other intermediate products for a 4×4×4 matrix multiply. Tensor cores are used to perform much larger two-dimensional or higher dimensional matrix operations, built up from these smaller elements, in at least one embodiment. In at least one embodiment, an API, such as a CUDA 9 C++ API, exposes specialized matrix load, matrix multiply and accumulate, and matrix store operations to efficiently use tensor cores from a CUDA-C++ program. In at least one embodiment, at a CUDA level, a warp-level interface assumes 16×16 size matrices spanning all 32 threads of warp.

In at least one embodiment, each SM 5600 comprises, without limitation, M SFUs 5612 that perform special functions (e.g., attribute evaluation, reciprocal square root, and like). In at least one embodiment, SFUs 5612 include, without limitation, a tree traversal unit configured to traverse a hierarchical tree data structure. In at least one embodiment, SFUs 5612 include, without limitation, a texture unit configured to perform texture map filtering operations. In at least one embodiment, texture units are configured to load texture maps (e.g., a 2D array of texels) from memory and sample texture maps to produce sampled texture values for use in shader programs executed by SM 5600. In at least one embodiment, texture maps are stored in shared memory/L1 cache 5618. In at least one embodiment, texture units implement texture operations such as filtering operations using mip-maps (e.g., texture maps of varying levels of detail), in accordance with at least one embodiment. In at least one embodiment, each SM 5600 includes, without limitation, two texture units.

Each SM 5600 comprises, without limitation, N LSUs 5614 that implement load and store operations between shared memory/L1 cache 5618 and register file 5608, in at least one embodiment. Interconnect network 5616 connects each functional unit to register file 5608 and LSU 5614 to register file 5608 and shared memory/L1 cache 5618 in at least one embodiment. In at least one embodiment, interconnect network 5616 is a crossbar that can be configured to connect any functional units to any registers in register file 5608 and connect LSUs 5614 to register file 5608 and memory locations in shared memory/L1 cache 5618.

In at least one embodiment, shared memory/L1 cache 5618 is an array of on-chip memory that allows for data storage and communication between SM 5600 and primitive engine and between threads in SM 5600, in at least one embodiment. In at least one embodiment, shared memory/L1 cache 5618 comprises, without limitation, 128 KB of storage capacity and is in a path from SM 5600 to a partition unit. In at least one embodiment, shared memory/L1 cache 5618, in at least one embodiment, is used to cache reads and writes. In at least one embodiment, one or more of shared memory/L1 cache 5618, L2 cache, and memory are backing stores.

Combining data cache and shared memory functionality into a single memory block provides improved performance for both types of memory accesses, in at least one embodiment. In at least one embodiment, capacity is used or is usable as a cache by programs that do not use shared memory, such as if shared memory is configured to use half of a capacity, and texture and load/store operations can use remaining capacity. Integration within shared memory/L1 cache 5618 enables shared memory/L1 cache 5618 to function as a high-throughput conduit for streaming data while simultaneously providing high-bandwidth and low-latency access to frequently reused data, in accordance with at least one embodiment. In at least one embodiment, when configured for general purpose parallel computation, a simpler configuration can be used compared with graphics processing. In at least one embodiment, fixed function graphics processing units are bypassed, creating a much simpler programming model. In a general purpose parallel computation configuration, a work distribution unit assigns and distributes blocks of threads directly to DPCs, in at least one embodiment. In at least one embodiment, threads in a block execute a common program, using a unique thread ID in calculation to ensure each thread generates unique results, using SM 5600 to execute program and perform calculations, shared memory/L1 cache 5618 to communicate between threads, and LSU 5614 to read and write global memory through shared memory/L1 cache 5618 and memory partition unit. In at least one embodiment, when configured for general purpose parallel computation, SM 5600 writes commands that scheduler unit 5604 can use to launch new work on DPCs.

In at least one embodiment, a PPU is included in or coupled to a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, and more. In at least one embodiment, a PPU is embodied on a single semiconductor substrate. In at least one embodiment, a PPU is included in a system-on-a-chip ("SoC") along with one or more other devices such as additional PPUs, memory, a reduced instruction set computer ("RISC") CPU, a memory management unit ("MMU"), a digital-to-analog converter ("DAC"), and like.

In at least one embodiment, a PPU may be included on a graphics card that includes one or more memory devices. In at least one embodiment, that graphics card may be configured to interface with a PCIe slot on a motherboard of a desktop computer. In at least one embodiment, that PPU may be an integrated graphics processing unit ("iGPU") included in chipset of a motherboard.

Inference and/or training logic 2815 are used to perform inferencing and/or training operations associated with one or more embodiments. Details regarding inference and/or training logic 2815 are provided herein in conjunction with FIGS. 28A and/or 28B. In at least one embodiment, deep learning application processor is used to train a machine learning model, such as a neural network, to predict or infer information provided to SM 5600. In at least one embodiment, SM 5600 is used to infer or predict information based on a trained machine learning model (e.g., neural network) that has been trained by another processor or system or by SM 5600. In at least one embodiment, SM 5600 may be used to perform one or more neural network use cases described herein.

In at least one embodiment, one or more systems depicted in FIGS. 28A and 28B are utilized to implement a framework for image processing (e.g., real-time image rendering and enhancement). In at least one embodiment, one or more systems depicted in FIGS. 28A and 28B are utilized to perform various processes such as those described in connection with FIGS. 1-27. In at least one embodiment, one or more systems depicted in FIGS. 28A and 28B are utilized to generate and apply blue noise masks to images that are able to handle the temporal domain, i.e., adding time to the spatial (image) domain to improve image quality when rendering images over multiple frames (e.g., time).

Embodiments are disclosed related a virtualized computing platform for advanced computing, such as image inferencing and image processing in medical applications. Without limitation, embodiments may include radiography, magnetic resonance imaging (MRI), nuclear medicine, ultrasound, sonography, elastography, photoacoustic imaging, tomography, echocardiography, functional near-infrared spectroscopy, and magnetic particle imaging, or a combination thereof. In at least one embodiment, a virtualized computing platform and associated processes described herein may additionally or alternatively be used, without limitation, in forensic science analysis, sub-surface detection and imaging (e.g., oil exploration, archaeology, paleontology, etc.), topography, oceanography, geology, osteology, meteorology, intelligent area or object tracking and monitoring, sensor data processing (e.g., RADAR, SONAR, LIDAR, etc.), and/or genomics and gene sequencing.

Figure 57:
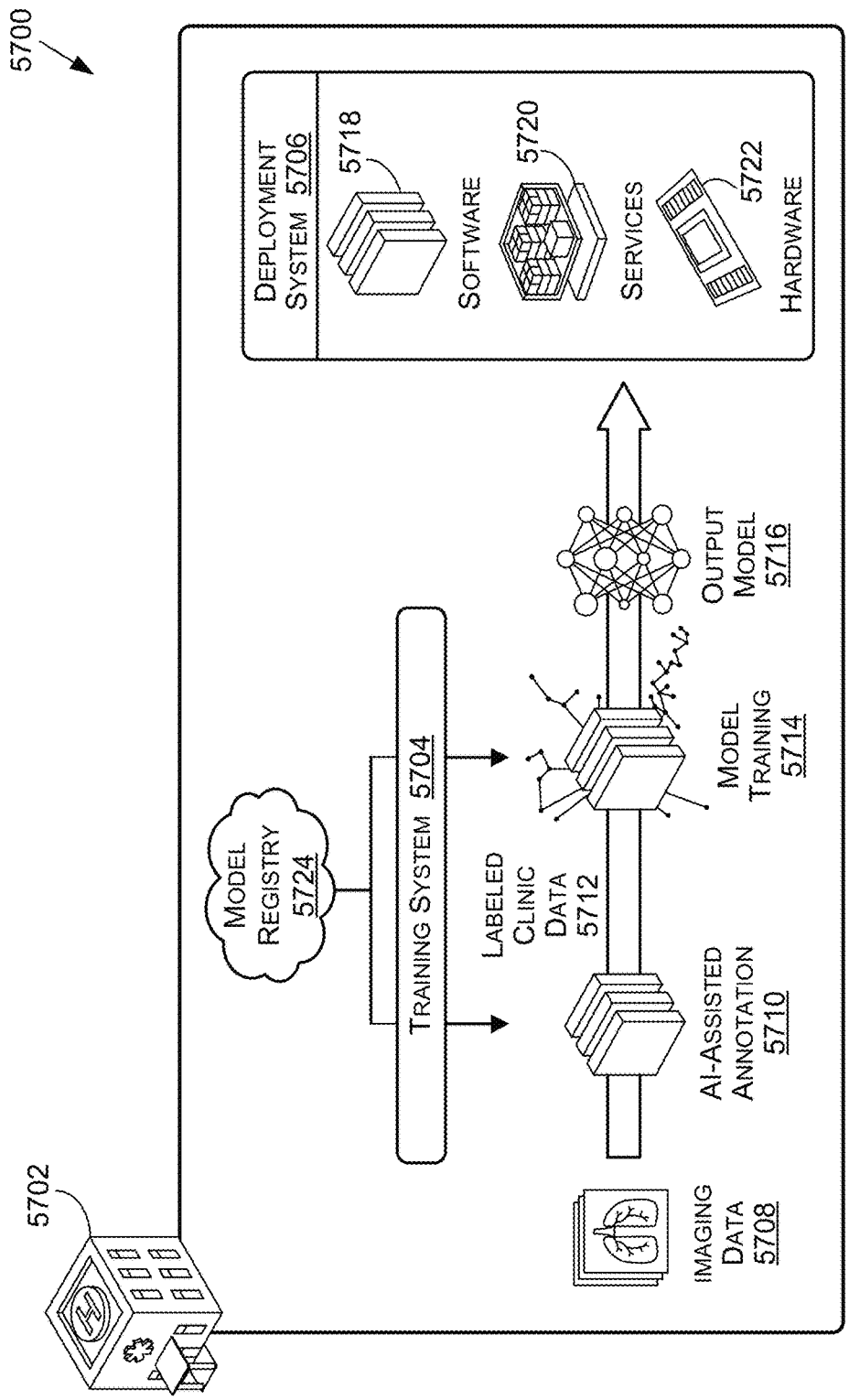
FIG. 57 is an example data flow diagram for an advanced computing pipeline, in accordance with at least one embodiment.

With reference to FIG. 57, FIG. 57 is an example data flow diagram for a process 5700 of generating and deploying an image processing and inferencing pipeline, in accordance with at least one embodiment. In at least one embodiment, process 5700 may be deployed for use with imaging devices, processing devices, genomics devices, gene sequencing devices, radiology devices, and/or other device types at one or more facilities 5702, such as medical facilities, hospitals, healthcare institutes, clinics, research or diagnostic labs, etc. In at least one embodiment, process 5700 may be deployed to perform genomics analysis and inferencing on sequencing data. Examples of genomic analyses that may be performed using systems and processes described herein include, without limitation, variant calling, mutation detection, and gene expression quantification.

In at least one embodiment, process 5700 may be executed within a training system 5704 and/or a deployment system 5706. In at least one embodiment, training system 5704 may be used to perform training, deployment, and implementation of machine learning models (e.g., neural networks, object detection algorithms, computer vision algorithms, etc.) for use in deployment system 5706. In at least one embodiment, deployment system 5706 may be configured to offload processing and compute resources among a distributed computing environment to reduce infrastructure requirements at facility 5702. In at least one embodiment, deployment system 5706 may provide a streamlined platform for selecting, customizing, and implementing virtual instruments for use with imaging devices (e.g., MRI, CT Scan, X-Ray, Ultrasound, etc.) or sequencing devices at facility 5702. In at least one embodiment, virtual instruments may include software-defined applications for performing one or more processing operations with respect to imaging data generated by imaging devices, sequencing devices, radiology devices, and/or other device types. In at least one embodiment, one or more applications in a pipeline may use or call upon services (e.g., inference, visualization, compute, AI, etc.) of deployment system 5706 during execution of applications.

In at least one embodiment, some of applications used in advanced processing and inferencing pipelines may use machine learning models or other AI to perform one or more processing steps. In at least one embodiment, machine learning models may be trained at facility 5702 using data 5708 (such as imaging data) generated at facility 5702 (and stored on one or more picture archiving and communication system (PACS) servers at facility 5702), may be trained using imaging or sequencing data 5708 from another facility or facilities (e.g., a different hospital, lab, clinic, etc.), or a combination thereof. In at least one embodiment, training system 5704 may be used to provide applications, services, and/or other resources for generating working, deployable machine learning models for deployment system 5706.

In at least one embodiment, a model registry 5724 may be backed by object storage that may support versioning and object metadata. In at least one embodiment, object storage may be accessible through, for example, a cloud storage (e.g., a cloud 5826 of FIG. 58) compatible application programming interface (API) from within a cloud platform. In at least one embodiment, machine learning models within model registry 5724 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, a training pipeline 5804 (FIG. 58) may include a scenario where facility 5702 is training their own machine learning model, or has an existing machine learning model that needs to be optimized or updated. In at least one embodiment, imaging data 5708 generated by imaging device(s), sequencing devices, and/or other device types may be received. In at least one embodiment, once imaging data 5708 is received, AI-assisted annotation 5710 may be used to aid in generating annotations corresponding to imaging data 5708 to be used as ground truth data for a machine learning model. In at least one embodiment, AI-assisted annotation 5710 may include one or more machine learning models (e.g., convolutional neural networks (CNNs)) that may be trained to generate annotations corresponding to certain types of imaging data 5708 (e.g., from certain devices) and/or certain types of anomalies in imaging data 5708. In at least one embodiment, AI-assisted annotations 5710 may then be used directly, or may be adjusted or fine-tuned using an annotation tool (e.g., by a researcher, a clinician, a doctor, a scientist, etc.), to generate ground truth data. In at least one embodiment, in some examples, labeled clinic data 5712 (e.g., annotations provided by a clinician, doctor, scientist, technician, etc.) may be used as ground truth data for training a machine learning model. In at least one embodiment, AI-assisted annotations 5710, labeled clinic data 5712, or a combination thereof may be used as ground truth data for training a machine learning model. In at least one embodiment, a trained machine learning model may be referred to as an output model 5716, and may be used by deployment system 5706, as described herein.

In at least one embodiment, training pipeline 5804 (FIG. 58) may include a scenario where facility 5702 needs a machine learning model for use in performing one or more processing tasks for one or more applications in deployment system 5706, but facility 5702 may not currently have such a machine learning model (or may not have a model that is optimized, efficient, or effective for such purposes). In at least one embodiment, an existing machine learning model may be selected from model registry 5724. In at least one embodiment, model registry 5724 may include machine learning models trained to perform a variety of different inference tasks on imaging data. In at least one embodiment, machine learning models in model registry 5724 may have been trained on imaging data from different facilities than facility 5702 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises (e.g., to comply with HIPAA regulations, privacy regulations, etc.). In at least one embodiment, once a model is trained—or partially trained—at one location, a machine learning model may be added to model registry 5724. In at least one embodiment, a machine learning model may then be retrained, or updated, at any number of other facilities, and a retrained or updated model may be made available in model registry 5724. In at least one embodiment, a machine learning model may then be selected from model registry 5724—and referred to as output model 5716—and may be used in deployment system 5706 to perform one or more processing tasks for one or more applications of a deployment system.

In at least one embodiment, training pipeline 5804 (FIG. 58) may be used in a scenario that includes facility 5702 requiring a machine learning model for use in performing one or more processing tasks for one or more applications in deployment system 5706, but facility 5702 may not currently have such a machine learning model (or may not have a model that is optimized, efficient, or effective for such purposes). In at least one embodiment, a machine learning model selected from model registry 5724 might not be fine-tuned or optimized for imaging data 5708 generated at facility 5702 because of differences in populations, genetic variations, robustness of training data used to train a machine learning model, diversity in anomalies of training data, and/or other issues with training data. In at least one embodiment, AI-assisted annotation 5710 may be used to aid in generating annotations corresponding to imaging data 5708 to be used as ground truth data for retraining or updating a machine learning model. In at least one embodiment, labeled clinic data 5712 (e.g., annotations provided by a clinician, doctor, scientist, etc.) may be used as ground truth data for training a machine learning model. In at least one embodiment, retraining or updating a machine learning model may be referred to as model training 5714. In at least one embodiment, model training 5714—e.g., AI-assisted annotations 5710, labeled clinic data 5712, or a combination thereof—may be used as ground truth data for retraining or updating a machine learning model.

In at least one embodiment, deployment system 5706 may include software 5718, services 5720, hardware 5722, and/or other components, features, and functionality. In at least one embodiment, deployment system 5706 may include a software "stack," such that software 5718 may be built on top of services 5720 and may use services 5720 to perform some or all of processing tasks, and services 5720 and software 5718 may be built on top of hardware 5722 and use hardware 5722 to execute processing, storage, and/or other compute tasks of deployment system 5706.

In at least one embodiment, software 5718 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, for each type of imaging device (e.g., CT, MM, X-Ray, ultrasound, sonography, echocardiography, etc.), sequencing device, radiology device, genomics device, etc., there may be any number of containers that may perform a data processing task with respect to imaging data 5708 (or other data types, such as those described herein) generated by a device. In at least one embodiment, an advanced processing and inferencing pipeline may be defined based on selections of different containers that are desired or required for processing imaging data 5708, in addition to containers that receive and configure imaging data for use by each container and/or for use by facility 5702 after processing through a pipeline (e.g., to convert outputs back to a usable data type, such as digital imaging and communications in medicine (DICOM) data, radiology information system (RIS) data, clinical information system (CIS) data, remote procedure call (RPC) data, data substantially compliant with a representation state transfer (REST) interface, data substantially compliant with a file-based interface, and/or raw data, for storage and display at facility 5702). In at least one embodiment, a combination of containers within software 5718 (e.g., that make up a pipeline) may be referred to as a virtual instrument (as described in more detail herein), and a virtual instrument may leverage services 5720 and hardware 5722 to execute some or all processing tasks of applications instantiated in containers.

In at least one embodiment, a data processing pipeline may receive input data (e.g., imaging data 5708) in a DICOM, RIS, CIS, REST compliant, RPC, raw, and/or other format in response to an inference request (e.g., a request from a user of deployment system 5706, such as a clinician, a doctor, a radiologist, etc.). In at least one embodiment, input data may be representative of one or more images, video, and/or other data representations generated by one or more imaging devices, sequencing devices, radiology devices, genomics devices, and/or other device types. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 5716 of training system 5704.

In at least one embodiment, tasks of data processing pipeline may be encapsulated in a container(s) that each represent a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 5724 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers (e.g., software developers, clinicians, doctors, etc.) may develop, publish, and store applications (e.g., as containers) for performing image processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 5720 as a system (e.g., system 5800 of FIG. 58). In at least one embodiment, because DICOM objects may contain anywhere from one to hundreds of images or other data types, and due to a variation in data, a developer may be responsible for managing (e.g., setting constructs for, building pre-processing into an application, etc.) extraction and preparation of incoming DICOM data. In at least one embodiment, once validated by system 5800 (e.g., for accuracy, safety, patient privacy, etc.), an application may be available in a container registry for selection and/or implementation by a user (e.g., a hospital, clinic, lab, healthcare provider, etc.) to perform one or more processing tasks with respect to data at a facility (e.g., a second facility) of a user.

Figure 58:
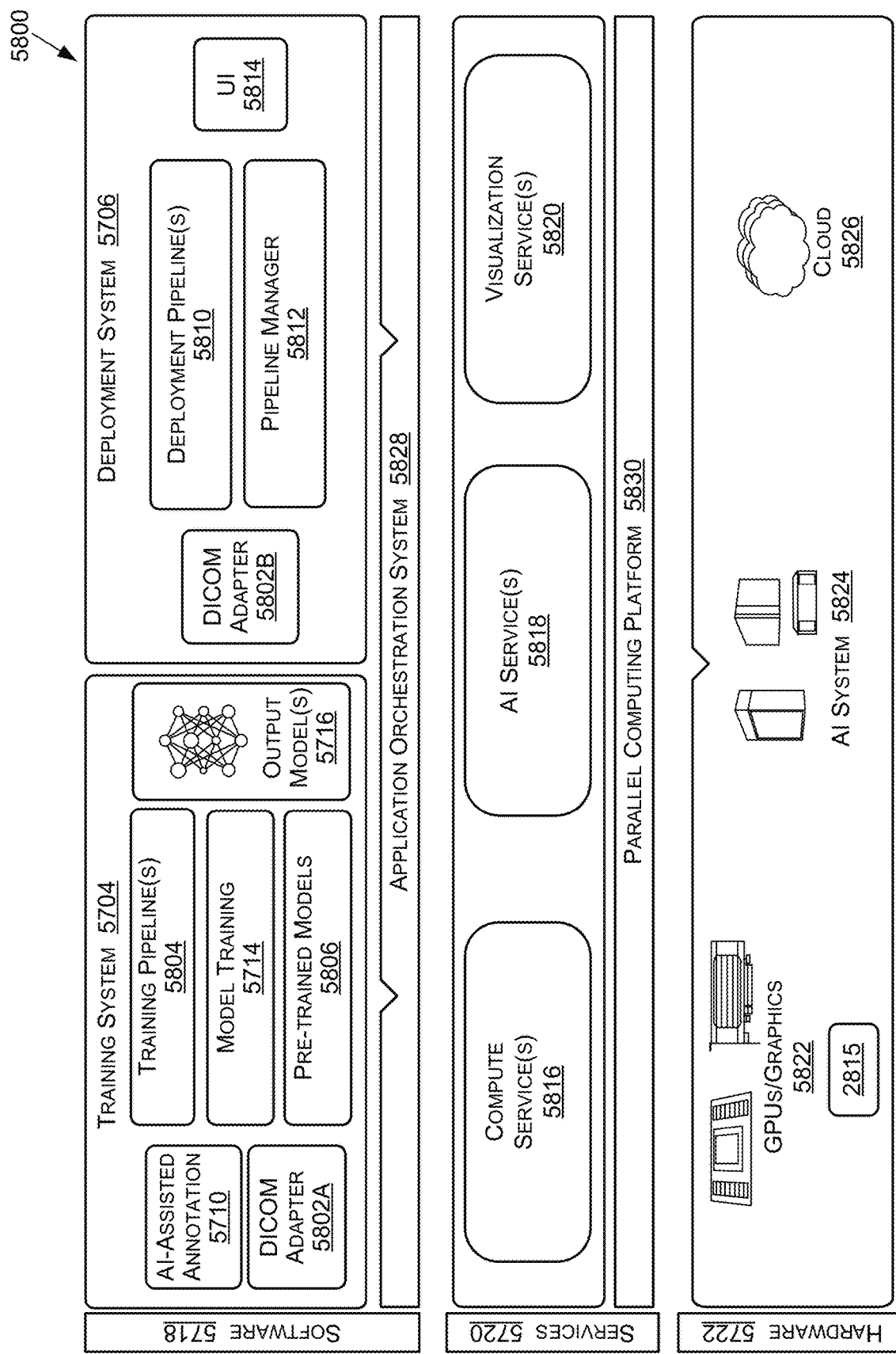
FIG. 58 is a system diagram for an example system for training, adapting, instantiating and deploying machine learning models in an advanced computing pipeline, in accordance with at least one embodiment.

In at least one embodiment, developers may then share applications or containers through a network for access and use by users of a system (e.g., system 5800 of FIG. 58). In at least one embodiment, completed and validated applications or containers may be stored in a container registry and associated machine learning models may be stored in model registry 5724. In at least one embodiment, a requesting entity (e.g., a user at a medical facility)—who provides an inference or image processing request—may browse a container registry and/or model registry 5724 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 5706 (e.g., a cloud) to perform processing of data processing pipeline. In at least one embodiment, processing by deployment system 5706 may include referencing selected elements (e.g., applications, containers, models, etc.) from a container registry and/or model registry 5724. In at least one embodiment, once results are generated by a pipeline, results may be returned to a user for reference (e.g., for viewing in a viewing application suite executing on a local, on-premises workstation or terminal). In at least one embodiment, a radiologist may receive results from a data processing pipeline including any number of application and/or containers, where results may include anomaly detection in X-rays, CT scans, MRIs, etc.

In at least one embodiment, to aid in processing or execution of applications or containers in pipelines, services 5720 may be leveraged. In at least one embodiment, services 5720 may include compute services, artificial intelligence (AI) services, visualization services, and/or other service types. In at least one embodiment, services 5720 may provide functionality that is common to one or more applications in software 5718, so functionality may be abstracted to a service that may be called upon or leveraged by applications. In at least one embodiment, functionality provided by services 5720 may run dynamically and more efficiently, while also scaling well by allowing applications to process data in parallel (e.g., using a parallel computing platform 5830 (FIG. 58)). In at least one embodiment, rather than each application that shares a same functionality offered by a service 5720 being required to have a respective instance of service 5720, service 5720 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (e.g., DICOM, RIS, CIS, REST compliant, RPC, raw, etc.) extraction, resizing, scaling, and/or other augmentation. In at least one embodiment, a visualization service may be used that may add image rendering effects—such as ray-tracing, rasterization, denoising, sharpening, etc.—to add realism to two-dimensional (2D) and/or three-dimensional (3D) models. In at least one embodiment, virtual instrument services may be included that provide for beam-forming, segmentation, inferencing, imaging, and/or support for other applications within pipelines of virtual instruments.

In at least one embodiment, where a service 5720 includes an AI service (e.g., an inference service), one or more machine learning models associated with an application for anomaly detection (e.g., tumors, growth abnormalities, scarring, etc.) may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 5718 implementing advanced processing and inferencing pipeline that includes segmentation application and anomaly detection application may be streamlined because each application may call upon a same inference service to perform one or more inferencing tasks.

In at least one embodiment, hardware 5722 may include GPUs, CPUs, graphics cards, an AI/deep learning system (e.g., an AI supercomputer, such as NVIDIA's DGX supercomputer system), a cloud platform, or a combination thereof. In at least one embodiment, different types of hardware 5722 may be used to provide efficient, purpose-built support for software 5718 and services 5720 in deployment system 5706. In at least one embodiment, use of GPU processing may be implemented for processing locally (e.g., at facility 5702), within an AI/deep learning system, in a cloud system, and/or in other processing components of deployment system 5706 to improve efficiency, accuracy, and efficacy of image processing, image reconstruction, segmentation, MM exams, stroke or heart attack detection (e.g., in real-time), image quality in rendering, etc. In at least one embodiment, a facility may include imaging devices, genomics devices, sequencing devices, and/or other device types on-premises that may leverage GPUs to generate imaging data representative of a subject's anatomy.

In at least one embodiment, software 5718 and/or services 5720 may be optimized for GPU processing with respect to deep learning, machine learning, and/or high-performance computing, as non-limiting examples. In at least one embodiment, at least some of computing environment of deployment system 5706 and/or training system 5704 may be executed in a datacenter one or more supercomputers or high performance computing systems, with GPU optimized software (e.g., hardware and software combination of NVIDIA's DGX system). In at least one embodiment, datacenters may be compliant with provisions of HIPAA, such that receipt, processing, and transmission of imaging data and/or other patient data is securely handled with respect to privacy of patient data. In at least one embodiment, hardware 5722 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC) may be executed using an AI/deep learning supercomputer(s) and/or GPU-optimized software (e.g., as provided on NVIDIA's DGX systems) as a hardware abstraction and scaling platform. In at least one embodiment, cloud platform may integrate an application container clustering system or orchestration system (e.g., KUBERNETES) on multiple GPUs to enable seamless scaling and load balancing.

In at least one embodiment, one or more systems depicted in FIGS. 28A and 28B are utilized to implement a framework for image processing (e.g., real-time image rendering and enhancement). In at least one embodiment, one or more systems depicted in FIGS. 28A and 28B are utilized to perform various processes such as those described in connection with FIGS. 1-27. In at least one embodiment, one or more systems depicted in FIGS. 28A and 28B are utilized to generate and apply blue noise masks to images that are able to handle the temporal domain, i.e., adding time to the spatial (image) domain to improve image quality when rendering images over multiple frames (e.g., time).

FIG. 58 is a system diagram for an example system 5800 for generating and deploying an imaging deployment pipeline, in accordance with at least one embodiment. In at least one embodiment, system 5800 may be used to implement process 5700 of FIG. 57 and/or other processes including advanced processing and inferencing pipelines. In at least one embodiment, system 5800 may include training system 5704 and deployment system 5706. In at least one embodiment, training system 5704 and deployment system 5706 may be implemented using software 5718, services 5720, and/or hardware 5722, as described herein.

In at least one embodiment, system 5800 (e.g., training system 5704 and/or deployment system 5706) may implemented in a cloud computing environment (e.g., using cloud 5826). In at least one embodiment, system 5800 may be implemented locally with respect to a healthcare services facility, or as a combination of both cloud and local computing resources. In at least one embodiment, in embodiments where cloud computing is implemented, patient data may be separated from, or unprocessed by, by one or more components of system 5800 that would render processing non-compliant with HIPAA and/or other data handling and privacy regulations or laws. In at least one embodiment, access to APIs in cloud 5826 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 5800, may be restricted to a set of public IPs that have been vetted or authorized for interaction.

In at least one embodiment, various components of system 5800 may communicate between and among one another using any of a variety of different network types, including but not limited to local area networks (LANs) and/or wide area networks (WANs) via wired and/or wireless communication protocols. In at least one embodiment, communication between facilities and components of system 5800 (e.g., for transmitting inference requests, for receiving results of inference requests, etc.) may be communicated over a data bus or data busses, wireless data protocols (Wi-Fi), wired data protocols (e.g., Ethernet), etc.

In at least one embodiment, training system 5704 may execute training pipelines 5804, similar to those described herein with respect to FIG. 57. In at least one embodiment, where one or more machine learning models are to be used in deployment pipelines 5810 by deployment system 5706, training pipelines 5804 may be used to train or retrain one or more (e.g., pre-trained) models, and/or implement one or more of pre-trained models 5806 (e.g., without a need for retraining or updating). In at least one embodiment, as a result of training pipelines 5804, output model(s) 5716 may be generated. In at least one embodiment, training pipelines 5804 may include any number of processing steps, such as but not limited to imaging data (or other input data) conversion or adaption (e.g., using DICOM adapter 5802A to convert DICOM images to another format suitable for processing by respective machine learning models, such as Neuroimaging Informatics Technology Initiative (NIfTI) format), AI-assisted annotation 5710, labeling or annotating of imaging data 5708 to generate labeled clinic data 5712, model selection from a model registry, model training 5714, training, retraining, or updating models, and/or other processing steps. In at least one embodiment, for different machine learning models used by deployment system 5706, different training pipelines 5804 may be used. In at least one embodiment, training pipeline 5804 similar to a first example described with respect to FIG. 57 may be used for a first machine learning model, training pipeline 5804 similar to a second example described with respect to FIG. 57 may be used for a second machine learning model, and training pipeline 5804 similar to a third example described with respect to FIG. 57 may be used for a third machine learning model. In at least one embodiment, any combination of tasks within training system 5704 may be used depending on what is required for each respective machine learning model. In at least one embodiment, one or more of machine learning models may already be trained and ready for deployment so machine learning models may not undergo any processing by training system 5704, and may be implemented by deployment system 5706.

In at least one embodiment, output model(s) 5716 and/or pre-trained model(s) 5806 may include any types of machine learning models depending on implementation or embodiment. In at least one embodiment, and without limitation, machine learning models used by system 5800 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

Figure 61A:
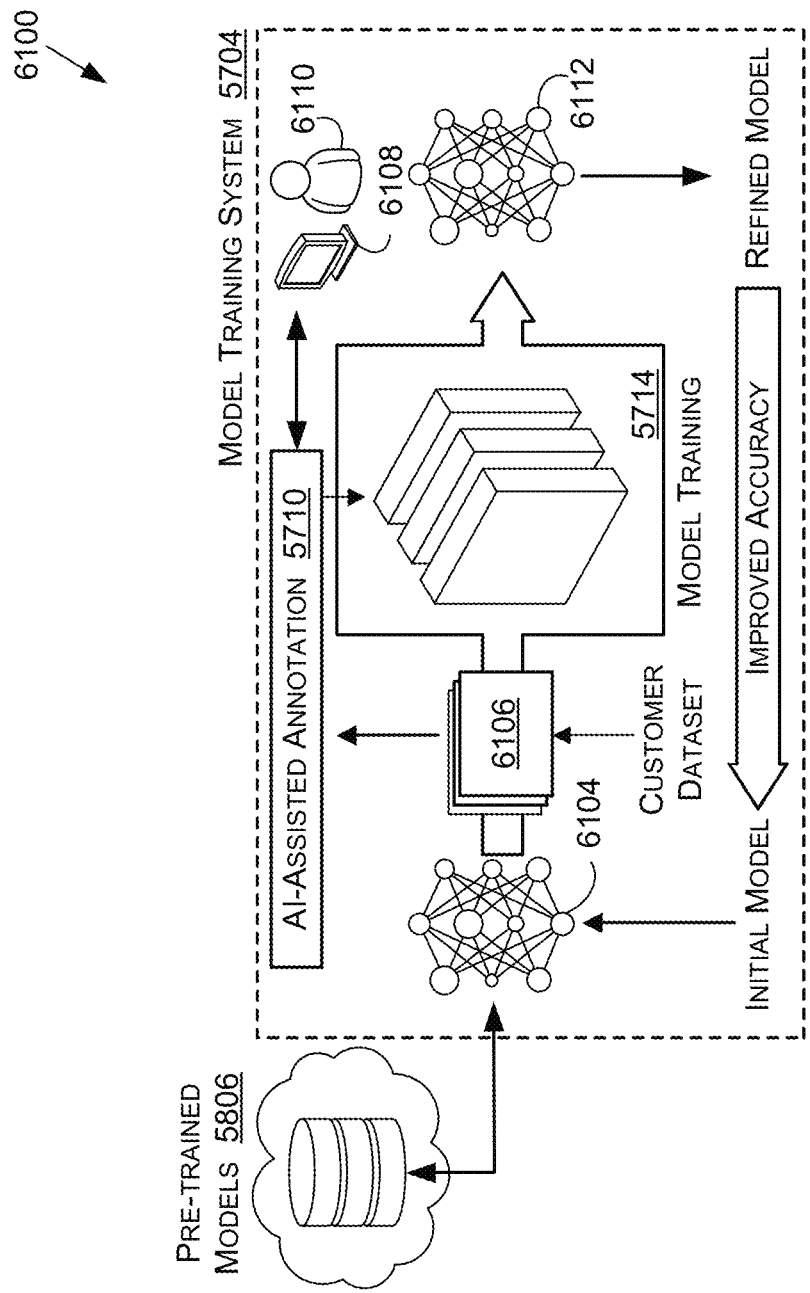
FIG. 61A illustrates a data flow diagram for a process to train a machine learning model, in accordance with at least one embodiment.
Figure 61B:
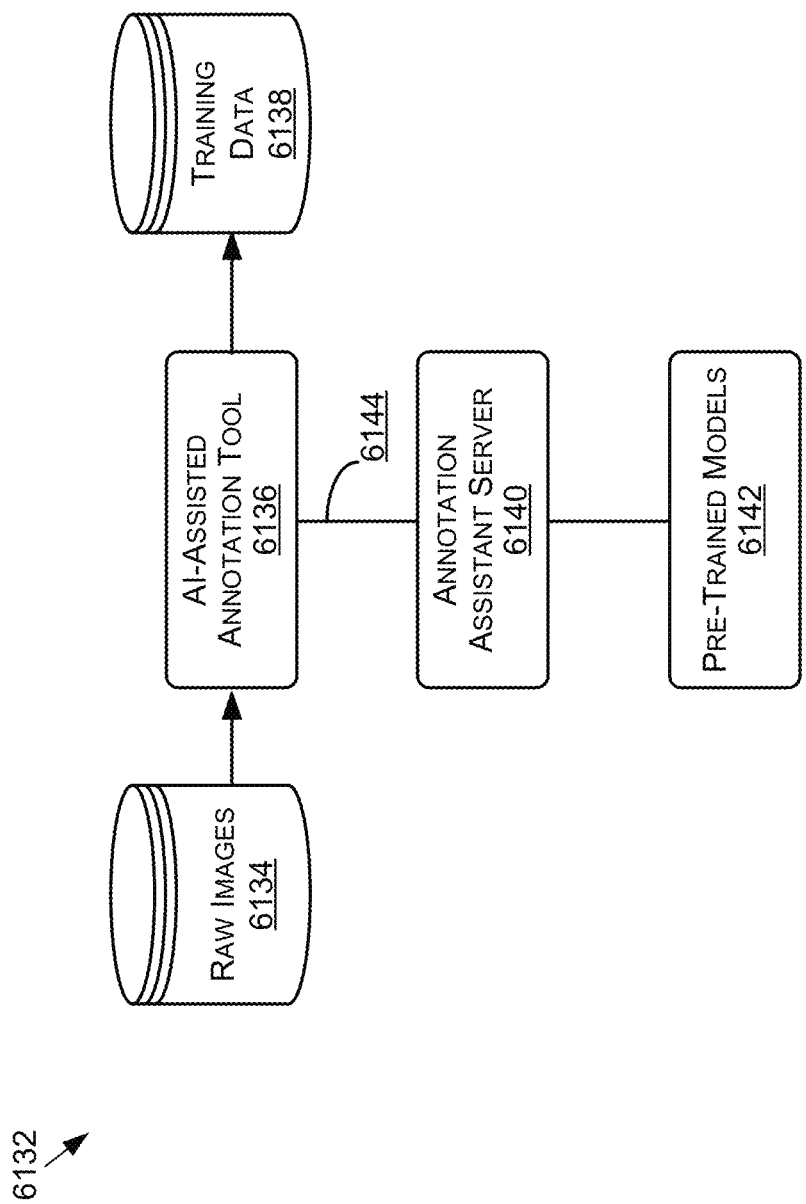
FIG. 61B is an example illustration of a client-server architecture to enhance annotation tools with pre-trained annotation models, in accordance with at least one embodiment.

In at least one embodiment, training pipelines 5804 may include AI-assisted annotation, as described in more detail herein with respect to at least FIG. 61B. In at least one embodiment, labeled clinic data 5712 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of imaging data 5708 (or other data type used by machine learning models), there may be corresponding ground truth data generated by training system 5704. In at least one embodiment, AI-assisted annotation may be performed as part of deployment pipelines 5810; either in addition to, or in lieu of AI-assisted annotation included in training pipelines 5804. In at least one embodiment, system 5800 may include a multi-layer platform that may include a software layer (e.g., software 5718) of diagnostic applications (or other application types) that may perform one or more medical imaging and diagnostic functions. In at least one embodiment, system 5800 may be communicatively coupled to (e.g., via encrypted links) PACS server networks of one or more facilities. In at least one embodiment, system 5800 may be configured to access and referenced data (e.g., DICOM data, RIS data, raw data, CIS data, REST compliant data, RPC data, raw data, etc.) from PACS servers (e.g., via a DICOM adapter 5802, or another data type adapter such as RIS, CIS, REST compliant, RPC, raw, etc.) to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (e.g., called) from an external environment(s) (e.g., facility 5702). In at least one embodiment, applications may then call or execute one or more services 5720 for performing compute, AI, or visualization tasks associated with respective applications, and software 5718 and/or services 5720 may leverage hardware 5722 to perform processing tasks in an effective and efficient manner.

In at least one embodiment, deployment system 5706 may execute deployment pipelines 5810. In at least one embodiment, deployment pipelines 5810 may include any number of applications that may be sequentially, non-sequentially, or otherwise applied to imaging data (and/or other data types) generated by imaging devices, sequencing devices, genomics devices, etc.—including AI-assisted annotation, as described above. In at least one embodiment, as described herein, a deployment pipeline 5810 for an individual device may be referred to as a virtual instrument for a device (e.g., a virtual ultrasound instrument, a virtual CT scan instrument, a virtual sequencing instrument, etc.). In at least one embodiment, for a single device, there may be more than one deployment pipeline 5810 depending on information desired from data generated by a device. In at least one embodiment, where detections of anomalies are desired from an MRI machine, there may be a first deployment pipeline 5810, and where image enhancement is desired from output of an MRI machine, there may be a second deployment pipeline 5810.

In at least one embodiment, applications available for deployment pipelines 5810 may include any application that may be used for performing processing tasks on imaging data or other data from devices. In at least one embodiment, different applications may be responsible for image enhancement, segmentation, reconstruction, anomaly detection, object detection, feature detection, treatment planning, dosimetry, beam planning (or other radiation treatment procedures), and/or other analysis, image processing, or inferencing tasks. In at least one embodiment, deployment system 5706 may define constructs for each of applications, such that users of deployment system 5706 (e.g., medical facilities, labs, clinics, etc.) may understand constructs and adapt applications for implementation within their respective facility. In at least one embodiment, an application for image reconstruction may be selected for inclusion in deployment pipeline 5810, but data type generated by an imaging device may be different from a data type used within an application. In at least one embodiment, DICOM adapter 5802B (and/or a DICOM reader) or another data type adapter or reader (e.g., RIS, CIS, REST compliant, RPC, raw, etc.) may be used within deployment pipeline 5810 to convert data to a form useable by an application within deployment system 5706. In at least one embodiment, access to DICOM, RIS, CIS, REST compliant, RPC, raw, and/or other data type libraries may be accumulated and pre-processed, including decoding, extracting, and/or performing any convolutions, color corrections, sharpness, gamma, and/or other augmentations to data. In at least one embodiment, DICOM, RIS, CIS, REST compliant, RPC, and/or raw data may be unordered and a pre-pass may be executed to organize or sort collected data. In at least one embodiment, because various applications may share common image operations, in some embodiments, a data augmentation library (e.g., as one of services 5720) may be used to accelerate these operations. In at least one embodiment, to avoid bottlenecks of conventional processing approaches that rely on CPU processing, parallel computing platform 5830 may be used for GPU acceleration of these processing tasks.

In at least one embodiment, an image reconstruction application may include a processing task that includes use of a machine learning model. In at least one embodiment, a user may desire to use their own machine learning model, or to select a machine learning model from model registry 5724. In at least one embodiment, a user may implement their own machine learning model or select a machine learning model for inclusion in an application for performing a processing task. In at least one embodiment, applications may be selectable and customizable, and by defining constructs of applications, deployment and implementation of applications for a particular user are presented as a more seamless user experience. In at least one embodiment, by leveraging other features of system 5800—such as services 5720 and hardware 5722—deployment pipelines 5810 may be even more user friendly, provide for easier integration, and produce more accurate, efficient, and timely results.

In at least one embodiment, deployment system 5706 may include a user interface 5814 (e.g., a graphical user interface, a web interface, etc.) that may be used to select applications for inclusion in deployment pipeline(s) 5810, arrange applications, modify or change applications or parameters or constructs thereof, use and interact with deployment pipeline(s) 5810 during set-up and/or deployment, and/or to otherwise interact with deployment system 5706. In at least one embodiment, although not illustrated with respect to training system 5704, user interface 5814 (or a different user interface) may be used for selecting models for use in deployment system 5706, for selecting models for training, or retraining, in training system 5704, and/or for otherwise interacting with training system 5704.

Figure 59:
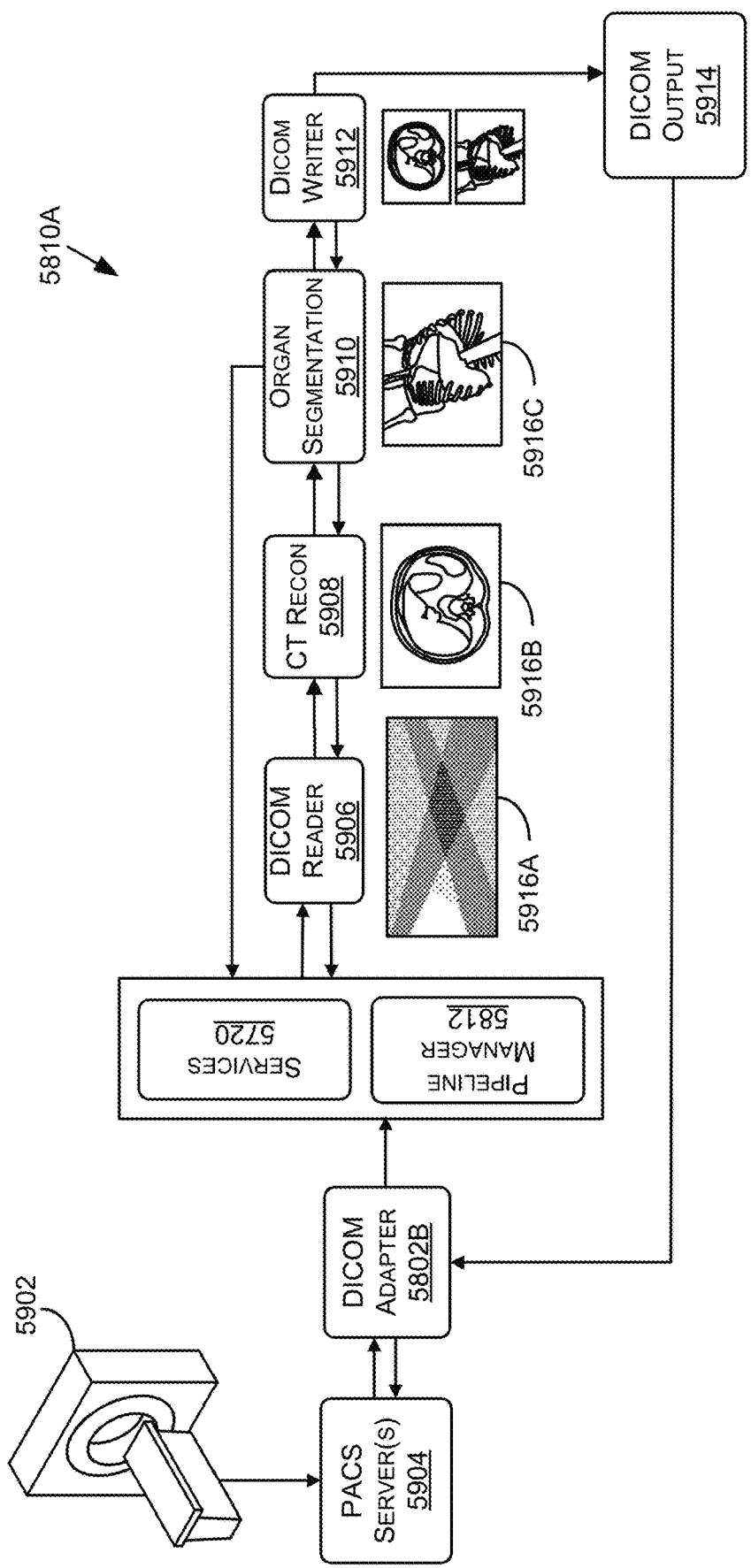
FIG. 59 includes an example illustration of an advanced computing pipeline 5810A for processing imaging data, in accordance with at least one embodiment.

In at least one embodiment, pipeline manager 5812 may be used, in addition to an application orchestration system 5828, to manage interaction between applications or containers of deployment pipeline(s) 5810 and services 5720 and/or hardware 5722. In at least one embodiment, pipeline manager 5812 may be configured to facilitate interactions from application to application, from application to service 5720, and/or from application or service to hardware 5722. In at least one embodiment, although illustrated as included in software 5718, this is not intended to be limiting, and in some examples (e.g., as illustrated in FIG. 59) pipeline manager 5812 may be included in services 5720. In at least one embodiment, application orchestration system 5828 (e.g., Kubernetes, DOCKER, etc.) may include a container orchestration system that may group applications into containers as logical units for coordination, management, scaling, and deployment. In at least one embodiment, by associating applications from deployment pipeline(s) 5810 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 5812 and application orchestration system 5828. In at least one embodiment, so long as an expected input and/or output of each container or application is known by a system (e.g., based on constructs of applications or containers), application orchestration system 5828 and/or pipeline manager 5812 may facilitate communication among and between, and sharing of resources among and between, each of applications or containers. In at least one embodiment, because one or more of applications or containers in deployment pipeline(s) 5810 may share same services and resources, application orchestration system 5828 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 5828) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 5720 leveraged by and shared by applications or containers in deployment system 5706 may include compute services 5816, AI services 5818, visualization services 5820, and/or other service types. In at least one embodiment, applications may call (e.g., execute) one or more of services 5720 to perform processing operations for an application. In at least one embodiment, compute services 5816 may be leveraged by applications to perform super-computing or other high-performance computing (HPC) tasks. In at least one embodiment, compute service(s) 5816 may be leveraged to perform parallel processing (e.g., using a parallel computing platform 5830) for processing data through one or more of applications and/or one or more tasks of a single application, substantially simultaneously. In at least one embodiment, parallel computing platform 5830 (e.g., NVIDIA's CUDA) may enable general purpose computing on GPUs (GPGPU) (e.g., GPUs 5822). In at least one embodiment, a software layer of parallel computing platform 5830 may provide access to virtual instruction sets and parallel computational elements of GPUs, for execution of compute kernels. In at least one embodiment, parallel computing platform 5830 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 5830 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 5818 may be leveraged to perform inferencing services for executing machine learning model(s) associated with applications (e.g., tasked with performing one or more processing tasks of an application). In at least one embodiment, AI services 5818 may leverage AI system 5824 to execute machine learning model(s) (e.g., neural networks, such as CNNs) for segmentation, reconstruction, object detection, feature detection, classification, and/or other inferencing tasks. In at least one embodiment, applications of deployment pipeline(s) 5810 may use one or more of output models 5716 from training system 5704 and/or other models of applications to perform inference on imaging data (e.g., DICOM data, RIS data, CIS data, REST compliant data, RPC data, raw data, etc.). In at least one embodiment, two or more examples of inferencing using application orchestration system 5828 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 5828 may distribute resources (e.g., services 5720 and/or hardware 5722) based on priority paths for different inferencing tasks of AI services 5818.

In at least one embodiment, shared storage may be mounted to AI services 5818 within system 5800. In at least one embodiment, shared storage may operate as a cache (or other storage device type) and may be used to process inference requests from applications. In at least one embodiment, when an inference request is submitted, a request may be received by a set of API instances of deployment system 5706, and one or more instances may be selected (e.g., for best fit, for load balancing, etc.) to process a request. In at least one embodiment, to process a request, a request may be entered into a database, a machine learning model may be located from model registry 5724 if not already in a cache, a validation step may ensure appropriate machine learning model is loaded into a cache (e.g., shared storage), and/or a copy of a model may be saved to a cache. In at least one embodiment, a scheduler (e.g., of pipeline manager 5812) may be used to launch an application that is referenced in a request if an application is not already running or if there are not enough instances of an application. In at least one embodiment, if an inference server is not already launched to execute a model, an inference server may be launched. In at least one embodiment, any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT less than one minute) priority while others may have lower priority (e.g., TAT less than 10 minutes). In at least one embodiment, model execution times may be measured from requesting institution or entity and may include partner network traversal time, as well as execution on an inference service.

In at least one embodiment, transfer of requests between services 5720 and inference applications may be hidden behind a software development kit (SDK), and robust transport may be provided through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. In at least one embodiment, results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 5826, and an inference service may perform inferencing on a GPU.

In at least one embodiment, visualization services 5820 may be leveraged to generate visualizations for viewing outputs of applications and/or deployment pipeline(s) 5810. In at least one embodiment, GPUs 5822 may be leveraged by visualization services 5820 to generate visualizations. In at least one embodiment, rendering effects, such as ray-tracing, may be implemented by visualization services 5820 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 5820 may include an internal visualizer, cinematics, and/or other rendering or image processing capabilities or functionality (e.g., ray tracing, rasterization, internal optics, etc.).

In at least one embodiment, hardware 5722 may include GPUs 5822, AI system 5824, cloud 5826, and/or any other hardware used for executing training system 5704 and/or deployment system 5706. In at least one embodiment, GPUs 5822 (e.g., NVIDIA's TESLA and/or QUADRO GPUs) may include any number of GPUs that may be used for executing processing tasks of compute services 5816, AI services 5818, visualization services 5820, other services, and/or any of features or functionality of software 5718. For example, with respect to AI services 5818, GPUs 5822 may be used to perform pre-processing on imaging data (or other data types used by machine learning models), post-processing on outputs of machine learning models, and/or to perform inferencing (e.g., to execute machine learning models). In at least one embodiment, cloud 5826, AI system 5824, and/or other components of system 5800 may use GPUs 5822. In at least one embodiment, cloud 5826 may include a GPU-optimized platform for deep learning tasks. In at least one embodiment, AI system 5824 may use GPUs, and cloud 5826—or at least a portion tasked with deep learning or inferencing—may be executed using one or more AI systems 5824. As such, although hardware 5722 is illustrated as discrete components, this is not intended to be limiting, and any components of hardware 5722 may be combined with, or leveraged by, any other components of hardware 5722.

In at least one embodiment, AI system 5824 may include a purpose-built computing system (e.g., a super-computer or an HPC) configured for inferencing, deep learning, machine learning, and/or other artificial intelligence tasks. In at least one embodiment, AI system 5824 (e.g., NVIDIA's DGX) may include GPU-optimized software (e.g., a software stack) that may be executed using a plurality of GPUs 5822, in addition to CPUs, RAM, storage, and/or other components, features, or functionality. In at least one embodiment, one or more AI systems 5824 may be implemented in cloud 5826 (e.g., in a data center) for performing some or all of AI-based processing tasks of system 5800.

In at least one embodiment, cloud 5826 may include a GPU-accelerated infrastructure (e.g., NVIDIA's NGC) that may provide a GPU-optimized platform for executing processing tasks of system 5800. In at least one embodiment, cloud 5826 may include an AI system(s) 5824 for performing one or more of AI-based tasks of system 5800 (e.g., as a hardware abstraction and scaling platform). In at least one embodiment, cloud 5826 may integrate with application orchestration system 5828 leveraging multiple GPUs to enable seamless scaling and load balancing between and among applications and services 5720. In at least one embodiment, cloud 5826 may tasked with executing at least some of services 5720 of system 5800, including compute services 5816, AI services 5818, and/or visualization services 5820, as described herein. In at least one embodiment, cloud 5826 may perform small and large batch inference (e.g., executing NVIDIA's TENSOR RT), provide an accelerated parallel computing API and platform 5830 (e.g., NVIDIA's CUDA), execute application orchestration system 5828 (e.g., KUBERNETES), provide a graphics rendering API and platform (e.g., for ray-tracing, 2D graphics, 3D graphics, and/or other rendering techniques to produce higher quality cinematics), and/or may provide other functionality for system 5800.

In at least one embodiment, in an effort to preserve patient confidentiality (e.g., where patient data or records are to be used off-premises), cloud 5826 may include a registry—such as a deep learning container registry. In at least one embodiment, a registry may store containers for instantiations of applications that may perform pre-processing, post-processing, or other processing tasks on patient data. In at least one embodiment, cloud 5826 may receive data that includes patient data as well as sensor data in containers, perform requested processing for just sensor data in those containers, and then forward a resultant output and/or visualizations to appropriate parties and/or devices (e.g., on-premises medical devices used for visualization or diagnoses), all without having to extract, store, or otherwise access patient data. In at least one embodiment, confidentiality of patient data is preserved in compliance with HIPAA and/or other data regulations.

In at least one embodiment, one or more systems depicted in FIGS. 28A and 28B are utilized to implement a framework for image processing (e.g., real-time image rendering and enhancement). In at least one embodiment, one or more systems depicted in FIGS. 28A and 28B are utilized to perform various processes such as those described in connection with FIGS. 1-27. In at least one embodiment, one or more systems depicted in FIGS. 28A and 28B are utilized to generate and apply blue noise masks to images that are able to handle the temporal domain, i.e., adding time to the spatial (image) domain to improve image quality when rendering images over multiple frames (e.g., time).

FIG. 59 includes an example illustration of a deployment pipeline 5810A for processing imaging data, in accordance with at least one embodiment. In at least one embodiment, system 5800—and specifically deployment system 5706—may be used to customize, update, and/or integrate deployment pipeline(s) 5810A into one or more production environments. In at least one embodiment, deployment pipeline 5810A of FIG. 59 includes a non-limiting example of a deployment pipeline 5810A that may be custom defined by a particular user (or team of users) at a facility (e.g., at a hospital, clinic, lab, research environment, etc.). In at least one embodiment, to define deployment pipelines 5810A for a CT scanner 5902, a user may select—from a container registry, for example—one or more applications that perform specific functions or tasks with respect to imaging data generated by CT scanner 5902. In at least one embodiment, applications may be applied to deployment pipeline 5810A as containers that may leverage services 5720 and/or hardware 5722 of system 5800. In addition, deployment pipeline 5810A may include additional processing tasks or applications that may be implemented to prepare data for use by applications (e.g., DICOM adapter 5802B and DICOM reader 5906 may be used in deployment pipeline 5810A to prepare data for use by CT reconstruction 5908, organ segmentation 5910, etc.). In at least one embodiment, deployment pipeline 5810A may be customized or selected for consistent deployment, one time use, or for another frequency or interval. In at least one embodiment, a user may desire to have CT reconstruction 5908 and organ segmentation 5910 for several subjects over a specific interval, and thus may deploy pipeline 5810A for that period of time. In at least one embodiment, a user may select, for each request from system 5800, applications that a user wants to perform processing on that data for that request. In at least one embodiment, deployment pipeline 5810A may be adjusted at any interval and, because of adaptability and scalability of a container structure within system 5800, this may be a seamless process.

In at least one embodiment, deployment pipeline 5810A of FIG. 59 may include CT scanner 5902 generating imaging data of a patient or subject. In at least one embodiment, imaging data from CT scanner 5902 may be stored on a PACS server(s) 5904 associated with a facility housing CT scanner 5902. In at least one embodiment, PACS server(s) 5904 may include software and/or hardware components that may directly interface with imaging modalities (e.g., CT scanner 5902) at a facility. In at least one embodiment, DICOM adapter 5802B may enable sending and receipt of DICOM objects using DICOM protocols. In at least one embodiment, DICOM adapter 5802B may aid in preparation or configuration of DICOM data from PACS server(s) 5904 for use by deployment pipeline 5810A. In at least one embodiment, once DICOM data is processed through DICOM adapter 5802B, pipeline manager 5812 may route data through to deployment pipeline 5810A. In at least one embodiment, DICOM reader 5906 may extract image files and any associated metadata from DICOM data (e.g., raw sinogram data, as illustrated in visualization 5916A). In at least one embodiment, working files that are extracted may be stored in a cache for faster processing by other applications in deployment pipeline 5810A. In at least one embodiment, once DICOM reader 5906 has finished extracting and/or storing data, a signal of completion may be communicated to pipeline manager 5812. In at least one embodiment, pipeline manager 5812 may then initiate or call upon one or more other applications or containers in deployment pipeline 5810A.

In at least one embodiment, CT reconstruction 5908 application and/or container may be executed once data (e.g., raw sinogram data) is available for processing by CT reconstruction 5908 application. In at least one embodiment, CT reconstruction 5908 may read raw sinogram data from a cache, reconstruct an image file out of raw sinogram data (e.g., as illustrated in visualization 5916B), and store resulting image file in a cache. In at least one embodiment, at completion of reconstruction, pipeline manager 5812 may be signaled that reconstruction task is complete. In at least one embodiment, once reconstruction is complete, and a reconstructed image file may be stored in a cache (or other storage device), organ segmentation 5910 application and/or container may be triggered by pipeline manager 5812. In at least one embodiment, organ segmentation 5910 application and/or container may read an image file from a cache, normalize or convert an image file to format suitable for inference (e.g., convert an image file to an input resolution of a machine learning model), and run inference against a normalized image. In at least one embodiment, to run inference on a normalized image, organ segmentation 5910 application and/or container may rely on services 5720, and pipeline manager 5812 and/or application orchestration system 5828 may facilitate use of services 5720 by organ segmentation 5910 application and/or container. In at least one embodiment, for example, organ segmentation 5910 application and/or container may leverage AI services 5818 to perform inference on a normalized image, and AI services 5818 may leverage hardware 5722 (e.g., AI system 5824) to execute AI services 5818. In at least one embodiment, a result of an inference may be a mask file (e.g., as illustrated in visualization 5916C) that may be stored in a cache (or other storage device).

In at least one embodiment, once applications that process DICOM data and/or data extracted from DICOM data have completed processing, a signal may be generated for pipeline manager 5812. In at least one embodiment, pipeline manager 5812 may then execute DICOM writer 5912 to read results from a cache (or other storage device), package results into a DICOM format (e.g., as DICOM output 5914) for use by users at a facility who generated a request. In at least one embodiment, DICOM output 5914 may then be transmitted to DICOM adapter 5802B to prepare DICOM output 5914 for storage on PACS server(s) 5904 (e.g., for viewing by a DICOM viewer at a facility). In at least one embodiment, in response to a request for reconstruction and segmentation, visualizations 5916B and 5916C may be generated and available to a user for diagnoses, research, and/or for other purposes.

Although illustrated as consecutive application in deployment pipeline 5810A, CT reconstruction 5908 and organ segmentation 5910 applications may be processed in parallel in at least one embodiment. In at least one embodiment, where applications do not have dependencies on one another, and data is available for each application (e.g., after DICOM reader 5906 extracts data), applications may be executed at a same time, substantially at a same time, or with some overlap. In at least one embodiment, where two or more applications require similar services 5720, a scheduler of system 5800 may be used to load balance and distribute compute or processing resources between and among various applications. In at least one embodiment, in some embodiments, parallel computing platform 5830 may be used to perform parallel processing for applications to decrease run-time of deployment pipeline 5810A to provide real-time results.

Figure 60A:
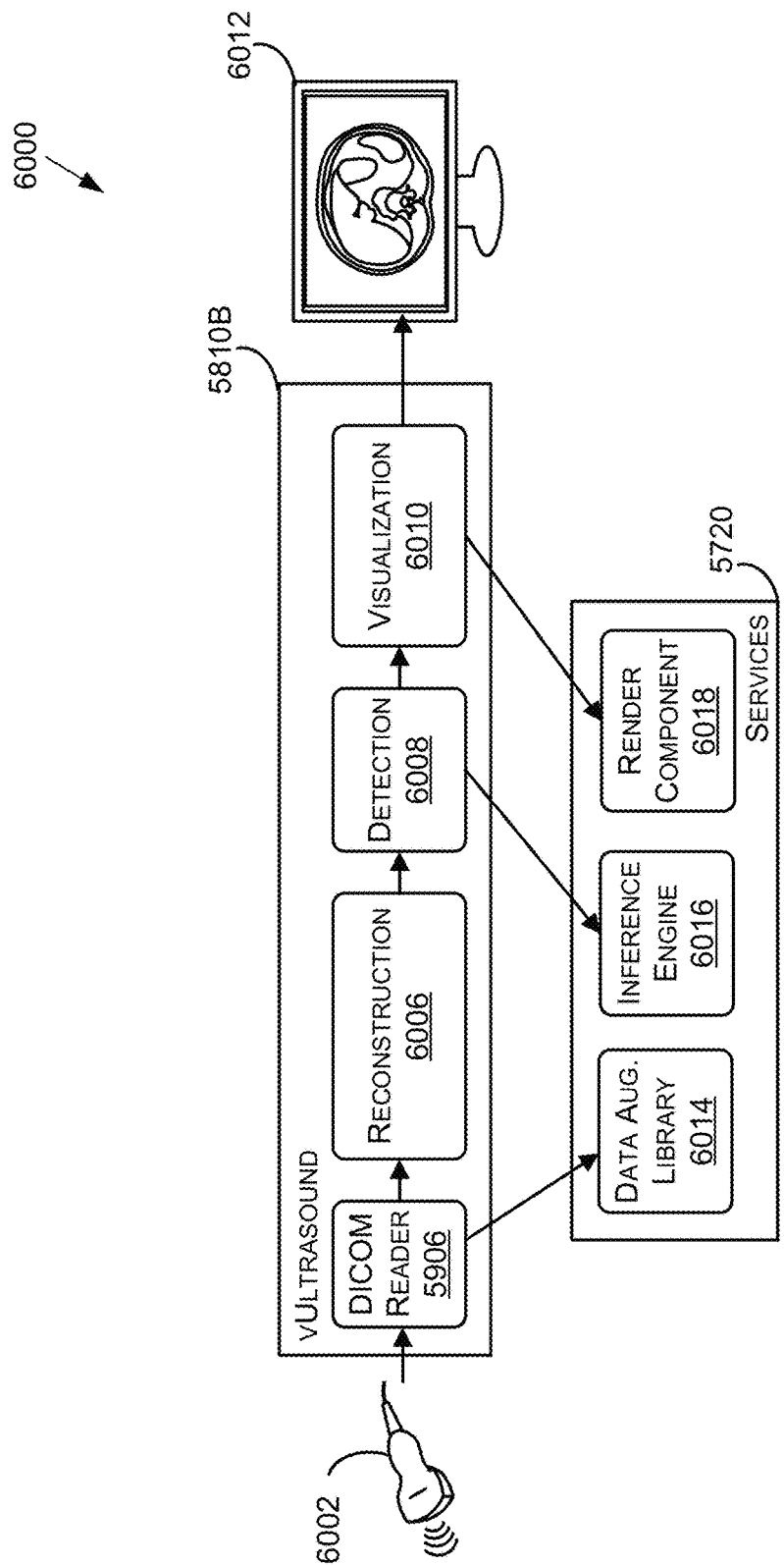
FIG. 60A includes an example data flow diagram of a virtual instrument supporting an ultrasound device, in accordance with at least one embodiment.
Figure 60B:
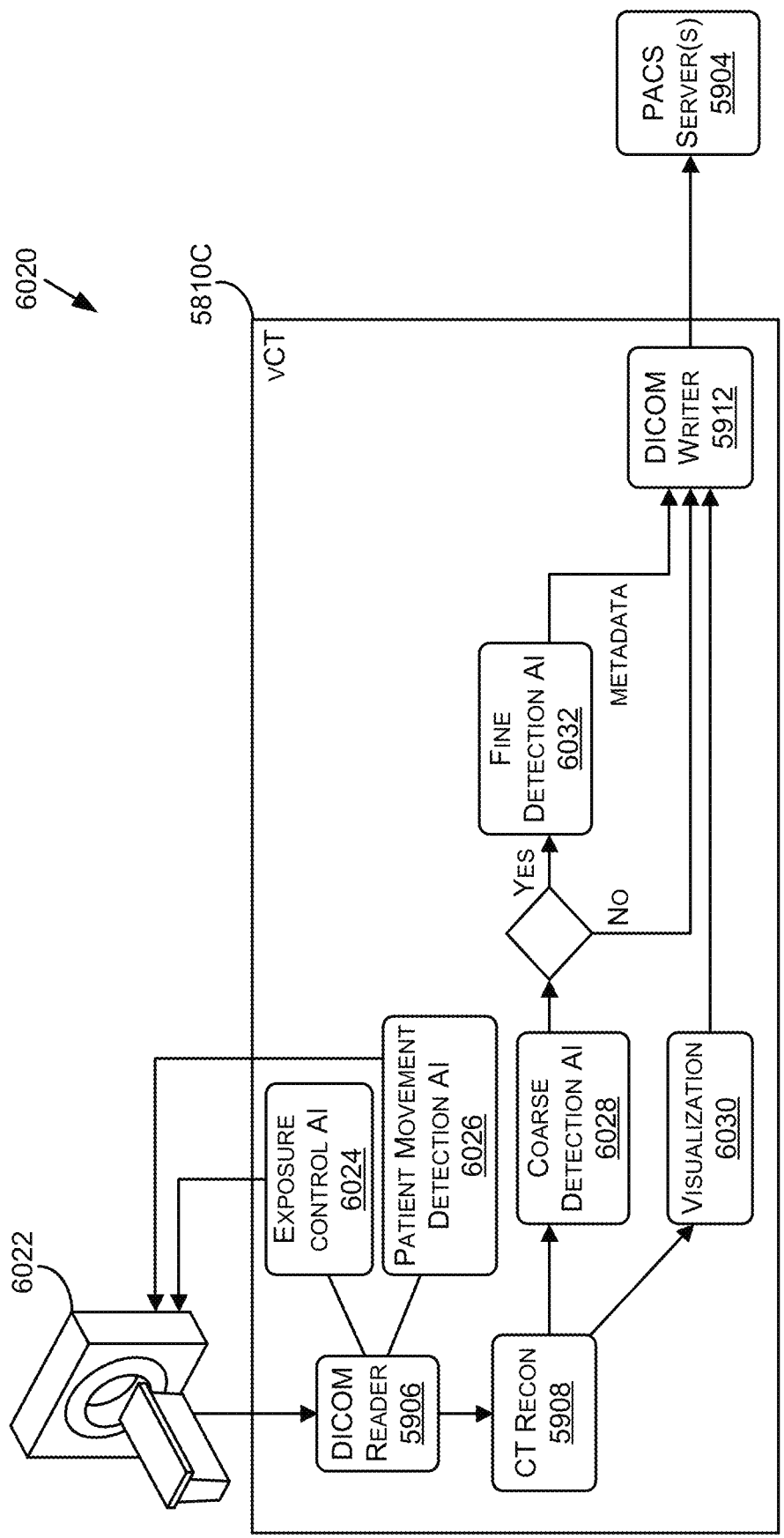
FIG. 60B includes an example data flow diagram of a virtual instrument supporting an CT scanner, in accordance with at least one embodiment.

In at least one embodiment, and with reference to FIGS. 60A and 60B, deployment system 5706 may be implemented as one or more virtual instruments to perform different functionalities—such as image processing, segmentation, enhancement, AI, visualization, and inferencing—with imaging devices (e.g., CT scanners, X-ray machines, MM machines, etc.), sequencing devices, genomics devices, and/or other device types. In at least one embodiment, system 5800 may allow for creation and provision of virtual instruments that may include a software-defined deployment pipeline 5810 that may receive raw/unprocessed input data generated by a device(s) and output processed/reconstructed data. In at least one embodiment, deployment pipelines 5810 (e.g., 5810A and 5810B) that represent virtual instruments may implement intelligence into a pipeline, such as by leveraging machine learning models, to provide containerized inference support to a system. In at least one embodiment, virtual instruments may execute any number of containers each including instantiations of applications. In at least one embodiment, such as where real-time processing is desired, deployment pipelines 5810 representing virtual instruments may be static (e.g., containers and/or applications may be set), while in other examples, container and/or applications for virtual instruments may be selected (e.g., on a per-request basis) from a pool of applications or resources (e.g., within a container registry).

In at least one embodiment, system 5800 may be instantiated or executed as one or more virtual instruments on-premise at a facility in, for example, a computing system deployed next to or otherwise in communication with a radiology machine, an imaging device, and/or another device type at a facility. In at least one embodiment, however, an on-premise installation may be instantiated or executed within a computing system of a device itself (e.g., a computing system integral to an imaging device), in a local datacenter (e.g., a datacenter on-premise), and/or in a cloud-environment (e.g., in cloud 5826). In at least one embodiment, deployment system 5706, operating as a virtual instrument, may be instantiated by a supercomputer or other HPC system in some examples. In at least one embodiment, on-premise installation may allow for high-bandwidth uses (via, for example, higher throughput local communication interfaces, such as RF over Ethernet) for real-time processing. In at least one embodiment, real-time or near real-time processing may be particularly useful where a virtual instrument supports an ultrasound device or other imaging modality where immediate visualizations are expected or required for accurate diagnoses and analyses. In at least one embodiment, a cloud-computing architecture may be capable of dynamic bursting to a cloud computing service provider, or other compute cluster, when local demand exceeds on-premise capacity or capability. In at least one embodiment, a cloud architecture, when implemented, may be tuned for training neural networks or other machine learning models, as described herein with respect to training system 5704. In at least one embodiment, with training pipelines in place, machine learning models may continuously learn and improve as they process additional data from devices they support. In at least one embodiment, virtual instruments may be continually improved using additional data, new data, existing machine learning models, and/or new or updated machine learning models.

In at least one embodiment, a computing system may include some or all of hardware 5722 described herein, and hardware 5722 may be distributed in any of a number of ways including within a device, as part of a computing device coupled to and located proximate a device, in a local datacenter at a facility, and/or in cloud 5826. In at least one embodiment, because deployment system 5706 and associated applications or containers are created in software (e.g., as discrete containerized instantiations of applications), behavior, operation, and configuration of virtual instruments, as well as outputs generated by virtual instruments, may be modified or customized as desired, without having to change or alter raw output of a device that a virtual instrument supports.

In at least one embodiment, one or more systems depicted in FIGS. 28A and 28B are utilized to implement a framework for image processing (e.g., real-time image rendering and enhancement). In at least one embodiment, one or more systems depicted in FIGS. 28A and 28B are utilized to perform various processes such as those described in connection with FIGS. 1-27. In at least one embodiment, one or more systems depicted in FIGS. 28A and 28B are utilized to generate and apply blue noise masks to images that are able to handle the temporal domain, i.e., adding time to the spatial (image) domain to improve image quality when rendering images over multiple frames (e.g., time).

FIG. 60A includes an example data flow diagram of a virtual instrument supporting an ultrasound device, in accordance with at least one embodiment. In at least one embodiment, deployment pipeline 5810B may leverage one or more of services 5720 of system 5800. In at least one embodiment, deployment pipeline 5810B and services 5720 may leverage hardware 5722 of a system either locally or in cloud 5826. In at least one embodiment, although not illustrated, process 6000 may be facilitated by pipeline manager 5812, application orchestration system 5828, and/or parallel computing platform 5830.

In at least one embodiment, process 6000 may include receipt of imaging data from an ultrasound device 6002. In at least one embodiment, imaging data may be stored on PACS server(s) in a DICOM format (or other format, such as RIS, CIS, REST compliant, RPC, raw, etc.), and may be received by system 5800 for processing through deployment pipeline 5810 selected or customized as a virtual instrument (e.g., a virtual ultrasound) for ultrasound device 6002. In at least one embodiment, imaging data may be received directly from an imaging device (e.g., ultrasound device 6002) and processed by a virtual instrument. In at least one embodiment, a transducer or other signal converter communicatively coupled between an imaging device and a virtual instrument may convert signal data generated by an imaging device to image data that may be processed by a virtual instrument. In at least one embodiment, raw data and/or image data may be applied to DICOM reader 5906 to extract data for use by applications or containers of deployment pipeline 5810B. In at least one embodiment, DICOM reader 5906 may leverage data augmentation library 6014 (e.g., NVIDIA's DALI) as a service 5720 (e.g., as one of compute service(s) 5816) for extracting, resizing, rescaling, and/or otherwise preparing data for use by applications or containers.

In at least one embodiment, once data is prepared, a reconstruction 6006 application and/or container may be executed to reconstruct data from ultrasound device 6002 into an image file. In at least one embodiment, after reconstruction 6006, or at a same time as reconstruction 6006, a detection 6008 application and/or container may be executed for anomaly detection, object detection, feature detection, and/or other detection tasks related to data. In at least one embodiment, an image file generated during reconstruction 6006 may be used during detection 6008 to identify anomalies, objects, features, etc. In at least one embodiment, detection 6008 application may leverage an inference engine 6016 (e.g., as one of AI service(s) 5818) to perform inference on data to generate detections. In at least one embodiment, one or more machine learning models (e.g., from training system 5704) may be executed or called by detection 6008 application.

In at least one embodiment, once reconstruction 6006 and/or detection 6008 is/are complete, data output from these applications and/or containers may be used to generate visualizations 6010, such as visualization 6012 (e.g., a grayscale output) displayed on a workstation or display terminal. In at least one embodiment, visualization may allow a technician or other user to visualize results of deployment pipeline 5810B with respect to ultrasound device 6002. In at least one embodiment, visualization 6010 may be executed by leveraging a render component 6018 of system 5800 (e.g., one of visualization service(s) 5820). In at least one embodiment, render component 6018 may execute a 2D, OpenGL, or ray-tracing service to generate visualization 6012.

In at least one embodiment, one or more systems depicted in FIGS. 28A and 28B are utilized to implement a framework for image processing (e.g., real-time image rendering and enhancement). In at least one embodiment, one or more systems depicted in FIGS. 28A and 28B are utilized to perform various processes such as those described in connection with FIGS. 1-27. In at least one embodiment, one or more systems depicted in FIGS. 28A and 28B are utilized to generate and apply blue noise masks to images that are able to handle the temporal domain, i.e., adding time to the spatial (image) domain to improve image quality when rendering images over multiple frames (e.g., time).

FIG. 60B includes an example data flow diagram of a virtual instrument supporting a CT scanner, in accordance with at least one embodiment. In at least one embodiment, deployment pipeline 5810C may leverage one or more of services 5720 of system 5800. In at least one embodiment, deployment pipeline 5810C and services 5720 may leverage hardware 5722 of a system either locally or in cloud 5826. In at least one embodiment, although not illustrated, process 6020 may be facilitated by pipeline manager 5812, application orchestration system 5828, and/or parallel computing platform 5830.

In at least one embodiment, process 6020 may include CT scanner 6022 generating raw data that may be received by DICOM reader 5906 (e.g., directly, via a PACS server 5904, after processing, etc.). In at least one embodiment, a Virtual CT (instantiated by deployment pipeline 5810C) may include a first, real-time pipeline for monitoring a patient (e.g., patient movement detection AI 6026) and/or for adjusting or optimizing exposure of CT scanner 6022 (e.g., using exposure control AI 6024). In at least one embodiment, one or more of applications (e.g., 6024 and 6026) may leverage a service 5720, such as AI service(s) 5818. In at least one embodiment, outputs of exposure control AI 6024 application (or container) and/or patient movement detection AI 6026 application (or container) may be used as feedback to CT scanner 6022 and/or a technician for adjusting exposure (or other settings of CT scanner 6022) and/or informing a patient to move less.

In at least one embodiment, deployment pipeline 5810C may include a non-real-time pipeline for analyzing data generated by CT scanner 6022. In at least one embodiment, a second pipeline may include CT reconstruction 5908 application and/or container, a coarse detection AI 6028 application and/or container, a fine detection AI 6032 application and/or container (e.g., where certain results are detected by coarse detection AI 6028), a visualization 6030 application and/or container, and a DICOM writer 5912 (and/or other data typewriter, such as RIS, CIS, REST compliant, RPC, raw, etc.) application and/or container. In at least one embodiment, raw data generated by CT scanner 6022 may be passed through pipelines of deployment pipeline 5810C (instantiated as a virtual CT instrument) to generate results. In at least one embodiment, results from DICOM writer 5912 may be transmitted for display and/or may be stored on PACS server(s) 5904 for later retrieval, analysis, or display by a technician, practitioner, or other user.

In at least one embodiment, one or more systems depicted in FIGS. 28A and 28B are utilized to implement a framework for image processing (e.g., real-time image rendering and enhancement). In at least one embodiment, one or more systems depicted in FIGS. 28A and 28B are utilized to perform various processes such as those described in connection with FIGS. 1-27. In at least one embodiment, one or more systems depicted in FIGS. 28A and 28B are utilized to generate and apply blue noise masks to images that are able to handle the temporal domain, i.e., adding time to the spatial (image) domain to improve image quality when rendering images over multiple frames (e.g., time).

FIG. 61A illustrates a data flow diagram for a process 6100 to train, retrain, or update a machine learning model, in accordance with at least one embodiment. In at least one embodiment, process 6100 may be executed using, as a non-limiting example, system 5800 of FIG. 58. In at least one embodiment, process 6100 may leverage services 5720 and/or hardware 5722 of system 5800, as described herein. In at least one embodiment, refined models 6112 generated by process 6100 may be executed by deployment system 5706 for one or more containerized applications in deployment pipelines 5810.

In at least one embodiment, model training 5714 may include retraining or updating an initial model 6104 (e.g., a pre-trained model) using new training data (e.g., new input data, such as customer dataset 6106, and/or new ground truth data associated with input data). In at least one embodiment, to retrain, or update, initial model 6104, output or loss layer(s) of initial model 6104 may be reset, or deleted, and/or replaced with an updated or new output or loss layer(s). In at least one embodiment, initial model 6104 may have previously fine-tuned parameters (e.g., weights and/or biases) that remain from prior training, so training or retraining 5714 may not take as long or require as much processing as training a model from scratch. In at least one embodiment, during model training 5714, by having reset or replaced output or loss layer(s) of initial model 6104, parameters may be updated and re-tuned for a new data set based on loss calculations associated with accuracy of output or loss layer(s) at generating predictions on new, customer dataset 6106 (e.g., image data 5708 of FIG. 57).

In at least one embodiment, pre-trained models 5806 may be stored in a data store, or registry (e.g., model registry 5724 of FIG. 57). In at least one embodiment, pre-trained models 5806 may have been trained, at least in part, at one or more facilities other than a facility executing process 6100. In at least one embodiment, to protect privacy and rights of patients, subjects, or clients of different facilities, pre-trained models 5806 may have been trained, on-premise, using customer or patient data generated on-premise. In at least one embodiment, pre-trained models 5806 may be trained using cloud 5826 and/or other hardware 5722, but confidential, privacy protected patient data may not be transferred to, used by, or accessible to any components of cloud 5826 (or other off premise hardware). In at least one embodiment, where a pre-trained model 5806 is trained at using patient data from more than one facility, pre-trained model 5806 may have been individually trained for each facility prior to being trained on patient or customer data from another facility. In at least one embodiment, such as where a customer or patient data has been released of privacy concerns (e.g., by waiver, for experimental use, etc.), or where a customer or patient data is included in a public data set, a customer or patient data from any number of facilities may be used to train pre-trained model 5806 on-premise and/or off premise, such as in a datacenter or other cloud computing infrastructure.

In at least one embodiment, when selecting applications for use in deployment pipelines 5810, a user may also select machine learning models to be used for specific applications. In at least one embodiment, a user may not have a model for use, so a user may select a pre-trained model 5806 to use with an application. In at least one embodiment, pre-trained model 5806 may not be optimized for generating accurate results on customer dataset 6106 of a facility of a user (e.g., based on patient diversity, demographics, types of medical imaging devices used, etc.). In at least one embodiment, prior to deploying pre-trained model 5806 into deployment pipeline 5810 for use with an application(s), pre-trained model 5806 may be updated, retrained, and/or fine-tuned for use at a respective facility.

In at least one embodiment, a user may select pre-trained model 5806 that is to be updated, retrained, and/or fine-tuned, and pre-trained model 5806 may be referred to as initial model 6104 for training system 5704 within process 6100. In at least one embodiment, customer dataset 6106 (e.g., imaging data, genomics data, sequencing data, or other data types generated by devices at a facility) may be used to perform model training 5714 (which may include, without limitation, transfer learning) on initial model 6104 to generate refined model 6112. In at least one embodiment, ground truth data corresponding to customer dataset 6106 may be generated by training system 5704. In at least one embodiment, ground truth data may be generated, at least in part, by clinicians, scientists, doctors, practitioners, at a facility (e.g., as labeled clinic data 5712 of FIG. 57).

In at least one embodiment, AI-assisted annotation 5710 may be used in some examples to generate ground truth data. In at least one embodiment, AI-assisted annotation 5710 (e.g., implemented using an AI-assisted annotation SDK) may leverage machine learning models (e.g., neural networks) to generate suggested or predicted ground truth data for a customer dataset. In at least one embodiment, user 6110 may use annotation tools within a user interface (a graphical user interface (GUI)) on computing device 6108.

In at least one embodiment, user 6110 may interact with a GUI via computing device 6108 to edit or fine-tune annotations or auto-annotations. In at least one embodiment, a polygon editing feature may be used to move vertices of a polygon to more accurate or fine-tuned locations.

In at least one embodiment, once customer dataset 6106 has associated ground truth data, ground truth data (e.g., from AI-assisted annotation, manual labeling, etc.) may be used by during model training 5714 to generate refined model 6112. In at least one embodiment, customer dataset 6106 may be applied to initial model 6104 any number of times, and ground truth data may be used to update parameters of initial model 6104 until an acceptable level of accuracy is attained for refined model 6112. In at least one embodiment, once refined model 6112 is generated, refined model 6112 may be deployed within one or more deployment pipelines 5810 at a facility for performing one or more processing tasks with respect to medical imaging data.

In at least one embodiment, refined model 6112 may be uploaded to pre-trained models 5806 in model registry 5724 to be selected by another facility. In at least one embodiment, his process may be completed at any number of facilities such that refined model 6112 may be further refined on new datasets any number of times to generate a more universal model.

In at least one embodiment, one or more systems depicted in FIGS. 28A and 28B are utilized to implement a framework for image processing (e.g., real-time image rendering and enhancement). In at least one embodiment, one or more systems depicted in FIGS. 28A and 28B are utilized to perform various processes such as those described in connection with FIGS. 1-27. In at least one embodiment, one or more systems depicted in FIGS. 28A and 28B are utilized to generate and apply blue noise masks to images that are able to handle the temporal domain, i.e., adding time to the spatial (image) domain to improve image quality when rendering images over multiple frames (e.g., time).

FIG. 61B is an example illustration of a client-server architecture 6132 to enhance annotation tools with pre-trained annotation models, in accordance with at least one embodiment. In at least one embodiment, AI-assisted annotation tools 6136 may be instantiated based on a client-server architecture 6132. In at least one embodiment, annotation tools 6136 in imaging applications may aid radiologists, for example, identify organs and abnormalities. In at least one embodiment, imaging applications may include software tools that help user 6110 to identify, as a non-limiting example, a few extreme points on a particular organ of interest in raw images 6134 (e.g., in a 3D Mill or CT scan) and receive auto-annotated results for all 2D slices of a particular organ. In at least one embodiment, results may be stored in a data store as training data 6138 and used as (for example and without limitation) ground truth data for training. In at least one embodiment, when computing device 6108 sends extreme points for AI-assisted annotation 5710, a deep learning model, for example, may receive this data as input and return inference results of a segmented organ or abnormality. In at least one embodiment, pre-instantiated annotation tools, such as AI-Assisted Annotation Tool 6136B in FIG. 61B, may be enhanced by making API calls (e.g., API Call 6144) to a server, such as an Annotation Assistant Server 6140 that may include a set of pre-trained models 6142 stored in an annotation model registry, for example. In at least one embodiment, an annotation model registry may store pre-trained models 6142 (e.g., machine learning models, such as deep learning models) that are pre-trained to perform AI-assisted annotation on a particular organ or abnormality. In at least one embodiment, these models may be further updated by using training pipelines 5804. In at least one embodiment, pre-installed annotation tools may be improved over time as new labeled clinic data 5712 is added.

Inference and/or training logic 2815 are used to perform inferencing and/or training operations associated with one or more embodiments. Details regarding inference and/or training logic 2815 are provided herein in conjunction with FIGS. 28A and/or 28B.

In at least one embodiment, one or more systems depicted in FIGS. 28A and 28B are utilized to implement a framework for image processing (e.g., real-time image rendering and enhancement). In at least one embodiment, one or more systems depicted in FIGS. 28A and 28B are utilized to perform various processes such as those described in connection with FIGS. 1-27. In at least one embodiment, one or more systems depicted in FIGS. 28A and 28B are utilized to generate and apply blue noise masks to images that are able to handle the temporal domain, i.e., adding time to the spatial (image) domain to improve image quality when rendering images over multiple frames (e.g., time).

Figure 62:
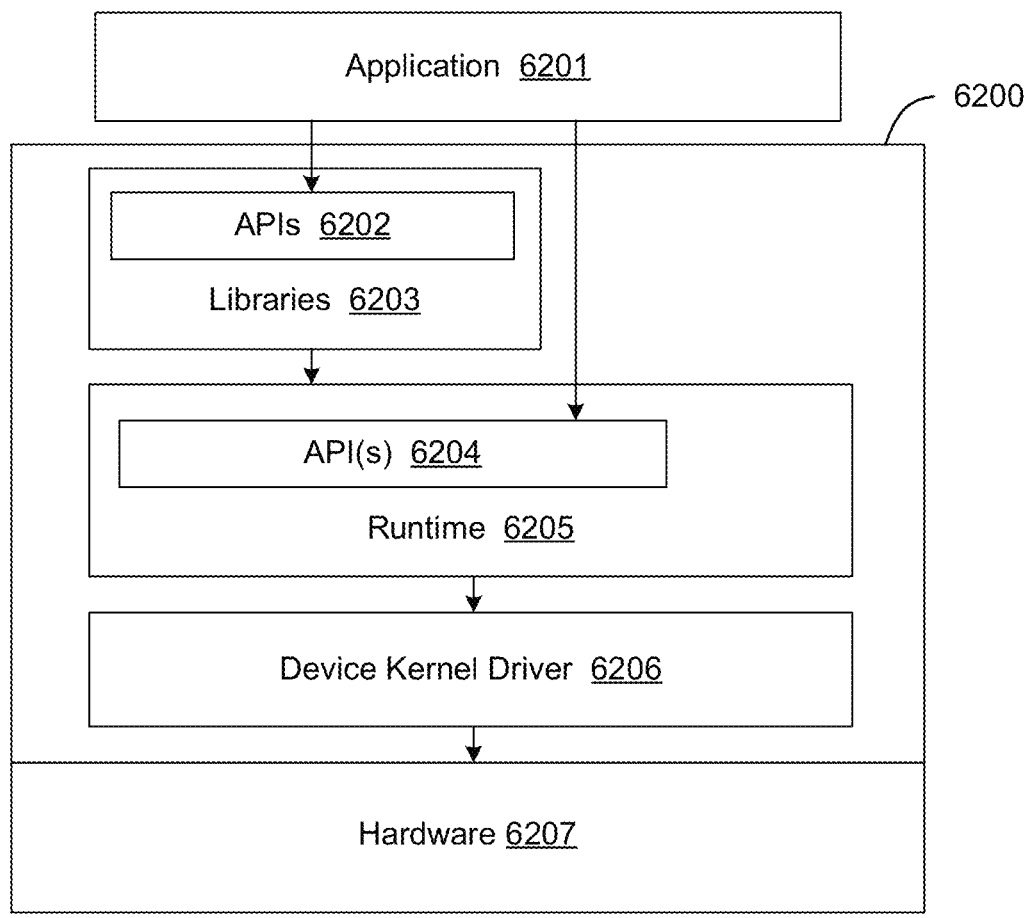
FIG. 62 illustrates a software stack of a programming platform, in accordance with at least one embodiment.

FIG. 62 illustrates a software stack of a programming platform, in accordance with at least one embodiment. In at least one embodiment, a programming platform is a platform for leveraging hardware on a computing system to accelerate computational tasks. A programming platform may be accessible to software developers through libraries, compiler directives, and/or extensions to programming languages, in at least one embodiment. In at least one embodiment, a programming platform may be, but is not limited to, CUDA, Radeon Open Compute Platform ("ROCm"), OpenCL (OpenCL™ is developed by Khronos group), SYCL, or Intel One API.

In at least one embodiment, a software stack 6200 of a programming platform provides an execution environment for an application 6201. In at least one embodiment, application 6201 may include any computer software capable of being launched on software stack 6200. In at least one embodiment, application 6201 may include, but is not limited to, an artificial intelligence ("AI")/machine learning ("ML") application, a high performance computing ("HPC") application, a virtual desktop infrastructure ("VDI"), or a data center workload.

In at least one embodiment, application 6201 and software stack 6200 run on hardware 6207. Hardware 6207 may include one or more GPUs, CPUs, FPGAs, AI engines, and/or other types of compute devices that support a programming platform, in at least one embodiment. In at least one embodiment, such as with CUDA, software stack 6200 may be vendor specific and compatible with only devices from particular vendor(s). In at least one embodiment, such as in with OpenCL, software stack 6200 may be used with devices from different vendors. In at least one embodiment, hardware 6207 includes a host connected to one more device that can be accessed to perform computational tasks via application programming interface ("API") calls. A device within hardware 6207 may include, but is not limited to, a GPU, FPGA, AI engine, or other compute device (but may also include a CPU) and its memory, as opposed to a host within hardware 6207 that may include, but is not limited to, a CPU (but may also include a compute device) and its memory, in at least one embodiment.

In at least one embodiment, software stack 6200 of a programming platform includes, without limitation, a number of libraries 6203, a runtime 6205, and a device kernel driver 6206. Each of libraries 6203 may include data and programming code that can be used by computer programs and leveraged during software development, in at least one embodiment. In at least one embodiment, libraries 6203 may include, but are not limited to, pre-written code and subroutines, classes, values, type specifications, configuration data, documentation, help data, and/or message templates. In at least one embodiment, libraries 6203 include functions that are optimized for execution on one or more types of devices. In at least one embodiment, libraries 6203 may include, but are not limited to, functions for performing mathematical, deep learning, and/or other types of operations on devices. In at least one embodiment, libraries 6303 are associated with corresponding APIs 6302, which may include one or more APIs, that expose functions implemented in libraries 6303.

In at least one embodiment, application 6201 is written as source code that is compiled into executable code, as discussed in greater detail below in conjunction with FIG. 67. Executable code of application 6201 may run, at least in part, on an execution environment provided by software stack 6200, in at least one embodiment. In at least one embodiment, during execution of application 6201, code may be reached that needs to run on a device, as opposed to a host. In such a case, runtime 6205 may be called to load and launch requisite code on a device, in at least one embodiment. In at least one embodiment, runtime 6205 may include any technically feasible runtime system that is able to support execution of application S01.

In at least one embodiment, runtime 6205 is implemented as one or more runtime libraries associated with corresponding APIs, which are shown as API(s) 6204. One or more of such runtime libraries may include, without limitation, functions for memory management, execution control, device management, error handling, and/or synchronization, among other things, in at least one embodiment. In at least one embodiment, memory management functions may include, but are not limited to, functions to allocate, deallocate, and copy device memory, as well as transfer data between host memory and device memory. In at least one embodiment, execution control functions may include, but are not limited to, functions to launch a function (sometimes referred to as a "kernel" when a function is a global function callable from a host) on a device and set attribute values in a buffer maintained by a runtime library for a given function to be executed on a device.

Runtime libraries and corresponding API(s) 6204 may be implemented in any technically feasible manner, in at least one embodiment. In at least one embodiment, one (or any number of) API may expose a low-level set of functions for fine-grained control of a device, while another (or any number of) API may expose a higher-level set of such functions. In at least one embodiment, a high-level runtime API may be built on top of a low-level API. In at least one embodiment, one or more of runtime APIs may be language-specific APIs that are layered on top of a language-independent runtime API.

In at least one embodiment, device kernel driver 6206 is configured to facilitate communication with an underlying device. In at least one embodiment, device kernel driver 6206 may provide low-level functionalities upon which APIs, such as API(s) 6204, and/or other software relies. In at least one embodiment, device kernel driver 6206 may be configured to compile intermediate representation ("IR") code into binary code at runtime. For CUDA, device kernel driver 6206 may compile Parallel Thread Execution ("PTX") IR code that is not hardware specific into binary code for a specific target device at runtime (with caching of compiled binary code), which is also sometimes referred to as "finalizing" code, in at least one embodiment. Doing so may permit finalized code to run on a target device, which may not have existed when source code was originally compiled into PTX code, in at least one embodiment. Alternatively, in at least one embodiment, device source code may be compiled into binary code offline, without requiring device kernel driver 6206 to compile IR code at runtime.

In at least one embodiment, one or more systems depicted in FIGS. 28A and 28B are utilized to implement a framework for image processing (e.g., real-time image rendering and enhancement). In at least one embodiment, one or more systems depicted in FIGS. 28A and 28B are utilized to perform various processes such as those described in connection with FIGS. 1-27. In at least one embodiment, one or more systems depicted in FIGS. 28A and 28B are utilized to generate and apply blue noise masks to images that are able to handle the temporal domain, i.e., adding time to the spatial (image) domain to improve image quality when rendering images over multiple frames (e.g., time).

Figure 63:
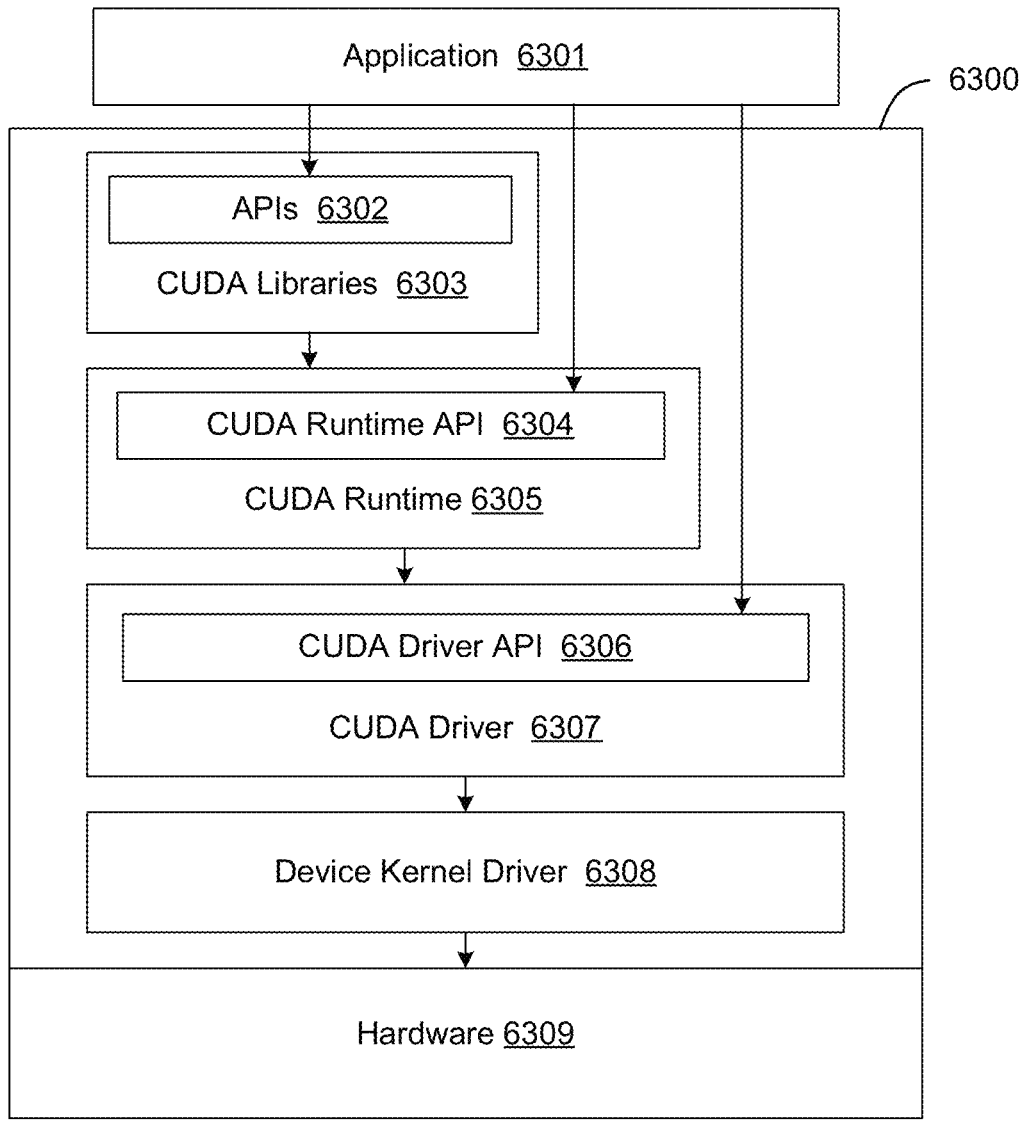
FIG. 63 illustrates a CUDA implementation of a software stack of FIG. 62, in accordance with at least one embodiment.

FIG. 63 illustrates a CUDA implementation of software stack 6200 of FIG. 62, in accordance with at least one embodiment. In at least one embodiment, a CUDA software stack 6300, on which an application 6301 may be launched, includes CUDA libraries 6303, a CUDA runtime 6305, a CUDA driver 6307, and a device kernel driver 6308. In at least one embodiment, CUDA software stack 6300 executes on hardware 6309, which may include a GPU that supports CUDA and is developed by NVIDIA Corporation of Santa Clara, CA.

In at least one embodiment, application 6301, CUDA runtime 6305, and device kernel driver 6308 may perform similar functionalities as application 6201, runtime 6205, and device kernel driver 6206, respectively, which are described above in conjunction with FIG. 62. In at least one embodiment, CUDA driver 6307 includes a library (libcuda.so) that implements a CUDA driver API 6306. Similar to a CUDA runtime API 6304 implemented by a CUDA runtime library (cudart), CUDA driver API 6306 may, without limitation, expose functions for memory management, execution control, device management, error handling, synchronization, and/or graphics interoperability, among other things, in at least one embodiment. In at least one embodiment, CUDA driver API 6306 differs from CUDA runtime API 6304 in that CUDA runtime API 6304 simplifies device code management by providing implicit initialization, context (analogous to a process) management, and module (analogous to dynamically loaded libraries) management. In contrast to high-level CUDA runtime API 6304, CUDA driver API 6306 is a low-level API providing more fine-grained control of a device, particularly with respect to contexts and module loading, in at least one embodiment. In at least one embodiment, CUDA driver API 6306 may expose functions for context management that are not exposed by CUDA runtime API 6304. In at least one embodiment, CUDA driver API 6306 is also language-independent and supports, e.g., OpenCL in addition to CUDA runtime API 6304. Further, in at least one embodiment, development libraries, including CUDA runtime 6305, may be considered as separate from driver components, including user-mode CUDA driver 6307 and kernel-mode device driver 6308 (also sometimes referred to as a "display" driver).

In at least one embodiment, CUDA libraries 6303 may include, but are not limited to, mathematical libraries, deep learning libraries, parallel algorithm libraries, and/or signal/image/video processing libraries, which parallel computing applications such as application 6301 may utilize. In at least one embodiment, CUDA libraries 6303 may include mathematical libraries such as a cuBLAS library that is an implementation of Basic Linear Algebra Subprograms ("BLAS") for performing linear algebra operations, a cuFFT library for computing fast Fourier transforms ("FFTs"), and a cuRAND library for generating random numbers, among others. In at least one embodiment, CUDA libraries 6303 may include deep learning libraries such as a cuDNN library of primitives for deep neural networks and a TensorRT platform for high-performance deep learning inference, among others.

In at least one embodiment, one or more systems depicted in FIGS. 28A and 28B are utilized to implement a framework for image processing (e.g., real-time image rendering and enhancement). In at least one embodiment, one or more systems depicted in FIGS. 28A and 28B are utilized to perform various processes such as those described in connection with FIGS. 1-27. In at least one embodiment, one or more systems depicted in FIGS. 28A and 28B are utilized to generate and apply blue noise masks to images that are able to handle the temporal domain, i.e., adding time to the spatial (image) domain to improve image quality when rendering images over multiple frames (e.g., time).

Figure 64:
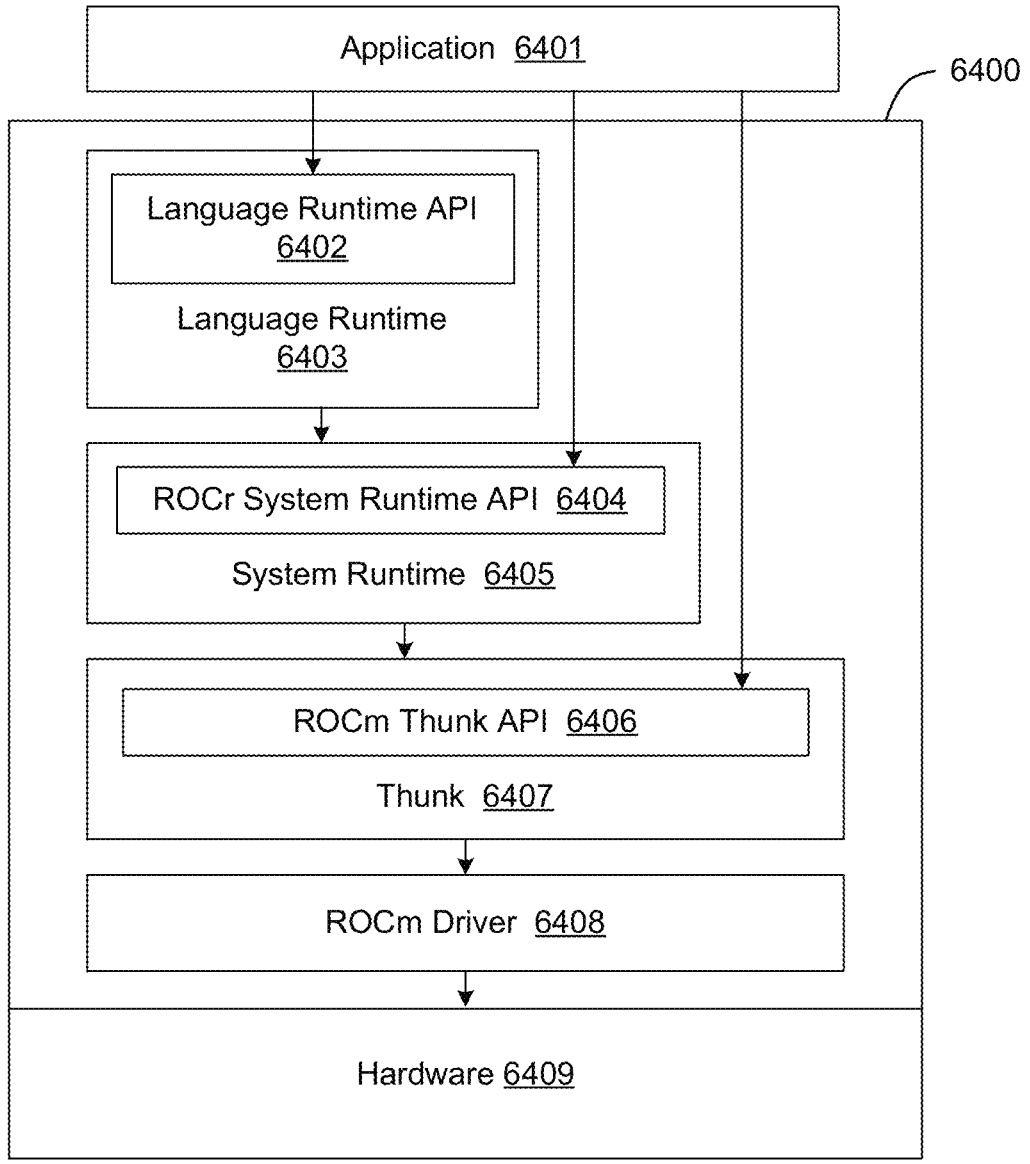
FIG. 64 illustrates a ROCm implementation of a software stack of FIG. 62, in accordance with at least one embodiment.

FIG. 64 illustrates a ROCm implementation of software stack 6200 of FIG. 62, in accordance with at least one embodiment. In at least one embodiment, a ROCm software stack 6400, on which an application 6401 may be launched, includes a language runtime 6403, a system runtime 6405, a thunk 6407, a ROCm kernel driver 6408, and a device kernel driver 6409. In at least one embodiment, ROCm software stack 6400 executes on hardware 6410, which may include a GPU that supports ROCm and is developed by AMD Corporation of Santa Clara, CA.

In at least one embodiment, application 6401 may perform similar functionalities as application 6201 discussed above in conjunction with FIG. 62. In addition, language runtime 6403 and system runtime 6405 may perform similar functionalities as runtime 6205 discussed above in conjunction with FIG. 62, in at least one embodiment. In at least one embodiment, language runtime 6403 and system runtime 6405 differ in that system runtime 6405 is a language-independent runtime that implements a ROCr system runtime API 6404 and makes use of a Heterogeneous System Architecture ("HAS") Runtime API. HAS runtime API is a thin, user-mode API that exposes interfaces to access and interact with an AMD GPU, including functions for memory management, execution control via architected dispatch of kernels, error handling, system and agent information, and runtime initialization and shutdown, among other things, in at least one embodiment. In contrast to system runtime 6405, language runtime 6403 is an implementation of a language-specific runtime API 6402 layered on top of ROCr system runtime API 6404, in at least one embodiment. In at least one embodiment, language runtime API may include, but is not limited to, a Heterogeneous compute Interface for Portability ("HIP") language runtime API, a Heterogeneous Compute Compiler ("HCC") language runtime API, or an OpenCL API, among others. HIP language in particular is an extension of C++ programming language with functionally similar versions of CUDA mechanisms, and, in at least one embodiment, a HIP language runtime API includes functions that are similar to those of CUDA runtime API 6304 discussed above in conjunction with FIG. 63, such as functions for memory management, execution control, device management, error handling, and synchronization, among other things.

In at least one embodiment, thunk (ROCt) 6407 is an interface that can be used to interact with underlying ROCm driver 6408. In at least one embodiment, ROCm driver 6408 is a ROCk driver, which is a combination of an AMDGPU driver and a HAS kernel driver (amdkfd). In at least one embodiment, AMDGPU driver is a device kernel driver for GPUs developed by AMD that performs similar functionalities as device kernel driver 6206 discussed above in conjunction with FIG. 62. In at least one embodiment, HAS kernel driver is a driver permitting different types of processors to share system resources more effectively via hardware features.

In at least one embodiment, various libraries (not shown) may be included in ROCm software stack 6400 above language runtime 6403 and provide functionality similarity to CUDA libraries 6303, discussed above in conjunction with FIG. 63. In at least one embodiment, various libraries may include, but are not limited to, mathematical, deep learning, and/or other libraries such as a hipBLAS library that implements functions similar to those of CUDA cuBLAS, a rocFFT library for computing FFTs that is similar to CUDA cuFFT, among others.

In at least one embodiment, one or more systems depicted in FIGS. 28A and 28B are utilized to implement a framework for image processing (e.g., real-time image rendering and enhancement). In at least one embodiment, one or more systems depicted in FIGS. 28A and 28B are utilized to perform various processes such as those described in connection with FIGS. 1-27. In at least one embodiment, one or more systems depicted in FIGS. 28A and 28B are utilized to generate and apply blue noise masks to images that are able to handle the temporal domain, i.e., adding time to the spatial (image) domain to improve image quality when rendering images over multiple frames (e.g., time).

Figure 65:
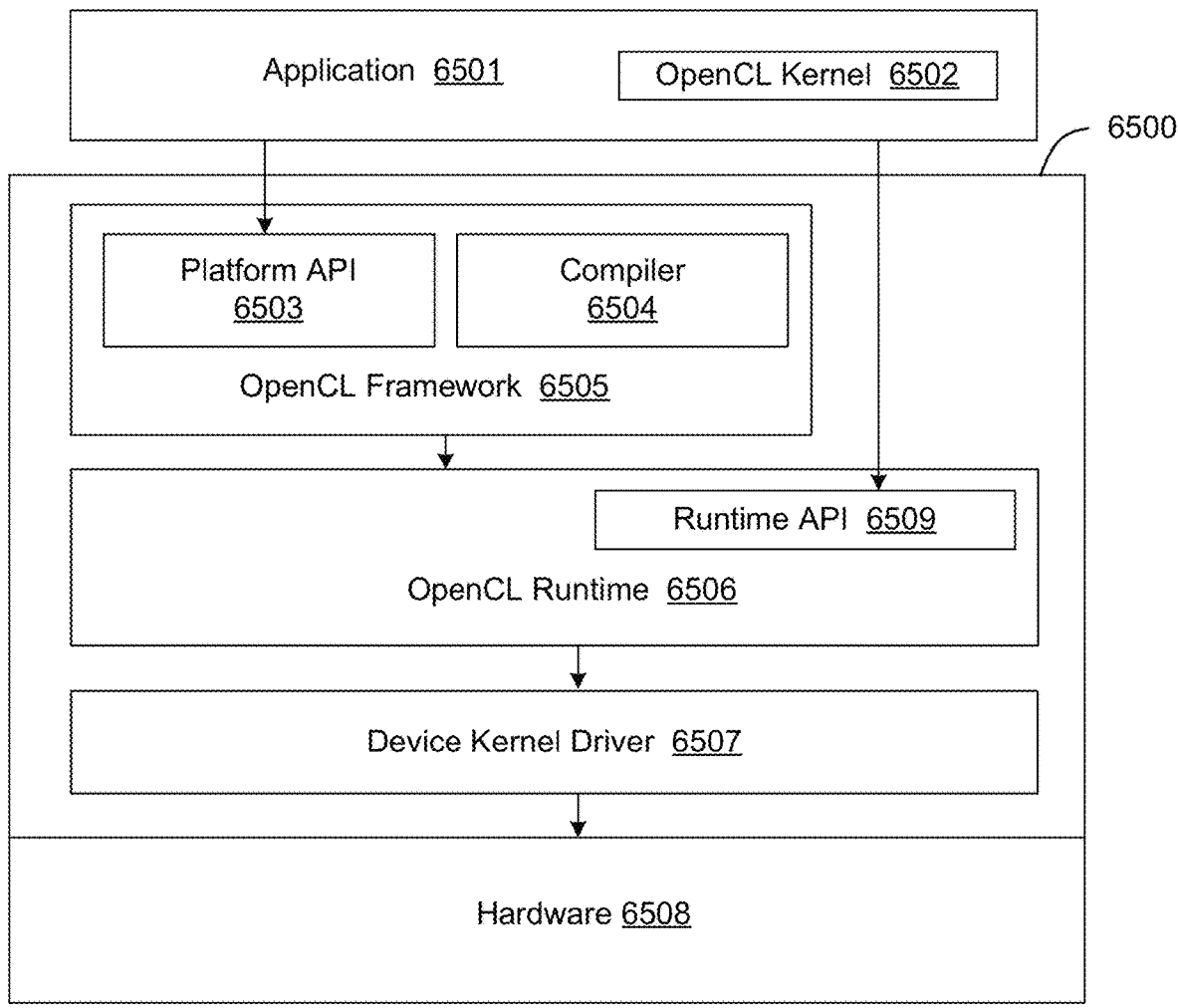
FIG. 65 illustrates an OpenCL implementation of a software stack of FIG. 62, in accordance with at least one embodiment.

FIG. 65 illustrates an OpenCL implementation of software stack 6200 of FIG. 62, in accordance with at least one embodiment. In at least one embodiment, an OpenCL software stack 6500, on which an application 6501 may be launched, includes an OpenCL framework 6505, an OpenCL runtime 6506, and a driver 6507. In at least one embodiment, OpenCL software stack 6500 executes on hardware 6309 that is not vendor-specific. As OpenCL is supported by devices developed by different vendors, specific OpenCL drivers may be required to interoperate with hardware from such vendors, in at least one embodiment.

In at least one embodiment, application 6501, OpenCL runtime 6506, device kernel driver 6507, and hardware 6508 may perform similar functionalities as application 6201, runtime 6205, device kernel driver 6206, and hardware 6207, respectively, that are discussed above in conjunction with FIG. 62. In at least one embodiment, application 6501 further includes an OpenCL kernel 6502 with code that is to be executed on a device.

In at least one embodiment, OpenCL defines a "platform" that allows a host to control devices connected to a host. In at least one embodiment, an OpenCL framework provides a platform layer API and a runtime API, shown as platform API 6503 and runtime API 6509. In at least one embodiment, runtime API 6509 uses contexts to manage execution of kernels on devices. In at least one embodiment, each identified device may be associated with a respective context, which runtime API 6509 may use to manage command queues, program objects, and kernel objects, share memory objects, among other things, for that device. In at least one embodiment, platform API 6503 exposes functions that permit device contexts to be used to select and initialize devices, submit work to devices via command queues, and enable data transfer to and from devices, among other things. In addition, OpenCL framework provides various built-in functions (not shown), including math functions, relational functions, and image processing functions, among others, in at least one embodiment.

In at least one embodiment, a compiler 6504 is also included in OpenCL frame-work 6505. Source code may be compiled offline prior to executing an application or online during execution of an application, in at least one embodiment. In contrast to CUDA and ROCm, OpenCL applications in at least one embodiment may be compiled online by compiler 6504, which is included to be representative of any number of compilers that may be used to compile source code and/or IR code, such as Standard Portable Intermediate Representation ("SPIR-V") code, into binary code. Alternatively, in at least one embodiment, OpenCL applications may be compiled offline, prior to execution of such applications.

In at least one embodiment, one or more systems depicted in FIGS. 28A and 28B are utilized to implement a framework for image processing (e.g., real-time image rendering and enhancement). In at least one embodiment, one or more systems depicted in FIGS. 28A and 28B are utilized to perform various processes such as those described in connection with FIGS. 1-27. In at least one embodiment, one or more systems depicted in FIGS. 28A and 28B are utilized to generate and apply blue noise masks to images that are able to handle the temporal domain, i.e., adding time to the spatial (image) domain to improve image quality when rendering images over multiple frames (e.g., time).

Figure 66:
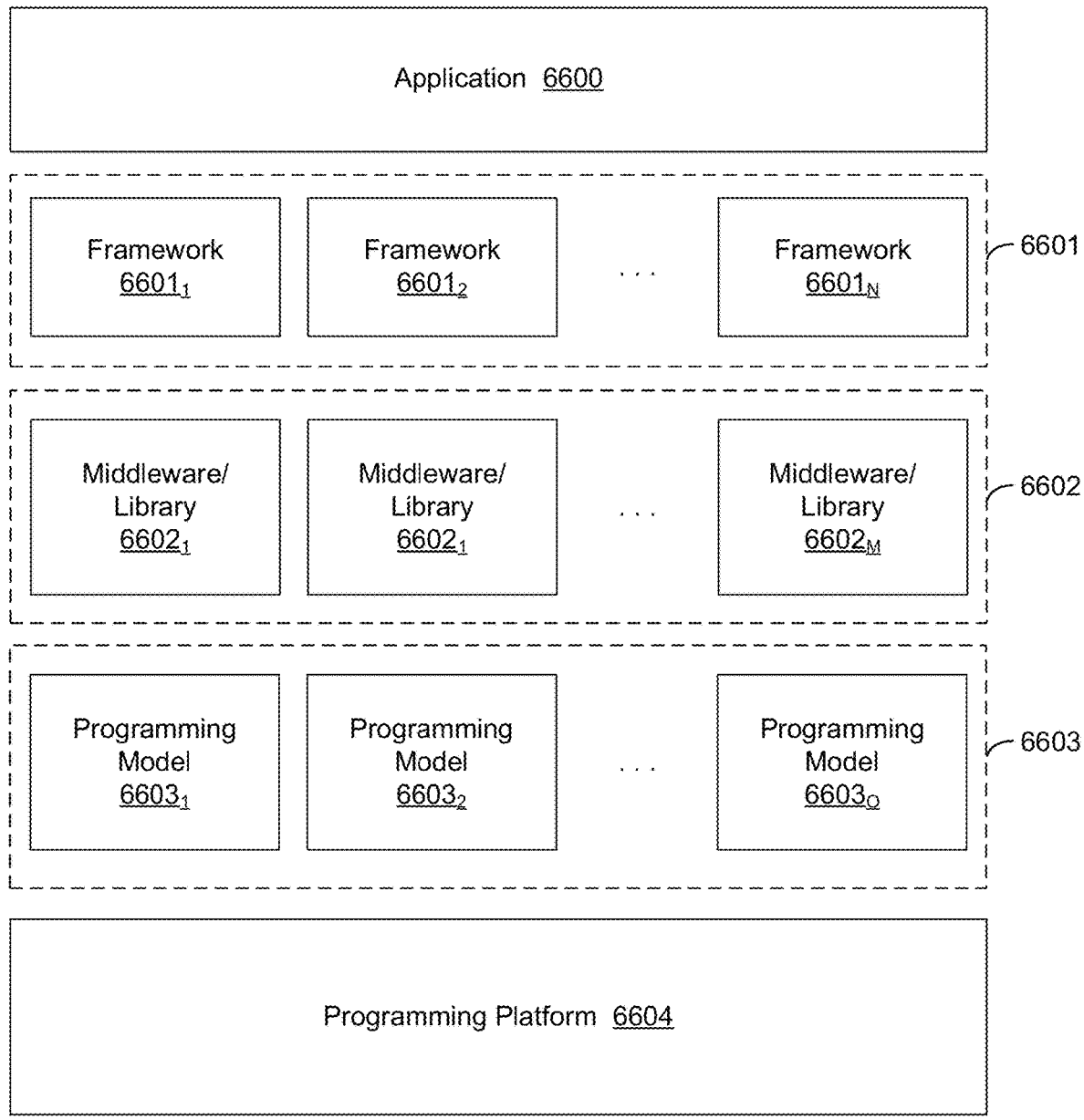
FIG. 66 illustrates software that is supported by a programming platform, in accordance with at least one embodiment.

FIG. 66 illustrates software that is supported by a programming platform, in accordance with at least one embodiment. In at least one embodiment, a programming platform 6604 is configured to support various programming models 6603, middlewares and/or libraries 6602, and frameworks 6601 that an application 6600 may rely upon. In at least one embodiment, application 6600 may be an AI/ML application implemented using, for example, a deep learning framework such as MXNet, PyTorch, or TensorFlow, which may rely on libraries such as cuDNN, NVIDIA Collective Communications Library ("NCCL"), and/or NVIDIA Developer Data Loading Library ("DALI") CUDA libraries to provide accelerated computing on underlying hardware.

In at least one embodiment, programming platform 6604 may be one of a CUDA, ROCm, or OpenCL platform described above in conjunction with FIG. 63, FIG. 64, and FIG. 65, respectively. In at least one embodiment, programming platform 6604 supports multiple programming models 6603, which are abstractions of an underlying computing system permitting expressions of algorithms and data structures. Programming models 6603 may expose features of underlying hardware in order to improve performance, in at least one embodiment. In at least one embodiment, programming models 6603 may include, but are not limited to, CUDA, HIP, OpenCL, C++ Accelerated Massive Parallelism ("C++ AMP"), Open Multi-Processing ("OpenMP"), Open Accelerators ("OpenACC"), and/or Vulcan Compute.

In at least one embodiment, libraries and/or middlewares 6602 provide implementations of abstractions of programming models 6604. In at least one embodiment, such libraries include data and programming code that may be used by computer programs and leveraged during software development. In at least one embodiment, such middlewares include software that provides services to applications beyond those available from programming platform 6604. In at least one embodiment, libraries and/or middlewares 6602 may include, but are not limited to, cuBLAS, cuFFT, cuRAND, and other CUDA libraries, or rocBLAS, rocFFT, rocRAND, and other ROCm libraries. In addition, in at least one embodiment, libraries and/or middlewares 6602 may include NCCL and ROCm Communication Collectives Library ("RCCL") libraries providing communication routines for GPUs, a MIOpen library for deep learning acceleration, and/or an Eigen library for linear algebra, matrix and vector operations, geometrical transformations, numerical solvers, and related algorithms.

In at least one embodiment, application frameworks 6601 depend on libraries and/or middlewares 6602. In at least one embodiment, each of application frameworks 6601 is a software framework used to implement a standard structure of application software. An AI/ML application may be implemented using a framework such as Caffe, Caffe2, TensorFlow, Keras, PyTorch, or MxNet deep learning frameworks, in at least one embodiment.

In at least one embodiment, one or more systems depicted in FIGS. 28A and 28B are utilized to implement a framework for image processing (e.g., real-time image rendering and enhancement). In at least one embodiment, one or more systems depicted in FIGS. 28A and 28B are utilized to perform various processes such as those described in connection with FIGS. 1-27. In at least one embodiment, one or more systems depicted in FIGS. 28A and 28B are utilized to generate and apply blue noise masks to images that are able to handle the temporal domain, i.e., adding time to the spatial (image) domain to improve image quality when rendering images over multiple frames (e.g., time).

Figure 67:
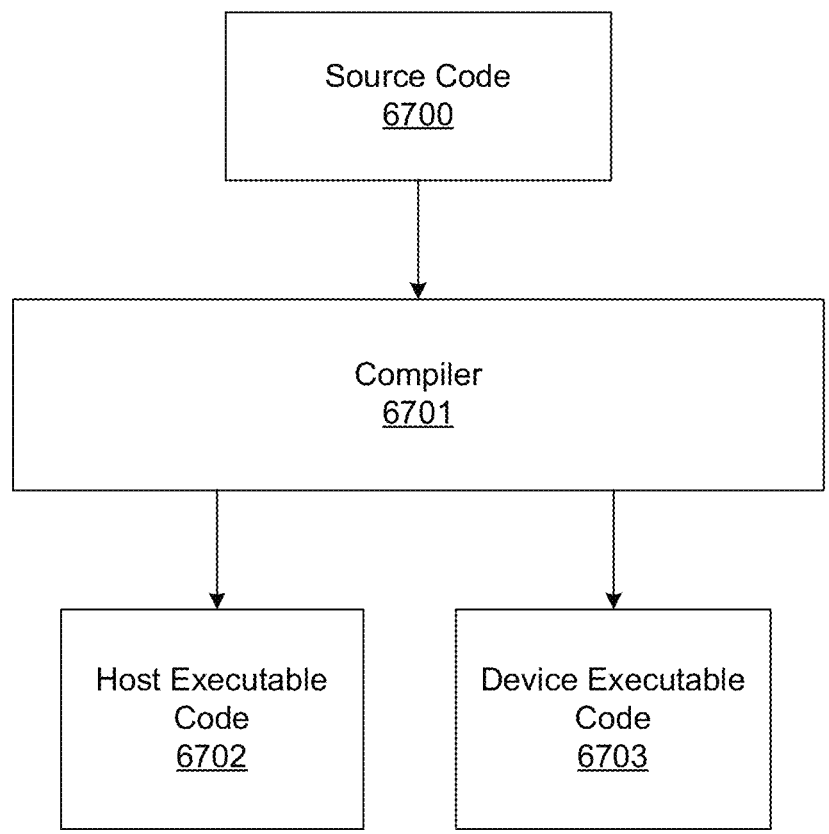
FIG. 67 illustrates compiling code to execute on programming platforms of FIGS. 62-65, in accordance with at least one embodiment.

FIG. 67 illustrates compiling code to execute on one of programming platforms of FIGS. 62-65, in accordance with at least one embodiment. In at least one embodiment, a compiler 6701 receives source code 6700 that includes both host code as well as device code. In at least one embodiment, complier 6701 is configured to convert source code 6700 into host executable code 6702 for execution on a host and device executable code 6703 for execution on a device. In at least one embodiment, source code 6700 may either be compiled offline prior to execution of an application, or online during execution of an application.

In at least one embodiment, source code 6700 may include code in any programming language supported by compiler 6701, such as C++, C, Fortran, etc. In at least one embodiment, source code 6700 may be included in a single-source file having a mixture of host code and device code, with locations of device code being indicated therein. In at least one embodiment, a single-source file may be a .cu file that includes CUDA code or a .hip.cpp file that includes HIP code. Alternatively, in at least one embodiment, source code 6700 may include multiple source code files, rather than a single-source file, into which host code and device code are separated.

In at least one embodiment, compiler 6701 is configured to compile source code 6700 into host executable code 6702 for execution on a host and device executable code 6703 for execution on a device. In at least one embodiment, compiler 6701 performs operations including parsing source code 6700 into an abstract system tree (AST), performing optimizations, and generating executable code. In at least one embodiment in which source code 6700 includes a single-source file, compiler 6701 may separate device code from host code in such a single-source file, compile device code and host code into device executable code 6703 and host executable code 6702, respectively, and link device executable code 6703 and host executable code 6702 together in a single file.

In at least one embodiment, host executable code 6702 and device executable code 6703 may be in any suitable format, such as binary code and/or IR code. In a case of CUDA, host executable code 6702 may include native object code and device executable code 6703 may include code in PTX intermediate representation, in at least one embodiment. In a case of ROCm, both host executable code 6702 and device executable code 6703 may include target binary code, in at least one embodiment.

In at least one embodiment, one or more systems depicted in FIGS. 28A and 28B are utilized to implement a framework for image processing (e.g., real-time image rendering and enhancement). In at least one embodiment, one or more systems depicted in FIGS. 28A and 28B are utilized to perform various processes such as those described in connection with FIGS. 1-27. In at least one embodiment, one or more systems depicted in FIGS. 28A and 28B are utilized to generate and apply blue noise masks to images that are able to handle the temporal domain, i.e., adding time to the spatial (image) domain to improve image quality when rendering images over multiple frames (e.g., time).

Figure 68:
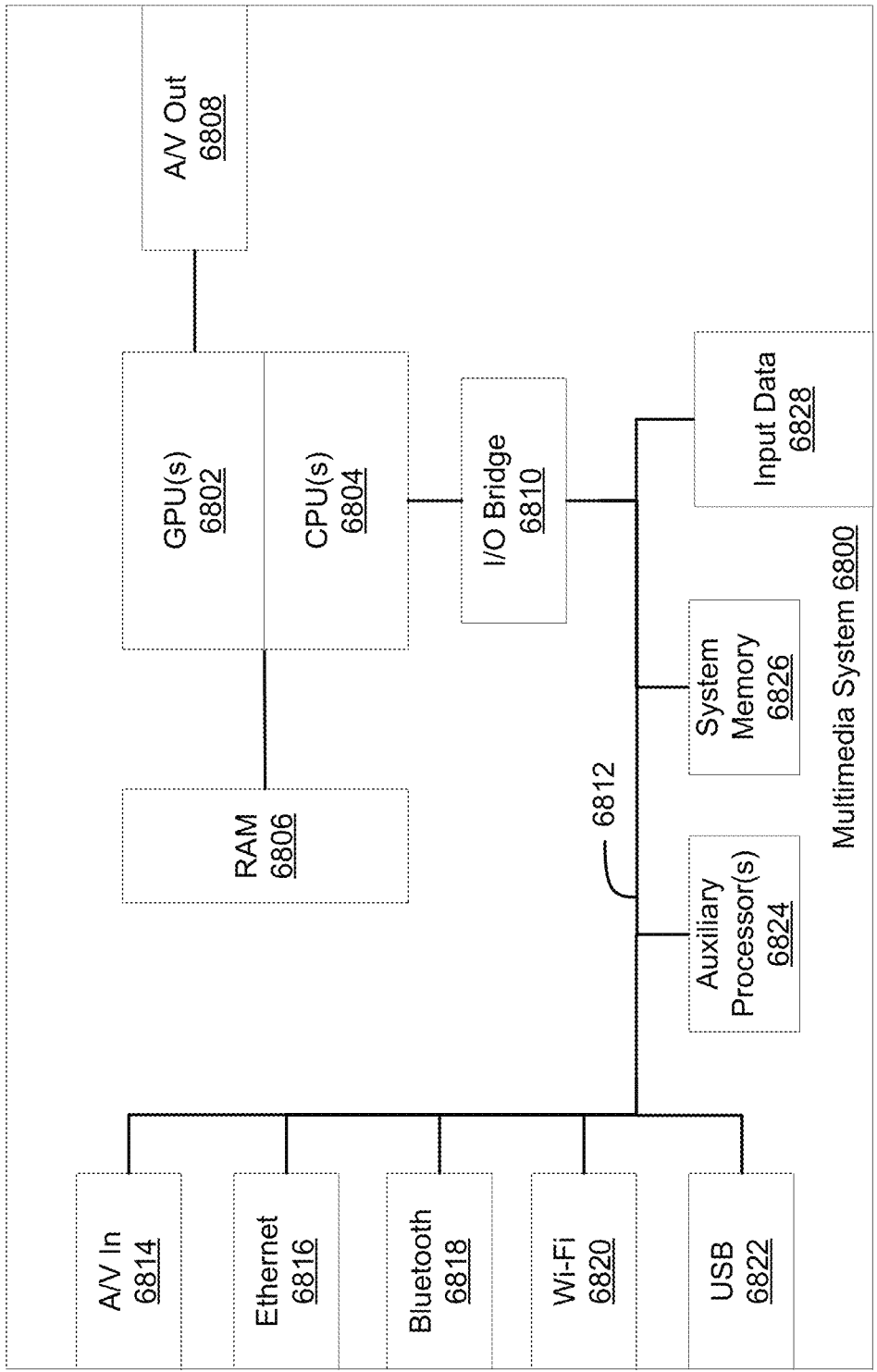
FIG. 68 illustrates a multimedia system, in accordance with at least one embodiment.

FIG. 68 illustrates a multimedia system, according to at least one embodiment. In at least one embodiment, a multimedia system is referred to as a gaming system, multimedia console, gaming console, and/or variations thereof. In at least one embodiment, FIG. 68 illustrates an overall system architecture of a computer game processing apparatus.

In at least one embodiment, multimedia system 6800 comprises graphics processing units (GPUs) 6802. In at least one embodiment, GPU(s) 6802, optionally in conjunction with CPU(s) 6804, generates video images and audio for output via audio/video (A/V) output 6808. In at least one embodiment, audio is generated in conjunction with or instead by an audio processor. In at least one embodiment, GPU(s) 6802 utilize a video encoder/video codec (e.g., coder/decoder) to form a video processing pipeline for graphics processing. In at least one embodiment, data is provided from GPU(s) 6802 to a video encoder/video codec and output to A/V output 6808 for transmission to a display. In at least one embodiment, GPU(s) 6802 is connected to one or more memory controllers to facilitate access to various types of memory, such as random access memory (RAM) 6806.

In at least one embodiment, GPU(s) 6802 is part of a processing unit comprising central processing units (CPUs) 6804. In at least one embodiment, GPU(s) 6802 and CPU(s) 6804 are part of an accelerated processing unit (APU). In at least one embodiment, CPU(s) 6804 comprise at least a level 1 cache, level 2 cache, and memory. In at least one embodiment, a level 1 cache and a level 2 cache temporarily store data and reduce a number of memory access cycles. In at least one embodiment, CPU(s) 6804 comprise at least one or more cores and one or more level caches. In at least one embodiment, memory of CPU(s) 6804 store executable code that is loaded during a boot process, such as when multimedia system 6800 is powered on.

In at least one embodiment, GPU(s) 6802 and CPU(s) 6804 communicate with bus 6812, optionally via input/output (I/O) bridge 6810, which may be a discreet component or part of GPU(s) 6802 and CPU(s) 6804. In at least one embodiment, data storage components such as system memory 6826, and input data 6828 are connected to bus 6812. In at least one embodiment, RAM 6806 also communicates with bus 6812. In at least one embodiment, auxiliary processor(s) 6824 are connected to bus 6812. In at least one embodiment, auxiliary processor(s) 6824 are provided to run or support one or more software, software applications, operating systems, and/or variations thereof executed in connection with multimedia system 6800.

In at least one embodiment, system memory 6826 stores application data that is loaded during a boot process. In at least one embodiment, input data 6828 comprises a DVD/CD drive, Blu-ray drive, hard drive, or other removable media drive. In at least one embodiment, input data 6828 is external or internal to multimedia system 6800. In at least one embodiment, application data is accessed via input data 6828 for execution, playback, and/or variations thereof. In at least one embodiment, input data 6828 is connected to I/O bridge 6810 via bus 6812.

In at least one embodiment, one or more components of multimedia system 6800 are connected via one or more buses, including serial and parallel buses, a memory bus, a peripheral bus, and a processor or local bus using various bus architectures, such as Peripheral Components Interconnects (PCI) bus, PCI-Express bus, and/or variations thereof. In at least one embodiment, multimedia system 6800 communicates with peripheral devices as appropriate via an audio/visual (A/V) input port 6814, Ethernet port 6816, Bluetooth wireless link 6818, Wi-Fi wireless link 6820, or one or more universal serial bus (USB) ports 6822. In at least one embodiment, audio and video are output via A/V output 6808, such as an HDMI port.

In at least one embodiment, video and optionally audio of multimedia system 6800 are output to one or more display devices through A/V output 6808. In at least one embodiment, display devices include devices such as a television, electronic display, computer monitor, and/or variations thereof. In at least one embodiment, video is presented in various forms, such as stereoscopic. In at least one embodiment, audio is presented through one or more audio devices in one of a number of formats such as stereo, 5.1 surround sound or 7.1 surround sound. In at least one embodiment, video and audio is presented to a head mounted display unit, such as a virtual reality device, worn by a user.

In at least one embodiment, upon boot of multimedia system 6800, application data is loaded from system memory 6826 into one or more memory and/or caches of CPU(s) 6804 and executed on CPU(s) 6804. In at least one embodiment, an application presents a graphical user interface that provides a user experience when navigating to different services available on multimedia system 6800. In at least one embodiment, applications, media, and/or variations thereof of input data 6828 are launched or played from input data 6828 to provide additional functionalities, applications, media, and/or variations thereof to multimedia system 6800. In at least one embodiment, multimedia system 6800 is configured to execute an executable program associated with a computer game in accordance with application data from system memory 6826 and input data 6828.

In at least one embodiment, one or more systems depicted in FIGS. 28A and 28B are utilized to implement a framework for image processing (e.g., real-time image rendering and enhancement). In at least one embodiment, one or more systems depicted in FIGS. 28A and 28B are utilized to perform various processes such as those described in connection with FIGS. 1-27. In at least one embodiment, one or more systems depicted in FIGS. 28A and 28B are utilized to generate and apply blue noise masks to images that are able to handle the temporal domain, i.e., adding time to the spatial (image) domain to improve image quality when rendering images over multiple frames (e.g., time).

Figure 69:
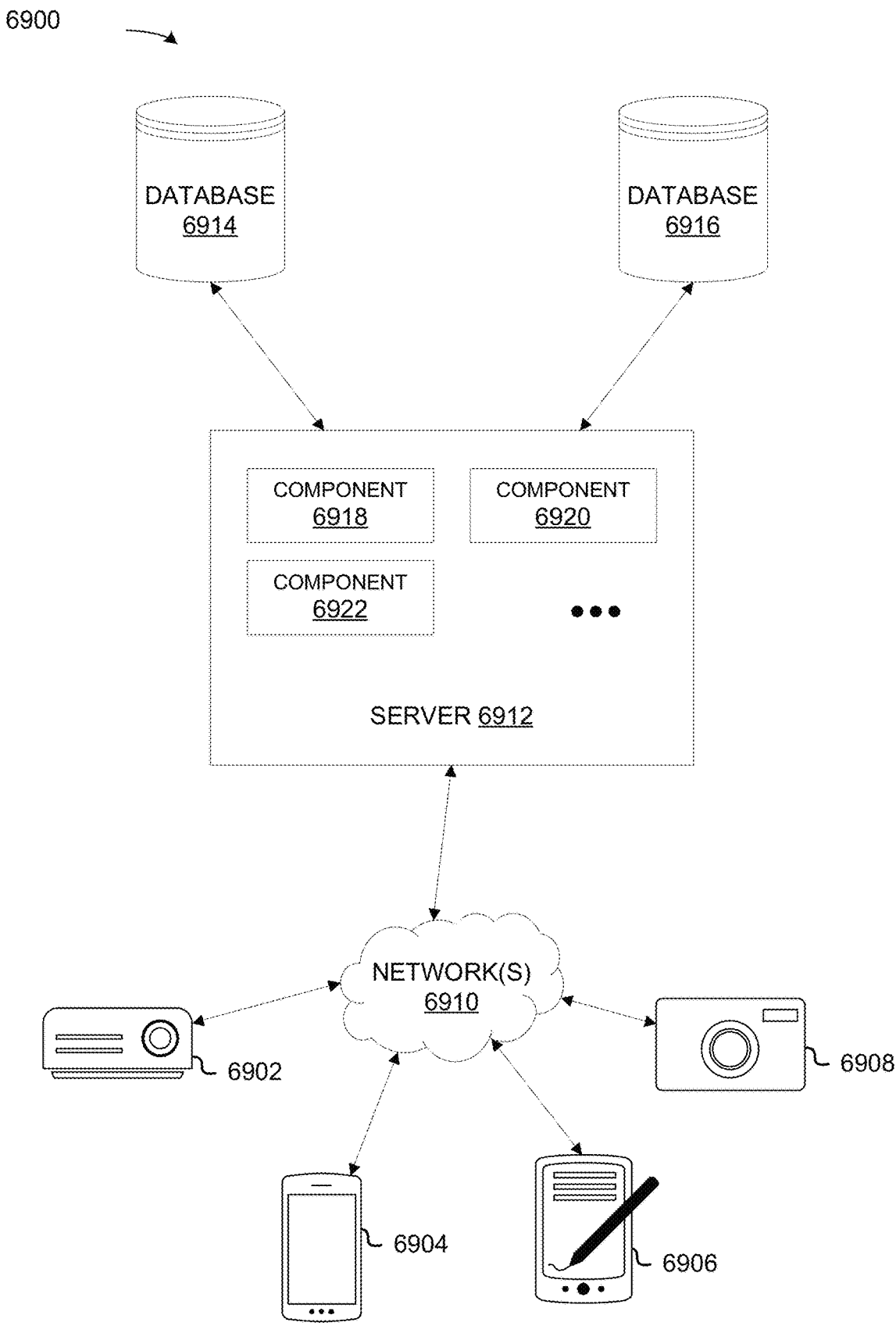
FIG. 69 illustrates a distributed system, in accordance with at least one embodiment.

FIG. 69 illustrates a distributed system 6900, in accordance with at least one embodiment. In at least one embodiment, distributed system 6900 includes one or more client computing devices 6902, 6904, 6906, and 6908, which are configured to execute and operate a client application such as a web browser, proprietary client, and/or variations thereof over one or more network(s) 6910. In at least one embodiment, server 6912 may be communicatively coupled with remote client computing devices 6902, 6904, 6906, and 6908 via network 6910.

In at least one embodiment, server 6912 may be adapted to run one or more services or software applications such as services and applications that may manage session activity of single sign-on (SSO) access across multiple data centers. In at least one embodiment, server 6912 may also provide other services or software applications can include non-virtual and virtual environments. In at least one embodiment, these services may be offered as web-based or cloud services or under a Software as a Service (SaaS) model to users of client computing devices 6902, 6904, 6906, and/or 6908. In at least one embodiment, users operating client computing devices 6902, 6904, 6906, and/or 6908 may in turn utilize one or more client applications to interact with server 6912 to utilize services provided by these components. In at least one embodiment, distributed system 6900 performs process 100 (see FIG. 1A) or process 106 (see FIG. 1B).

In at least one embodiment, software components 6918, 6920 and 6922 of system 6900 are implemented on server 6912. In at least one embodiment, one or more components of system 6900 and/or services provided by these components may also be implemented by one or more of client computing devices 6902, 6904, 6906, and/or 6908. In at least one embodiment, users operating client computing devices may then utilize one or more client applications to use services provided by these components. In at least one embodiment, these components may be implemented in hardware, firmware, software, or combinations thereof. It should be appreciated that various different system configurations are possible, which may be different from distributed system 6900. The embodiment shown in FIG. 69 is thus one example of a distributed system for implementing an embodiment system and is not intended to be limiting.

In at least one embodiment, client computing devices 6902, 6904, 6906, and/or 6908 may include various types of computing systems. In at least one embodiment, a client computing device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and/or variations thereof. In at least one embodiment, devices may support various applications such as various Internet-related apps, e-mail, short message service (SMS) applications, and may use various other communication protocols. In at least one embodiment, client computing devices may also include general purpose personal computers including, by way of example, personal computers and/or laptop computers running various versions of Microsoft Windows®, Apple Macintosh®, and/or Linux operating systems. In at least one embodiment, client computing devices can be workstation computers running any of a variety of commercially-available UNIX® or UNIX-like operating systems, including without limitation a variety of GNU/Linux operating systems, such as Google Chrome OS. In at least one embodiment, client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 6910. Although distributed system 6900 in FIG. 69 is shown with four client computing devices, any number of client computing devices may be supported. Other devices, such as devices with sensors, etc., may interact with server 6912.

In at least one embodiment, network(s) 6910 in distributed system 6900 may be any type of network that can support data communications using any of a variety of available protocols, including without limitation TCP/IP (transmission control protocol/Internet protocol), SNA (systems network architecture), IPX (Internet packet exchange), AppleTalk, and/or variations thereof. In at least one embodiment, network(s) 6910 can be a local area network (LAN), networks based on Ethernet, Token-Ring, a wide-area network, Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

In at least one embodiment, server 6912 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In at least one embodiment, server 6912 can include one or more virtual machines running virtual operating systems, or other computing architectures involving virtualization. In at least one embodiment, one or more flexible pools of logical storage devices can be virtualized to maintain virtual storage devices for a server. In at least one embodiment, virtual networks can be controlled by server 6912 using software defined networking. In at least one embodiment, server 6912 may be adapted to run one or more services or software applications. In at least one embodiment, server 6912 comprises one or more hardware and/or software components that implement a neural network such as those described in connection with FIG. 70-FIG. 74. In at least one embodiment, server 6912 comprises one or more neural networks, which are referred to as deep learning super sampling networks, which generate high quality versions of input frames (e.g., rendered frames of a computer graphics program, such as a video game program).

In at least one embodiment, server 6912 may run any operating system, as well as any commercially available server operating system. In at least one embodiment, server 6912 may also run any of a variety of additional server applications and/or mid-tier applications, including HTTP (hypertext transport protocol) servers, FTP (file transfer protocol) servers, CGI (common gateway interface) servers, JAVA® servers, database servers, and/or variations thereof. In at least one embodiment, exemplary database servers include without limitation those commercially available from Oracle, Microsoft, Sybase, IBM (International Business Machines), and/or variations thereof.

In at least one embodiment, server 6912 may include one or more applications to analyze and consolidate data feeds and/or event updates received from users of client computing devices 6902, 6904, 6906, and 6908. In at least one embodiment, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and/or variations thereof. In at least one embodiment, server 6912 may also include one or more applications to display data feeds and/or real-time events via one or more display devices of client computing devices 6902, 6904, 6906, and 6908.

In at least one embodiment, distributed system 6900 may also include one or more databases 6914 and 6916. In at least one embodiment, databases may provide a mechanism for storing information such as user interactions information, usage patterns information, adaptation rules information, and other information. In at least one embodiment, databases 6914 and 6916 may reside in a variety of locations. In at least one embodiment, one or more of databases 6914 and 6916 may reside on a non-transitory storage medium local to (and/or resident in) server 6912. In at least one embodiment, databases 6914 and 6916 may be remote from server 6912 and in communication with server 6912 via a network-based or dedicated connection. In at least one embodiment, databases 6914 and 6916 may reside in a storage-area network (SAN). In at least one embodiment, any necessary files for performing functions attributed to server 6912 may be stored locally on server 6912 and/or remotely, as appropriate. In at least one embodiment, databases 6914 and 6916 may include relational databases, such as databases that are adapted to store, update, and retrieve data in response to SQL-formatted commands.

In at least one embodiment, one or more systems depicted in FIGS. 28A and 28B are utilized to implement a framework for image processing (e.g., real-time image rendering and enhancement). In at least one embodiment, one or more systems depicted in FIGS. 28A and 28B are utilized to perform various processes such as those described in connection with FIGS. 1-27. In at least one embodiment, one or more systems depicted in FIGS. 28A and 28B are utilized to generate and apply blue noise masks to images that are able to handle the temporal domain, i.e., adding time to the spatial (image) domain to improve image quality when rendering images over multiple frames (e.g., time).

Figure 70:
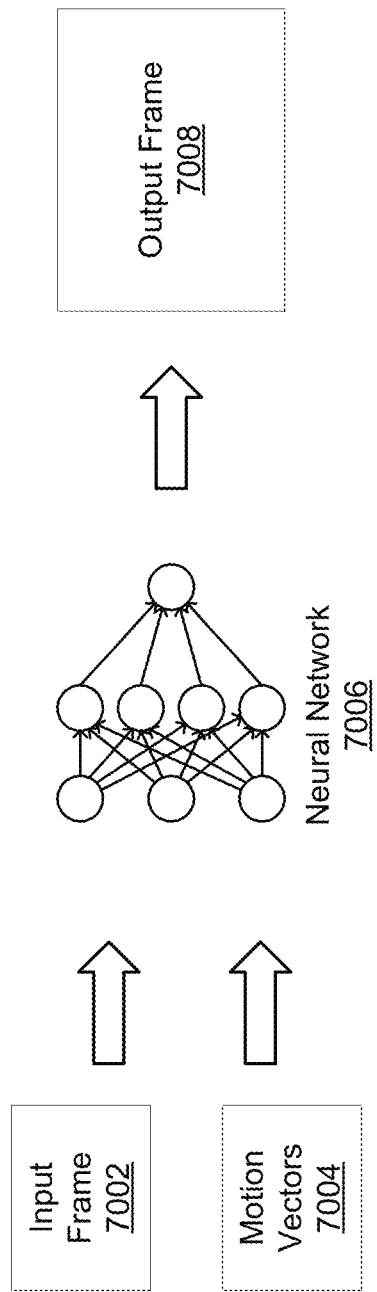
FIG. 70 illustrates a super sampling neural network, in accordance with at least one embodiment.

FIG. 70 illustrates a super sampling neural network, in accordance with at least one embodiment. In at least one embodiment, a neural network 7006 is referred to as a super sampling neural network, deep learning super sampling (DLSS) network, super sampling network, and/or variations thereof. In at least one embodiment, an input frame 7002 and motion vectors 7004 are processed by a neural network 7006 to generate an output frame 7008. In at least one embodiment, neural networks such as those described in connection with FIG. 70-74 are DLSS networks. In at least one embodiment, neural network 7006 is used to perform part of process 100 (see FIG. 1A) or process 106 (see FIG. 1B), e.g., if a rendered or provided image is part of DLSS in image processing.

In at least one embodiment, an input frame 7002 is an image. In at least one embodiment, an input frame 7002 is a computer generated image that is generated by one or more computer graphics programs or software. In at least one embodiment, an input frame 7002 is an image that is captured from one or more image capturing devices, such as a camera. In at least one embodiment, an input frame 7002 is a frame of a set of frames of a video. In at least one embodiment, an input frame 7002 is a frame of a video that is captured from one or more video capturing devices, such as a video camera. In at least one embodiment, an input frame 7002 is a frame of a computer generated video that is generated by one or more computer graphics programs or software.

In at least one embodiment, an input frame 7002 is a render of a two-dimensional (2D) model. In at least one embodiment, an input frame 7002 is a render of a three-dimensional (3D) model. In at least one embodiment, an input frame 7002 is generated by a rendering computer program, which is a computer program comprising executable instructions that, when executed, generate images based at least in part on a scene. In at least one embodiment, a scene refers to a 2D or 3D model. In at least one embodiment, a scene is defined by various characteristics, such as geometry, viewpoint, texture, lighting, shading, and/or variations thereof. In at least one embodiment, a computer program obtains a scene and generates an image of a scene through use of one or more rendering algorithms. In at least one embodiment, an input frame 7002 is an image generated through use of one or more light transport modelling techniques. In at least one embodiment, an input frame 7002 is generated through one or more rasterization techniques. In at least one embodiment, an input frame 7002 is generated through one or more ray casting techniques. In at least one embodiment, an input frame 7002 is generated through one or more ray tracing techniques.

In at least one embodiment, an input frame 7002 is a frame generated by a video game program. In at least one embodiment, a video game program is executed by one or more computing devices that comprise graphics hardware that generate real-time computer graphics. In at least one embodiment, an input frame 7002 is a frame that is generated in real-time. In at least one embodiment, an input frame 7002 is a frame that is pre-rendered. In at least one embodiment, an input frame 7002 is a frame of a video game that is displayed on one or more computer graphics display hardware, such as a video display device, mobile device, virtual reality headset, and/or variations thereof. In at least one embodiment, a video game program is executing and generates a 3D scene, in which an input frame 7002 is a render of a 3D scene. In at least one embodiment, an input frame 7002 is a frame that is rendered by a rendering device with various hardware and software constraints, such as graphics hardware limitations, memory limitations, and/or variations thereof.

In at least one embodiment, a neural network 7006 is a neural network that obtains an input frame and generates an output frame. In at least one embodiment, a neural network 7006 is a convolutional autoencoder network. In at least one embodiment, a neural network 7006 is a neural network that generates a higher quality version of an input frame. In at least one embodiment, qualities of a frame include resolution and aliasing, in which a high quality frame has a high resolution and minimal aliasing. In at least one embodiment, a neural network 7006 obtains an input frame, and generates an output frame with a higher resolution and lower aliasing than an input frame. In at least one embodiment, a neural network 7006 processes frames in near real-time. In at least one embodiment, near real-time processing refers to processing in which inputs are processed within a time interval from which inputs are generated. In at least one embodiment, a neural network 7006 processes input frames in near real-time such that input frames are processed within a time interval from which they are generated and/or rendered. In at least one embodiment, a neural network 7006 processes an input frame into an output frame within a time interval such that output frames are available from input frames with minimal latency. In at least one embodiment, minimal latency refers to latency that is at or below a defined latency time interval threshold. In at least one embodiment, output frames that are available from input frames with minimal latency are available within a defined time interval, which can be any suitable value, such as seconds, fractions of a second, and/or variations thereof. In at least one embodiment, a neural network 7006 obtains a frame of a video game and generates a high resolution, minimally aliased output frame. In at least one embodiment, a neural network 7006 is trained using various neural network training techniques such as those described in connection with FIG. 71. In at least one embodiment, output frames are generated at a rate which can be perceived as continuous motion for a human being, which may refer to frame rates over a certain threshold. In at least one embodiment, output frames are generated at a target rate at or over 20 frames per second (fps) including or not limited to 23.976 fps, 24 fps, 25 fps, 29.97 fps, 30 fps, 48 fps, 50 fps, 59.94 fps, 60 fps, 90 fps, 120 fps, 240 fps, and any other suitable target frame rate. In at least one embodiment, a computer system may lack computing resources to continuously render high quality frames at a target frame rate (e.g., 4K resolution at 60 fps) and instead render lower-resolution frames which are super-sampled using neural network 7006 to achieve said target frame (e.g., render 1080p resolution at 60 fps and super-sample to 4K resolution).

In at least one embodiment, a neural network 7006 obtains an input frame 7002. In at least one embodiment, a neural network 7006 obtains an input frame 7002 from a video game program executing on one or more computing devices, such as a video game console, computer, mobile device, and/or variations thereof. In at least one embodiment, a computer program, such as a video game program, computer graphics program, rendering program, and/or variations thereof, provides an input frame 7002 to a neural network 7006 through one or more interfaces, such as transmitted through one or more computer networks, transferred through one or more data transfer interfaces, and/or variations thereof. In at least one embodiment, a neural network 7006 obtains an input frame 7002, which is an image generated by a video game program. In at least one embodiment, a neural network 7006 obtains an input frame 7002 and associated motion vectors 7004, which indicate direction objects in a scene (e.g., a scene depicted in an input frame 7002) are moving. In at least one embodiment, a motion vector is a vector that represents an entity in a frame based on a position of an entity in a previous frame. In at least one embodiment, a motion vector indicates a motion or direction of movement of an entity of a frame of a scene. In at least one embodiment, motion vectors 7004 comprise a collection of one or more motion vectors that indicate motions or directions of movement of entities and/or objects of an input frame 7002. In at least one embodiment, a program such as a video game program generates both input frame 7002 and motion vectors 7004.

In at least one embodiment, a neural network 7006 obtains an input frame 7002 and motion vectors 7004, and generates an output frame 7008. In at least one embodiment, a neural network 7006 generates an output frame 7008 from an input frame 7002 and/or associated motion vectors 7004. In at least one embodiment, a neural network 7006 is trained using a high quality version of an input frame 7002, in which trained neural network 7006 generates an output frame 7008 to match α high quality version of input frame 7002. In at least one embodiment, an output frame 7008 is an upscaled/higher resolution version of an input frame 7002. In at least one embodiment, an output frame 7008 is a higher resolution version of an input frame 7002. In at least one embodiment, an output frame 7008 has a lower degree of aliasing than an input frame 7002. In at least one embodiment, an output frame 7008 is a higher quality representation of an input frame 7002. In at least one embodiment, a neural network 7006 obtains an input frame 7002, which is a real-time render of a scene of a video game, and associated motion vectors 7004, and generates an output frame 7008, which is a high quality version of an input frame 7002.

In at least one embodiment, one or more systems depicted in FIGS. 28A and 28B are utilized to implement a framework for image processing (e.g., real-time image rendering and enhancement). In at least one embodiment, one or more systems depicted in FIGS. 28A and 28B are utilized to perform various processes such as those described in connection with FIGS. 1-27. In at least one embodiment, one or more systems depicted in FIGS. 28A and 28B are utilized to generate and apply blue noise masks to images that are able to handle the temporal domain, i.e., adding time to the spatial (image) domain to improve image quality when rendering images over multiple frames (e.g., time).

Figure 71:
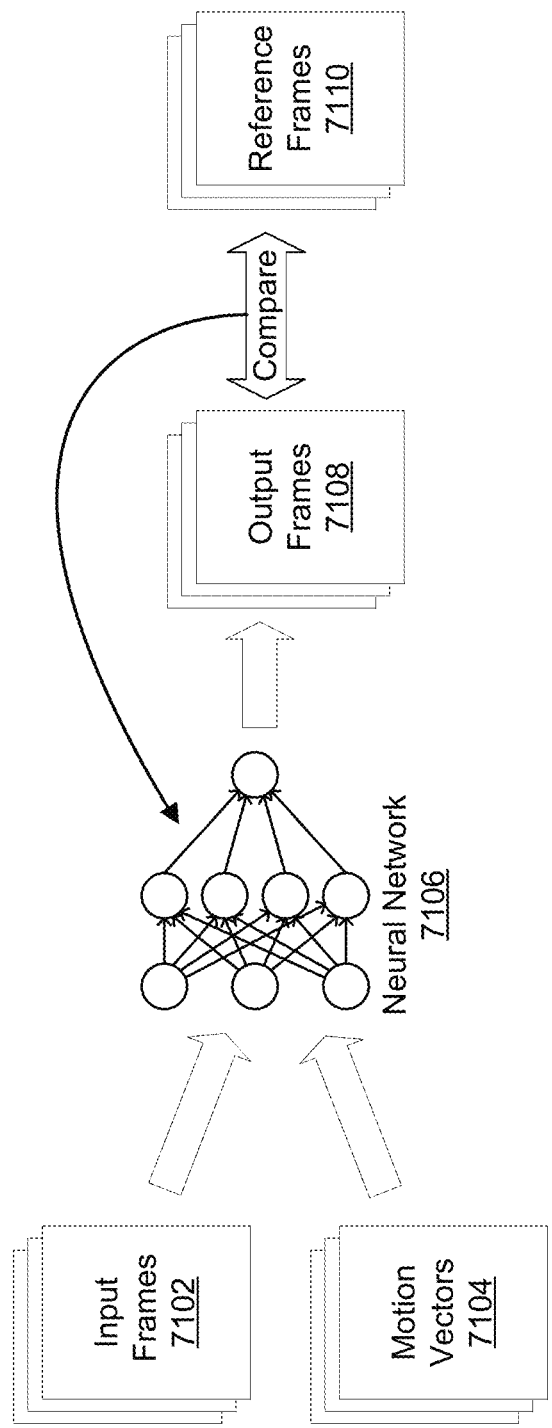
FIG. 71 illustrates an architecture of a super sampling neural network, in accordance with at least one embodiment.

FIG. 71 illustrates an architecture of a super sampling neural network, in accordance with at least one embodiment. In at least one embodiment, a neural network 7106 is referred to as a super sampling neural network, DLSS network, super sampling network, and/or variations thereof. In at least one embodiment, a neural network 7106 is trained to generate output frames 7108 from input frames 7102 and motion vectors 7104. In at least one embodiment, as part of training a neural network 7106, output frames 7108 generated by a neural network 7106 are compared with reference frames 7110 to update neural network 7106.

In at least one embodiment, input frames 7102 are input frames in accordance with those described in connection with FIG. 70. In at least one embodiment, input frames 7102 comprise one or more images, referred to as frames. In at least one embodiment, input frames 7102 comprise one or more images captured from one or more image and/or video capturing devices. In at least one embodiment, input frames 7102 comprise one or more renders of a scene. In at least one embodiment, input frames 7102 comprise frames generated by a video game program. In at least one embodiment, a video game program is executed by one or more computing devices that comprise graphics hardware that generate real-time computer graphics. In at least one embodiment, input frames 7102 are frames that are pre-rendered. In at least one embodiment, a video game program is executing and generates a 3D scene, in which input frames 7102 comprise renders of a 3D scene. In at least one embodiment, input frames 7102 are frames that are rendered by a rendering device with various hardware and software constraints, such as graphics hardware limitations, memory limitations, and/or variations thereof. In at least one embodiment, input frames 7102 are frames that are rendered with minimal post processing techniques, such as anti-aliasing (e.g., input frames 7102 comprise frames that are rendered with a little to no degree of anti-aliasing).

In at least one embodiment, post processing techniques for rendered frames include techniques and effects such as, but not limited to: ambient occlusion (e.g., horizon based ambient occlusion (HBAO), screen space ambient occlusion (SSAO)), anti-aliasing (e.g., fast approximate anti-aliasing (FXAA), super-sample anti-aliasing (SSAA), multi-sampling anti-aliasing (MSAA), temporal anti-aliasing (TXAA)), bloom, blur (e.g., depth of field, motion blur), cell shading, chromatic aberration, color correction, gamma correction, high dynamic range rendering, particle effects, shading, shadow mapping, sharpening, un-sharpening, upscaling, texture filtering (e.g., point, linear, bilinear, trilinear, anisotropic), and/or variations thereof. In at least one embodiment, input frames 7102 are frames that are rendered with little to no post processing techniques and/or effects.

In at least one embodiment, motion vectors 7104 are a set of one or more vectors that indicate directions of movement of objects of frames of input frames 7102. In at least one embodiment, a motion vector is a vector that represents an entity in a frame based on a position of an entity in a previous frame. In at least one embodiment, a motion vector indicates a motion or direction of movement of an entity of a frame of a scene. In at least one embodiment, motion vectors 7104 are generated by a program that rendered input frames 7102 and correspond to input frames 7102, in which a first set of motion vectors of motion vectors 7104 corresponds to a first frame of input frames 7102 and indicates motion of objects and/or entities depicted in a first frame of input frames 7102. In at least one embodiment, a first set of motion vectors of motion vectors 7104 corresponds to a first frame of input frames 7102 and indicates motion of objects of a first frame of input frames 7102 (e.g., directions and/or locations of where objects of a first frame of input frames 7102 will potentially be or move to in a subsequent frame of input frames 7102). In at least one embodiment, motion vectors 7104 comprise motion vectors generated by a video game program. In at least one embodiment, a video game program is executing and generates a 3D scene, in which motion vectors 7104 comprise vectors indicating movement of objects and/or entities of a 3D scene.

In at least one embodiment, reference frames 7110 comprise one or more images, referred to as frames. In at least one embodiment, reference frames 7110 correspond to input frames 7102 (e.g., each frame of reference frames 7110 corresponds to a frame of input frames 7102). In at least one embodiment, reference frames 7110 comprise one or more renders of a scene. In at least one embodiment, reference frames 7110 comprise frames generated by a video game program. In at least one embodiment, reference frames 7110 are frames that are rendered with various post processing techniques and/or effects. In at least one embodiment, reference frames 7110 are higher quality versions of input frames 7102. In at least one embodiment, a first frame of input frames 7102 is rendered from a scene using minimal post processing techniques and/or effects, and a first frame of reference frames 7110 is rendered from a same scene using post processing techniques and/or effects. In at least one embodiment, reference frames 7110 are frames rendered using 64× super sampling (64×SS).

In at least one embodiment, reference frames 7110 are frames rendered by one or more super computing devices, such as those described in connection with FIG. 31. In at least one embodiment, input frames 7102 and reference frames 7110 are frames rendered from a same computer graphics application or program (e.g., a same video game program). In at least one embodiment, reference frames 7110 and motion vectors are generated by one or more rendering devices, in which input frames 7102 and motion vectors 7104 are obtained from generated reference frames 7110 and motion vectors through one or more processes, such as downscaling generated reference frames 7110 and/or motion vectors to obtain input frames 7102 and motion vectors 7104, removing one or more post processing techniques and/or effects from generated reference frames 7110 and/or motion vectors to obtain input frames 7102 and motion vectors 7104, and variations thereof. In at least one embodiment, one or more rendering devices generate input frames 7102, motion vectors 7104, and/or reference frames 7110 from a particular computer graphics application or program (e.g., a video game program).

In at least one embodiment, a neural network 7106 is trained to process input frames 7102 and motion vectors 7104, and generate output frames 7108 that closely approximate or match corresponding reference frames 7110. In at least one embodiment, one or more rendering devices, through one or more computer graphics applications or programs, generate and store input frames 7102, motion vectors 7104, and reference frames 7110, in which one or more systems retrieve stored input frames 7102, motion vectors 7104, and reference frames 7110 to train a neural network 7106. In at least one embodiment, a neural network 7106 is a convolutional autoencoder network. In at least one embodiment, a neural network 7106 is trained using frames and/or motion vectors from a particular computer graphics application or program (e.g., a video game program) and is usable to generate frames for a particular computer graphics application or program. In at least one embodiment, a neural network 7106 is trained to generate high quality versions of input frames 7102 (e.g., upscaled/higher resolution frames, anti-aliased frames) as output frames 7108. In at least one embodiment, a neural network 7106 is trained to upscale and anti-alias frames of input frames 7102 as output frames 7108. In at least one embodiment, a neural network 7106 utilizes motion vectors 7104 to generate output frames 7108. In at least one embodiment, a neural network 7106 generates a first output frame of output frames 7108 from input frames 7102 and motion vectors 7104, generates a second output frame of output frames 7108 from a first output frame of output frames 7108, input frames 7102, and motion vectors 7104, and so on for subsequent output frames of output frames 7108. In at least one embodiment, a neural network 7106 applies sets of motion vectors from motion vectors 7104 to frames of output frames 7108 to generate subsequent frames of output frames 7108. In at least one embodiment, a neural network 7106 utilizes motion vectors 7104 as part of one or more temporal feedback processes that apply motion vectors to output frames to generate subsequent output frames.

In at least one embodiment, output frames 7108 are higher quality versions of input frames 7102, which can refer to various qualities, such as higher resolution, higher degrees of various post processing techniques and/or effects, and/or variations thereof. In at least one embodiment, a video game program is executing in connection with one or more computer graphics hardware, in which a frame is rendered and input to a neural network 7106, in which neural network 7106 generates a corresponding higher quality frame (e.g., an upscaled and/or anti-aliased frame). In at least one embodiment, a neural network 7106 is trained to output frames (e.g., output frames 7108) with various post processing techniques and/or effects from frames (e.g., input frames 7102) with minimal post processing techniques and/or effects. In at least one embodiment, a neural network 7106 obtains a frame and corresponding motion vectors, such as a frame and motion vectors of input frames 7102 and motion vectors 7104, respectively, and generates a corresponding high quality output frame, such as a frame of output frames 7108 (e.g., a frame with various post processing techniques and/or effects, such as an upscaled frame, an anti-aliased frame, an upscaled and anti-aliased frame, and/or variations thereof). In at least one embodiment, a neural network 7106 obtains an input frame (e.g., a frame of input frames 7102), a previous output frame (e.g., a previously generated output frame of output frames 7108), and motion vectors (e.g., motion vectors of motion vectors 7104), and generates an output frame (e.g., a subsequent output frame of output frames 7108).

In at least one embodiment, a neural network 7106 is trained and/or updated by comparing generated output frames 7108 with reference frames 7110. In at least one embodiment, a neural network 7106 is trained and used in connection with FIG. 70. In at least one embodiment, a neural network 7106 is trained or otherwise updated by one or more systems using a training framework such as a PyTorch, TensorFlow, Boost, Caffe, Microsoft Cognitive Toolkit/CNTK, MXNet, Chainer, Keras, Deeplearning4j, or any suitable training framework. In at least one embodiment, a neural network 7106 is trained by comparing output frames 7108 with reference frames 7110, determining differences between output frames 7108 and reference frames 7110, and utilizing determined differences to update weights and other components of neural network 7106 such that differences between output frames 7108 and reference frames 7110 are minimized.

In at least one embodiment, training is performed at least in a supervised, partially supervised, and/or unsupervised manner. In at least one embodiment, a neural network 7106 is trained to match input frames 7102 to reference frames 7110. In at least one embodiment, a neural network 7106 is trained by one or more systems that cause neural network 7106 to produce an output frame of output frames 7108 from a frame of input frames 7102, and measure a difference between an output frame of output frames 7108 and a corresponding frame of reference frames 7110. In at least one embodiment, a neural network 7106 is trained by one or more systems that cause neural network 7106 to obtain a frame of input frames 7102 and perform one or more neural network image processing/generation/rendering operations (e.g., generate new pixels, modify existing pixels) to generate an output frame of output frames 7108, compare an output frame of output frames 7108 with a corresponding frame of reference frames 7110, and adjust weights of neural network 7106 based at least in part on a comparison of an output frame of output frames 7108 with a corresponding frame of reference frames 7110. In at least one embodiment, a frame of output frames 7108 is compared with a frame of reference frames 7110 by comparing pixels of both frames with each other. In at least one embodiment, frames are compared by comparing pixel characteristics of frames (e.g., pixel intensity, pixel brightness, pixel color, pixel contrast) and measuring differences in pixel characteristics (e.g., differences in pixel intensity, pixel brightness, pixel color, pixel contrast between pixels of frames). In at least one embodiment, a neural network 7106 is trained using one or more back propagation processes in connection with one or more loss functions. In at least one embodiment, a neural network 7106 is trained using various techniques described herein such as those described in connection with FIG. 29.

In at least one embodiment, one or more systems depicted in FIGS. 28A and 28B are utilized to implement a framework for image processing (e.g., real-time image rendering and enhancement). In at least one embodiment, one or more systems depicted in FIGS. 28A and 28B are utilized to perform various processes such as those described in connection with FIGS. 1-27. In at least one embodiment, one or more systems depicted in FIGS. 28A and 28B are utilized to generate and apply blue noise masks to images that are able to handle the temporal domain, i.e., adding time to the spatial (image) domain to improve image quality when rendering images over multiple frames (e.g., time).

Figure 72:
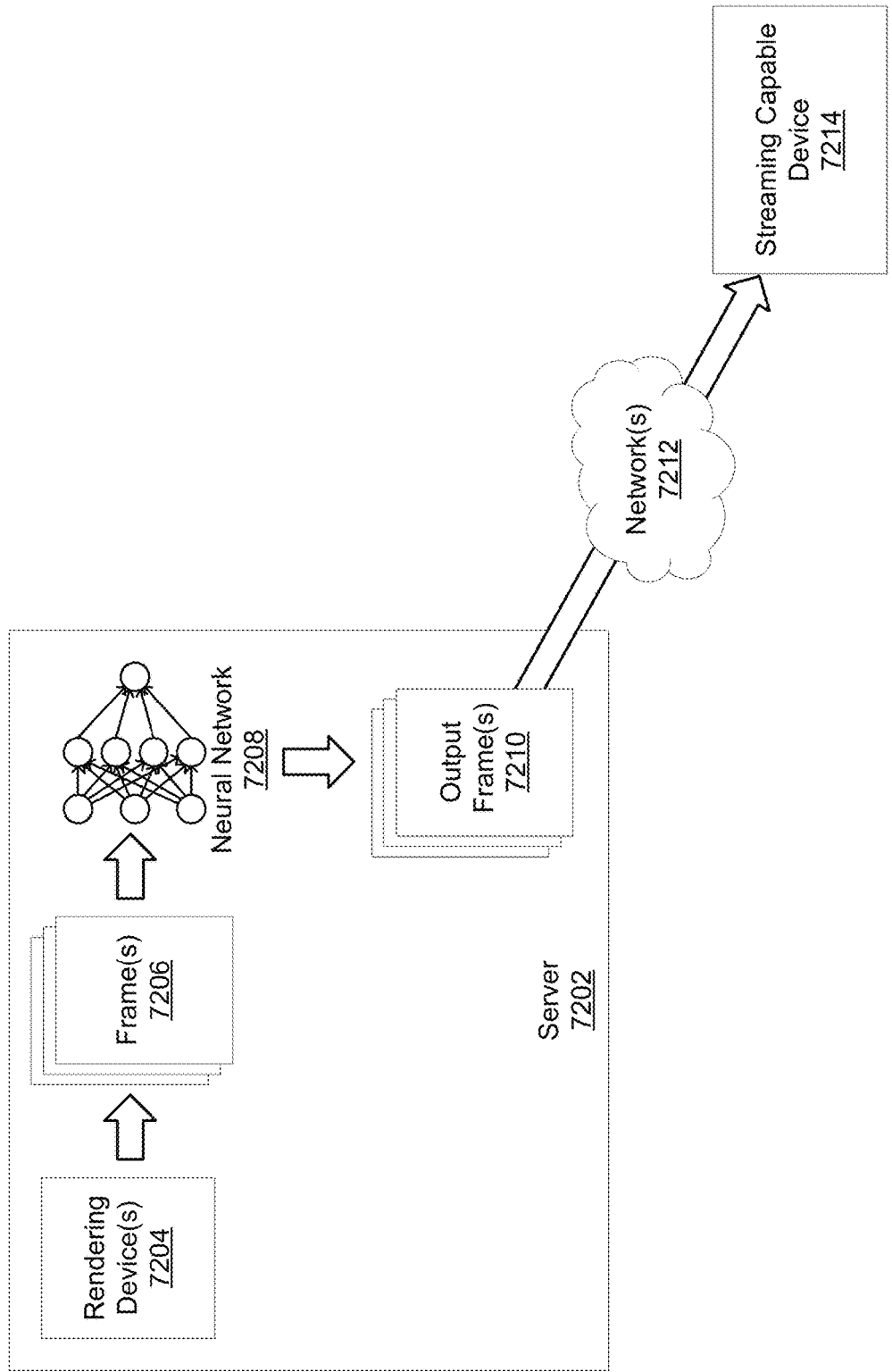
FIG. 72 illustrates an example of streaming using a super sampling neural network, in accordance with at least one embodiment.

FIG. 72 illustrates an example of streaming using a super sampling neural network, in accordance with at least one embodiment. In at least one embodiment, a neural network 7208 processes frame(s) 7206 generated by rendering device(s) 7204 to generate output frame(s) 7210, which are streamed via network(s) 7212 to a streaming capable device 7214. In at least one embodiment, a neural network 7208 is referred to as a DLSS network, super sampling neural network, super sampling network, and/or variations thereof. In at least one embodiment, a neural network 7208 is trained using techniques such as those described in connection with FIG. 71. In at least one embodiment, neural network 7208 is used in process 100 (see FIG. 1A) or process 106 (see FIG. 1B), e.g., as part of DLSS computing or image rendering.

In at least one embodiment, a server 7202 is a collection of one or more computer hardware and/or software components. In at least one embodiment, a server 7202 provides various functionalities to other programs or devices, referred to as clients. In at least one embodiment, a server 7202 provides streaming services. In at least one embodiment, streaming services refer to services that provide streaming media to a user. In at least one embodiment, streaming media refers to multimedia (e.g., video, audio) that is constantly received by and presented to a user while being delivered by a provider. In at least one embodiment, a server 7202 provides video game streaming services. In at least one embodiment, a server 7202 provides services in which frames of a video game are constantly received by and presented to a user while being delivered/generated by a server 7202. In at least one embodiment, a server 7202 comprises rendering device(s) 7204. In at least one embodiment, a server 7202 comprises one or more hardware and/or software components that implement a neural network 7208. In at least one embodiment, a server 7202 comprises one or more data storage components (e.g., hard drives) that provide storage and processing of frame(s) 7206 and output frame(s) 7210.

In at least one embodiment, rendering device(s) 7204 comprise one or more computer graphics rendering hardware and/or software components. In at least one embodiment, rendering device(s) 7204 comprise one or more graphics processing units. In at least one embodiment, rendering device(s) 7204 comprise one or more computing devices that generate and/or render graphics. In at least one embodiment, rendering device(s) 7204 comprise one or more computing devices that generate renders from a video game. In at least one embodiment, rendering device(s) 7204 render frames of a video game or other computer graphics program. In at least one embodiment, rendering device(s) 7204, using input data from a computer graphics program (e.g., a video game program), renders frame(s) 7206.

In at least one embodiment, frame(s) 7206 are frames rendered by rendering device(s) 7204. In at least one embodiment, frame(s) 7206 are associated with motion vectors that indicate directions of movement of objects of frame(s) 7206. In at least one embodiment, frame(s) 7206 and associated motion vectors are generated by rendering device(s) 7204. In at least one embodiment, frame(s) 7206 comprise frames generated by a particular video game program. In at least one embodiment, a video game program is executed by one or more computing devices that comprise graphics hardware (e.g., rendering device(s) 7204) that generate real-time computer graphics. In at least one embodiment, a video game program is executing and generates a 3D scene, in which frame(s) 7206 comprise renders of a 3D scene. In at least one embodiment, frame(s) 7206 are frames that are rendered by a rendering device with various hardware and software constraints, such as graphics hardware limitations, memory limitations, and/or variations thereof. In at least one embodiment, frame(s) 7206 are frames that are rendered with minimal post processing techniques, such as anti-aliasing (e.g., frame(s) 7206 comprise frames that are rendered with a little to no degree of anti-aliasing).

In at least one embodiment, a neural network 7208 comprises one or more neural networks that generate high quality frames from input frames. In at least one embodiment, a neural network 7208 is trained using frames from a particular computer graphics application or program (e.g., a video game program) and is usable to generate frames for a particular computer graphics application or program. In at least one embodiment, a neural network 7208 is trained to generate high quality versions of frame(s) 7206 (e.g., upscaled/higher resolution frames, anti-aliased frames). In at least one embodiment, a neural network 7208 is trained to upscale and anti-alias frames of frame(s) 7206. In at least one embodiment, a video game program is executing in connection with one or more computer graphics hardware, in which a frame is rendered and input to a neural network 7208 (e.g., frame(s) 7206 are rendered by rendering device (s) 7204 and input to neural network 7208), in which neural network 7208 generates a corresponding higher quality frame (e.g., an upscaled and/or anti-aliased frame). In at least one embodiment, a neural network 7208 is trained to output frames with various post processing techniques and/or effects from frames with minimal post processing techniques and/or effects. In at least one embodiment, a neural network 7208 obtains a frame and corresponding motion vectors, and generates a corresponding high quality output frame (e.g., a frame with various post processing techniques and/or effects, such as an upscaled frame, an anti-aliased frame, an upscaled and anti-aliased frame, and/or variations thereof). In at least one embodiment, a neural network 7208 obtains frame(s) 7206 and motion vectors and generates output frame(s) 7210. In at least one embodiment, a neural network 7208 utilizes one or more temporal feedback processes that process output frames of output frame(s) 7210 in connection with frame(s) 7206 and associated motion vectors to generate subsequent frames of output frame(s) 7210.

In at least one embodiment, output frame(s) 7210 correspond to frame(s) 7206 (e.g., each frame of output frame(s) 7210 corresponds to a frame of frame(s) 7206). In at least one embodiment, output frame(s) 7210 are frames that are generated with various post processing techniques and/or effects. In at least one embodiment, output frame(s) 7210 are higher quality versions of frame(s) 7206. In at least one embodiment, output frame(s) 7210 comprise upscaled (e.g., higher resolution) and/or anti-aliased versions of frame(s) 7206.

In at least one embodiment, network(s) 7212 comprise any suitable computer communication network, such as Internet. In at least one embodiment, network(s) 7212 are cryptographically protected, encrypted, or otherwise secured. In at least one embodiment, network(s) 7212 comprise one or more computer network communication channels in which data is transmitted and received. In at least one embodiment, network(s) 7212 provide methods of communication between a server 7202 and a streaming capable device 7214. In at least one embodiment, output frame(s) 7210 are transmitted from a server 7202 via network(s) 7212 to a streaming capable device 7214.

In at least one embodiment, a streaming capable device 7214 is a computing device that is capable of receiving multimedia through one or more networks. In at least one embodiment, a streaming capable device 7214 is a device with limited graphics rendering capabilities that is unable to render frames such as output frame(s) 7210, but is able to access a server 7202 via network(s) 7212 to obtain output frame(s) 7210. In at least one embodiment, a streaming capable device 7214 is a streaming capable computing device such that streaming capable device 7214 comprises various hardware and/or software components that constantly receive and/or obtain multimedia from one or more networks. In at least one embodiment, a streaming capable device 7214 is a computing device such as a mobile phone, laptop, computer, gaming console, tablet, and/or variations thereof. In at least one embodiment, a streaming capable device 7214 comprises one or more computer networking components, such as various receivers, transmitters, and/or transceivers, which obtain and process multimedia transmitted through one or more networks. In at least one embodiment, a streaming capable device 7214 is operable by one or more users. In at least one embodiment, a streaming capable device 7214 receives output frame(s) 7210 through network(s) 7212. In at least one embodiment, a streaming capable device 7214 receives output frame(s) 7210 in connection with one or more programs executing on streaming capable device 7214 that display and/or process output frame(s) 7210.

In at least one embodiment, a streaming capable device 7214 comprises one or more software programs and/or applications that processes obtained output frame(s) 7210 and provides output frame(s) 7210 to be viewed (e.g., via an electronic visual display of streaming capable device 7214) and/or interacted with (e.g., via various user input hardware of streaming capable device 7214) by one or more users. In at least one embodiment, a streaming capable device 7214 comprises one or more electronic visual display hardware, such as a liquid crystal display (LCD), light-emitting diode (LED) display, and/or variations thereof, and one or more user input hardware, such as computer mouse, keyboard, gaming controller, and/or variations thereof, in which users utilize to interact with one or more software programs and/or applications executing on streaming capable device 7214. In at least one embodiment, a streaming capable device 7214 provides indications of user input to a server 7202 via network(s) 7212, in which frame(s) 7206 are generated by rendering device(s) 7204 based at least in part on user input.

In at least one embodiment, a video game program is executing on a server 7202, where frame(s) 7206 are frames of a video game program, in which frame(s) 7206 are rendered by rendering device(s) 7204, and processed and transmitted as output frame(s) 7210 to a streaming capable device 7214, in which a user interacts with streaming capable device 7214 in connection with output frame(s) 7210 (e.g., output frame(s) 7210 are frames of a video game program requiring interaction, in which a user inputs interaction to streaming capable device 7214), in which user interactions are transmitted to server 7202 to a video game program to determine how subsequent frames of a video game program are to be rendered by rendering device(s) 7204. In at least one embodiment, frame(s) 7206 are rendered based at least in part on input from a user in connection with a streaming capable device 7214, and processed by a neural network 7208 to generate output frame(s) 7210, in which output frame(s) 7210 are transmitted to streaming capable device 7214, in which further user input is received by streaming capable device 7214 and transmitted to server 7202 to generate subsequent frames, which are then processed by neural network 7208 and transmitted to streaming capable device 7214, and so on for subsequent frames and subsequent user input.

In at least one embodiment, one or more systems depicted in FIGS. 28A and 28B are utilized to implement a framework for image processing (e.g., real-time image rendering and enhancement). In at least one embodiment, one or more systems depicted in FIGS. 28A and 28B are utilized to perform various processes such as those described in connection with FIGS. 1-27. In at least one embodiment, one or more systems depicted in FIGS. 28A and 28B are utilized to generate and apply blue noise masks to images that are able to handle the temporal domain, i.e., adding time to the spatial (image) domain to improve image quality when rendering images over multiple frames (e.g., time).

Figure 73:
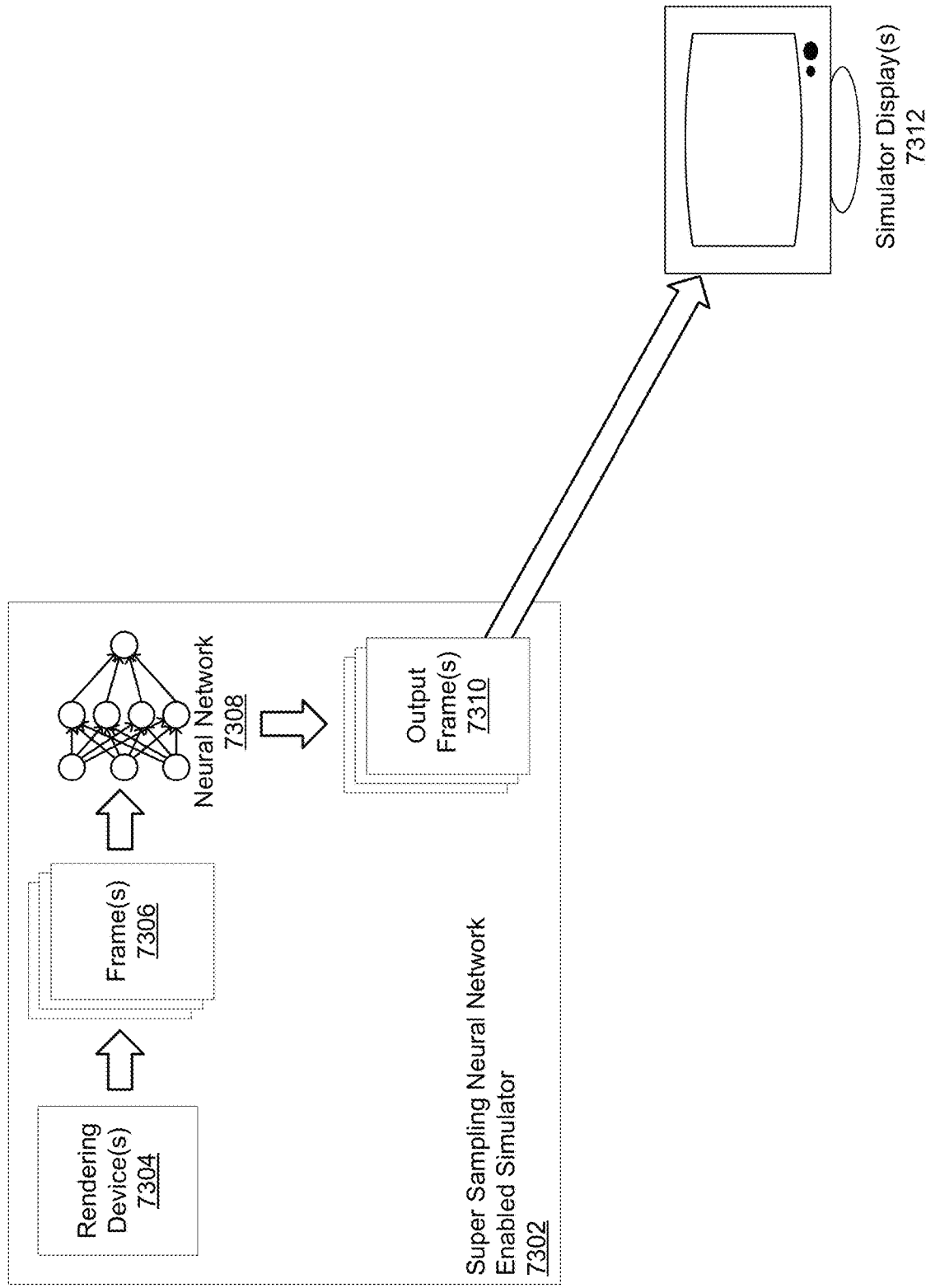
FIG. 73 illustrates an example of simulation using a super sampling neural network, in accordance with at least one embodiment.

FIG. 73 illustrates an example of simulation using a super sampling neural network, in accordance with at least one embodiment. In at least one embodiment, a neural network 7308 processes frame(s) 7306 generated by rendering device(s) 7304 to generate output frame(s) 7310, which are output to simulator display(s) 7312. In at least one embodiment, a neural network 7308 is referred to as a DLSS network, super sampling neural network, super sampling network, and/or variations thereof. In at least one embodiment, a neural network 7308 is trained using techniques such as those described in connection with FIG. 71.

In at least one embodiment, a super sampling neural network enabled simulator 7302 is a collection of one or more computer hardware and/or software components. In at least one embodiment, a super sampling neural network enabled simulator 7302 comprises rendering device(s) 7304. In at least one embodiment, a super sampling neural network enabled simulator 7302 comprises one or more hardware and/or software components that implement a neural network 7308. In at least one embodiment, a super sampling neural network enabled simulator 7302 comprises one or more data storage components (e.g., hard drives) that provide storage and processing of frame(s) 7306 and output frame(s) 7310.

In at least one embodiment, a super sampling neural network enabled simulator 7302 is a simulator device, such as a flight simulator, driving simulator, and/or variations thereof, that executes various simulator programs, such as flight simulator programs, driving simulator programs, and/or variations thereof. In at least one embodiment, a flight simulator is a device that artificially re-creates aircraft flight and an environment in which it flies. In at least one embodiment, a flight simulator, through execution of a flight simulator program, simulates various aspects of flight, such as physics of how aircraft fly, how aircraft react to applications of various flight controls, effects of other aircraft systems, and effects of factors such as turbulence, air density, wind shear, cloud, precipitation, weather, and/or variations thereof, on aircraft. In at least one embodiment, a flight simulator (e.g., a super sampling neural network enabled simulator 7302) comprises one or more hardware components that simulate an aircraft, such as hardware of a cockpit of an aircraft, that allow user interaction with a flight simulator (e.g., hardware components comprise various user input devices, such as a steering wheel, controller, joystick, buttons, switches, levers, and/or variations thereof). In at least one embodiment, a flight simulator comprises one or more displays (e.g., simulator display(s) 7312) that users interact with in connection with hardware of a flight simulator to simulate various aspects of flight. In at least one embodiment, a driving simulator is a device that artificially recreates motor vehicle movement and an environment in which it moves. In at least one embodiment, a driving simulator, through execution of a driving simulator program, simulates various aspects of operation of a motor vehicle, such as physics of a motor vehicle, how a motor vehicle reacts to applications of various motor vehicle controls, effects of other motor vehicle systems, and effects of factors such as environmental changes, wind, weather, and/or variations thereof, on motor vehicles. In at least one embodiment, a driving simulator (e.g., a super sampling neural network enabled simulator 7302) comprises one or more hardware components that simulate a motor vehicle, such as hardware of a driver seat of a motor vehicle, that allow user interaction with a driving simulator (e.g., hardware components comprise various user input devices, such as a steering wheel, pedals, controller, joystick, buttons, switches, levers, and/or variations thereof). In at least one embodiment, a driving simulator comprises one or more displays (e.g., simulator display(s) 7312) that users interact with in connection with hardware of a driving simulator to simulate various aspects of driving or other motor vehicle operation. In at least one embodiment, simulator display(s) 7312 are displays of a super sampling neural network enabled simulator 7302.

In at least one embodiment, rendering device(s) 7304 comprise one or more computer graphics rendering hardware and/or software components. In at least one embodiment, rendering device(s) 7304 comprise one or more graphics processing units. In at least one embodiment, rendering device(s) 7304 comprise one or more computing devices that generate and/or render graphics. In at least one embodiment, rendering device(s) 7304 comprise one or more computing devices that generate renders from a computer graphics program, such as a video game, simulation program, simulation video game, and/or variations thereof. In at least one embodiment, rendering device(s) 7304, using input data from a computer graphics program (e.g., a simulation program), renders frame(s) 7306.

In at least one embodiment, frame(s) 7306 are frames rendered by rendering device(s) 7304. In at least one embodiment, frame(s) 7306 are associated with motion vectors that indicate directions of movement of objects of frame(s) 7306. In at least one embodiment, frame(s) 7306 and associated motion vectors are generated by rendering device(s) 7304. In at least one embodiment, frame(s) 7306 comprise frames generated by a particular simulation program, such as a flight simulator program, driving simulator program, and/or variations thereof. In at least one embodiment, a simulation program is executed by one or more computing devices that comprise graphics hardware (e.g., rendering device(s) 7304) that generate real-time computer graphics. In at least one embodiment, a simulation program is executing and generates a 3D scene, in which frame(s) 7306 comprise renders of a 3D scene. In at least one embodiment, frame(s) 7306 are frames that are rendered with minimal post processing techniques, such as anti-aliasing (e.g., frame(s) 7306 comprise frames that are rendered with a little to no degree of anti-aliasing).

In at least one embodiment, a neural network 7308 comprises one or more neural networks that generate high quality frames from input frames. In at least one embodiment, a neural network 7308 is trained using frames from a particular computer graphics application or program (e.g., a simulation program) and is usable to generate frames for a particular computer graphics application or program. In at least one embodiment, a neural network 7308 is trained to generate high quality versions of frame(s) 7306 (e.g., upscaled/higher resolution frames, anti-aliased frames). In at least one embodiment, a simulation program is executing in connection with one or more computer graphics hardware, in which a frame is rendered and input to a neural network 7308 (e.g., frame(s) 7306 are rendered by rendering device(s) 7304 and input to neural network 7308), in which neural network 7308 generates a corresponding higher quality frame (e.g., an upscaled and/or anti-aliased frame). In at least one embodiment, a neural network 7308 is trained to output frames with various post processing techniques and/or effects from frames with minimal post processing techniques and/or effects. In at least one embodiment, a neural network 7308 obtains a frame and corresponding motion vectors, and generates a corresponding high quality output frame (e.g., a frame with various post processing techniques and/or effects, such as an upscaled/higher resolution frame, an anti-aliased frame, an upscaled and anti-aliased frame, and/or variations thereof). In at least one embodiment, a neural network 7308 obtains frame(s) 7306 and/or motion vectors and generates output frame(s) 7310. In at least one embodiment, a neural network 7308 utilizes one or more temporal feedback processes that process output frames of output frame(s) 7310 in connection with frame(s) 7306 and associated motion vectors to generate subsequent frames of output frame(s) 7310.

In at least one embodiment, output frame(s) 7310 correspond to frame(s) 7306 (e.g., each frame of output frame(s) 7310 corresponds to a frame of frame(s) 7306). In at least one embodiment, output frame(s) 7310 are frames that are generated with various post processing techniques and/or effects. In at least one embodiment, output frame(s) 7310 are higher quality versions of frame(s) 7306. In at least one embodiment, output frame(s) 7310 comprise upscaled and/or anti-aliased versions of frame(s) 7306. In at least one embodiment, output frame(s) 7310 are displayed on simulator display(s) 7312 as part of operation of one or more simulators (e.g., super sampling neural network enabled simulator 7302), such as a flight simulator that executes a flight simulator program, a driving simulator that executes a driving simulator program, and/or variations thereof. In at least one embodiment, a user is operating a super sampling neural network enabled simulator 7302 and performs one or more actions, through one or more user input devices, based at least in part on output frame(s) 7310 displayed on simulator display(s) 7312.

In at least one embodiment, one or more systems depicted in FIGS. 28A and 28B are utilized to implement a framework for image processing (e.g., real-time image rendering and enhancement). In at least one embodiment, one or more systems depicted in FIGS. 28A and 28B are utilized to perform various processes such as those described in connection with FIGS. 1-27. In at least one embodiment, one or more systems depicted in FIGS. 28A and 28B are utilized to generate and apply blue noise masks to images that are able to handle the temporal domain, i.e., adding time to the spatial (image) domain to improve image quality when rendering images over multiple frames (e.g., time).

Figure 74:
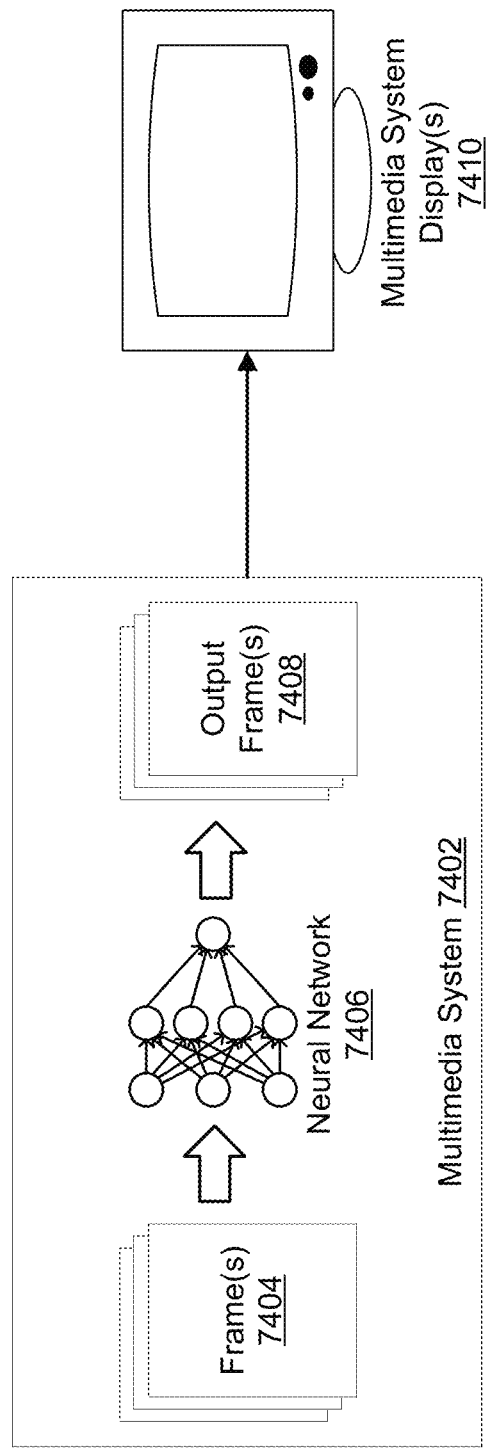
FIG. 74 illustrates an example of a device using a super sampling neural network, in accordance with at least one embodiment.

FIG. 74 illustrates an example of a device using a super sampling neural network, in accordance with at least one embodiment. In at least one embodiment, a neural network 7406 processes frame(s) 7404 generated by a multimedia system 7402 to generate output frame(s) 7408, which are output to multimedia system display(s) 7410. In at least one embodiment, a neural network 7406 is referred to as a DLSS network, super sampling neural network, super sampling network, and/or variations thereof. In at least one embodiment, a neural network 7406 is trained using techniques such as those described in connection with FIG. 71.

In at least one embodiment, a multimedia system 7402 is a collection of one or more computer hardware and/or software components. In at least one embodiment, a multimedia system 7402 comprises one or more rendering devices. In at least one embodiment, a multimedia system 7402 comprises one or more hardware and/or software components that implement a neural network 7406. In at least one embodiment, a multimedia system 7402 comprises one or more data storage components (e.g., hard drives) that provide storage and processing of frame(s) 7404 and output frame(s) 7408. In at least one embodiment, a multimedia system 7402 is a gaming console, such as those described in accordance with FIG. 68. In at least one embodiment, a multimedia system 7402 is any suitable computing device that processes multimedia, such as a computer, tablet, gaming device, gaming console, mobile device, and/or variations thereof. In at least one embodiment, multimedia system display(s) 7410 are one or more electronic visual display hardware that display data (e.g., multimedia, video games) from a multimedia system 7402. In at least one embodiment, multimedia system display(s) 7410 are displays of a multimedia system 7402.

In at least one embodiment, a multimedia system 7402 comprises one or more computer graphics rendering hardware and/or software components. In at least one embodiment, a multimedia system 7402 comprises one or more graphics processing units. In at least one embodiment, a multimedia system 7402 comprises one or more computing devices that generate and/or render graphics. In at least one embodiment, a multimedia system 7402 comprises one or more processors that execute various programs, such as video game programs, software applications, software programs, and/or variations thereof. In at least one embodiment, a multimedia system 7402 comprises one or more computing devices that generate renders from a computer graphics program, such as a video game. In at least one embodiment, a multimedia system 7402, using input data from a computer graphics program executing on multimedia system 7402 (e.g., a video game program), renders frame(s) 7404. In at least one embodiment, a multimedia system 7402 comprises one or more hardware components that allow user interaction with a multimedia system 7402 (e.g., hardware components comprise various user input devices, such as controllers, joysticks, buttons, switches, levers, and/or variations thereof). In at least one embodiment, a multimedia system 7402 is connected to one or more user input devices that allow users to interact with various programs executing on a multimedia system 7402 (e.g., video game programs).

In at least one embodiment, frame(s) 7404 are frames rendered by a multimedia system 7402. In at least one embodiment, frame(s) 7404 are associated with motion vectors that indicate directions of movement of objects of frame(s) 7404. In at least one embodiment, frame(s) 7404 and associated motion vectors are generated by a multimedia system 7402. In at least one embodiment, frame(s) 7404 comprise frames generated by a particular video game program. In at least one embodiment, a video game program is executed by one or more computing devices that comprise graphics hardware (e.g., a multimedia system 7402) that generate real-time computer graphics. In at least one embodiment, a video game program is executing and generates a 3D scene, in which frame(s) 7404 comprise renders of a 3D scene. In at least one embodiment, frame(s) 7404 are frames that are rendered with minimal post processing techniques, such as anti-aliasing (e.g., frame(s) 7404 comprise frames that are rendered with a little to no degree of anti-aliasing).

In at least one embodiment, a neural network 7406 comprises one or more neural networks that generate high quality frames from input frames. In at least one embodiment, a neural network 7406 is trained using frames from a particular computer graphics application or program (e.g., a video game program) and is usable to generate frames for a particular computer graphics application or program. In at least one embodiment, a neural network 7406 is trained to generate high quality versions of frame(s) 7404 (e.g., upscaled/higher resolution frames, anti-aliased frames). In at least one embodiment, a video game program is executing in connection with one or more computer graphics hardware, in which a frame is rendered and input to a neural network 7406 (e.g., frame(s) 7404 are rendered by a multimedia system 7402 and input to neural network 7406), in which neural network 7406 generates a corresponding higher quality frame (e.g., an upscaled/higher resolution and/or anti-aliased frame). In at least one embodiment, a neural network 7406 is trained to output frames with various post processing techniques and/or effects from frames with minimal post processing techniques and/or effects. In at least one embodiment, a neural network 7406 obtains a frame and corresponding motion vectors, and generates a corresponding high quality output frame (e.g., a frame with various post processing techniques and/or effects, such as an upscaled/higher resolution frame, an anti-aliased frame, an upscaled and anti-aliased frame, and/or variations thereof). In at least one embodiment, a neural network 7406 obtains frame(s) 7404 and/or motion vectors and generates output frame(s) 7408. In at least one embodiment, a neural network 7406 utilizes one or more temporal feedback processes that process output frames of output frame(s) 7408 in connection with frame(s) 7404 and associated motion vectors to generate subsequent frames of output frame(s) 7408.

In at least one embodiment, output frame(s) 7408 correspond to frame(s) 7404 (e.g., each frame of output frame(s) 7408 corresponds to a frame of frame(s) 7404). In at least one embodiment, output frame(s) 7408 are frames that are generated with various post processing techniques and/or effects. In at least one embodiment, output frame(s) 7408 are higher quality versions of frame(s) 7404. In at least one embodiment, output frame(s) 7408 comprise upscaled and/or anti-aliased versions of frame(s) 7404. In at least one embodiment, a neural network 7406 constantly generates output frames of output frame(s) 7408 as frames of frame(s) 7404 are rendered by a multimedia system 7402. In at least one embodiment, output frame(s) 7408 are displayed on multimedia display(s) 7410 as part of operation of one or more video game programs. In at least one embodiment, a user is operating a multimedia system 7402 and performs one or more actions, through one or more user input devices, based at least in part on output frame(s) 7408 displayed on multimedia display(s) 7410.

In at least one embodiment, one or more systems depicted in FIGS. 28A and 28B are utilized to implement a framework for image processing (e.g., real-time image rendering and enhancement). In at least one embodiment, one or more systems depicted in FIGS. 28A and 28B are utilized to perform various processes such as those described in connection with FIGS. 1-27. In at least one embodiment, one or more systems depicted in FIGS. 28A and 28B are utilized to generate and apply blue noise masks to images that are able to handle the temporal domain, i.e., adding time to the spatial (image) domain to improve image quality when rendering images over multiple frames (e.g., time).

In at least one embodiment, a single semiconductor platform may refer to a sole unitary semiconductor-based integrated circuit or chip. In at least one embodiment, multi-chip modules may be used with increased connectivity which simulate on-chip operation, and make substantial improvements over utilizing a conventional central processing unit ("CPU") and bus implementation. In at least one embodiment, various modules may also be situated separately or in various combinations of semiconductor platforms per desires of user.

In at least one embodiment, referring back to FIG. 34, computer programs in form of machine-readable executable code or computer control logic algorithms are stored in main memory 3404 and/or secondary storage. Computer programs, if executed by one or more processors, enable system 3400 to perform various functions in accordance with at least one embodiment. In at least one embodiment, memory 3404, storage, and/or any other storage are possible examples of computer-readable media. In at least one embodiment, secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory, etc. In at least one embodiment, architecture and/or functionality of various previous figures are implemented in context of CPU 3402, parallel processing system 3412, an integrated circuit capable of at least a portion of capabilities of both CPU 3402, parallel processing system 3412, a chipset (e.g., a group of integrated circuits designed to work and sold as a unit for performing related functions, etc.), and/or any suitable combination of integrated circuit(s).

In at least one embodiment, architecture and/or functionality of various previous figures are implemented in context of a general computer system, a circuit board system, a game console system dedicated for entertainment purposes, an application-specific system, and more. In at least one embodiment, computer system 3400 may take form of a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, a mobile phone device, a television, workstation, game consoles, embedded system, and/or any other type of logic.

In at least one embodiment, parallel processing system 3412 includes, without limitation, a plurality of parallel processing units ("PPUs") 3414 and associated memories 3416. In at least one embodiment, PPUs 3414 are connected to a host processor or other peripheral devices via an interconnect 3418 and a switch 3420 or multiplexer. In at least one embodiment, parallel processing system 3412 distributes computational tasks across PPUs 3414 which can be parallelizable—for example, as part of distribution of computational tasks across multiple graphics processing unit ("GPU") thread blocks. In at least one embodiment, memory is shared and accessible (e.g., for read and/or write access) across some or all of PPUs 3414, although such shared memory may incur performance penalties relative to use of local memory and registers resident to a PPU 3414. In at least one embodiment, operation of PPUs 3414 is synchronized through use of a command such as _syncthreads( ), wherein all threads in a block (e.g., executed across multiple PPUs 3414) to reach a certain point of execution of code before proceeding.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A processor comprising:
   one or more processing units to perform a plurality of operations including:
   computing an energy value for at least some pixels of one or more images based on coordinates of the at least some pixels at different times, a distance between a pair of the at least some pixels, and an energy falloff parameter, wherein the energy value of a pixel in the at least some pixels is a non-zero value as a result of the pixel and another pixel being in a same two-dimensional layer or the pixel and the other pixel having identical coordinates at different temporal slices;
   generating a mask to apply to the one or more images based on the energy value computed for the at least some pixels; and
   rendering an output image over multiple frames based on applying the mask to the one or more images.

2. The processor of claim 1, wherein the distance between the pair of the at least some pixels is computed toroidally.

3. The processor of claim 1, wherein the plurality of operations further comprise:
   receiving pixel data with three dimensions corresponding to the one or more images, wherein one dimension of the three dimensions corresponds to a time dimension, wherein the pixel data includes coordinates for each pixel, and wherein the mask is a three-dimensional mask.

4. The processor of claim 1, wherein the plurality of operations further comprise:
   setting the energy value of a first pixel of the at least some pixels to a zero value if the first pixel and a second pixel are not in a same two-dimensional layer or do not have identical coordinates.

5. The processor of claim 1, wherein the plurality of operations further comprise:
   providing the output image as part of an image generation pipeline that includes ray tracing.

6. The processor of claim 1, wherein the plurality of operations further comprise:
   applying a temporal image upscaling to the one or more images, wherein the upscaling is based on a neural network inferring upscaling from a lower resolution image.

7. The processor of claim 1, wherein the plurality of operations further comprise:
   obtaining pixel data corresponding to the one or more images, and including more than three dimensions.

8. The processor of claim 7, wherein the plurality of operations further comprise:
   applying a void and cluster algorithm to the pixel data, and wherein an energy function for the void and cluster algorithm is based on computed intensity values.

9. The processor of claim 1, wherein the energy falloff parameter is a Gaussian blur parameter.

10. The processor of claim 1, wherein the plurality of operations further comprise:
    sampling the one or more images to obtain pixel data for one or more pixels comprising at least one coordinate for each of the one or more pixels.

11. A computer-implemented method comprising:
    Computing one or more energy values for at least some pixels for one or more images based on coordinates of the at least some pixels, a distance between a pair of the at least some pixels, and an energy falloff parameter, wherein an energy value of the one or more energy values computed for a pixel in the at least some pixels is a non-zero value if the pixel and another pixel are in a same two-dimensional layer or the pixel and the other pixel have identical coordinates at different temporal slices;
    generating a three-dimensional mask to apply to received one or more images based on the one or more energy values computed for the at least some pixels; and
    providing an output image based on applying the three-dimensional mask to the received one or more images.

12. The computer-implemented method of claim 11, wherein the three-dimensional mask adds blue noise to the one or more images.

13. The computer-implemented method of claim 11, wherein the distance between the pair of the at least some pixels is computed toroidally.

14. The computer-implemented method of claim 11, further comprising:
    receiving pixel data with three dimensions corresponding to the one or more images, wherein one dimension of the three dimensions corresponds to a time dimension, and wherein the pixel data includes coordinates for each pixel.

15. The computer-implemented method of claim 11, further comprising:
    Setting a first energy value of the one or more energy values computed for a first pixel in the at least some pixels to a zero value if the first pixel and a second pixel are not in a same two-dimensional layer or do not have identical coordinates.

16. The computer-implemented method of claim 11, wherein providing the output image is part of an image generation pipeline that includes ray tracing or path tracing.

17. The computer-implemented method of claim 11, further comprising:
    applying a temporal image upscaling to the one or more images, wherein the upscaling is based on a lower resolution image.

18. The computer-implemented method of claim 11, further comprising:
    obtaining pixel data corresponding to the one or more images; and
    applying a void and cluster algorithm to the pixel data, and wherein an energy function for the void and cluster algorithm is based on the one or more energy values.

19. The computer-implemented method of claim 11, further comprising:
    obtaining pixel data comprising one or more coordinates for one or more pixels of the one or more images, wherein the energy falloff parameter is a Gaussian blur parameter based on the coordinates of the pixel data.

20. The computer-implemented method of claim 11, further comprising:
    applying a low pass filter before providing the output image.

21. The computer-implemented method of claim 11, further comprising:
    sampling the one or more images to obtain pixel data comprising at least three dimensions.

22. The computer-implemented method of claim 11, wherein providing the output image further comprises using the three-dimensional mask with at least one of dithering, stochastic transparency, area light sampling, volumetric rendering, path tracing, temporal anti-aliasing, or stochastic alpha image processing techniques.

23. A system comprising:
one or more processors to perform operations comprising:
obtaining energy values by computing an energy value for at least some pixels of one or more images based on coordinates of the at least some pixels, a distance between a pair of the at least some pixels, and an energy falloff parameter, wherein the energy value of a pixel in the at least some pixels is a non-zero value based on the pixel and another pixel being in a same two-dimensional layer or the pixel and the other pixel having identical coordinates at different temporal slices;
generating a mask to apply to the one or more images based on the energy values; and
providing an output image over multiple frames based on the mask to the one or more images.

24. The system of claim 23, wherein the distance between the pair of the at least some pixels is computed toroidally.

25. The system of claim 23, wherein providing the output image is part of an image generation pipeline that includes ray tracing.

26. The system of claim 23, wherein the operations further comprise:
receiving pixel data with three dimensions corresponding to the one or more images, wherein one dimension of the three dimensions corresponds to a time dimension, wherein the pixel data includes coordinates for each pixel, and wherein the mask is a three-dimensional mask.

27. The system of claim 26, wherein the energy falloff parameter is a Gaussian blur parameter based on the coordinates of the pixel data.

28. The system of claim 23, wherein the operations further comprise:
applying a temporal image upscaling to the one or more images, wherein the upscaling is based on a neural network inferring upscaling from a lower resolution image.

29. The system of claim 23, wherein the mask adds blue noise to the one or more images.

30. The system of claim 23, wherein the operations further comprise:
applying a low pass filter before providing the output image.

31. The system of claim 23, wherein the operations further comprise:
sampling the one or more images to obtain pixel data comprising at least three dimensions.

* * * * *